US008300031B2

(12) United States Patent
Kimura

(10) Patent No.: US 8,300,031 B2
(45) Date of Patent: Oct. 30, 2012

(54) SEMICONDUCTOR DEVICE COMPRISING TRANSISTOR HAVING GATE AND DRAIN CONNECTED THROUGH A CURRENT-VOLTAGE CONVERSION ELEMENT

(75) Inventor: Hajime Kimura, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1031 days.

(21) Appl. No.: 11/391,373

(22) Filed: Mar. 29, 2006

(65) Prior Publication Data

US 2006/0238135 A1 Oct. 26, 2006

(30) Foreign Application Priority Data

Apr. 20, 2005 (JP) ................................ 2005-121917

(51) Int. Cl.
*G06F 3/038* (2006.01)

(52) U.S. Cl. ........................................................ 345/204

(58) Field of Classification Search .............. 345/63–83, 345/204; 315/169.3
See application file for complete search history.

(56) References Cited

U.S. PATENT DOCUMENTS

| | | | |
|---|---|---|---|
| 5,929,464 | A | 7/1999 | Yamazaki et al. |
| 6,351,078 | B1 | 2/2002 | Wang et al. |
| 6,611,108 | B2 | 8/2003 | Kimura |
| 6,858,991 | B2 | 2/2005 | Miyazawa |
| 7,061,451 | B2 | 6/2006 | Kimura |
| 7,113,154 | B1 | 9/2006 | Inukai |
| 7,113,155 | B2 | 9/2006 | Kimura |
| 7,215,304 | B2 | 5/2007 | Tsuchiya et al. |
| 7,271,785 | B2 | 9/2007 | Jang |
| 7,557,780 | B2 | 7/2009 | Kimura |
| 7,612,746 | B2 | 11/2009 | Kimura |
| 7,760,162 | B2 | 7/2010 | Miyazawa |
| 2003/0090447 | A1 | 5/2003 | Kimura |
| 2003/0103022 | A1 | 6/2003 | Noguchi et al. |
| 2004/0246241 | A1 | 12/2004 | Sato et al. |
| 2004/0256646 | A1* | 12/2004 | Lee et al. ...................... 257/288 |
| 2005/0093791 | A1* | 5/2005 | Lo .................................. 345/82 |
| 2007/0035488 | A1 | 2/2007 | Kimura |
| 2009/0309823 | A1 | 12/2009 | Kimura |

FOREIGN PATENT DOCUMENTS

| | | | |
|---|---|---|---|
| EP | 1 103 946 | | 5/2001 |
| EP | 1291841 | A | 3/2003 |
| EP | 1622121 | A | 2/2006 |
| JP | 09-016123 | A | 1/1997 |
| JP | 2001-343933 | | 12/2001 |
| JP | 2002-014653 | A | 1/2002 |
| JP | 2002-072926 | A | 3/2002 |

(Continued)

*Primary Examiner* — Dennis Joseph
(74) *Attorney, Agent, or Firm* — Eric J. Robinson; Robinson Intellectual Property Law Office, P.C.

(57) ABSTRACT

When a signal inputted to a pixel is erased by setting potentials of a gate terminal and a source terminal of a driving transistor to be equal, a current slightly flows through the driving transistor in some cases, which leads to occur a display defect. The invention provides a display device which improves the yield while suppressing the increase in manufacturing cost. When a potential of a scan line for erasure is raised, a potential of the gate terminal of the driving transistor is raised accordingly. For example, the scan line and the gate terminal of the driving transistor are connected through a rectifying element.

10 Claims, 62 Drawing Sheets

FOREIGN PATENT DOCUMENTS

| | | | | |
|---|---|---|---|---|
| JP | 2002-323873 | A | | 11/2002 |
| JP | 2003-150106 | A | | 5/2003 |
| JP | 2003-195813 | A | | 7/2003 |
| JP | 2003-308030 | A | | 10/2003 |
| JP | 2004-054188 | A | | 2/2004 |
| JP | 2005-507505 | | | 3/2005 |
| WO | WO-03/037040 | | | 5/2003 |
| WO | WO 03/038790 | A2 | * | 5/2003 |

* cited by examiner

SEMICONDUCTOR DEVICE COMPRISING TRANSISTOR HAVING GATE AND DRAIN CONNECTED THROUGH A CURRENT-VOLTAGE CONVERSION ELEMENT

BACKGROUND OF THE INVENTION

1. Field of the Invention

The invention relates to a semiconductor device having a function to control with a transistor a current supplied to a load. In particular, the invention relates to a pixel formed of a current drive type light emitting element of which luminance changes by a current, to a display device including a scan line driver circuit and a signal line driver circuit, and to a driving method thereof. Further, the invention relates to an electronic device having the display device in the display portion.

2. Description of the Related Art

In recent years, what is called a self-luminous type display device, which has pixels formed of light emitting elements such as light emitting diodes (LEDs), is attracting attentions. As a light emitting element used for such a self-luminous type display device, an organic light emitting diode (OLED), an organic EL element, and electroluminescence (also referred to as an electroluminescence (EL) element) are notable and becoming to be used for an EL display and the like. A light emitting element such as an OLED which is a self-luminous element is advantageous in that visibility of pixels is high, a backlight is not required, response is fast, and the like as compared to a liquid crystal display. Luminance of a light emitting element is controlled by a current value flowing therethrough.

As a driving method to express a gray scale of such a display device, there are an analog gray scale method and a digital gray scale method. The analog method includes a method to control light emission intensity of a light emitting element in an analog manner and a method to control light emission time of a light emitting element in an analog manner. The analog gray scale method often employs a method to control light emission intensity of a light emitting element in an analog manner. However, the method to control light emission intensity in an analog manner is easily affected by variations in characteristics of a thin film transistor (hereinafter also referred to as a TFT) of each pixel, which leads to variations in light emission of each pixel. In the digital gray scale method, on the other hand, a light emitting element is controlled to be turned on/off in a digital manner to express a gray scale. In the case of the digital gray scale method, the uniformity in luminance of each pixel is excellent; however, only two gray scale levels can be expressed since there are only two states: light emission or non-light emission. Therefore, another method is used in combination to realize a multi-level gray scale. There is an area gray scale method to express a gray scale by selecting the weighted light emission areas of pixels and a time gray scale method to express a gray scale by selecting the weighted light emission time. In the digital gray scale method, a time gray scale method which is suitable for achieving high definition is often employed.

[Patent Document 1]

Japanese Patent Document Laid-open No. 2001-343933

SUMMARY OF THE INVENTION

In the time gray scale method, a transistor for driving a light emitting element is turned on/off in a digital manner. Therefore, variations in luminance of pixels due to the variations in characteristics of transistors which form pixels do not affect much.

Normally, when a transistor is turned on, a Low (hereinafter also referred to as an L-level) potential is inputted in the case of a P-channel transistor. This L-level potential is lower than a potential of a source terminal of the P-channel transistor, and a potential difference between the L-level potential and the potential of the source terminal of the P-channel transistor is equal to or lower than a threshold voltage of the P-channel transistor. Further, in the case of an N-channel transistor, a High (hereinafter also referred to as an H-level) potential is inputted. This H-level potential is higher than a potential of a source terminal of the N-channel transistor, and a potential difference between the H-level potential and the potential of the source terminal of the N-channel transistor is equal to or higher than a threshold voltage of the N-channel transistor. It is to be noted that a threshold voltage of a normal P-channel transistor is a voltage lower than 0 V. Further, a threshold voltage of a normal N-channel transistor is a voltage higher than 0 V. Therefore, when a gate-source voltage of a transistor is 0 V, the transistor is turned off and a current does not flow. Such a transistor is referred to as an enhancement transistor (also referred to as normally-off).

On the other hand, there is a transistor in which a current flows even when a gate-source voltage thereof is 0 V. It is to be noted that such a transistor is referred to as a depletion transistor (also referred to as normally-on).

Normally, a transistor is manufactured to be a normally-off state. However, there is a case where a transistor is manufactured into a normally-on state due to manufacturing variations. When a driving transistor is normally-on, there is a case where a current flows through the driving transistor and a current also flows to a light emitting element even when a pixel is not required to emit no light. Then, an accurate display cannot be performed.

In view of this, there is a case where a driving transistor is completely made normally-off by adding to a channel forming region impurities with an opposite conductive type to that of impurities added to a source region and a drain region of the driving transistor. That is, a driving transistor is made an enhancement transistor more completely in some cases, which is generally called channel doping. Alternatively, in the case where a driving transistor is a P-channel transistor, a potential of a video signal to turn off the driving transistor (a potential inputted to a gate terminal of the driving transistor) is set higher than a potential inputted to a source terminal of the driving transistor so as to turn off the driving transistor. Similarly, in the case where a driving transistor is an N-channel transistor, a potential of a video signal to turn off the driving transistor (a potential inputted to a gate terminal of the driving transistor) is set lower than a potential inputted to a source terminal of the driving transistor so as to turn off the driving transistor.

Here, in a digital time gray scale method, a technique to simultaneously perform a writing operation of a signal to a pixel and an erasing operation of a signal to a pixel is employed in order to realize high definition and a high gray scale display. That is, in a driving method that a pixel to which a signal is written immediately starts a light emission period (sustain period), the signal written to the pixel is erased before a next signal is written to the pixel in order to provide light emission period shorter than a writing period (address period) of a signal to a pixel. Such a driving method is described with reference to FIG. 8.

FIG. 8 shows an operation of one frame period in accordance with a time passage. In FIG. 8, the lateral direction expresses a time passage and the longitudinal direction expresses the number of scan rows of scan lines.

When an image is displayed, a writing operation and a light emitting operation are repeatedly performed. A period to perform a writing operation and a light emitting operation for one image (one frame) is referred to as one frame period. The process of signals for one frame is not particularly limited, however, at least about 60 times per second is preferable so that a person who sees the image does not sense a flicker.

As shown in FIG. 8, one frame period is divided into four subframe periods including address periods Ta1, Ta2, Ta3, and Ta4 and sustain periods Ts1, Ts2, Ts3, and Ts4. That is, each pixel row is time-divided into writing time Tb1, Tb2, Tb3, and Tb4 and light emission time Ts1(*i*), Ts2(*i*), Ts3(*i*), and Ts4(*i*). When a signal for light emission is inputted to a pixel, a light emitting element therein is in a light emission state in the sustain period. A ratio of lengths of light emission time in each subframe is $Ts1(i):Ts2(i):Ts3(i):Ts4(i)=2^3:2^2:2^1:2^0=8:4:2:1$, thereby a 4-bit gray scale can be expressed. However, the numbers of bits and gray scale levels are not limited to those described here, for example, eight subframe periods may be provided to express an 8-bit gray scale.

An operation of one frame period is described. First, in the address period Ta1, a writing operation is performed in the writing time Tb1 of each row from the first to last rows. That is, scan signals are sequentially inputted to a scan line from the first row, thereby pixels are selected. Then, when the pixel is selected, a video signal is inputted from a signal line to the pixel. Depending on the potential thereof, each pixel is controlled to emit light or no light in the sustain period Ts1. Accordingly, start time of a writing operation to a pixel differs depending on rows. The row where the writing operation has terminated sequentially starts the sustain period Ts1. In the sustain period, a light emitting element of a pixel to which a signal for light emission is inputted is in a light emission state. Further, the row where the sustain period Ts1 has terminated sequentially starts a signal writing operation of a next subframe period, and writing operations are sequentially performed similarly from the first to the last rows in each signal writing time Tb2. In this manner, a video signal is inputted to a pixel similarly in the address periods Ta2, Ta3, and Ta4, and depending on a potential thereof, each pixel is controlled to emit light or no light in the sustain periods Ts2, Ts3, and Ts4. By repeating the aforementioned operations, operations up to the sustain period Ts4 are terminated.

Like the sustain period Ts4, when a sustain period is required to be forcibly terminated in a row where light emission time is already terminated before writing operations up to the last row are terminated, a video signal written to a pixel is erased by erasing time Te so as to control to forcibly make a non-light emission state. In the row where the non-light emission state is forcibly made, the non-light emission state is kept for a certain period (this period is a non-light emission period Te4). As soon as the writing period of the last row is terminated, an address period of a next frame period (or a subframe period) sequentially starts from the first row. Accordingly, a subframe period of which light emission time is shorter than an address period can be provided.

In this manner, integrated time of the light emission time in the subframe periods corresponds to light emission time of each pixel in one frame period, thereby a gray scale is expressed.

It is to be noted that the subframe periods are sequentially arranged in the order from the longest sustain period; however, they are not necessarily arranged like this. For example, the subframe periods may be sequentially arranged in the order from the shortest sustain period or the subframe period with a long sustain period and the one with a short sustain period may be randomly arranged.

FIG. 2 shows a pixel configuration of a conventional display device which realizes such a driving method. A driving transistor 201, a switching transistor 202, a capacitor 203, a light emitting element 204, a first scan line 205, a signal line 206, a power source line 207, an erasing transistor 209, and a second scan line 210 are provided. It is to be noted that the driving transistor 201 is a P-channel transistor, the switching transistor 202 is an N-channel transistor, and the erasing transistor 209 is an N-channel transistor.

The switching transistor 202 has a gate terminal connected to the scan line 205, a first terminal (source terminal or drain terminal) connected to the signal line 206, and a second terminal (source terminal or drain terminal) connected to a gate terminal of the driving transistor 201. Further, a second terminal of the switching transistor 202 is connected to the power source line 207 through the capacitor 203. The driving transistor 201 has a first terminal (source terminal or drain terminal) connected to the power source line 207 and a second terminal (source terminal or drain terminal) connected to a first electrode (pixel electrode) of the light emitting element 204. A second electrode (opposite electrode) 208 of the light emitting element 204 is set at a low power source potential Vss. It is to be noted that the low power source potential Vss is a potential which satisfies $Vss<Vdd$ with a standard of a high power source potential Vdd set at the power source line 207. The low power source potential Vss may be set at GND, 0 V, or the like. A potential difference between the high power source potential Vdd and the low power source potential Vss is applied to the light emitting element 204 to feed a current to the light emitting element 204 to emit light, therefore, potentials of the high power source potential Vdd and the low power source potential Vss are set so that a potential difference between them becomes a forward threshold voltage of the light emitting element 204.

An erasing transistor is provided in parallel to the capacitor 203. That is, a first terminal (source terminal or drain terminal) of the erasing transistor 209 is connected to the gate terminal of the driving transistor 201 and a second terminal (source terminal or drain terminal) thereof is connected to the power source line 207. Further, a gate terminal of the erasing transistor 209 is connected to the second scan line 210. It is to be noted that the capacitor 203 may be removed when the gate capacitance of the driving transistor 201 is used as a substitute.

Next, description is made on an operation of a pixel to realize the aforementioned driving method. It is to be noted that a display device having this pixel employs a voltage input voltage drive method that light emission or non-light emission of the pixel is controlled by writing a video signal of voltage data to the pixel. When the pixel emits light, a voltage is applied to a light emitting element in the pixel, thereby luminance based on the voltage is obtained. Accordingly, by operating the driving transistor 201 as a switch, a voltage can be applied to the light emitting element 204.

First, description is made on a writing operation of a signal to a pixel. When a pixel is selected by the first scan line 205, that is the case where the switching transistor 202 is on, a video signal is inputted from the signal line 206 to the pixel. Then, a charge corresponding to a voltage for the video signal is accumulated in the capacitor 203, and the capacitor 203 holds the voltage when the switching transistor 202 is turned off. This voltage is a voltage between the gate terminal and the first terminal of the driving transistor 201 and corresponds to a gate-source voltage Vgs of the driving transistor 201.

It is to be noted that an operating region of a transistor (N-channel transistor here for simplicity) can be generally divided into a linear region and a saturation region. When a drain-source voltage is Vds, a gate-source voltage is Vgs, and a threshold voltage is Vth, a boundary between the linear region and the saturation region is when (Vgs−Vth)=Vds is satisfied. When (Vgs−Vth)<Vds is satisfied, a transistor operates in a saturation region and ideally, a current value hardly changes even when Vds changes. That is, a current value is determined only by the level of Vgs. On the other hand, when (Vgs−Vth)>Vds is satisfied, a transistor operates in a linear region and a current value is determined by the levels of Vds and Vgs. Then, when a transistor operates in a linear region, Vds can be low as Vgs is high. That is, potentials of a source terminal and a drain terminal can be almost equal. Therefore, when a transistor operates in a linear region, the transistor can function as a switch.

Therefore, in the case of a voltage input voltage drive method as in this pixel, a video signal which turns the driving transistor 201 sufficiently on or off is inputted to the gate terminal so that the driving transistor 201 functions as a switch.

Therefore, when a pixel emits light, a video signal which turns on the driving transistor 201 in a linear region is inputted from the signal line 206. Then, the driving transistor 201 functions almost as a switch; therefore, a power source potential Vdd set at the power source line 207 is ideally applied to a first electrode of the light emitting element 204 as it is. On the other hand, when a pixel emits no light, a video signal which turns the driving transistor 201 sufficiently off is inputted from the signal line 206.

That is, ideally, a voltage applied to the light emitting element 204 is made constant and luminance obtained by the light emitting element 204 is made constant. Then, a plurality of subframe periods are provided in one frame period and a video signal is written to each pixel in a signal writing period (address period) of each subframe period. In a light emission period (sustain period), each pixel holds the video signal. Then, a pixel emits light or no light depending on the video signal. It is to be noted that in a subframe where light emission time is shorter than an address period, the signal held in each pixel in the erasing period is erased. Then, light emission and non-light emission of a pixel are controlled per subframe period, and a gray scale is expressed by a sum of light emission time in one frame period.

Next, description is made on an erasing operation in an erasing period of a video signal written to a pixel. The second scan line 210 selects a pixel and turns on the erasing transistor 209, thereby a voltage held in the capacitor 203 is erased. That is, a charge accumulated in the capacitor 203 is discharged and potentials of opposite electrodes of the capacitor 203 are made equal. In this manner, voltages of a gate and a source of the driving transistor 201 are made approximately equal to turn off the driving transistor 201.

However, at this time, when the driving transistor 201 is normally-on (depletion transistor) due to manufacturing variations and the like, a current flows to the driving transistor 201 even when voltages of a gate and a source of the driving transistor 201 are equal, thereby the light emitting element 204 emits light. Accordingly, as it is impossible to make a pixel emit no light, an accurate display cannot be performed, which causes a decrease in yield.

In the case of making a pixel emit no light by a video signal, Vgs>0 can be satisfied by the potential of the video signal even when the driving transistor 201 is normally-on. In the case of the pixel configuration of FIG. 2, however, only Vgs=0 is satisfied when making a pixel emit no light by erasure. Accordingly, a current flows to the driving transistor 201 and the light emitting element 204 emits light. Therefore, a display defect occurs and the yield decreases.

In view of this, the invention provides a display device which suppresses an increase in manufacturing cost and improves yield.

A principle of the invention is that when a potential of a scan line for erasure is raised, a potential of a gate terminal of a driving transistor is raised accordingly. Alternatively, when a potential of a scan line is dropped, a gate potential of a driving transistor is dropped accordingly. For example, a scan line and a gate terminal of a driving transistor are connected through a rectifying element.

Further, a rectifying element used for the invention is a resistor, a PN junction diode, a PIN junction diode, a Schottky diode, a diode-connected transistor, or a diode formed of a carbon nanotube or a combination thereof.

A potential transfer element can be used instead of a rectifying element. As a potential transfer element, a transistor having a gate terminal, a first terminal, and a second terminal, or the transistor and a current-voltage converter element where the gate terminal and the second terminal of the transistor are connected through the current-voltage converter element.

A semiconductor element of the invention includes a first transistor, a second transistor, and a third transistor each of which is provided with a gate terminal, a first terminal, and a second terminal, and the invention includes a current-voltage converter element, a first wire, a second wire, a third wire, a fourth wire, and an electrode. The first terminal of the first transistor is connected to the first wire, the gate terminal thereof is connected to the second wire, and the second terminal thereof is connected to the gate terminal of the second transistor. The first terminal of the second transistor is connected to the third wire and the second terminal thereof is connected to the electrode. The first terminal of the third transistor is connected to the gate terminal of the second transistor, the gate terminal thereof is connected to the fourth wire, and the second terminal thereof is connected to the fourth wire through the current-voltage converter element.

In a semiconductor device of the invention with the aforementioned configuration, the current-voltage converter element is a resistor, a PN junction diode, a PIN junction diode, a Schottky diode, a transistor, a diode-connected transistor or a combination thereof.

In a semiconductor device of the invention with the aforementioned configuration, the first transistor and the third transistor are N-channel transistors and the second transistor is a P-channel transistor.

A semiconductor device of the invention includes a first transistor, a second transistor, and a third transistor each of which includes a gate terminal, a first terminal, and a second terminal, and the invention includes a current-voltage converter element, a first wire, a second wire, a third wire, a fourth wire, and a light emitting element in which a light emitting layer is sandwiched between a pixel electrode and an opposite electrode. The first terminal of the first transistor is connected to the first wire, the gate terminal thereof is connected to the second wire, and the second terminal thereof is connected to the gate terminal of the second transistor The first terminal of the second transistor is connected to the third wire and the second terminal thereof is connected to the pixel electrode of the light emitting element. The first terminal of the third transistor is connected to the gate terminal of the second transistor, the gate terminal thereof is connected to the fourth wire, and the second terminal is connected to the fourth wire through the current-voltage converter element.

In a display device of the invention with the aforementioned configuration, the current-voltage converter element is a resistor, a PN junction diode, a PIN junction diode, a Schottky diode, a transistor, or a diode-connected transistor or a combination thereof.

In a display device of the invention with the aforementioned configuration, the first transistor and the third transistor are N-channel transistors and the second transistor is a P-channel transistor.

An electronic device of the invention has a display device with the aforementioned configuration in a display portion.

A switch used in the invention may be any switch such as an electrical switch or a mechanical switch. That is, it may be anything as far as it can control a current and is not limited to a particular type. It may be a transistor, a diode (PN diode, PIN diode, Schottky diode, diode-connected transistor, and the like), or a logic circuit configured with them. Therefore, in the case of applying a transistor as a switch, polarity (conductivity) thereof is not particularly limited because it operates just as a switch. However, when an off current is preferred to be small, a transistor of polarity with a small off current is favorably used. For example, the transistor which has an LDD region or a multi-gate structure has a small off current. Further, it is desirable that an N-channel transistor is employed when a potential of a source terminal of the transistor as a switch is closer to the low potential side power source (Vss, GND, 0 V and the like), and a P-channel transistor is desirably employed when the potential of the source terminal is closer to the high potential side power source (Vdd and the like). This helps the switch operate efficiently as the absolute value of the gate-source voltage of the transistor can be increased. It is also to be noted that a CMOS switch can also be applied by using both N-channel and P-channel transistors. With a CMOS switch, an operation can be appropriately performed even when the situation changes such that a voltage outputted through a switch (that is, an input voltage) is higher or lower than an output voltage.

In the invention, “being connected” means “being electrically connected” and “being directly connected”. Therefore, in the configuration disclosed in the invention, another element which enables an electrical connection (for example, a switch, a transistor, a capacitor, an inductor, a resistor, a diode, and the like) may be provided in the predetermined connection. Alternatively, connection may be made without interposing another element. It is to be noted that when elements are connected without interposing another element which enables electrical connection and connected not electrically but directly, it is referred to as “being directly connected” or “being in direct connection”. It is to be noted when the description is made as “being electrically connected”, it includes the case where elements are electrically connected and the case where elements are directly connected.

It is to be noted that a light emitting element can employ various modes. For example, a display medium which changes contrast by an electromagnetic effect can be used, such as an EL element (organic EL element, inorganic EL element, or EL element containing organic material and inorganic material), an electron discharging element, a liquid crystal element, an electron ink, a light diffraction element, a discharging element, a digital micromirror device (DMD), a piezoelectric element, and a carbon nanotube. It is to be noted that an EL panel type display device using an EL element includes an EL display, a display device using an electron discharging element includes a field emission display (FED), an SED type flat panel display (Surface-conduction Electron-emitter Display), and the like, a liquid crystal panel type display device includes a liquid crystal display, a digital paper type display device using an electron ink includes electronic paper, a display device using a light diffraction element includes a grating light valve (GLV) type display, a PDP (Plasma Display Panel) type display using a discharging element includes a plasma display, a DMD panel type display device using a micro mirror element includes a digital light processing (DLP) type display device, a display device using a piezoelectric element includes a piezoelectric ceramic display, a display device using a carbon nanotube includes a nano emissive display (NED), and the like.

It is to be noted that transistors of various modes can be applied as a transistor of the invention. Therefore, kinds of transistors applicable to the invention are not limited. Accordingly, a thin film transistor (TFT) using an amorphous semiconductor film typified by amorphous silicon and polycrystalline silicon, a MOS transistor formed using a semiconductor substrate or an SOI substrate, a junction transistor or a bipolar transistor, which are formed using a semiconductor substrate or an SOI substrate, a transistor using a compound semiconductor such as ZnO (zinc oxide) or a-InGaZnO (indium, gallium, zinc, oxygen)-based amorphous semiconductor, a transistor using an organic semiconductor or a carbon nanotube, and other transistors. It is to be noted that an amorphous semiconductor film may contain hydrogen or halogen. A substrate over which a transistor is provided is not limited to a particular type and a substrate of various kinds can be used. Therefore, a transistor can be provided over, for example, a single crystalline substrate, an SOI substrate, a glass substrate, a plastic substrate, a paper substrate, a cellophane substrate, a quartz substrate, and the like. Further, a transistor formed over a certain substrate may be transferred to another substrate.

It is to be noted that various types of transistors can be used as a transistor of the invention and formed over various substrates. Therefore, all of the circuits may be formed over a glass substrate, a plastic substrate, a single crystal substrate, an SOI substrate, or any substrate. When all the circuits are formed over a substrate, cost can be reduced by reducing the number of components and reliability can be improved by reducing the number of connections with the components. Alternatively, a part of a circuit may be formed over a certain substrate and another part of the circuit may be formed over another substrate. That is, not all of the circuits is required to be formed over the same substrate. For example, a part of a circuit may be formed over a glass substrate using a transistor and another part of the circuit may be formed over a single crystal substrate into an IC chip which may be provided over the glass substrate by COG (Chip On Glass). Alternatively, the IC chip may be connected to a glass substrate using TAB (Tape Automated Bonding) or a printed substrate. In this manner, when parts of a circuit are formed over the same substrate, cost can be reduced by reducing the number of components and reliability can be improved by reducing the number of connections with the components. Further, a portion with a high driving voltage or a high driving frequency which consumes more power is not preferably formed over the same substrate, thereby an increase in power consumption can be prevented.

It is to be noted that a transistor can have structures of various modes and is not limited to a specific structure. For example, a multi-gate structure which has two or more gate lines may be employed as well. With a multi-gate structure, an off current can be reduced and reliability can be improved by improving the pressure resistance of a transistor, and further flat characteristics can be obtained that a drain-source current hardly changes even when a drain-source voltage changes in the operation in a saturation region. Further, gate electrodes may be provided over and under a channel. Accordingly, a channel region increases, thereby an S value (sub-threshold coefficient) can be improved since a current value is easily increased and a depletion layer is easily formed. Further, a gate electrode may be provided over a channel or under the channel. A forward staggered structure or an inversely staggered structure may be employed. A channel region may be divided into a plurality of regions, connected in parallel, or connected in series. Further, a source electrode or a drain electrode may overlap a channel (or a part of it). Accordingly, a charge is accumulated in a part of the channel and an unstable operation can be prevented. Further, an LDD region may be provided. By providing an LDD region, an off current can be reduced and reliability can be improved by improving the pressure resistance of a transistor, and further flat characteristics can be obtained that a drain-source current hardly changes even when a drain-source voltage changes in the operation in a saturation region.

It is to be noted in the invention that one pixel corresponds to one element which can control brightness. Therefore, for example, one pixel expresses one color element by which brightness is expressed. Accordingly, in the case of a color display device formed of color elements of R (red), G (green), and B (blue), the smallest unit of an image is formed of three pixels of an R pixel, a G pixel, and a B pixel. It is to be noted that a color element is not limited to be formed of three colors and may be more colors such as RGBW (W is white). Further, as another example, when controlling the brightness of one color element by using a plurality of regions, one of the plurality of regions corresponds to one pixel. Therefore, for example, in the case of performing an area gray scale display, a plurality of regions are provided for one color element to control the brightness, which express a gray scale as a whole. One of the regions to control the brightness corresponds to one pixel. Therefore, in that case, one color element is formed of a plurality of pixels. Moreover, in that case, regions which contribute to display differ in size depending on the pixel. In the plurality of regions to control the brightness provided for one color element, that is a plurality of pixels which form one color element, the viewing angle may be expanded by supplying each pixel with a slightly different signal. It is to be noted that description "one pixel (three colors)" corresponds to one pixel including three pixels of R, G and B. A description "one pixel (one color)" corresponds to the case where a plurality of pixels are provided for one color element, and are collectively considered as one pixel.

It is to be noted in the invention that the case where pixels are arranged in matrix corresponds not only to the case where pixels are arranged in a grid configuration where longitudinal stripes and lateral stripes cross each other, but also to the case where dots of three color elements are arranged in what is called a delta configuration when a full color display is performed using the three color elements (for example, RGB). It is to be noted that a color element is not limited to three colors and may be more colors such as RGBW (W is white). The size of a light emission area may be different depending on the dot of the color element.

A transistor includes at least three terminals. For example, a transistor is an element with at least three terminals, having a gate electrode, a drain region, and a source region. A channel region is provided between the drain region and the source region. Here, it is difficult to determine the source region or the drain region since they depend on the structure, operating condition, and the like of the transistor. Therefore, in this specification, a gate electrode is referred to as a gate terminal, a region which functions as a source or a drain is referred to as a first terminal or a second terminal.

It is to be noted that a gate includes a gate electrode and a gate wire (also referred to as a gate line, a gate signal line, or the like) or a part of them. A gate electrode corresponds to a conductive film of a part overlapping a channel region and a semiconductor forming an LDD (Lightly Doped Drain) region and the like through a gate insulating film. The gate wire corresponds to a wire for connecting between gate electrodes of pixels and between a gate electrode and another wire.

However, there is a part which functions as a gate electrode and also as a gate wire. Such a region may be referred to as a gate electrode or a gate wire. That is, there is a region which cannot be distinguished as a gate electrode or a gate wire. For example, when there is a channel region overlapping a gate wire which is extended, the region functions as a gate wire and also as a gate electrode. Therefore, such a region may be referred to as a gate electrode or a gate wire.

Further, a region which is formed of the same material as a gate electrode and connected to a gate electrode may be referred to as a gate electrode as well. Similarly, a region which is formed of the same material as a gate wire and connected to a gate wire may be referred to as a gate wire. In a strict sense, such regions do not overlap a channel region or do not have functions to connect to another gate electrode in some cases. However, there is a region which is formed of the same material as a gate electrode or a gate wire and connected to a gate electrode or a gate wire due to a manufacturing margin and the like. Therefore, such a region may be referred to as a gate electrode or a gate wire.

For example, in a multi-gate transistor, gate electrodes of one transistor and another transistor are often connected through a conductive film formed of the same material as the gate electrode. Such a region for connecting the gate electrodes may be referred to as a gate wire, or a gate electrode when a multi-gate transistor is considered as one transistor. That is, a component which is formed of the same material as a gate electrode or a gate wire and connected to a gate electrode or a gate wire may be referred to as a gate electrode or a gate wire. Moreover, for example, a conductive film of a portion which connects a gate electrode and a gate wire may be referred to as a gate electrode or a gate wire.

It is to be noted that a gate terminal corresponds to a part of a region of a gate electrode or a region electrically connected to a gate electrode.

It is to be noted that a source includes a source region, a source electrode, and a source wire (also referred to as source line, source signal line, or the like), or a part of them. A source region corresponds to a semiconductor region which contains a lot of P-type impurities (boron, gallium, or the like) or N-type impurities (phosphorus, arsenic, or the like). Therefore, a region containing a small amount of P-type impurities or N-type impurities, that is an LDD (Lightly Doped Drain) region is not included in a source region. A source electrode corresponds to a conductive layer of a part which is formed of a different material from a source region and electrically connected to a source region. However, a source electrode is sometimes referred to as a source electrode including a source region. A source wire corresponds to a wire for connecting between source electrodes of pixels and connecting between a source electrode and another wire.

However, there is a part which functions as a source electrode and also as a source wire. Such a region may be referred to as a source electrode or a source wire. That is, there is a region which cannot be distinguished as a source electrode or a source wire. For example, when there is a source region overlapping a source wire which is extended, the region functions as a source wire and also as a source electrode. Therefore, such a region may be referred to as a source electrode or a source wire.

Further, a part which is formed of the same material as a source electrode and connected to a source electrode may be referred to as a source electrode as well. A part which connects between one source electrode and another source electrode may also be referred to as a source electrode as well. Further, a part overlapping a source region and connected to a source electrode may be referred to as a source electrode. Similarly, a part which is formed of the same material as a source wire and connected to a source wire may be referred to as a source wire. In a strict sense, such a part may not have functions to connect one source electrode to another source electrode in some cases. However, the part is formed of the same material as a source electrode or a source wire and connected to a source electrode or a source wire due to a manufacturing margin and the like. Therefore, the part may also be referred to as a source electrode or a source wire.

For example, a conductive film of a portion which connects between a source electrode and a source wire may be referred to as a source electrode or a source wire.

It is to be noted that a source terminal corresponds to a part of a source region, a source electrode, or a region electrically connected to a source electrode.

It is to be noted that a drain is similar to as a source.

It is to be noted in the invention that a semiconductor device corresponds to a device including a circuit having a semiconductor element (transistor, diode, or the like). Further, a semiconductor device may be a general device which functions by utilizing semiconductor characteristics. A display device corresponds to a device including a display element (liquid crystal element, light emitting element, or the like). It is to be noted that a display device may be a main body of a display panel in which a plurality of pixels including display elements such as a liquid crystal element and an EL element or a peripheral driver circuit for driving the pixels are formed over a substrate. Moreover, a display device may include the one provided with a flexible printed circuit (FPC) or a printed wiring board (PWB). Further, a light emitting device corresponds to a display device including self-luminous light emitting elements such as an EL element and an element used for an FED in particular. A liquid crystal display device corresponds to a display device including liquid crystal elements.

It is to be noted in this specification that a slight current which flows when a transistor is turned off and a reverse current of a rectifying element are collectively referred to as an off current.

According to the invention, an off current flowing to a rectifying element or a transistor can be reduced. Therefore, it can be prevented that a light emitting element of a pixel to which a signal for non-light emission (black display) is inputted slightly emits light.

Further, a display device can be provided which can suppress an increase in manufacturing cost and improve the yield to reduce an off current of a transistor or a rectifying element without increasing the manufacturing steps.

An electronic device having the display device in the display portion can be provided.

DESCRIPTION OF THE INVENTION

Although the invention will be fully described by way of embodiment modes and embodiments with reference to the accompanying drawings, it is to be understood that various changes and modifications will be apparent to those skilled in the art. Therefore, unless such changes and modifications depart from the scope of the invention, they should be construed as being included therein.

Figure 49:
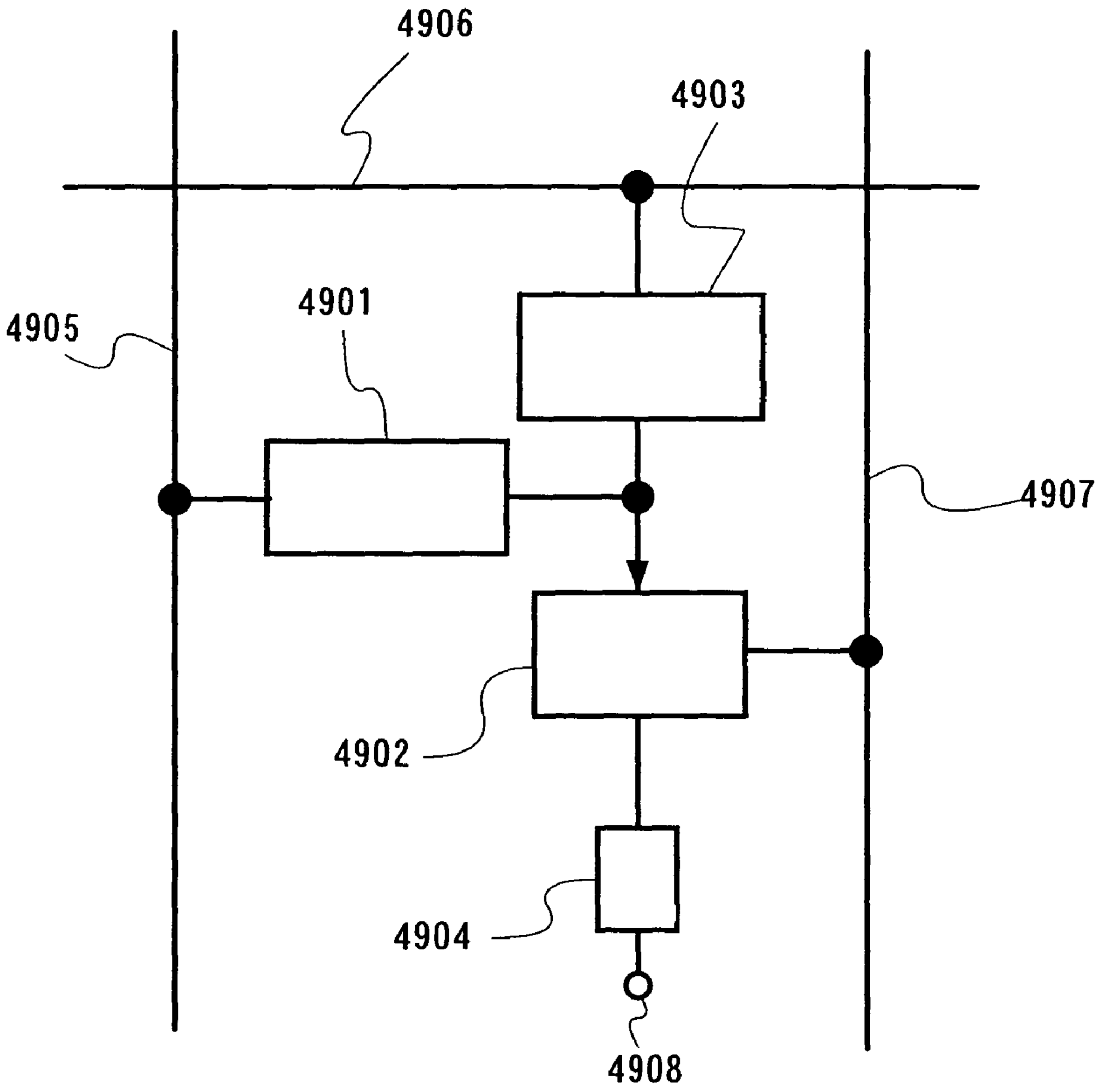
FIG. 49 is a diagram showing a pixel configuration of the invention.

Description is made with reference to FIG. 49 on a basic configuration of a pixel of the invention.

A pixel shown in FIG. 49 includes a switching unit 4901, a driving unit 4902, a potential transfer unit 4903, a light emitting element 4904, a signal line 4905, a scan line 4906, and a power source line 4907. The switching unit 4901 controls conduction or no conduction between the signal line 4905 and a control terminal of the driving unit 4902. The driving unit 4902 controls driving of the light emitting element 4904 in accordance with a signal inputted to the control terminal. That is, when a signal to make a pixel emit light is inputted to the control terminal of the driving unit 4902, a power source is supplied from the power source line 4907 to the light emitting element 4904. Further, when a signal to make a pixel emit no light is inputted to the control terminal of the driving unit 4902, a power source is not supplied from the power source line 4907 to the light emitting element 4904. It is to be noted that a predetermined potential is supplied to an opposite electrode 4908 of the light emitting element 4904.

The potential transfer unit 4903 is connected between the scan line 4906 and the control terminal of the driving unit 4902 and controls a potential supply to the control terminal of the driving unit 4902 in accordance with a signal (potential) inputted to the scan line 4906. Then, the level of a potential inputted to the control terminal of the driving unit 4902 changes depending on the level of a potential inputted to the scan line 4906.

Next, description is made on an operation of a pixel.

When a signal is written to a pixel, the switching unit 4901 becomes conductive and a video signal (potential) inputted to the signal line 4905 is inputted to the control terminal of the driving unit 4902. In this manner, a signal is written to a pixel. The driving unit 4902 holds a signal inputted to the control terminal.

The light emitting element 4904 emits light or no light in accordance with a signal inputted to the control terminal of the driving unit 4902. That is, a pixel emits light or no light.

In the case of an erasing operation of a pixel, a signal is inputted to the scan line 4906. This signal contains potential information. A sufficient potential is inputted to the control terminal of the driving unit 4902 so that the driving unit 4902 does not supply a power source from the power source line 4907 to the light emitting element 4904. In this manner, it is prevented that a power source leaks from the driving unit 4902 and is supplied to the light emitting element 4904.

Embodiment Mode 1

In this embodiment mode, description is made on a pixel configuration in the case of applying a rectifying element as a potential transfer unit and to a display device having the pixel.

Figure 1:
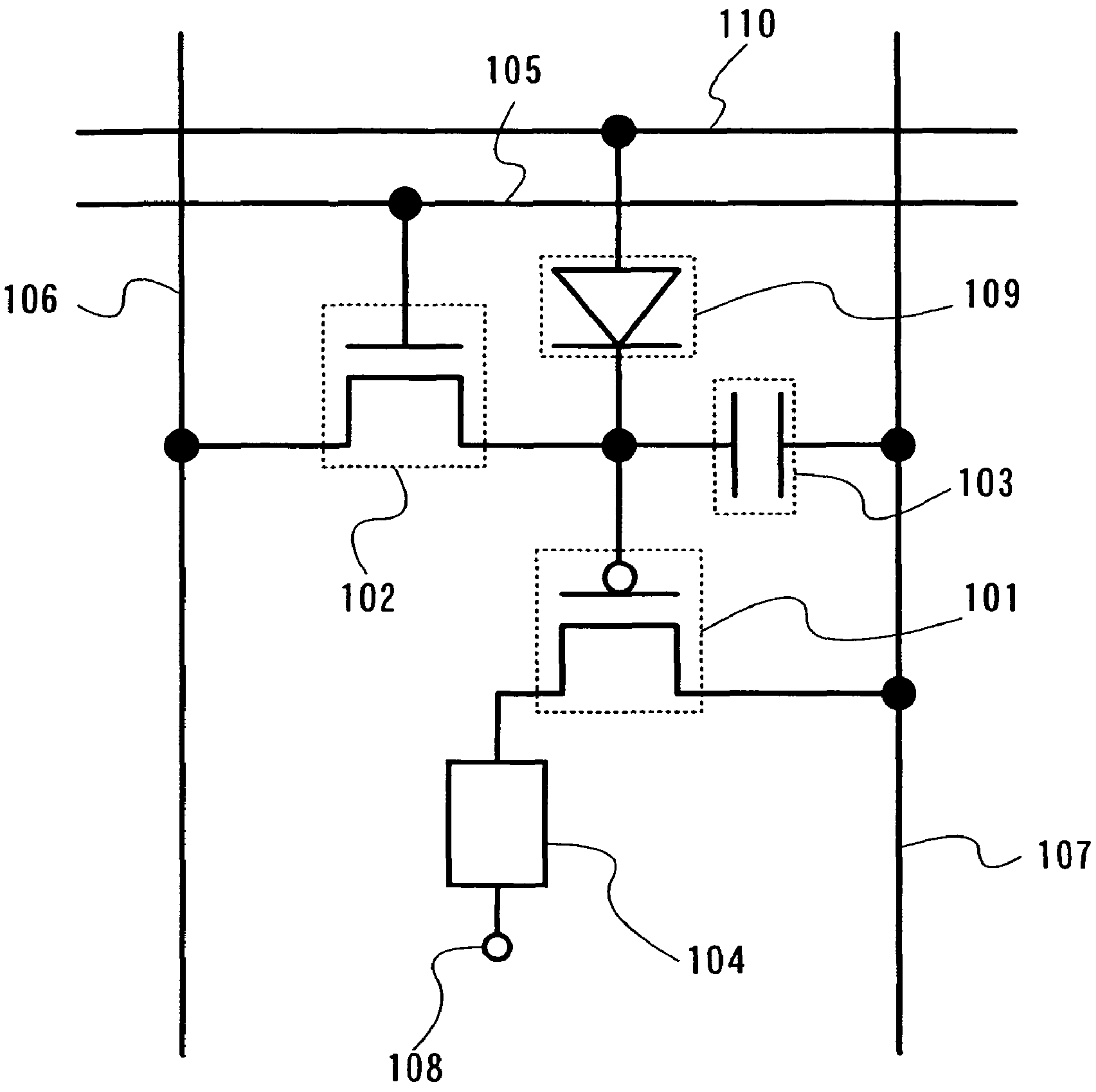
FIG. 1 is a diagram showing a pixel configuration of the invention.
Figure 2:
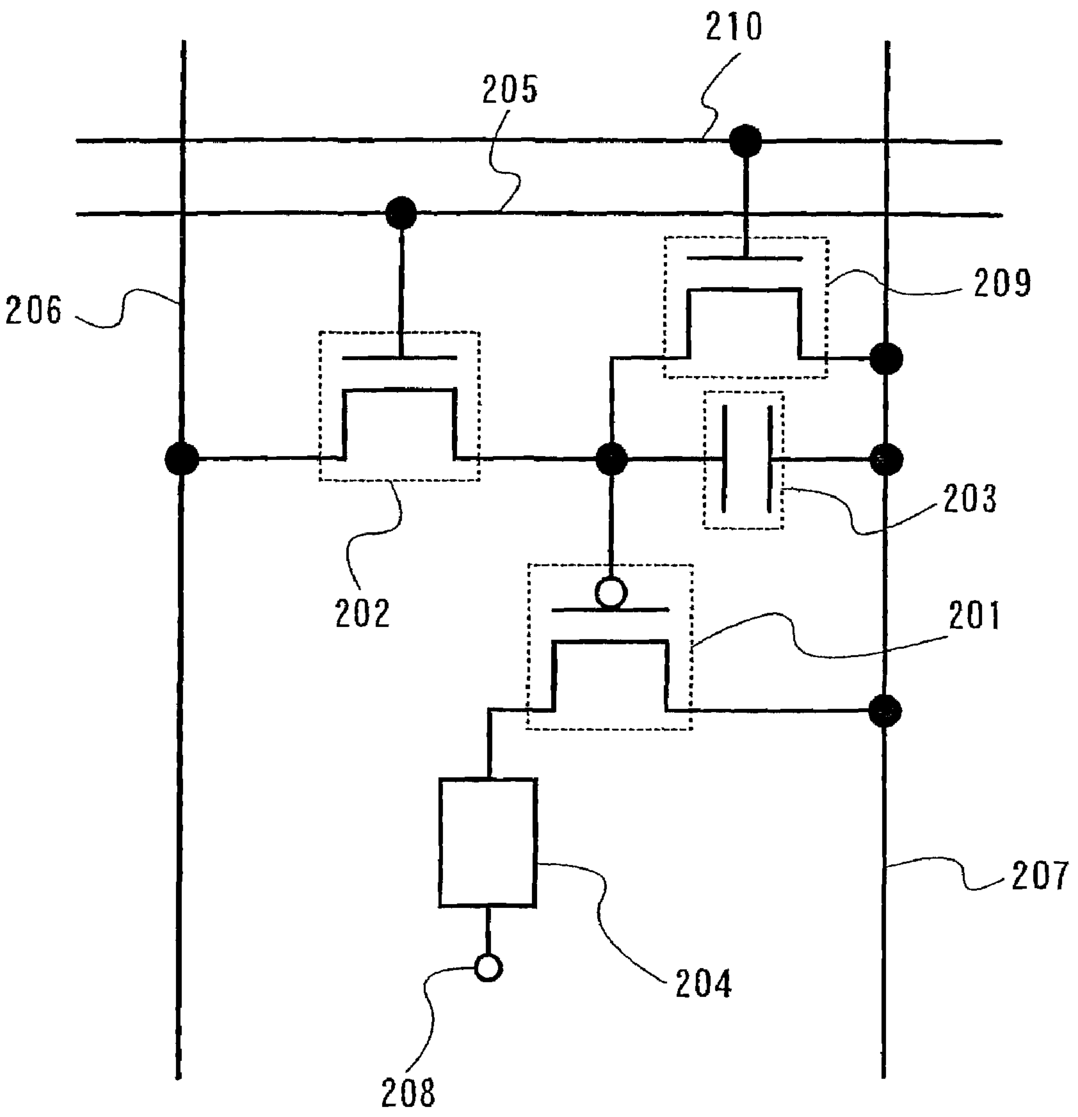
FIG. 2 PRIOR ART
FIG. 2 is a diagram showing a conventional pixel configuration.

First, description is made with reference to FIG. 1 on a basic pixel configuration of this embodiment mode. Here, only one pixel is shown, but a plurality of pixels are arranged in matrix of the row direction and the column direction in a pixel portion of a display device.

The pixel shown in FIG. 1 includes a driving transistor 101, a switching transistor 102, a capacitor 103, a light emitting element 104, a first scan line 105, a signal line 106, a power source line 107, a rectifying element 109, and a second scan line 110. It is to be noted that the driving transistor 101 is a P-channel transistor and the switching transistor 102 is an N-channel transistor. The switching transistor 102 has a gate terminal connected to the first scan line 105, a first terminal (source terminal or drain terminal) connected to the signal line 106, and a second terminal (source terminal or drain terminal) connected to a gate terminal of the driving transistor 101. The driving transistor 101 has the gate terminal connected to the second scan line 110 through the rectifying element 109. Further, the second terminal of the switching transistor 102 is connected to the power source line 107 through the capacitor 103. Further, the driving transistor 101 has a first terminal (source terminal or drain terminal) connected to the power source line 107 and a second terminal (source terminal or drain terminal) connected to a first electrode (pixel electrode) of the light emitting element 104. A second electrode (opposite electrode) 108 of the light emitting element 104 is set at a low power source potential. It is to be noted that the low power source potential satisfies the relation: low power source potential<high power source potential with a standard of a high power source potential set at the power source line 107. As the low power source potential, for example, GND, 0 V, or the like may be set. Each of the high power source potential and the low power source potential is set so that a potential between them becomes equal to or higher than a forward threshold voltage of the light emitting element 104. Accordingly, the potential difference between the high power source potential and the low power source potential is applied to the light emitting element 104 to supply a current to the light emitting element 104 to emit light.

It is to be noted that the capacitor 103 may be connected at a place where a gate potential of the driving transistor 101 can be held. For example, one electrode of the capacitor 103 may be connected to the gate terminal of the driving transistor 101 and the other electrode thereof may be connected to a different wire than the power source line 107. Further, the capacitor 103 may be removed when the gate capacitance of the driving transistor 101 is used as a substitute.

Next, description is made on an operation of a pixel.

When a signal is written to a pixel, an H-level signal to turn on the switching transistor 102 is inputted to the first scan line 105. Then, the switching transistor 102 is turned on and a pixel to which a signal is written is selected. Then, a video signal is written from the signal line 106 to a pixel. That is, a charge corresponding to a voltage for the video signal is accumulated in the capacitor 103. When the first scan line 105 is set at L-level to turn off the switching transistor 102, the capacitor 103 holds the voltage. It is to be noted that a voltage between the gate terminal and the first terminal of the driving transistor 101 corresponds to a gate-source voltage Vgs of the driving transistor 101.

Here, in the case of a voltage input voltage drive method, a video signal (Vsig (L) to turn on and Vsig (H) to turn off) which turns the driving transistor 101 sufficiently on or off is inputted to the gate terminal of the driving transistor 101. That is, the driving transistor 101 operates in a linear region, which is as a switch.

Therefore, when a video signal Vsig (L) to turn on the driving transistor 101 is inputted, a power source potential Vdd applied to the power source line 107 is ideally applied to the first electrode of the light emitting element 104 as it is.

It is preferable that an H-level signal inputted to the first scan line 105 be a potential V1 which is higher than a video signal to make a pixel emit no light (a gate potential Vsig (H) to turn off the driving transistor 101) by a threshold voltage Vth of the switching transistor 102. Because, when Vsig (H) is inputted to the signal line 106, the first terminal of the switching transistor 102 as an N-channel transistor becomes a drain terminal. Therefore, the switching transistor 102 is turned off when a potential of the second terminal (source terminal at this time) is lower than a potential of the gate terminal by a threshold voltage Vth of the switching transistor 102. That is, when a gate potential of the switching transistor 102 is lower than V1, Vsig (H) inputted to the signal line 106 cannot be inputted to the gate terminal of the driving transistor 101. Then, the driving transistor 101 cannot be turned off completely, thereby the light emitting element 104 slightly emits light in some cases.

It is preferable that an L-level signal inputted to the first scan line 105 be a potential lower than Vsig (L). For example, in the case where a potential of an L-level signal inputted to the first scan line 105 is equal to that of a video signal (gate potential Vsig (L) to turn on the driving transistor 101) which makes a pixel emit light, when Vsig (L) is inputted to the signal line 106 for writing a signal to a pixel of another row, a gate-source voltage of the switching transistor 102 becomes 0 V in the pixel to which Vsig (H) is written. Then, an off current flows when the switching transistor 102 is normally-on. Accordingly, the charge accumulated in the capacitor 103 is discharged and the gate potential of the driving transistor 101 becomes low, thereby a current flows through the driving transistor 101 which makes the light emitting element 104 slightly emit light in some cases.

Next, description is made on an erasing operation. In the erasing operation, an H-level signal is inputted to the second scan line 110. Then, a current flows through the rectifying element 109, thereby the gate potential of the driving transistor 101 held by the capacitor 103 can be a certain predetermined potential. That is, it is possible to set a potential of the gate terminal of the driving transistor 101 to be a predetermined potential and to forcibly turn off the driving transistor 101 regardless of a video signal written to a pixel in a signal writing period. It is to be noted that a potential of the gate terminal of the driving transistor 101 becomes lower than that of the second scan line 110 by a threshold voltage of the rectifying element 109.

At this time, it is preferable that an H-level signal inputted to the second scan line 110 be a potential equal to or higher than a high power source potential inputted to the power source line 107. By appropriately setting the potential of the H-level signal, the potential of the gate terminal of the driving transistor 101 can be set higher than the potential of the source terminal thereof when forcibly turning off the driving transistor 101 in the erasing period. Accordingly, even when the driving transistor 101 is normally-on, the driving transistor 101 can be forcibly turned off to prevent that the light emitting element 104 slightly emits light.

It is to be noted that an H-level inputted to the second scan line 110 may be an H-level inputted to the first scan line 105. As a result, the number of power source lines can be reduced.

It is to be noted that an L-level signal is inputted to the second scan line 110 except for in the erasing operation. It is preferable that the potential of the L-level signal be a potential equal to or lower than that of a video signal (gate potential Vsig (L) to turn on the driving transistor 101) which makes a pixel emit light. However, if the potential of the L-level signal is set too low, a reverse bias voltage applied to the rectifying element 109 becomes high in the case where a video signal for non-light emission (gate potential Vsig (H) to turn off the driving transistor 101) is written to the pixel. Accordingly, an off current flowing to the rectifying element 109 (also referred to as a reverse current) is increased and a charge held in the capacitor 103 leaks. Then, the gate potential of the driving transistor 101 falls, thereby an off current of the driving transistor 101 increases. Therefore, it is preferable that the potential of the L-level signal be equal to that of a video signal which makes a pixel emit light (gate potential Vsig (L) to turn on the driving transistor 101).

Figure 8:
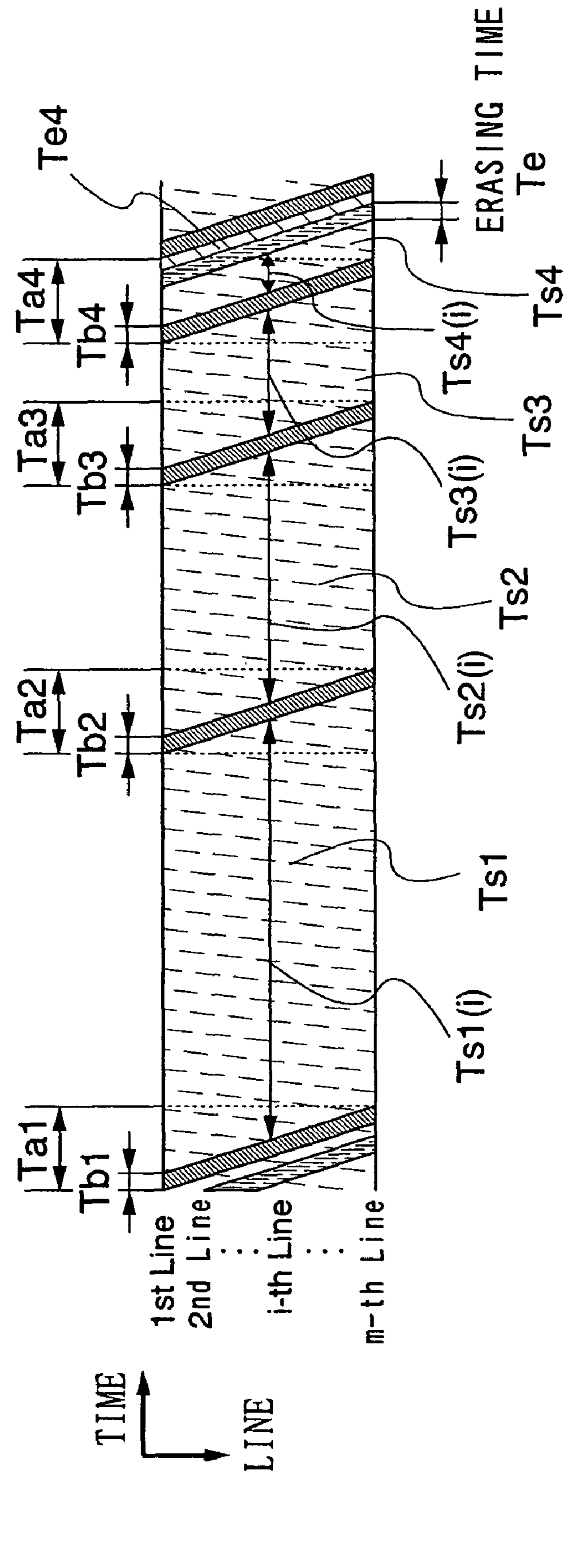
FIG. 8 shows a timing chart.

It is to be noted that the erasing operation erases a video signal written to a pixel and corresponds to erase time Te in the timing chart shown in FIG. 8. Further, an erasing period is a period after an erasing operation of the pixel until a signal writing operation to the pixel, which corresponds to the erasing period Te4 in the timing chart shown in FIG. 8.

Figure 40:
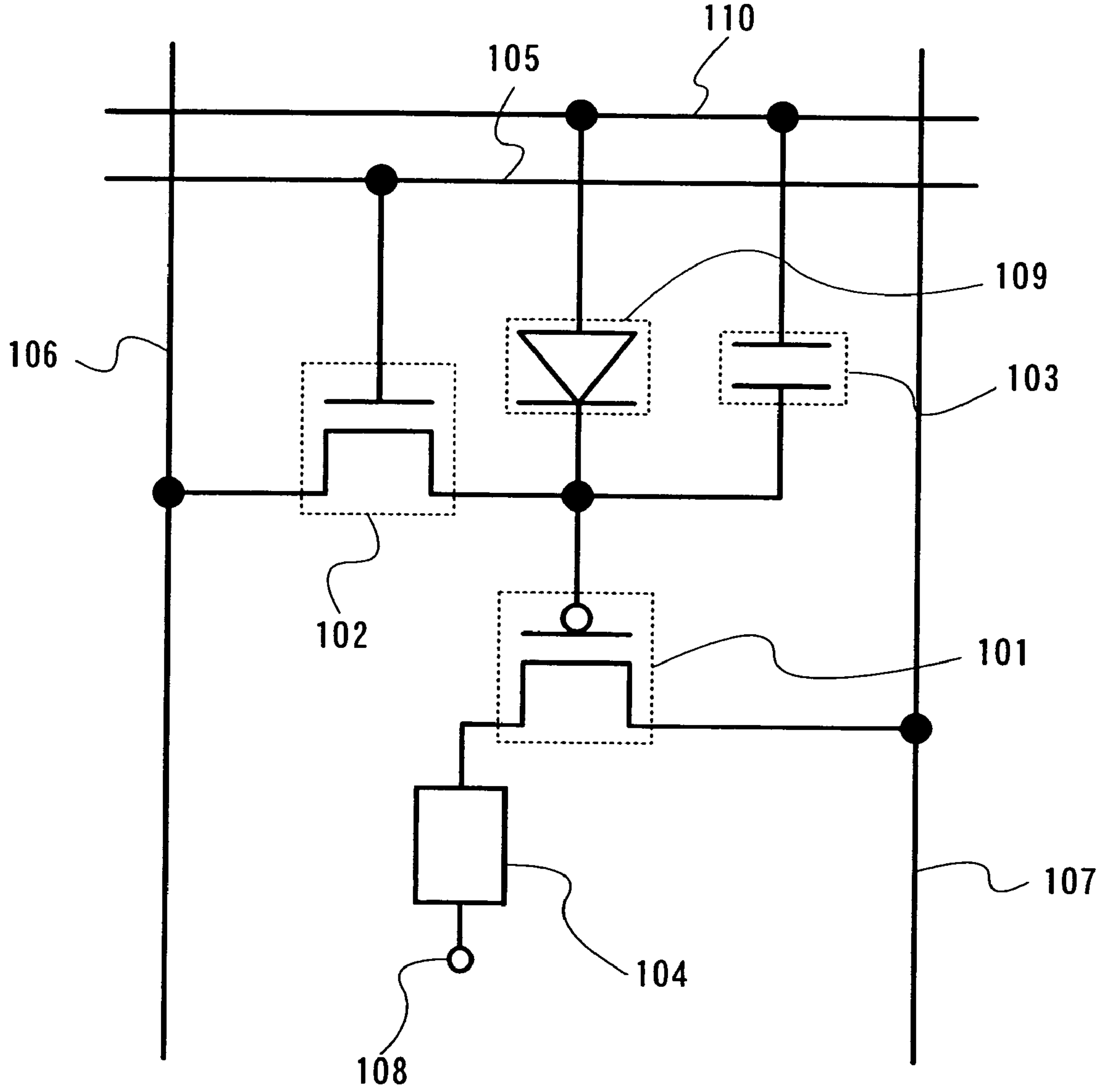
FIG. 40 is a diagram showing a pixel configuration of the invention.

As shown in FIG. 40, in a pixel of the invention, one electrode of the capacitor 103 may be connected to the gate terminal of the driving transistor 101 and the other electrode thereof may be connected to the second scan line 110. While a video signal is written to a pixel and the pixel holds the signal, the second scan line 110 is kept at an L-level. Therefore, the gate potential of the driving transistor 101 can be held. In the erasing operation, the second scan line 110 is set at an H-level. Accordingly, the potential of the one electrode of the capacitor 103 is raised. Therefore, the driving transistor 101 can be easily turned off quickly. Then, a current flows through the rectifying element 109 until a predetermined potential to turn off the driving transistor 101 is obtained. That is, the video signal written to the pixel can be erased, and the second scan line 110 is kept at an H-level all through the erasing period.

In FIG. 1 as well, the second scan line 110 may be kept at an H-level all through the erasing period. Accordingly, it can be prevented that the gate potential of the driving transistor 101 falls due to a leak of charge.

The rectifying element 109 can employ a diode-connected transistor. Besides, a PN junction diode, a PIN junction diode, a Schottky diode, a diode formed of a carbon nanotube, and the like may be used as well.

Figure 3:
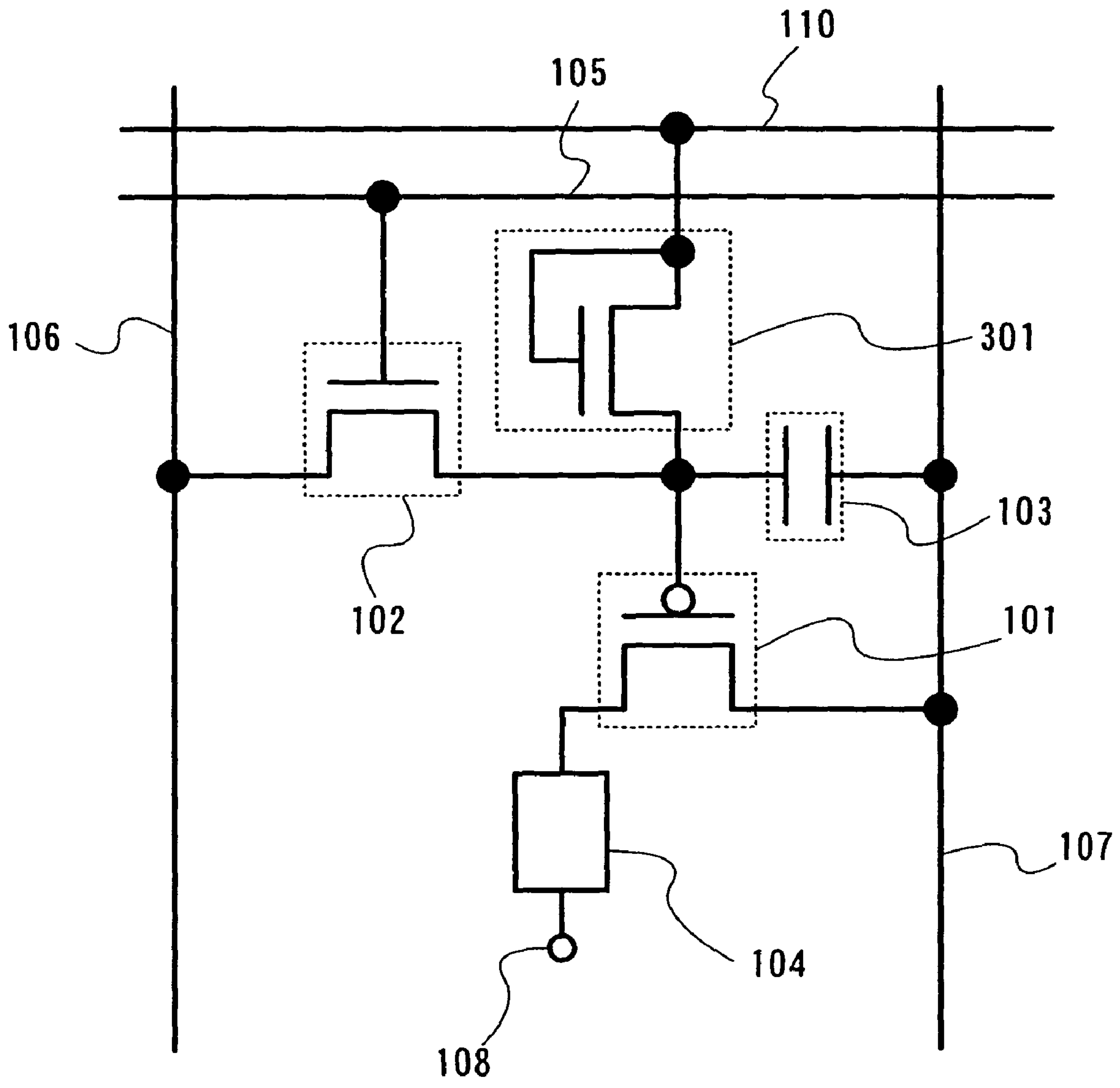
FIG. 3 is a diagram showing a pixel configuration of the invention.

FIG. 3 shows a pixel configuration in the case where a diode-connected N-channel transistor is applied to the rectifying element 109. A first terminal (source terminal or drain terminal) of a diode-connected transistor 301 is connected to the gate terminal of the driving transistor 101. Moreover, a second terminal (source terminal or drain terminal) of the diode-connected transistor 301 is connected to a gate terminal thereof and to the second scan line 110. When the second scan line 110 is at an L-level, the second terminal of the diode-connected transistor 301 functions as a source terminal. As the gate terminal and the source terminal are connected, a current does not flow. However, when an H-level signal is inputted to the second scan line 110, the second terminal of the diode-connected transistor 301 functions as a drain terminal; therefore, a current flows through the diode-connected transistor 301. Accordingly, the diode-connected transistor 301 has a rectifying effect.

Figure 4:
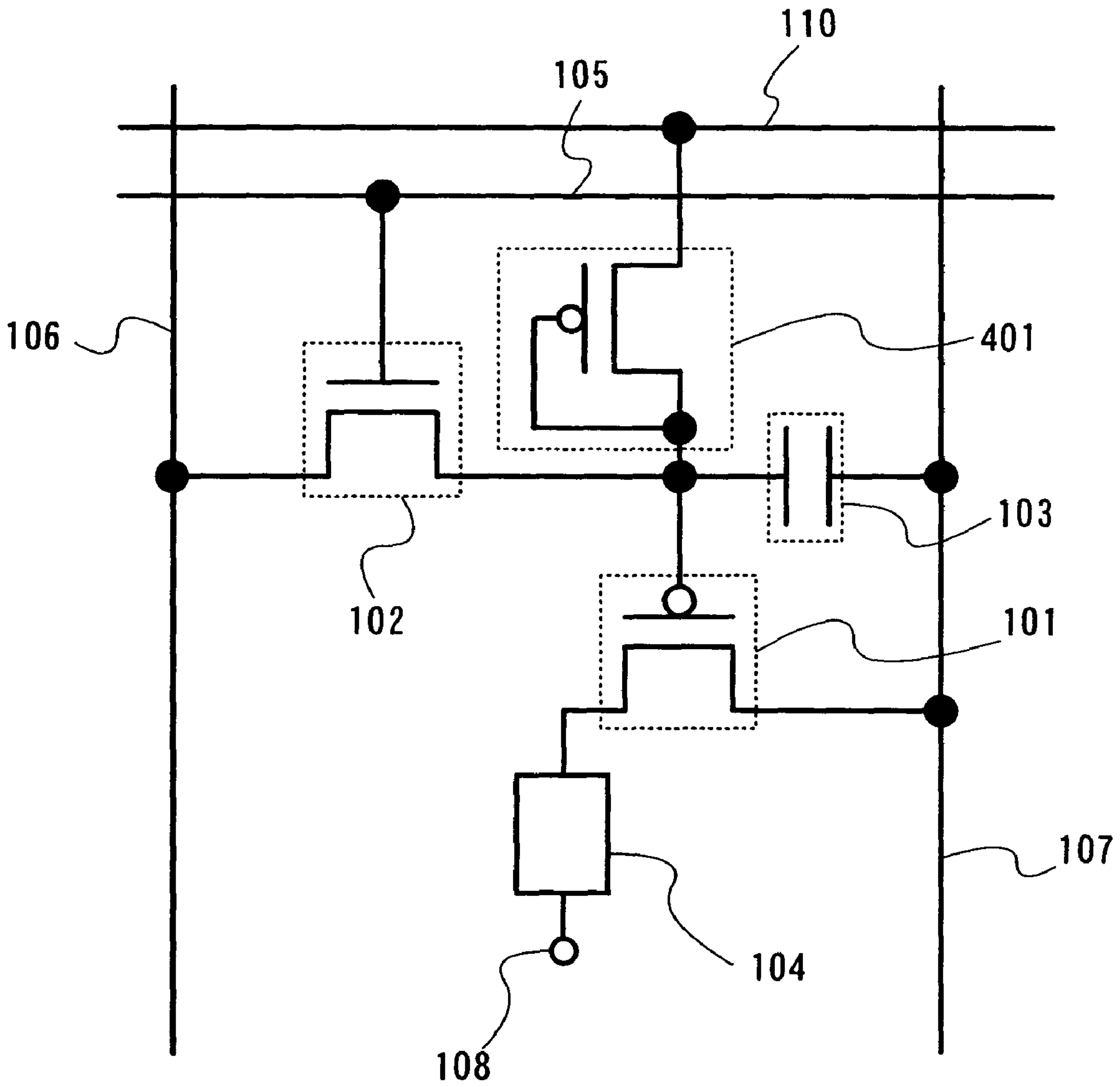
FIG. 4 is a diagram showing a pixel configuration of the invention.

FIG. 4 shows a pixel configuration in the case where a diode-connected P-channel transistor is applied. A first terminal (source terminal or drain terminal) of a diode-connected transistor 401 is connected to the second scan line 110. Moreover, a second terminal (source terminal or drain terminal) of the diode-connected transistor 401 is connected to a gate terminal thereof and to the gate terminal of the driving transistor 101. When the second scan line 110 is at an L-level, a current does not flow through the diode-connected transistor 401 as the gate terminal and the source terminal are connected. However, when an H-level signal is inputted to the second scan line 110, the second terminal of the diode-connected transistor 401 functions as a drain terminal; therefore, a current flows through the diode-connected transistor 401. Accordingly, the diode-connected transistor 401 has a rectifying effect.

At this time, it is preferable that the potential of the H-level signal inputted to the second scan line 110 be a potential higher than that of the power source line 107. Accordingly, an off current of the driving transistor 101 can be reduced. Further, it is preferable that the potential of the L-level signal inputted to the second scan line 110 be a potential equal to or lower than that of a video signal which makes a pixel emit light (gate potential Vsig (L) to turn on the driving transistor 101). However, if the potential of the L-level signal is set too low, drain-source voltages of the diode-connected transistors 301 and 401 become high in the case where a video signal for non-light emission (Vsig (H) to turn off the driving transistor 101) is written to the pixel. Accordingly, an off current is increased. Therefore, it is preferable that the potential of the L-level signal be equal to that of a video signal (gate potential Vsig (L) to turn on the driving transistor 101) which makes a pixel emit no light.

Figure 14:
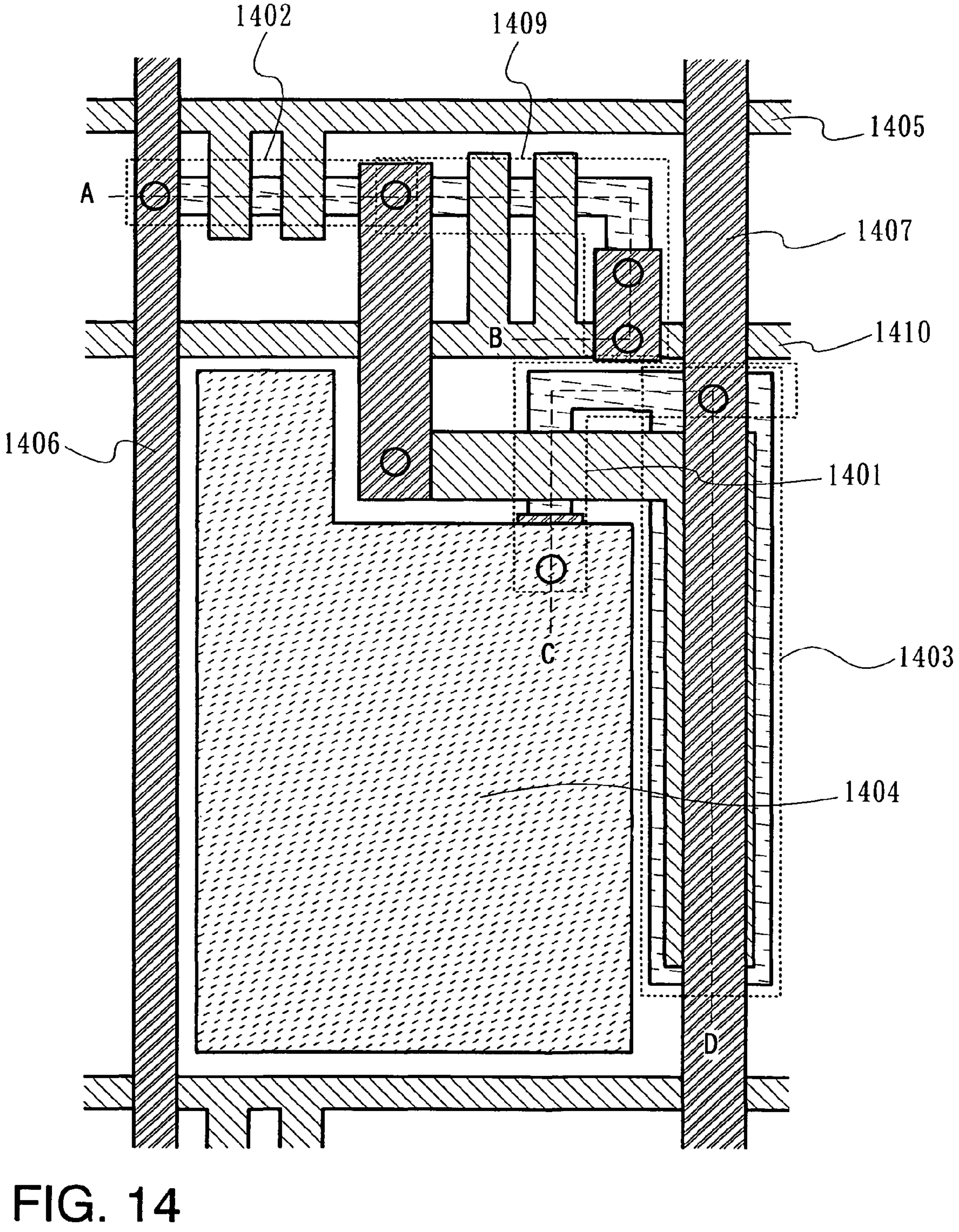
FIG. 14 is a diagram showing a pixel layout.

Here, FIG. 14 shows an example of a layout of the pixel shown in FIG. 3. The pixel includes a driving transistor 1401, a switching transistor 1402, a capacitor 1403, a pixel electrode 1404, a first scan line 1405, a signal line 1406, a power source line 1407, a diode-connected transistor 1409, and a second scan line 1410. The switching transistor 1402 has a gate terminal formed of a part of the first scan line 1405, a first terminal (source terminal or drain terminal) connected to the signal line 1406, and a second terminal (source terminal or drain terminal) connected to a gate terminal of the driving transistor 1401. The diode-connected transistor 1409 has a gate terminal formed of a part of the second scan line 1410, a first terminal (source terminal or drain terminal) connected to the gate terminal of the driving transistor 1401, and a second terminal (source terminal or drain terminal) connected to the second scan line 1410. Further, the driving transistor 1401 has a first terminal (source terminal or drain terminal) connected to the power source line 1407 and a second terminal (source terminal or drain terminal) connected to the pixel electrode 1404. The capacitor 1403 has a first electrode formed of a part of an electrode which forms the gate terminal of the driving transistor 1401 and a second electrode formed of a part of the power source line 1407 and a semiconductor layer formed in the same layer as an impurity region (source region or drain region) which functions as the first terminal of the driving transistor 1401. The pixel layout of FIG. 14 is only an example of a layout of the pixel shown in FIG. 3 and the pixel layout is not limited to this. The driving transistor 1401, the switching transistor 1402, the capacitor 1403, the first scan line 1405, the signal line 1406, the power source line 1407, the diode-connected transistor 1409, and the second scan line 1410 in FIG. 14 correspond to the driving transistor 101, the switching transistor 102, the capacitor 103, the first scan line 105, the signal line 106, the power source line 107, the diode-connected transistor 301, and the second scan line 110 in FIG. 3 respectively. By forming a light emitting layer and an opposite electrode over the pixel electrode 1404, the light emitting element 104 shown in FIG. 3 is completed.

Figure 15A:
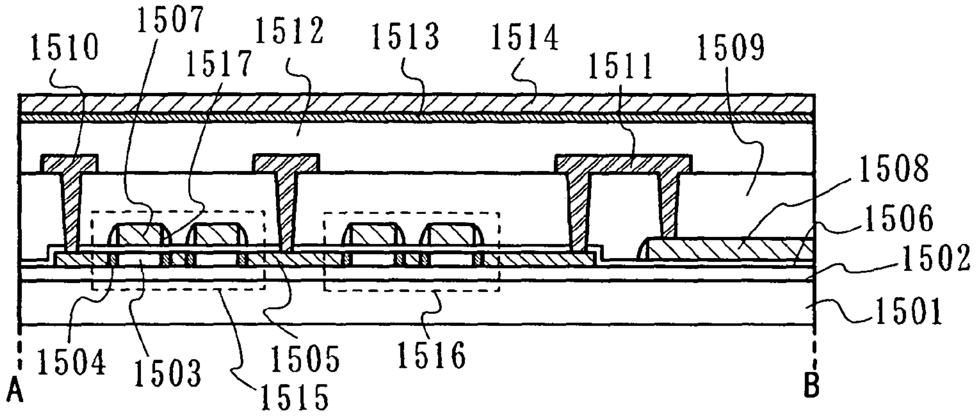
FIGS. 15A to 15C are sectional diagrams of portions of pixels of the invention.
Figure 15B:
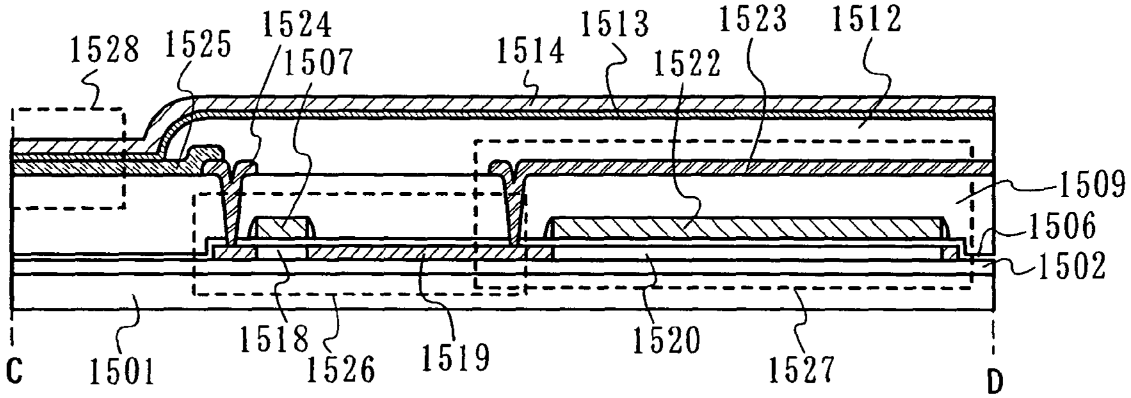

In order to describe the pixel configuration in more details, a sectional diagram along a broken line A-B is shown in FIG. 15A and a sectional diagram along a broken line C-D is shown in FIG. 15B.

Description is made on the sectional diagrams of FIGS. 15A and 15B. A base film 1502 is formed over a substrate 1501. The substrate 1501 can be formed of an insulating substrate such as a glass substrate, a quartz substrate, a plastic substrate, and a ceramic substrate, or of a metal substrate, a semiconductor substrate, or the like. The base film 1502 can be formed by a CVD method or a sputtering method. For example a silicon oxide film, a silicon nitride film, a silicon oxynitride film, or the like formed by a CVD method using $SiH_4$, $N_2O$, and $NH_3$ as a source material. Moreover, a stacked-layer of these may be used as well. It is to be noted that the base film 1502 is provided to prevent impurities from dispersing from the substrate 1501 into the semiconductor layer. When the substrate 1501 is formed of a glass substrate or a quartz substrate, the base film 1502 is not required to be provided.

Island-shaped semiconductor layers are formed over the base film 1502. In the semiconductor layers, a channel forming region 1503 where an N-channel is formed, an impurity region 1505 which functions as a source region or a drain region of an N-channel transistor, a low concentration impurity region (LDD region) 1504, a channel forming region 1518 where a P-channel is formed, an impurity region 1519 which functions as a source region or a drain region of a P-channel transistor, and a semiconductor layer 1520 which forms a part of a first electrode of a capacitor 1527 are formed. A gate electrode 1507, a first wire 1508, and a second wire 1522 are formed over the channel forming region 1503, the channel forming region 1518, and the semiconductor layer 1520 with the gate insulating film 1506 interposed therebetween. As the gate insulating film 1506, a silicon oxide film, a silicon nitride film, a silicon oxynitride film, or the like formed by a CVD method or a sputtering method can be used. Further, an aluminum (Al) film, a copper (Cu) film, a thin film containing aluminum or copper as a main component, a chromium (Cr) film, a tantalum (Ta) film, a tantalum nitride (TaN) film, a titanium (Ti) film, a tungsten (W) film, a molybdenum (Mo) film, or the like can be used as the gate electrode 1507, the first wire 1508, and the second wire 1522.

Sidewalls 1517 are formed on the sides of the gate electrode 1507. After forming a silicon compound, for example, a silicon oxide film, a silicon nitride film, or a silicon oxynitride film are formed so as to cover the gate electrode 1507, etch-back treatment is applied to form the sidewalls 1517.

The LDD regions 1504 are formed under the sidewalls 1517. That is, the LDD regions 1504 are formed in a self-aligned manner.

An interlayer insulating film 1509 is formed over the gate electrode 1507, the first wire 1508, the second wire 1522, the sidewalls 1517, and the gate insulating film 1506. The interlayer insulating film 1509 includes an inorganic insulating film as a lower layer and a resin film as an upper layer. As an inorganic insulating film, a silicon nitride film, a silicon oxide film, a silicon oxynitride film, or a film formed by stacking these layers can be used. As a resin film, polyimide, polyamide, acrylic, polyimide amide, epoxy, and the like can be used.

A third wire 1510, a fourth wire 1511, a fifth wire 1524, a sixth wire 1523, and a pixel electrode 1525 are formed over the interlayer insulating film 1509. The third wire 1510 is electrically connected to the impurity region 1505 through a contact hole. Further, the fourth wire 1511 is connected to the impurity region 1505 and the first wire 1508 through contact holes. A titanium (Ti) film, an aluminum (Al) film, a copper (Cu) film, an aluminum film containing Ti, or the like can be used as the third wire 1510, the fourth wire 1511, the fifth wire 1524, and the sixth wire 1523. It is to be noted that in the case of providing a wire such as a signal line in the same layer as the third wire 1510, the fourth wire 1511, the fifth wire 1524, and the sixth wire 1523, copper which has low resistance is preferably used. Further, as a material used for the pixel electrode 1525, a material having a high work function is preferably used. For example, a single layer of a titanium nitride (TiN) film, a chromium (Cr) film, a tungsten (W) film, a zinc (Zn) film, a platinum (Pt) film, or the like, a stacked-layer of a titanium nitride film and a film containing aluminum as a main component, a stacked-layer of three layers of a titanium nitride film, a film containing aluminum as a main component, and a titanium nitride film can be used. With a stacked-layer structure, the resistance as a wire is low, a preferable ohmic contact can be obtained, and further a function as an anode can be obtained. By using a metal film which reflects light, an anode which does not transmit light can be formed.

An insulator 1512 is formed over the third wire 1510, the fourth wire 1511, the fifth wire 1524, the sixth wire 1523, and the interlayer insulating film 1510 so as to cover an end portion of the pixel electrode 1525. As the insulator 1512, for example, a positive type photosensitive acrylic resin film can be used.

A layer 1513 containing an organic compound is provided over the insulator 1512 and the pixel electrode 1525, and an opposite electrode 1514 is provided over the layer 1513 containing an organic compound. A region where the layer 1513 containing an organic compound is sandwiched between the pixel electrode 1525 and the opposite electrode 1514 corresponds to a light emitting element 1528. As a material used for the opposite electrode 1514, a material having a low work function is preferably used. For example, a metal thin film of aluminum (Al), silver (Ag), lithium (Li), calcium (Ca), an alloy of these, MgAg, MgIn, AlLi, $CaF_2$, $Ca_3N_2$ or the like can be used. By using a metal thin film in this manner, a cathode which can transmit light can be formed.

In this manner, an N-channel transistor 1515, an N-channel transistor 1516, a P-channel transistor 1526, a capacitor 1527, and the light emitting element 1528 are formed. The N-channel transistor 1515, the N-channel transistor 1516, the P-channel transistor 1526, the capacitor 1527, the pixel electrode 1525 of the light emitting element 1528 correspond to the switching transistor 1402, the diode-connected transistor 1409, the driving transistor 1401, the capacitor 1403, and the pixel electrode 1404 in FIG. 14 respectively. It is to be noted that the description has been made on the case of a display device with a top emission structure as an example, however, the invention is not limited to this.

Moreover, the aforementioned is only an example and a layout of a pixel of the invention is not limited to this. A structure of a transistor is not limited to this, and for example, a structure having no sidewall may be employed as well.

Figure 11:
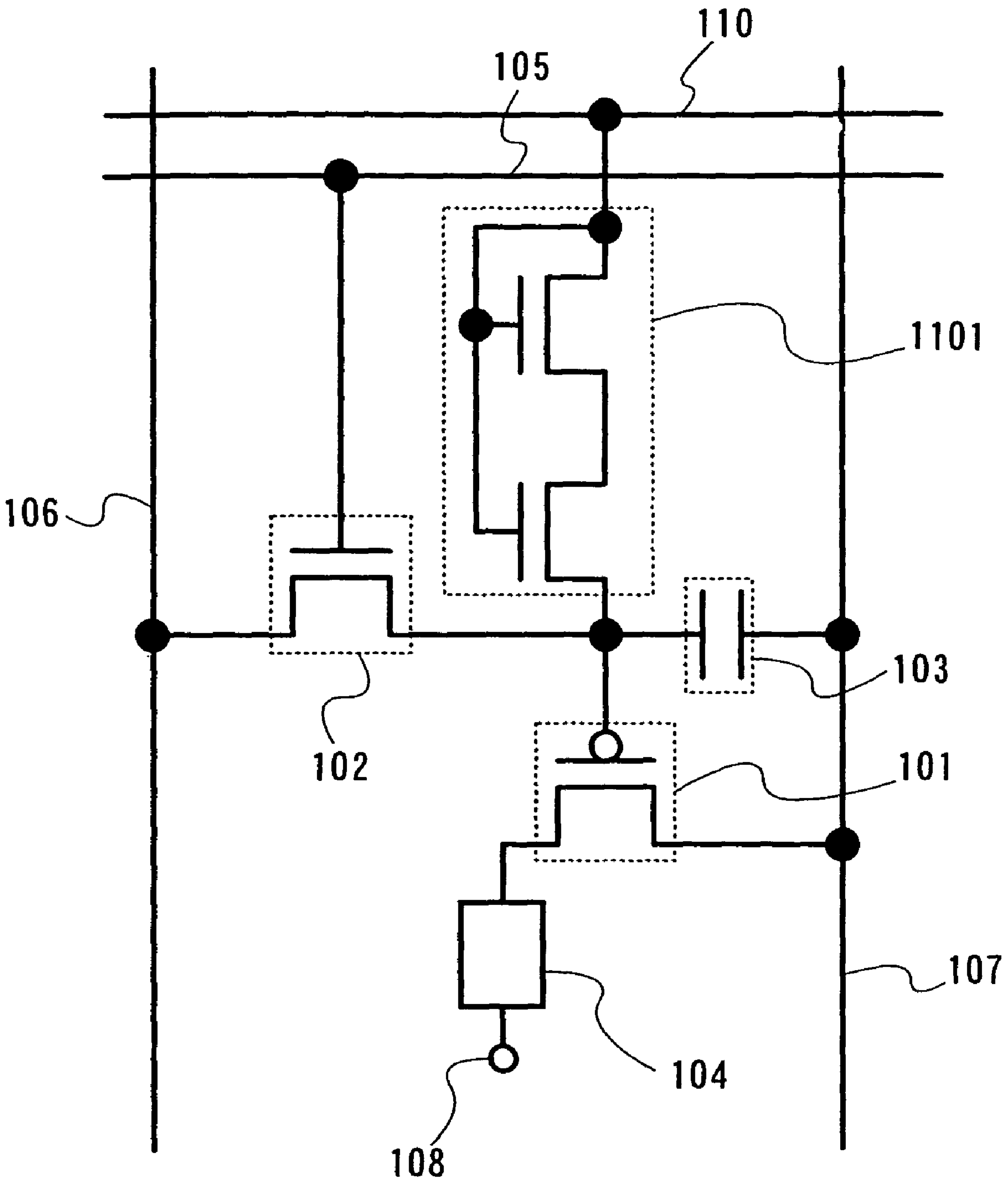
FIG. 11 is a diagram showing a pixel configuration of the invention.
Figure 12:
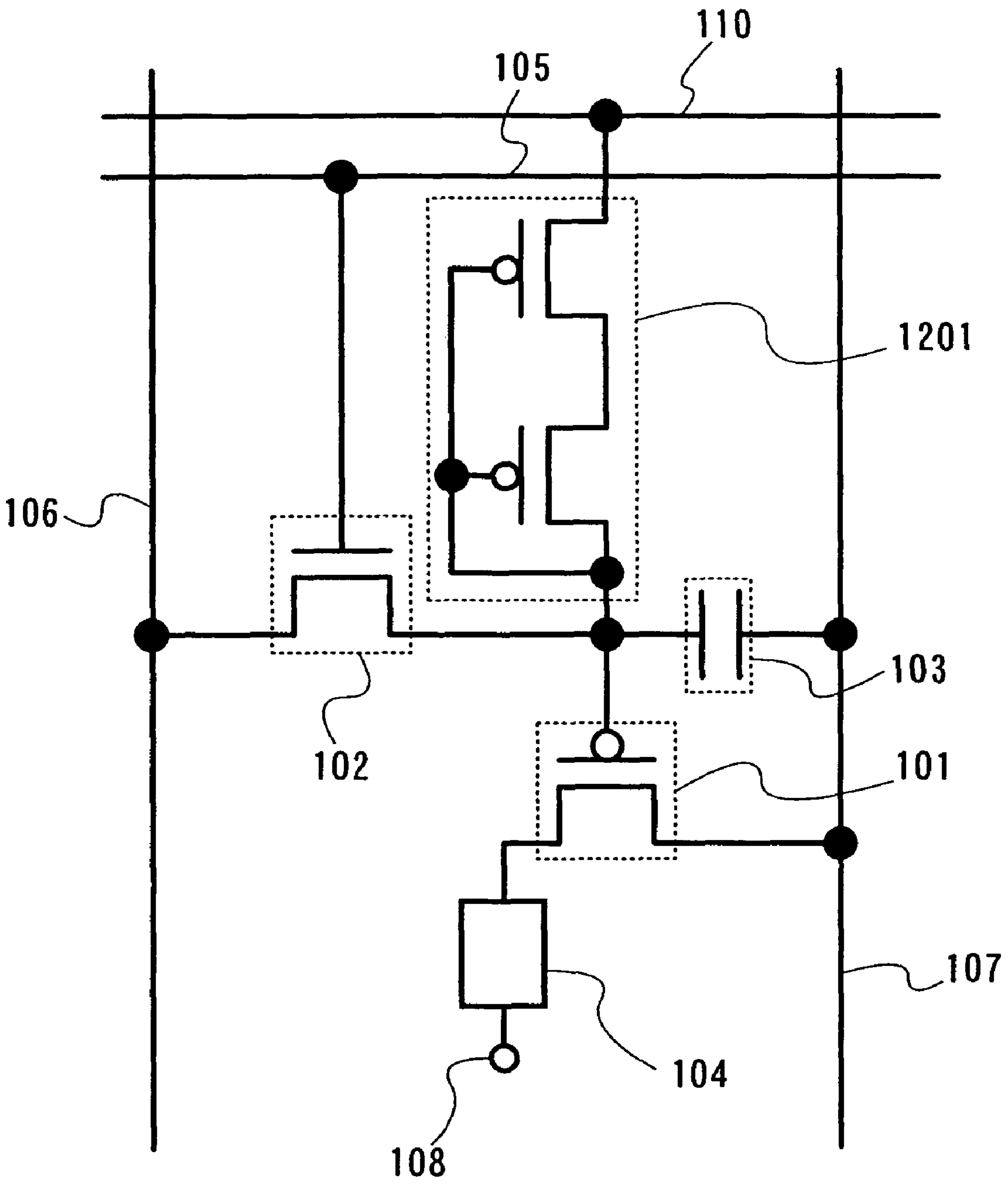
FIG. 12 is a diagram showing a pixel configuration of the invention.

Next, description is made with reference to FIGS. 11 and 12 on configurations where a multi-gate transistor which is diode-connected is used as the rectifying element 109. It is to be noted that a multi-gate transistor has two or more gate electrodes which are electrically connected and formed over a channel forming region. In a multi-gate transistor shown in FIGS. 11 and 12, gate terminals of two transistors are connected to each other, however, the invention is not limited to this. That is, in FIGS. 11 and 12, two transistors of which gate terminals are connected to each other are used to more clearly show a multi-gate structure in order to describe an effect of using a multi-gate transistor which is diode-connected as the rectifying element 109. In this embodiment mode, the switching transistor 102 or the driving transistor 101 may be a multi-gate transistor.

In a pixel shown in FIG. 11, an N-channel multi-gate transistor which is diode-connected is used as the rectifying element 109 shown in FIG. 1. A first terminal (source terminal or drain terminal) of a diode-connected multi-gate transistor 1101 is connected to the gate terminal of the driving transistor 101. Further, a second terminal (source terminal or drain terminal) of the diode-connected multi-gate transistor 1101 is connected to a gate terminal connected to two gate electrodes and is further connected to the second scan line 110. When the second scan line 110 is at an L-level, a current does not flow through the diode-connected multi-gate transistor 1101 since the gate terminal and the source terminal are connected to each other. When an H-level signal is inputted to the second scan line 110, a current flows through the diode-connected multi-gate transistor 1101 since the second terminal of the diode-connected multi-gate transistor 1101 functions as a drain terminal. Therefore, the diode-connected multi-gate transistor 1101 has a rectifying effect.

Further, in the pixel of FIG. 12, a first terminal (source terminal or drain terminal) of a diode-connected multi-gate transistor 1201 is connected to the second scan line 110. Moreover, a second terminal (source terminal or drain terminal) of the diode-connected multi-gate transistor 1201 is connected to a gate terminal connected to two gate electrodes and is further connected to the gate terminal of the driving transistor 101. When the second scan line 110 is at an L-level, a current does not flow through the diode-connected multi-gate transistor 1201 since the gate terminal and the source terminal are connected to each other. When an H-level signal is inputted to the second scan line 110, a current flows through the diode-connected multi-gate transistor 1201 since the second terminal of the diode-connected multi-gate transistor 1201 functions as a drain terminal. Therefore, the diode-connected multi-gate transistor 1201 has a rectifying effect.

It is to be noted that the diode-connected multi-gate transistor 1101 shown in FIG. 11 or the diode-connected multi-gate transistor 1201 shown in FIG. 12 is not limited to have two gate electrodes, and may have three or more gate electrodes. By forming a multi-gate transistor, a gate leak current which flows to a gate electrode of a transistor can be reduced. Therefore, it can be prevented that a video signal (the gate potential of the driving transistor 101) written to a pixel is disturbed by a gate leak current.

Figure 9:
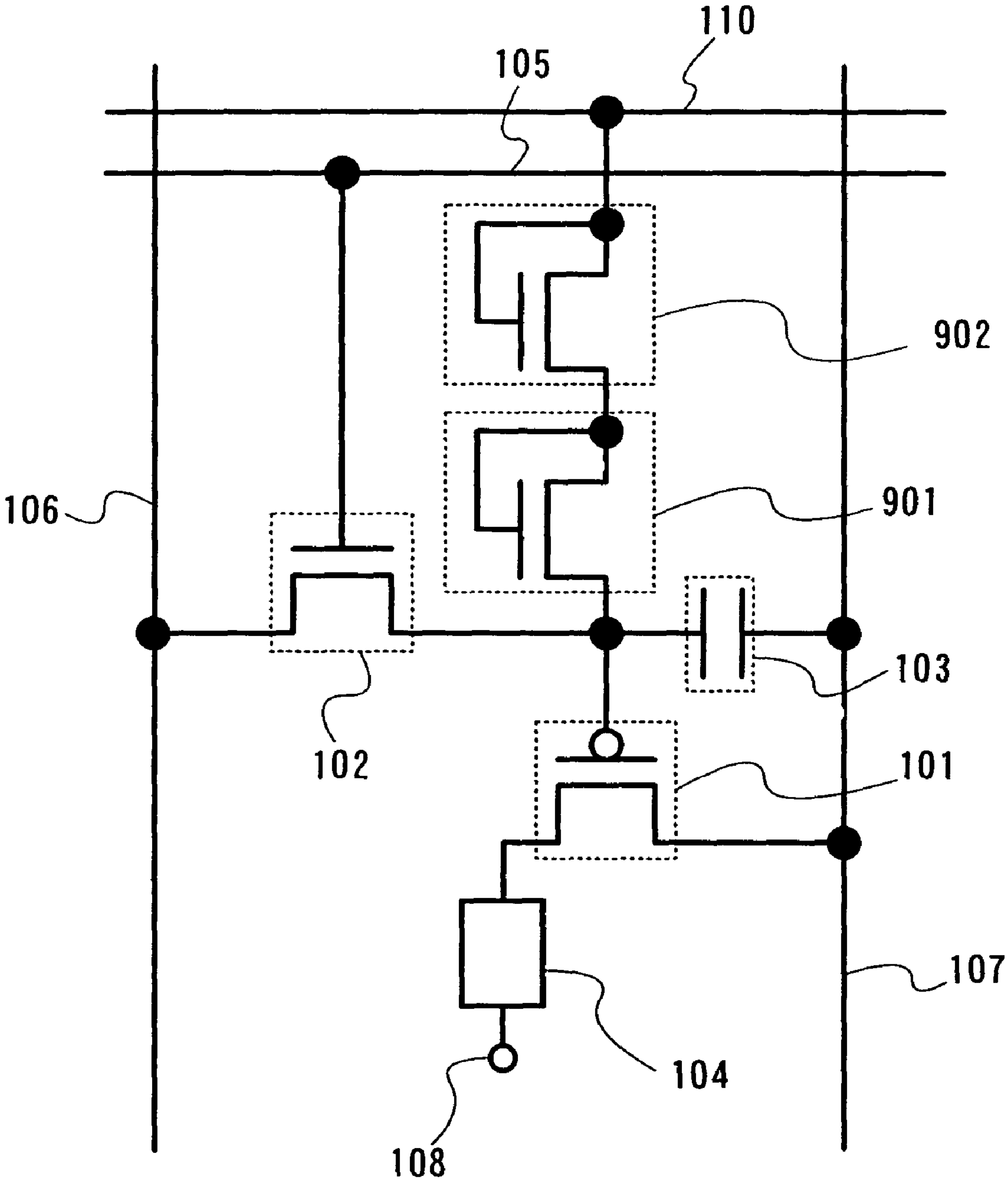
FIG. 9 is a diagram showing a pixel configuration of the invention.
Figure 10:
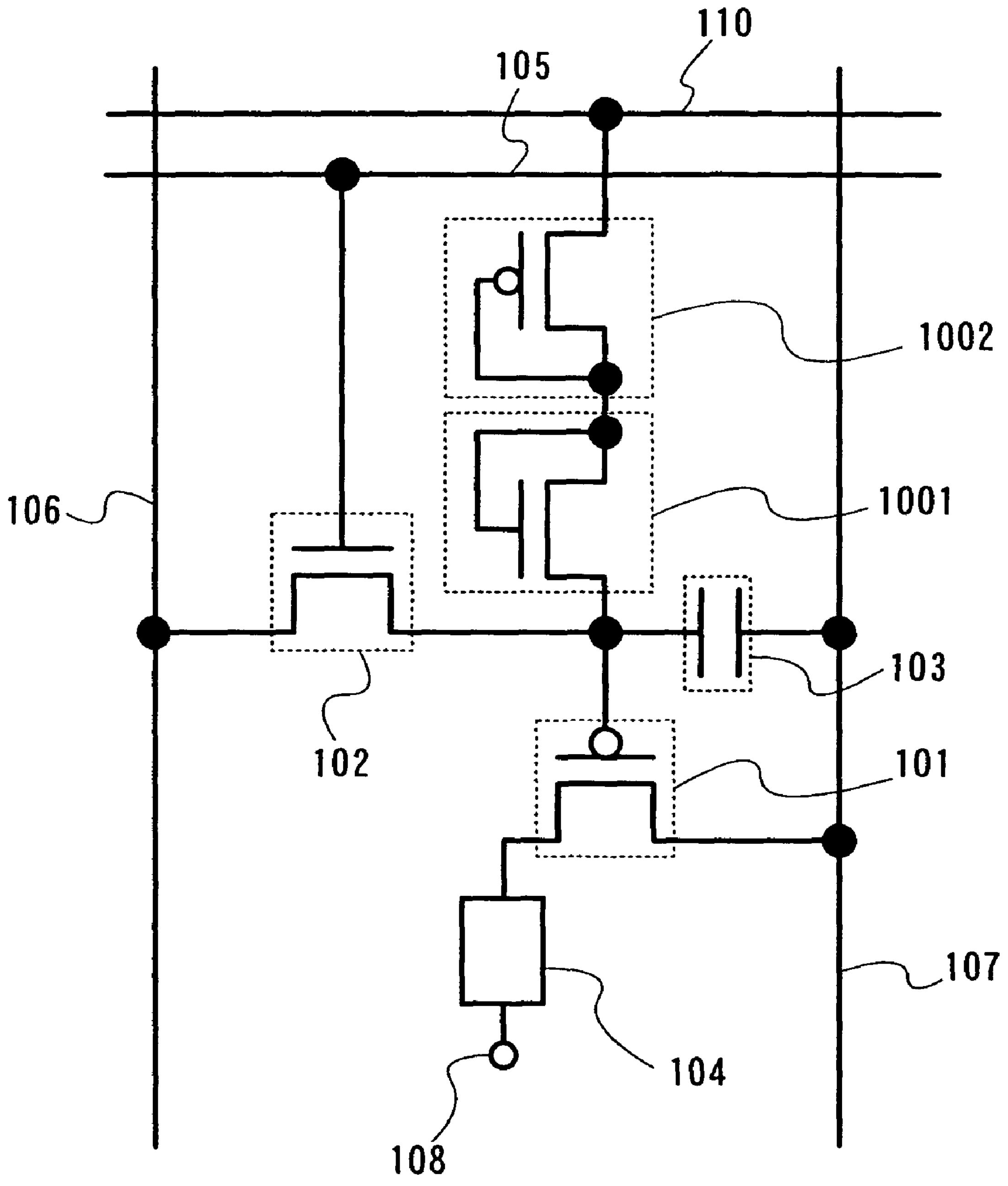
FIG. 10 is a diagram showing a pixel configuration of the invention.

Description is made with reference to FIGS. 9 and 10 on configurations where a plurality of diode-connected transistors are used as the rectifying element 109.

In a pixel shown in FIG. 9, two diode-connected N-channel transistors are used as the rectifying element 109. That is, a first diode-connected transistor 901 and a second diode-connected transistor 902 are used as the rectifying element 109. That is, a first terminal (source terminal or drain terminal) of the diode-connected transistor 901 is connected to the gate terminal of the driving transistor 101. A second terminal (source terminal or drain terminal) of the diode-connected transistor 901 is connected to a gate terminal thereof and is further connected to a first terminal (source terminal or drain terminal) of the second diode-connected transistor 902. A second terminal (source terminal or drain terminal) of the diode-connected transistor 902 is connected to a gate terminal thereof and is further connected to the second scan line 110. When the second scan line 110 is at an L-level, a current does not flow through the first diode-connected transistor 901 and the second diode-connected transistor 902 since the gate terminal and the source terminal of each are connected to each other. When an H-level signal is inputted to the second scan line 110, a current flows through the first diode-connected transistor 901 and the second diode-connected transistor 902 since the second terminal of each of the first diode-connected transistor 901 and the second diode-connected transistor 902 functions as a drain terminal. Therefore, the first diode-connected transistor 901 and the second diode-connected transistor 902 have rectifying effects.

In this manner, by dispersing a potential difference between an H-level potential of the second scan line 110 and a gate potential of the driving transistor 101 into a drain-source voltage of the first diode-connected transistor 901 and a drain-source voltage of the second diode-connected transistor 902, higher resistance can be provided as compared to the case of using one transistor to form the rectifying element 109. Accordingly, a gate potential to turn off the driving transistor 101 can be easily set. Further, a drain-source voltage of one transistor is decreased, which leads to the reduction in an off current.

It is to be noted that although N-channel transistors are used as a plurality of diode-connected transistors in FIG. 9, a P-channel transistor may also be used. Further, in FIG. 9, two diode-connected transistors are used, however, three or more of them may be used as well.

As shown in FIG. 10, an N-channel transistor and a P-channel transistor which are diode-connected may be used in combination as the rectifying element 109.

In a pixel shown in FIG. 10, a diode-connected N-channel transistor and a diode-connected P-channel transistor are used as the rectifying element 109. That is, a first diode-connected transistor 1002 which is a diode-connected N-channel transistor and a second diode-connected transistor 1001 which is a diode-connected P-channel transistor are used as the rectifying element 109. That is, a first terminal (source terminal or drain terminal) of the diode-connected transistor 1001 is connected to the gate terminal of the driving transistor 101. A second terminal (source terminal or drain terminal) of the diode-connected transistor 1001 is connected to a gate terminal thereof and is further connected to a second terminal (source terminal or drain terminal) of the diode-connected transistor 1002. A second terminal (source terminal or drain terminal) of the diode-connected transistor 1002 is connected to a gate terminal thereof. A first terminal (source terminal or drain terminal) of the diode-connected transistor 1002 is connected to the second scan line 110. When the second scan line 110 is at an L-level, a current does not flow through the first diode-connected transistor 1001 and the second diode-connected transistor 1002 since the gate terminal and the source terminal of each are connected to each other. When an H-level signal is inputted to the second scan line 110, a current flows through the first diode-connected transistor 1001 and the second diode-connected transistor 1002 since the second terminal of each of the first diode-connected transistor 1001 and the second diode-connected transistor 1002 functions as a drain terminal. Therefore, the first diode-connected transistor 1001 and the second diode-connected transistor 1002 have rectifying effects.

Here, it is generally easy to form an LDD region in an N-channel transistor, therefore, an off current can be reduced by using a diode-connected N-channel transistor having an LDD region as the rectifying element 109. However, by using a polycrystalline silicon film as an active layer (channel forming region), the transistor is likely to be an N-channel transistor which rather tends to be a depletion transistor. As a P-channel transistor tends to be an enhancement transistor at this time, a diode-connected N-channel transistor and a diode-connected P-channel transistor are used in combination to further reduce an off current. In the case where a P-channel transistor became a depletion transistor, an N-channel transistor tends to be an enhancement transistor similarly, therefore, an off current can be reduced.

Figure 16:
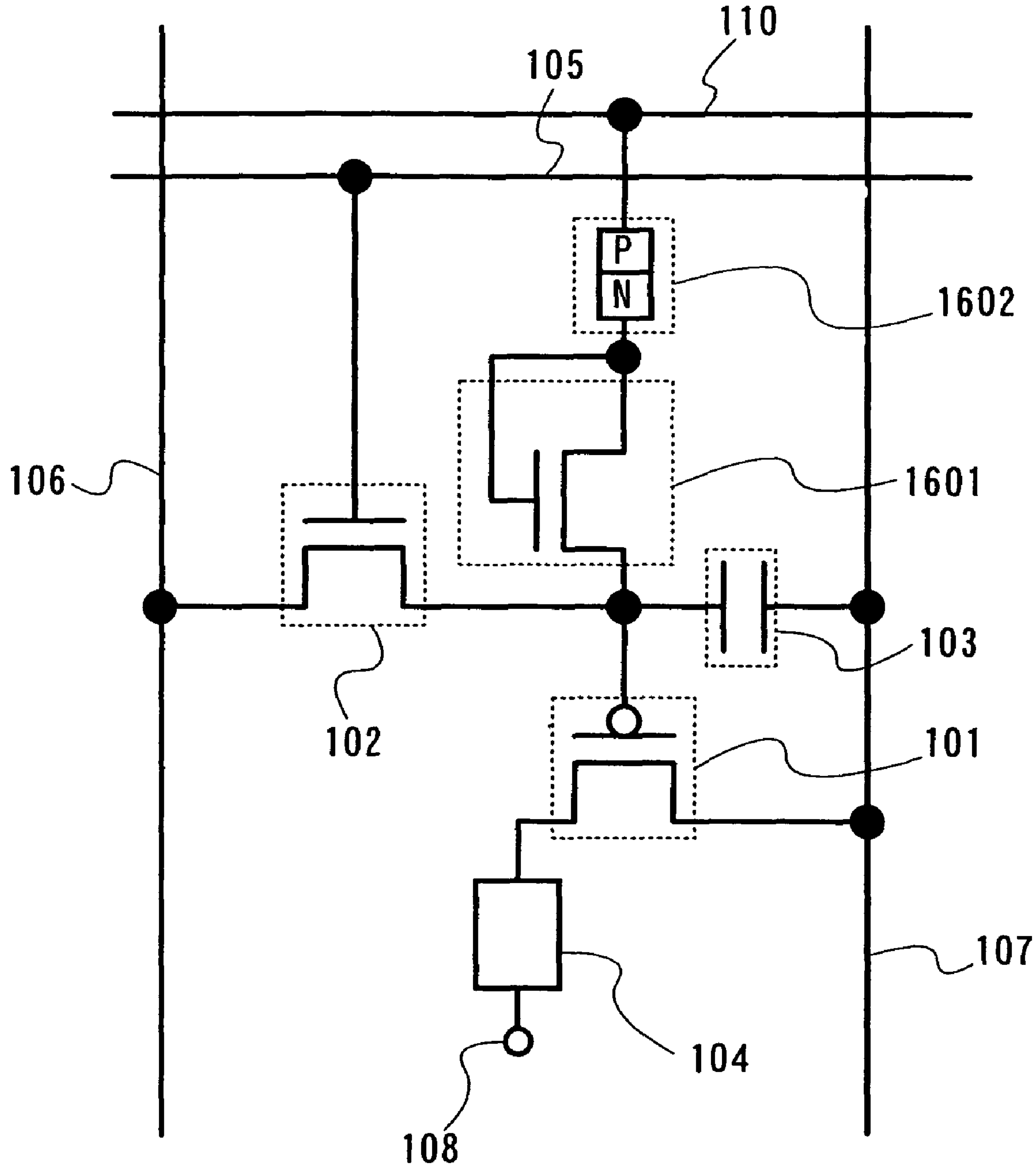
FIG. 16 is a diagram showing a pixel configuration of the invention.
Figure 17:
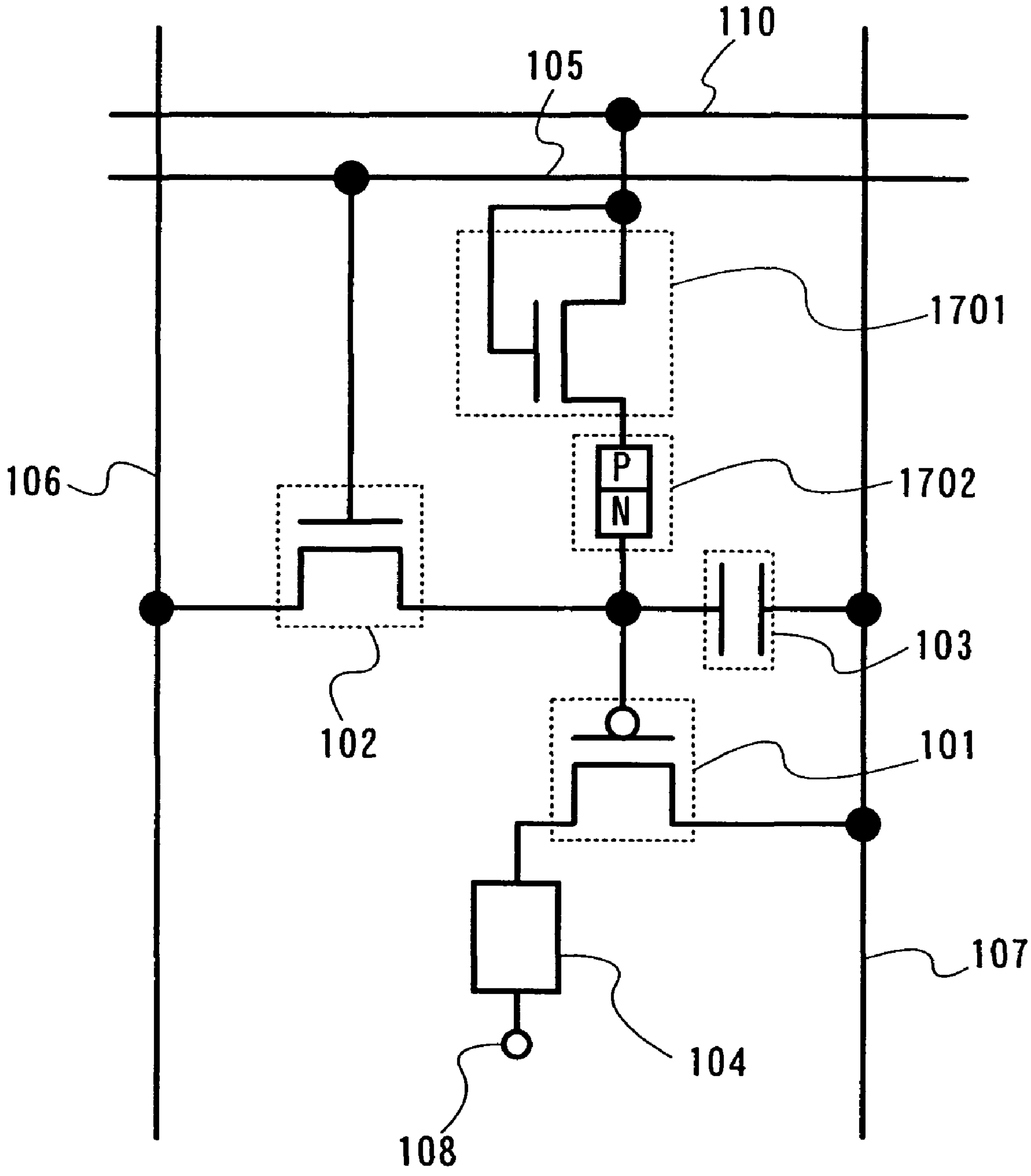
FIG. 17 is a diagram showing a pixel configuration of the invention.
Figure 42:
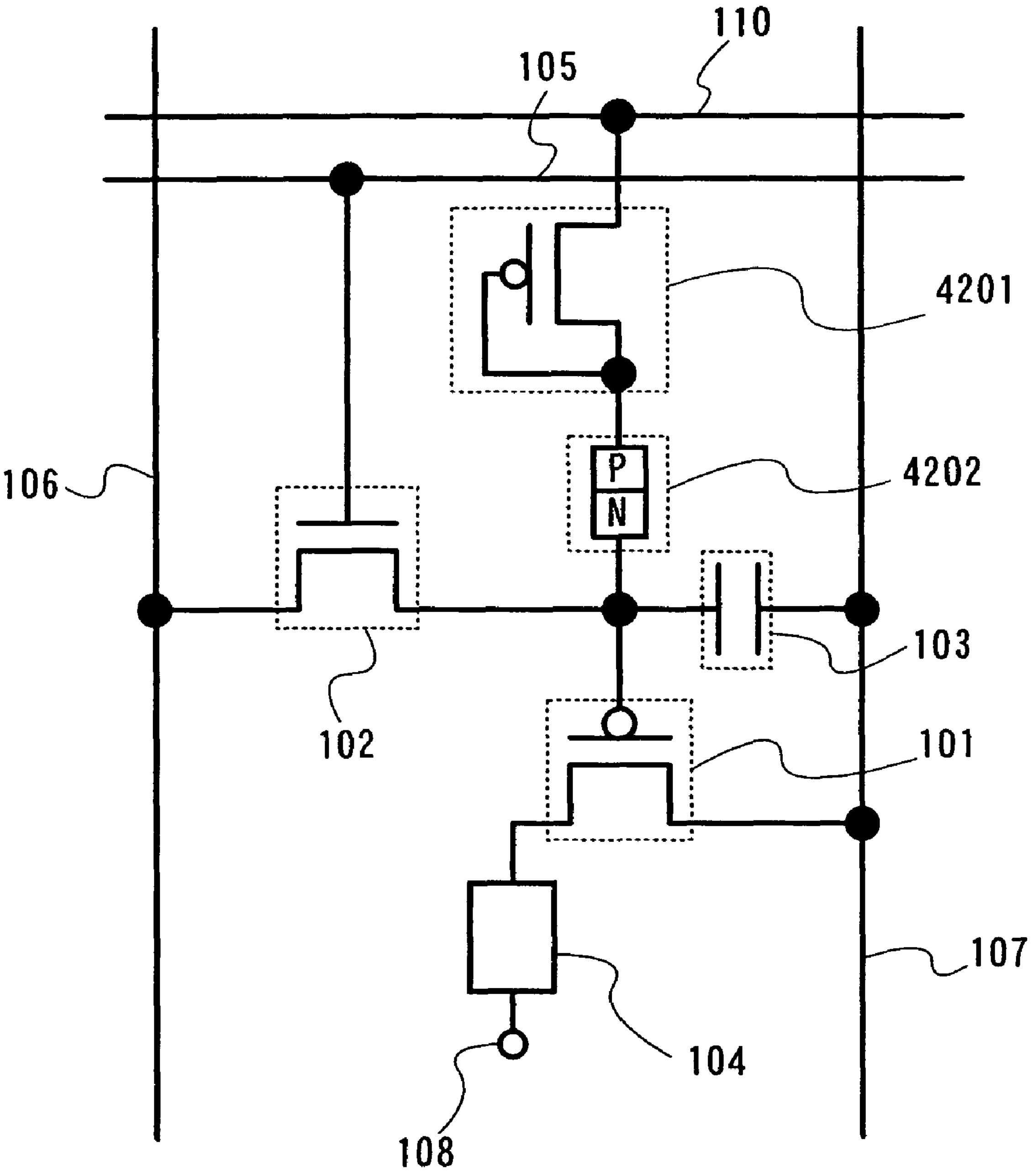
FIG. 42 is a diagram showing a pixel configuration of the invention.
Figure 46:
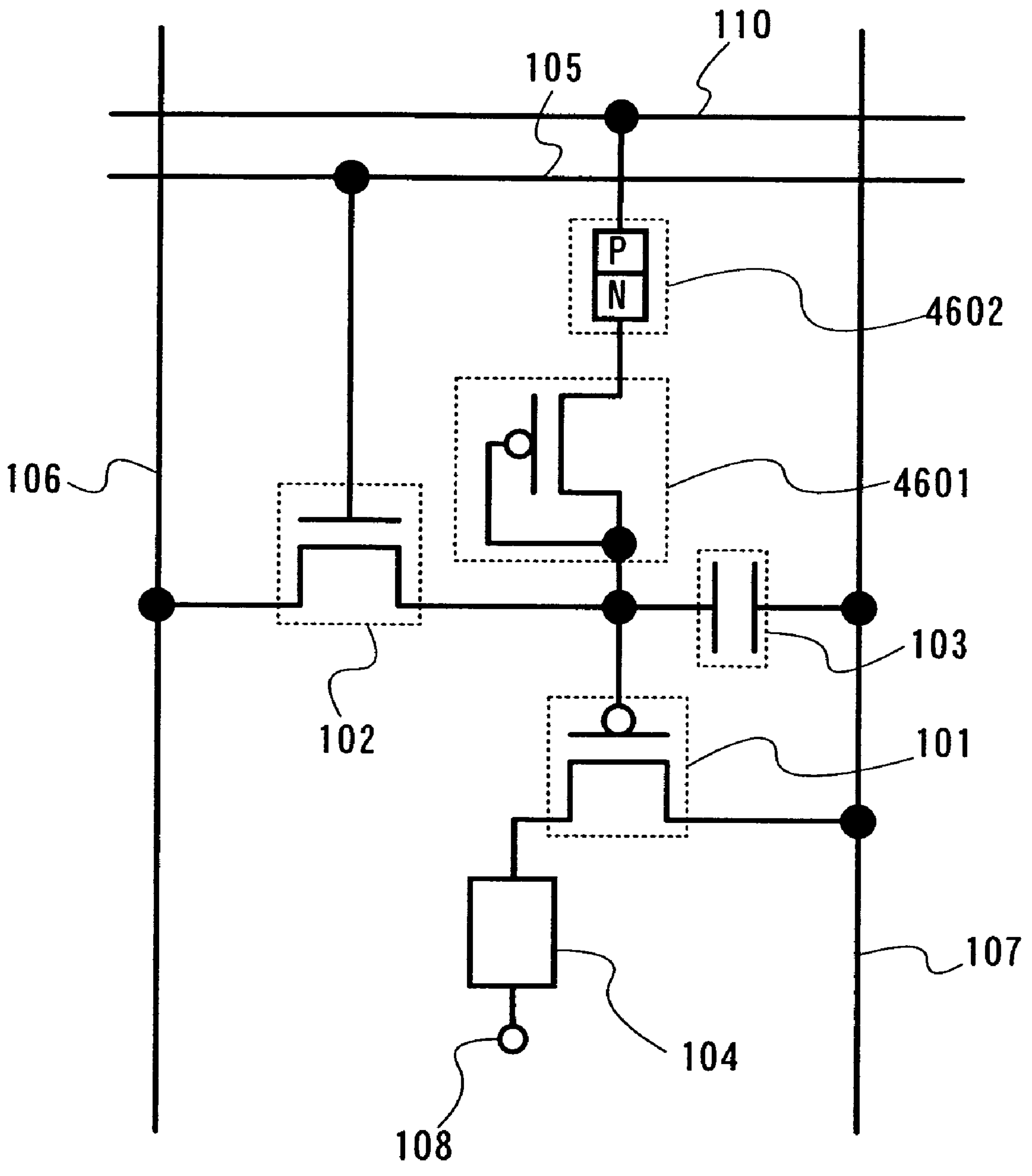
FIG. 46 is a diagram showing a pixel configuration of the invention.

Moreover, a diode-connected transistor and a PN junction diode may be used in combination as the rectifying element 109. Accordingly, an off current can be more effectively reduced. In FIG. 16, a PN junction diode 1602 is provided as the rectifying element 109 between a diode-connected transistor 1601 which is a diode-connected N-channel transistor and the second scan line 110. In FIG. 17, a PN junction diode 1702 is provided as the rectifying element 109 between a diode-connected transistor 1701 which is a diode-connected N-channel transistor and the gate terminal of the driving transistor 101. In FIG. 46, a PN junction diode 4602 is provided as the rectifying element 109 between a diode-connected transistor 4601 which is a diode-connected P-channel transistor and the second scan line 110. In FIG. 42, a PN junction diode 4202 is provided as the rectifying element 109 between a diode-connected transistor 4201 which is a diode-connected P-channel transistor and the gate terminal of the driving transistor 101.

First, description is briefly made on FIG. 16. A first terminal (source terminal or drain terminal) of the diode-connected transistor 1601 is connected to the gate terminal of the driving transistor 101 and a gate terminal thereof is connected to a second terminal (source terminal or drain terminal) thereof. Further, the second terminal of the diode-connected transistor 1601 is connected to an N-type semiconductor region of the PN junction diode 1602 and a P-type semiconductor region of the PN junction diode 1602 is connected to the second scan line 110.

Further, description is briefly made on FIG. 46. A second terminal (source terminal or drain terminal) of the diode-connected transistor 4601 is connected to a gate terminal thereof and is further connected to the gate terminal of the driving transistor 101. A first terminal (source terminal or drain terminal) of the diode-connected transistor 4601 is connected to an N-type semiconductor region of the PN junction diode 4602. A P-type semiconductor region of the PN junction diode 4602 is connected to the second scan line 110.

Description is briefly made on FIG. 17. A first terminal (source terminal or drain terminal) of the diode-connected transistor 1701 is connected to a P-type semiconductor region of the PN junction diode 1702 and an N-type semiconductor region of the PN junction diode 1702 is connected to the gate terminal of the driving transistor 101. Further, a second terminal (source terminal or drain terminal) of the diode-connected transistor 1701 is connected to a gate terminal thereof and is further connected to the second scan line 110.

Description is briefly made on FIG. 42. A second terminal (source terminal or drain terminal) of the diode-connected transistor 4201 is connected to a gate terminal thereof and a first terminal thereof (source terminal or drain terminal) is connected to a P-type semiconductor region of the PN junction diode 4202. An N-type semiconductor region of the PN junction diode 4702 is connected to the gate terminal of the driving transistor 101. The first terminal of the diode-connected transistor 4201 is connected to the second scan line 110.

Figure 41:
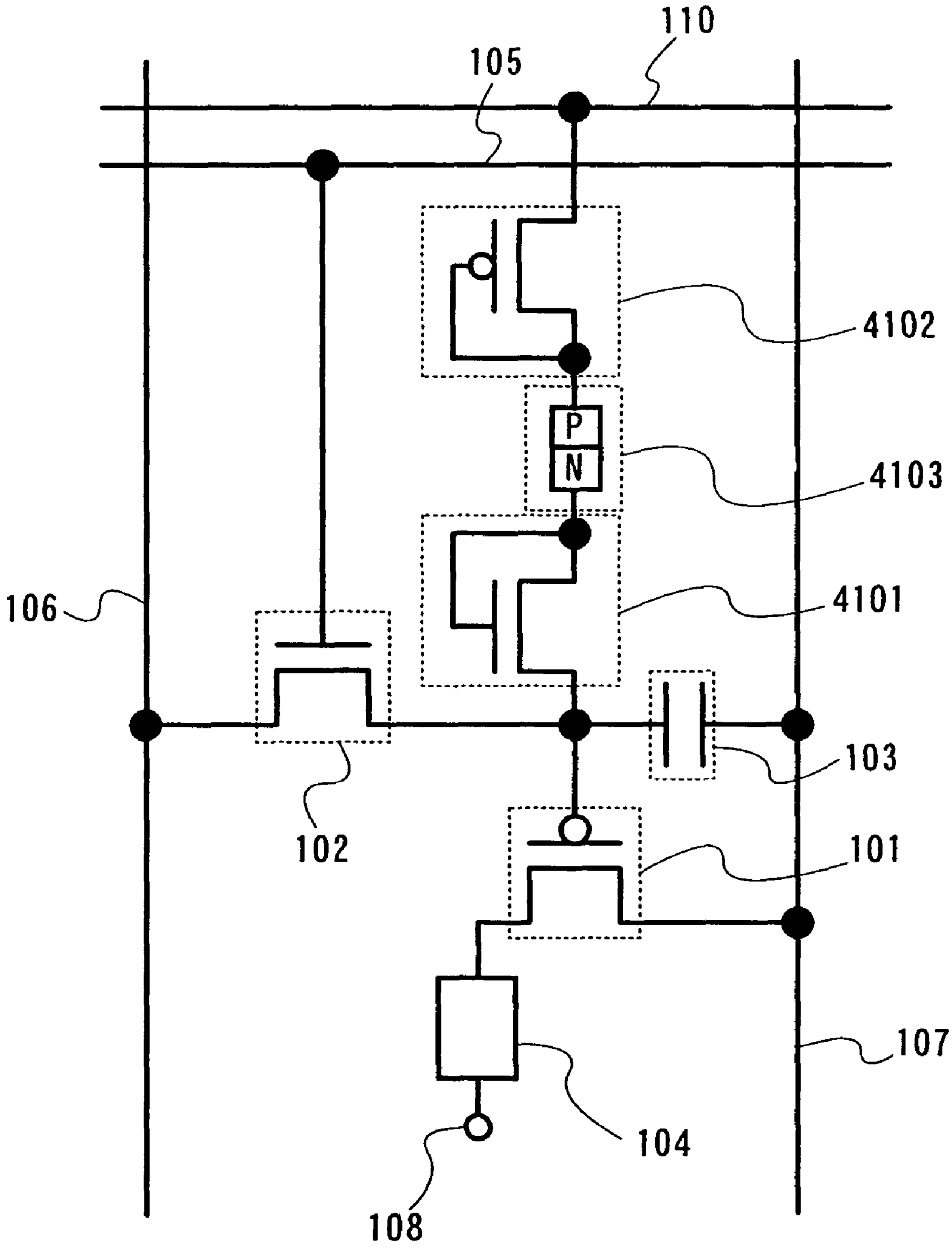
FIG. 41 is a diagram showing a pixel configuration of the invention.
Figure 47:
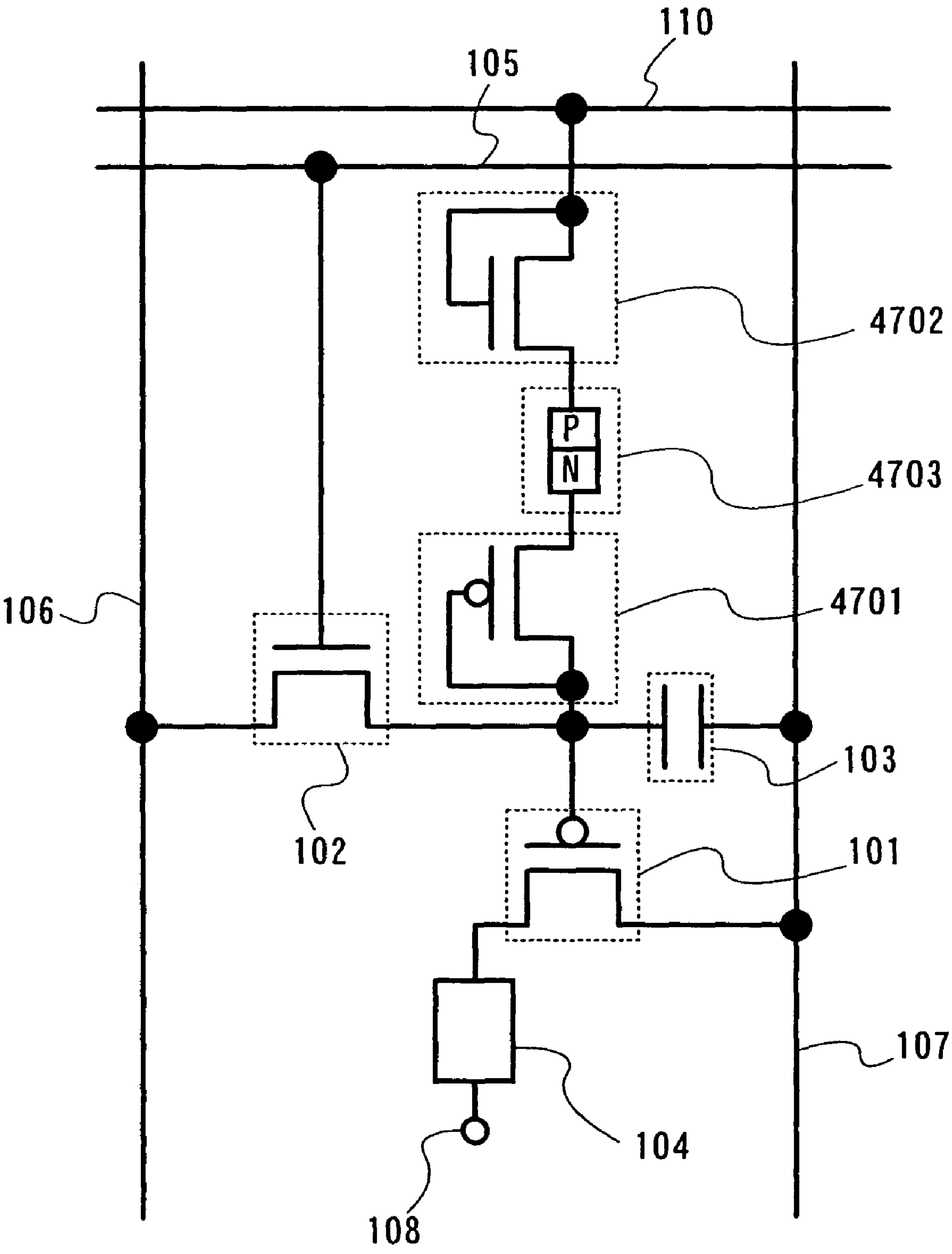
FIG. 47 is a diagram showing a pixel configuration of the invention.

Description is made with reference to FIGS. 41 and 47 on the case where a diode-connected P-channel transistor, a diode-connected N-channel transistor, and a PN junction diode are used in combination as the rectifying element 109.

Description is briefly made on FIG. 41. A first diode-connected transistor 4101, a second diode-connected transistor 4102, and a PN junction diode 4103 are used as the rectifying element 109. The first diode-connected transistor 4101 is an N-channel transistor and the second diode-connected transistor 4102 is a P-channel transistor. A first terminal (source terminal or drain terminal) of the first diode-connected transistor 4101 is connected to the gate terminal of the driving transistor 101. A second terminal (source terminal or drain terminal) of the first diode-connected transistor 4101 is connected to a gate terminal thereof and is further connected to an N-type semiconductor region of the PN junction diode 4103. A second terminal (source terminal or drain terminal) of the second diode-connected transistor 4102 is connected to a gate terminal thereof and is further connected to a P-type semiconductor region of the PN junction diode 4103. With such connections, the number of contacts can be reduced. A first terminal (source terminal or drain terminal) of the second diode-connected transistor 4102 is connected to the second scan line 110. When the second scan line 110 is at an L-level, a current does not flow through the first diode-connected transistor 4101 and the second diode-connected transistor 4102 since the gate terminal and the source terminal of each are connected to each other. When an H-level signal is inputted to the second scan line 110, the second terminal of each of the first diode-connected transistor 4101 and the second diode-connected transistor 4102 functions as a drain terminal. At this time, a forward bias voltage is applied to the PN junction diode 4103. Accordingly, a current flows through the first diode-connected transistor 4101, the second diode-connected transistor 4102, and the PN junction diode 4103. Therefore, the first diode-connected transistor 4101, the second diode-connected transistor 4102, and the rectifying element 4103 have rectifying effects.

Description is briefly made on FIG. 47. A first diode-connected transistor 4701, a second diode-connected transistor 4702, and a PN junction diode 4703 are used as the rectifying element 109. The first diode-connected transistor 4701 is a P-channel transistor and the second diode-connected transistor 4702 is an N-channel transistor. A second terminal (source terminal or drain terminal) of the first diode-connected transistor 4701 is connected to a gate terminal thereof and further connected to the gate terminal of the driving transistor 101. A first terminal (source terminal or drain terminal) of the first diode-connected transistor 4701 is connected to an N-type semiconductor region of the PN junction diode 4703. A second terminal (source terminal or drain terminal) of the second diode-connected transistor 4702 is connected to a gate terminal thereof and to the second scan line 110. A first terminal (source terminal or drain terminal) of the second diode-connected transistor 4702 is connected to a P-type semiconductor region of the PN junction diode 4703. When the second scan line 110 is at an L-level, a current does not flow through the first diode-connected transistor 4701 and the second diode-connected transistor 4702 since the gate terminal and the source terminal of each are connected to each other. When an H-level signal is inputted to the second scan line 110, the second terminal of each of the first diode-connected transistor 4701 and the second diode-connected transistor 4702 functions as a drain terminal. At this time, a forward bias voltage is applied to the PN junction diode 4703. Accordingly, a current flows through the first diode-connected transistor 4701, the second diode-connected transistor 4702, and the PN junction diode 4703. Therefore, the first diode-connected transistor 4701, the second diode-connected transistor 4702, and the rectifying element 4703 have rectifying effects.

It is to be noted that the polarity of the switching transistor 102 or the driving transistor 101 may be appropriately changed in the pixel as described above as a pixel of the invention. In the case of changing the polarity of the driving transistor 101, a forward current of the rectifying element 109 is set to be reverse. As an example, FIG. 45 shows the case where an N-channel transistor is used as the driving transistor 101 in the pixel of FIG. 1.

Figure 45:
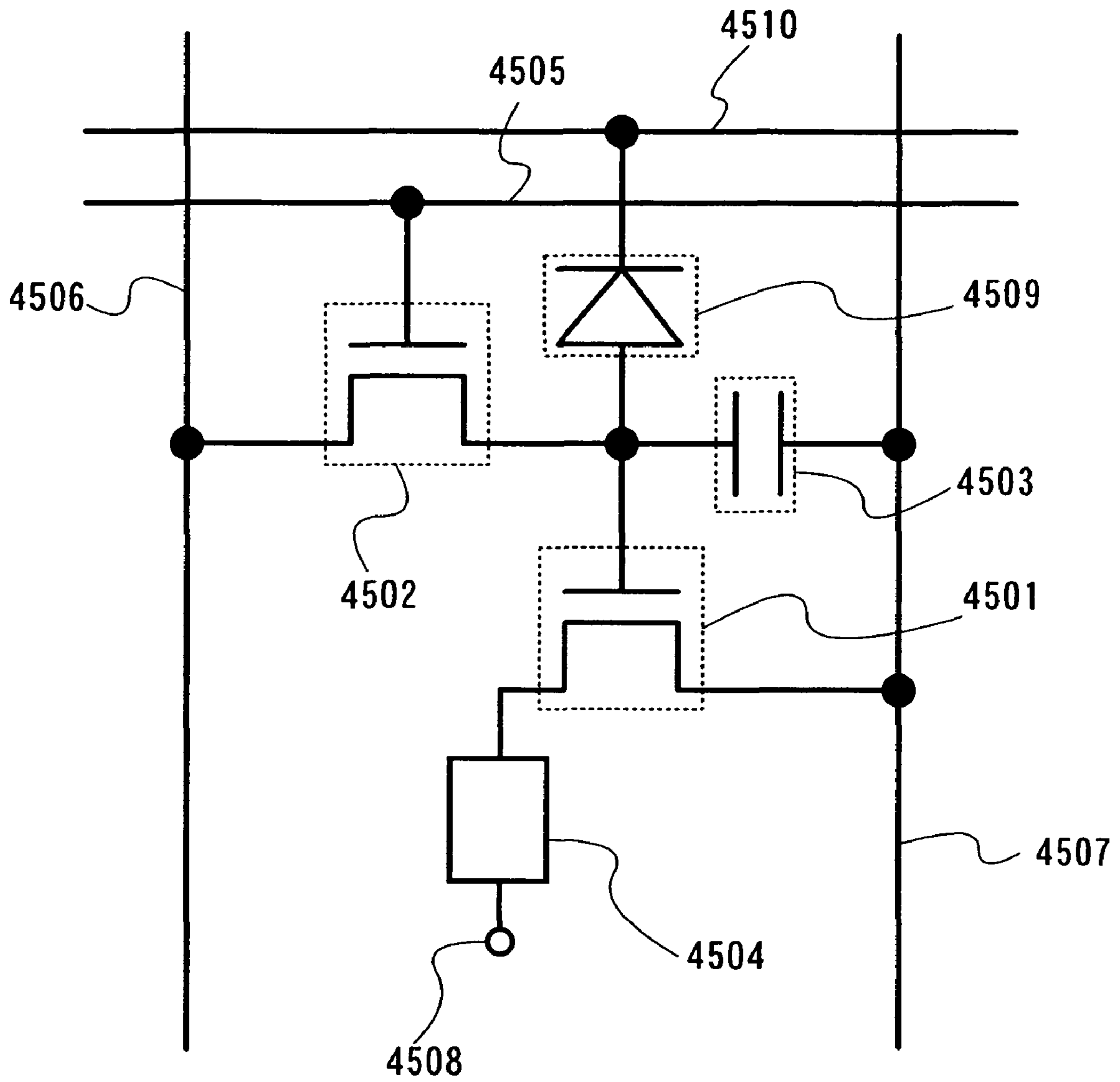
FIG. 45 is a diagram showing a pixel configuration of the invention.

In FIG. 45, a driving transistor 4501, a switching transistor 4502, a capacitor 4503, a light emitting element 4504, a first scan line 4505, a signal line 4506, a power source line 4507, a rectifying element 4509, and a second scan line 4510 are provided. It is to be noted that the driving transistor 4501 and the switching transistor 4502 are N-channel transistors. A gate terminal of the switching transistor 4502 is connected to the first scan line 4505, a first terminal (source terminal or drain terminal) thereof is connected to the signal line 4506, and a second terminal (source terminal or drain terminal) is connected to a gate terminal of the driving transistor 4501.

Further, the gate terminal of the driving transistor 4501 is connected to the second scan line 4510 through the rectifying element 4509. A second terminal (source terminal or drain terminal) of the switching transistor 4502 is connected to the power source line 4507 through a capacitor 4503. Further, a second terminal (source terminal or drain terminal) of the driving transistor 4501 is connected to the power source line 4507 and a first terminal (source terminal or drain terminal) thereof is connected a first electrode (pixel electrode) of the light emitting element 4504. A second electrode (opposite electrode) of the light emitting element 4504 is set at a low power source potential. It is to be noted that the low power source potential satisfies the relation: low power source potential<high power source potential with a standard of a high power source potential set at the power source line 4507. As the low power source potential, for example, GND, 0 V, or the like may be set. Therefore, potentials of the high power source potential and the low power source potential are set so that a voltage applied to the light emitting element 4504 becomes equal to or higher than a forward threshold voltage of the light emitting element 4504.

It is to be noted that the capacitor 4503 may be connected at a place where a gate potential of the driving transistor 4501 can be held. For example, one electrode of the capacitor 4503 may be connected to the gate terminal of the driving transistor 4501 and the other electrode thereof may be connected to a different wire than the power source line 4507. The capacitor 4503 may be provided between the gate and source of the driving transistor 4501. Further, the capacitor 4503 may be removed when the gate capacitance of the driving transistor 4501 is used as a substitute.

Next, description is made on an operation of a pixel.

When a signal is written to a pixel, an H-level signal to turn on the switching transistor 4502 is inputted to the first scan line 4505. Then, the switching transistor 4502 is turned on and a pixel to which a signal is written is selected. Accordingly, a video signal is written from the signal line 4506 to the pixel. That is, a charge of a voltage corresponding to the video signal is accumulated in the capacitor 4503. When an L-level signal is inputted to the first scan line 4505 to turn off the switching transistor 4502, the capacitor 4503 holds the voltage. It is to be noted that this voltage is a voltage between the gate terminal and the second terminal of the driving transistor 101 and corresponds to a gate-drain voltage of the driving transistor 4501.

It is to be noted that an H-level signal inputted to the first scan line 4505 is higher than the video signal to make a pixel emit light gate potential (Vsig (H) to turn on the driving transistor 4501) by a threshold voltage of the switching transistor 4502 or more. In the case where an L-level signal inputted to the first scan line 4505 has a potential equal to that of the video signal to make a pixel emit no light (gate potential Vsig (L) to turn off the driving transistor 4501), when Vsig (L) is inputted to the signal line 106 for writing a signal to a pixel of another row, a gate-source voltage of the switching transistor 4502 becomes 0 V in the pixel to which Vsig (H) is written, thus an of current may flow. Accordingly, the L-level signal of the first scan line 4505 is set lower than Vsig (L).

Next, description is made on an erasing operation. In the erasing operation, an L-level signal is inputted to the second scan line 4510. Then, a current flows through the rectifying element 4509, thereby the gate potential of the driving transistor 4501 held by the capacitor 4503 can be a certain predetermined potential. That is, it is possible to set a potential of the gate terminal of the driving transistor 4501 to be a predetermined potential and to forcibly turn off the driving transistor 4501 regardless of a video signal written to a pixel in a signal writing period. It is to be noted that a potential of the gate terminal of the driving transistor 4501 becomes higher than that of the second scan line 4510 by a threshold voltage of the rectifying element 4509.

At this time, it is preferable that an L-level signal inputted to the second scan line 4510 be a potential equal to or lower than a low power source potential set at an opposite electrode 4508. By appropriately setting the potential of the L-level signal, the potential of the gate terminal of the driving transistor 4501 can be set lower than the potential of the source terminal thereof when forcibly turning off the driving transistor 4501 in the erasing period. Accordingly, even when the driving transistor 4501 is normally-on, the driving transistor 4501 can be forcibly turned off to prevent that the light emitting element 4504 slightly emits light.

It is to be noted that an H-level signal is inputted to the second scan line 4510 except for in the erasing operation. It is preferable that the potential of the H-level signal be a potential equal to or higher than that of a video signal (gate potential Vsig (H) to turn on the driving transistor 4501) which makes a pixel emit light. However, if the potential of the H-level signal is set too high, a reverse bias voltage applied to the rectifying element 4509 becomes high in the case where a video signal for non-light emission (gate potential Vsig (L) to turn off the driving transistor 4501) is written to the pixel. Accordingly, an off current flowing to the rectifying element 4509 (also referred to as a reverse current) is increased. Then, the gate potential of the driving transistor 4501 falls, thereby an off current of the driving transistor 4501 increases. Therefore, it is preferable that the potential of the H-level signal be equal to that of a video signal which makes a pixel emit light (gate potential Vsig (H) to turn on the driving transistor 4501).

In the driving transistor 4501, the second terminal connected to the power source line 4507 functions as a source terminal. Therefore, it is preferable that the video signal Vsig (H) to turn on the driving transistor 4501 be a potential higher than a potential inputted to the power source line 4507 by the threshold voltage of the driving transistor 4501 or more. Accordingly, a potential of the power source line 4507 can be inputted to the pixel electrode of the light emitting element 4504.

A diode-connected transistor can be used as the rectifying element 4509. Further, besides the diode-connected transistor, a PN junction diode, a PIN junction diode, a Schottky diode, a diode formed of a carbon nanotube, or the like may be used as well.

Further, a pixel configuration of the invention is not limited to the aforementioned. For example, the invention can be applied to a pixel as shown in FIG. 13.

Figure 13:
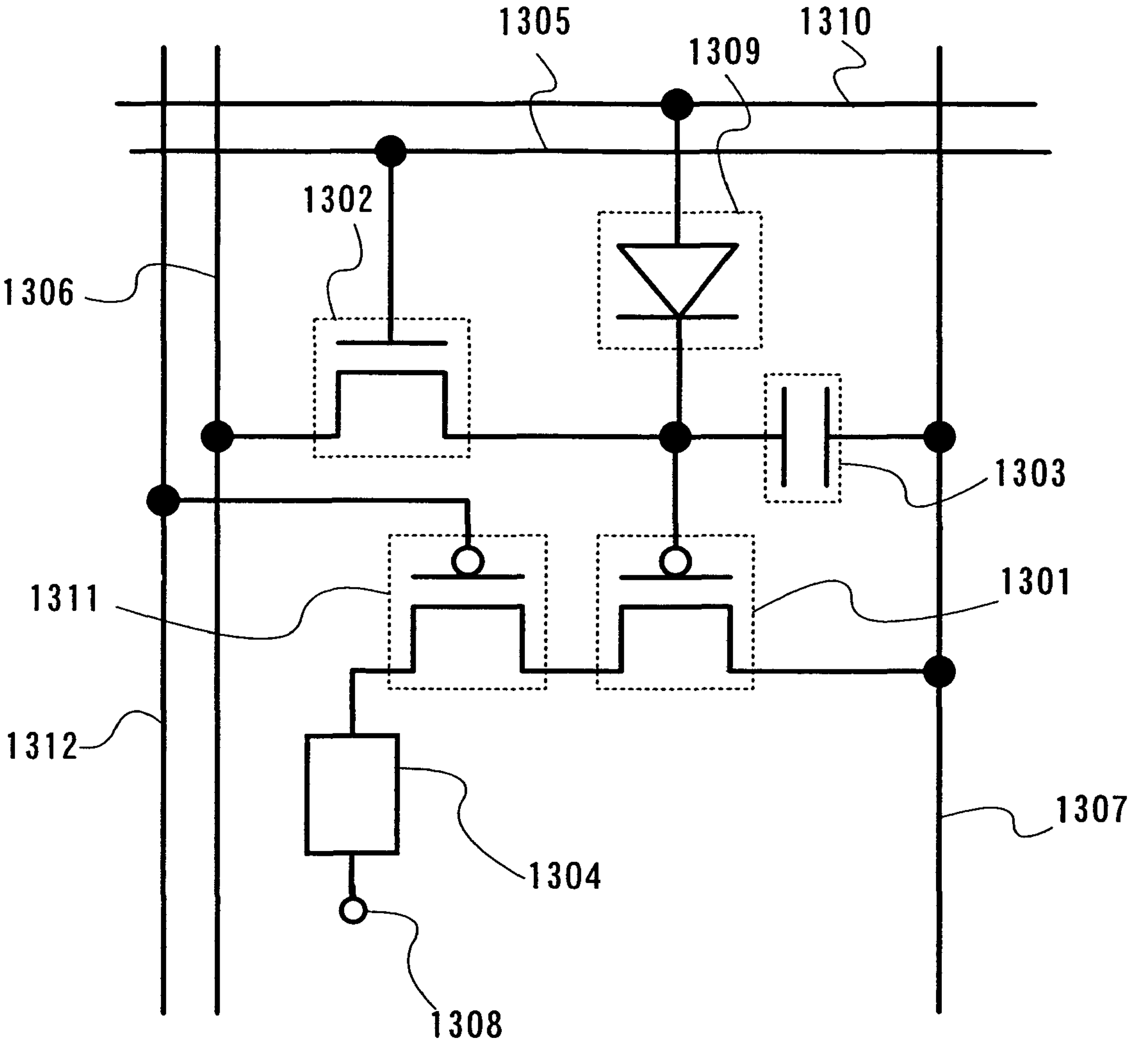
FIG. 13 is a diagram showing a pixel configuration of the invention.

In the pixel shown in FIG. 13, a driving transistor 1301, a switching transistor 1302, a current controlling transistor 1311, a capacitor 1303, a light emitting element 1304, a first scan line 1305, a second scan line 1310, a signal line 1306, a power source line 1307, and a wire 1312 are provided. It is to be noted that the driving transistor 1301 is a P-channel transistor, the switching transistor 1302 is an N-channel transistor, and the current controlling transistor 1311 is a P-channel transistor. A gate terminal of the switching transistor 1302 is connected to the first scan line 1305, a first terminal (source terminal or drain terminal) thereof is connected to the signal line 1306, and a second terminal (source terminal or drain terminal) thereof is connected to a gate terminal of the driving transistor 1301. A second terminal of the switching transistor 1302 is connected to the power source line 1307 through the capacitor 1303. Further, a first terminal (source terminal or drain terminal) of the driving transistor 1301 is connected to the power source line 1307 and a second terminal (source terminal or drain terminal) thereof is connected to a first terminal (source terminal or drain terminal) of the current controlling transistor 1311. A second terminal (source terminal or drain terminal) of the current controlling transistor 1311 is connected to a pixel electrode of the light emitting element 1304 and a gate terminal thereof is connected to the wire 1312. That is, the driving transistor 1301 and the current controlling transistor 1311 are connected in series. It is to be noted that a low power source potential is inputted to an opposite electrode 1308 of the light emitting element 1304. It is to be noted that the low power source potential satisfies the relation: low power source potential<high power source potential with a standard of the high power source potential set at the power source line 1307. As the low power source potential, for example, GND, 0 V, or the like may be set.

In this pixel configuration, the current controlling transistor 1311 operates in a saturation region in order to supply a constant current to the light emitting element 1304 when a pixel emits light. The capacitor 1303 may be removed when the gate capacitance of the driving transistor 1301 is used as a substitute.

When an H-level signal is inputted to the first scan line 1305 and a pixel is selected, that is when the switching transistor 1302 is turned on, a video signal is inputted from the signal line 1306 to the pixel. Then, a charge of a voltage corresponding to the video signal is accumulated in the capacitor 1303 which holds the voltage. This voltage is a voltage between a gate terminal and a first terminal of the driving transistor 1301 and corresponds to a gate-source voltage Vgs of the driving transistor 1301. It is to be noted that the second scan line 1310 is set at an L-level.

Then, a video signal which turns the driving transistor 1301 sufficiently on or off is inputted. That is, the driving transistor 1301 operates in a linear region.

Therefore, when a video signal to turn on the driving transistor 1301 is inputted, a high power source potential Vdd which is inputted to the power source line 1307 is ideally inputted to the first terminal of the current controlling transistor 1311 as it is. At this time, the first terminal of the current controlling transistor 1311 functions as a source terminal and a current supplied to the light emitting element 1304 is determined depending on a gate-source voltage of a current controlling transistor 1309 inputted by the wire 1312 and the power source line 1307.

That is, by making constant luminance from the light emitting element 1304*a* current supplied to the light emitting element 1304 constant. It is possible to suppress a change in luminance of the light emitting element 1304 due to the changes in the environmental temperature and with time.

In the erasing operation, an H-level potential is inputted to the second scan line 1310. Then, a current flows to the rectifying element 1309 and the potential of the driving transistor 1301 can be set at a certain potential. This potential turns off the driving transistor 1301, thereby preventing that the light emitting element 1304 slightly emits light.

Therefore, by using the pixel configuration described in this embodiment mode, for example, the driving method described with reference to FIG. 8 can be realized.

Embodiment Mode 2

In this embodiment mode, description is made on a configuration where a circuit element having three terminals is used as a potential transfer unit.

Figure 53:
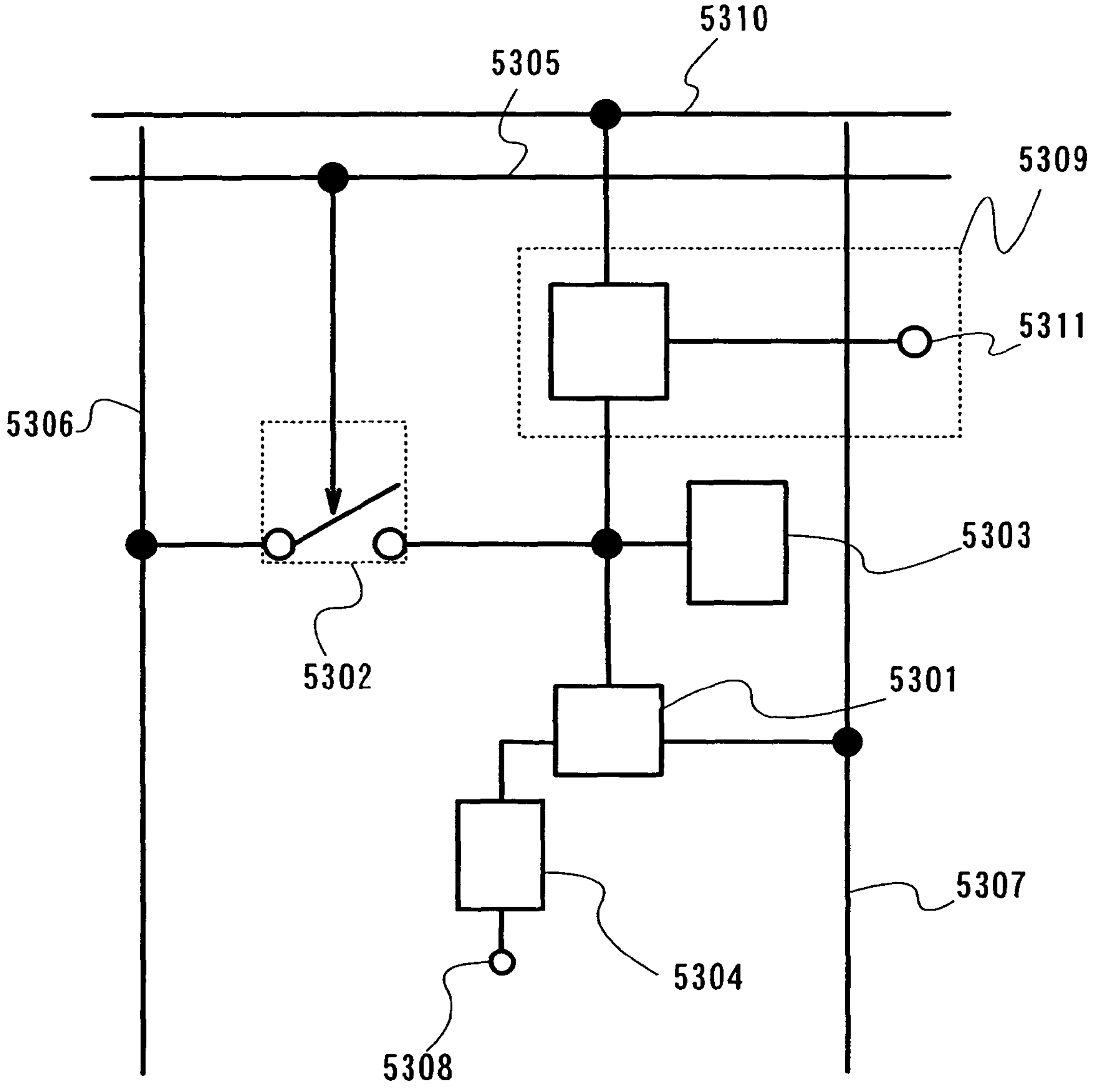
FIG. 53 is a diagram showing a pixel configuration of the invention.

First, description is made with reference to FIG. 53 on a basic pixel configuration of this embodiment mode. In the pixel, a transistor 5301, a switch 5302, a potential holding element 5303, a light emitting element 5304, a first scan line 5305, a signal line 5306, a power source line 5307, a second scan line 5310, and a potential transfer element 5309 are provided. The switch 5302 is connected to control the conduction or no conduction between the signal line 5306 and a gate terminal of the transistor 5301. Further, a control terminal of the switch 5302 is connected to the first scan line 5305. Accordingly, the switch 5302 is turned on/off depending on a signal inputted to the first scan line 5305, thereby controlling the conduction or no conduction between the signal line 5306 and the gate terminal of the transistor 5301. Moreover, a first terminal (source terminal or drain terminal) of the transistor 5301 is connected to the power source line 5307 and a second terminal (source terminal or drain terminal) thereof is connected to a pixel electrode of the light emitting element 5304. It is to be noted that a predetermined potential is supplied to an opposite electrode 5308 of the light emitting element 5304. Further, a first terminal of the potential transfer element 5309 is connected to a control terminal of the transistor 5301 and a second terminal thereof is connected to the second scan line 5310. A certain potential is inputted to a third terminal 5311 of the potential transfer element 5309. The potential transfer element 5309 can control whether to supply a potential inputted to a second terminal to a first terminal depending on the relation between the potentials of the third terminal 5311 and the second terminal. Further, the level of the potential can also be controlled. The potential holding element 5303 is connected to a gate terminal of the transistor 5301 and holds a potential inputted to the gate terminal of the transistor 5301.

Next, description is made on an operation of the pixel.

When a signal is written to a pixel, a signal is inputted to the first scan line 5305 to turn on the switch 5302. Then, a video signal is inputted from the signal line 5306 to the control terminal of the transistor 5301. This video signal is held by the potential holding element 5303. In this manner, a signal is written to the pixel.

After a signal is written to the pixel, the transistor 5301 keeps on or off depending on the potential held by the potential holding element 5303. That is, the light emitting element 5304 keeps a light emitting state or a non-light emitting state.

In the erasing operation, a signal is inputted to the second scan line 5310. Then, a potential is supplied from the potential transfer element 5309 to the control terminal of the transistor 5301. The potential supplied to the control terminal can be set as a sufficient potential to turn off the transistor 5301.

Therefore, when the light emitting element 5304 is required to emit no light, the transistor 5301 is turned off so that the power source line 5307 and the pixel electrode of the light emitting element 5304 become non-conductive. In this manner, it can be prevented that the light emitting element 5304 slightly emits light.

It is to be noted that either of a P-channel transistor or an N-channel transistor can be applied as the transistor 5301.

In the case of applying a P-channel transistor to the transistor 5301, it is preferable to apply a P-channel transistor to the potential transfer element 5309. Description is made on this structure with reference to FIG. 54.

Figure 54:
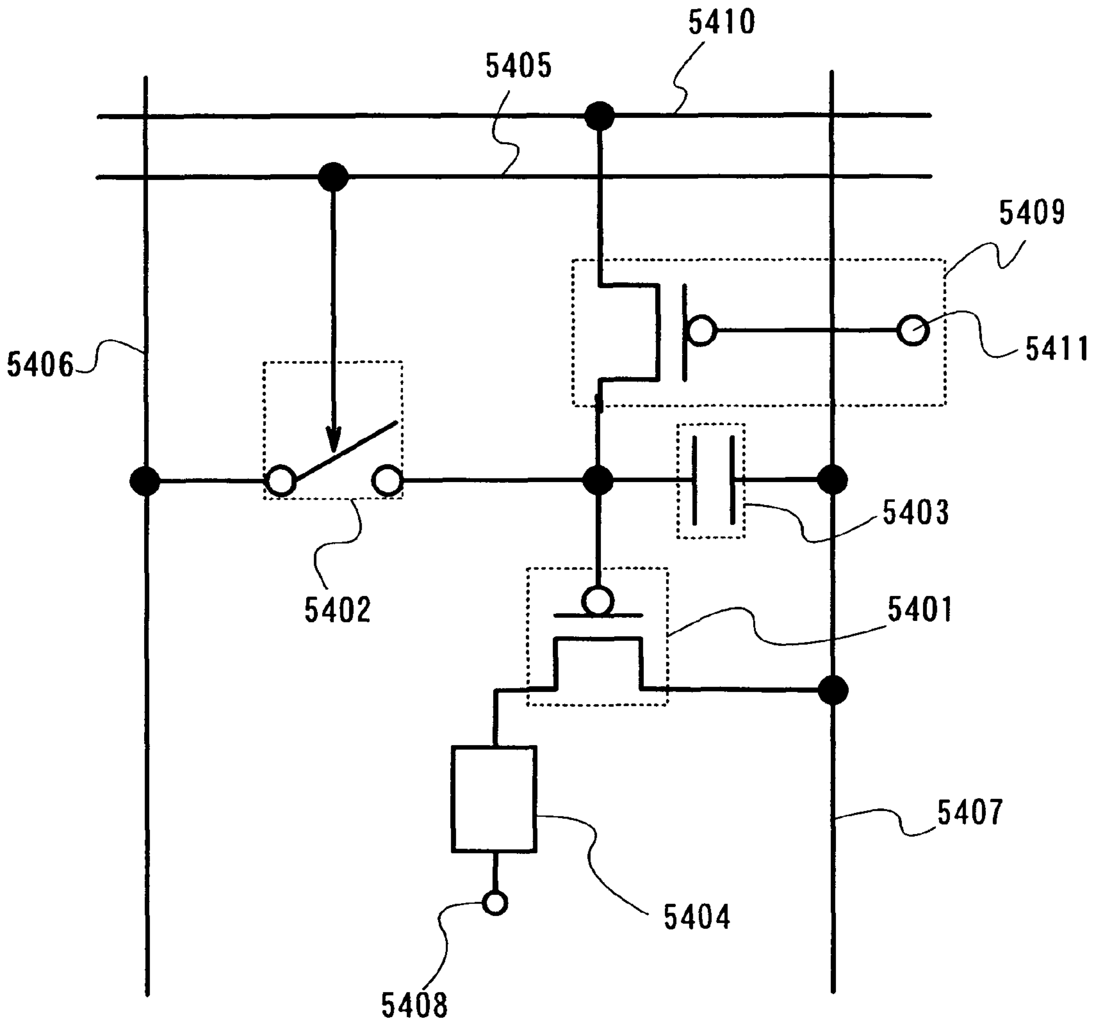
FIG. 54 is a diagram showing a pixel configuration of the invention.

In a pixel shown in FIG. 54, a first transistor 5401, a switch 5402, a capacitor 5403, a light emitting element 5404, a first scan line 5405, a signal line 5406, a power source line 5407, a second scan line 5410, and a second transistor 5409 are provided. It is to be noted that the first transistor 5401 and the second transistor 5409 are P-channel transistors. The switch 5402 is connected so that the signal line 5406 and a gate terminal of the first transistor 5401 become conductive or non-conductive. Further, a control terminal of the switch 5402 is connected to the first scan line 5405. Accordingly, the switch 5402 is turned on/off in accordance with a signal inputted to the first scan line 5405, thereby the signal line 5406 and the gate terminal of the first transistor 5401 can be conductive or non-conductive. A first terminal (source terminal or drain terminal) of the first transistor 5401 is connected to the power source line 5407 and a second terminal (source terminal or drain terminal) thereof is connected to a pixel electrode of the light emitting element 5404. Further, a first terminal (source terminal or drain terminal) of the second transistor 5409 is connected to a gate terminal of the first transistor 5401, and a second terminal (source terminal or drain terminal) thereof is connected to the second scan line 5410. Further, a certain potential is inputted to a gate terminal 5411 of the second transistor 5409. The capacitor 5403 has one terminal connected to the gate terminal of the first transistor 5401 and the other terminal connected to the power source line 5407, and holds the potential inputted to the gate terminal of the first transistor 5401.

Next, description is made on an operation of the pixel.

When a signal is written to the pixel, a signal is inputted to the first scan line 5405 to turn on the switch 5402. Then, a video signal is inputted from the signal line 5406 to the gate terminal of the first transistor 5401. This video signal is held by the capacitor 5403. In this manner, a signal is written to the pixel. It is to be noted that the second scan line 5410 is set at an L-level at this time.

After a signal is written to the pixel, the first transistor 5401 keeps on or off depending on the potential held by the capacitor 5403. That is, the light emitting element 5404 keeps a light emitting state or a non-light emitting state.

In the erasing operation, an H-level signal is inputted to the second scan line 5410. Then, a potential is supplied to the gate terminal of the first transistor 5401 through the second transistor 5409. It is to be noted that the H-level potential inputted to the second scan line 5410 is preferably set higher than the potential inputted to the gate terminal 411 of the second transistor 5409 or the potential inputted to the power source line 5407. Therefore, the potential supplied to the gate terminal of the first transistor 5401 can be set as a sufficient potential to turn off the first transistor 5401.

Moreover, a potential of an L-level signal inputted to the second scan line 5410 is preferably set at a potential which is lower than the potential inputted to the gate terminal 5411 of the second transistor 5409 by an absolute value of a threshold voltage.

Therefore, when the light emitting element 5404 is required to emit no light, the first transistor 5401 is turned off so that the power source line 5407 and the pixel electrode of the light emitting element 5404 become non-conductive. In this manner, it can be prevented that the light emitting element 5404 slightly emits light.

Figure 44:
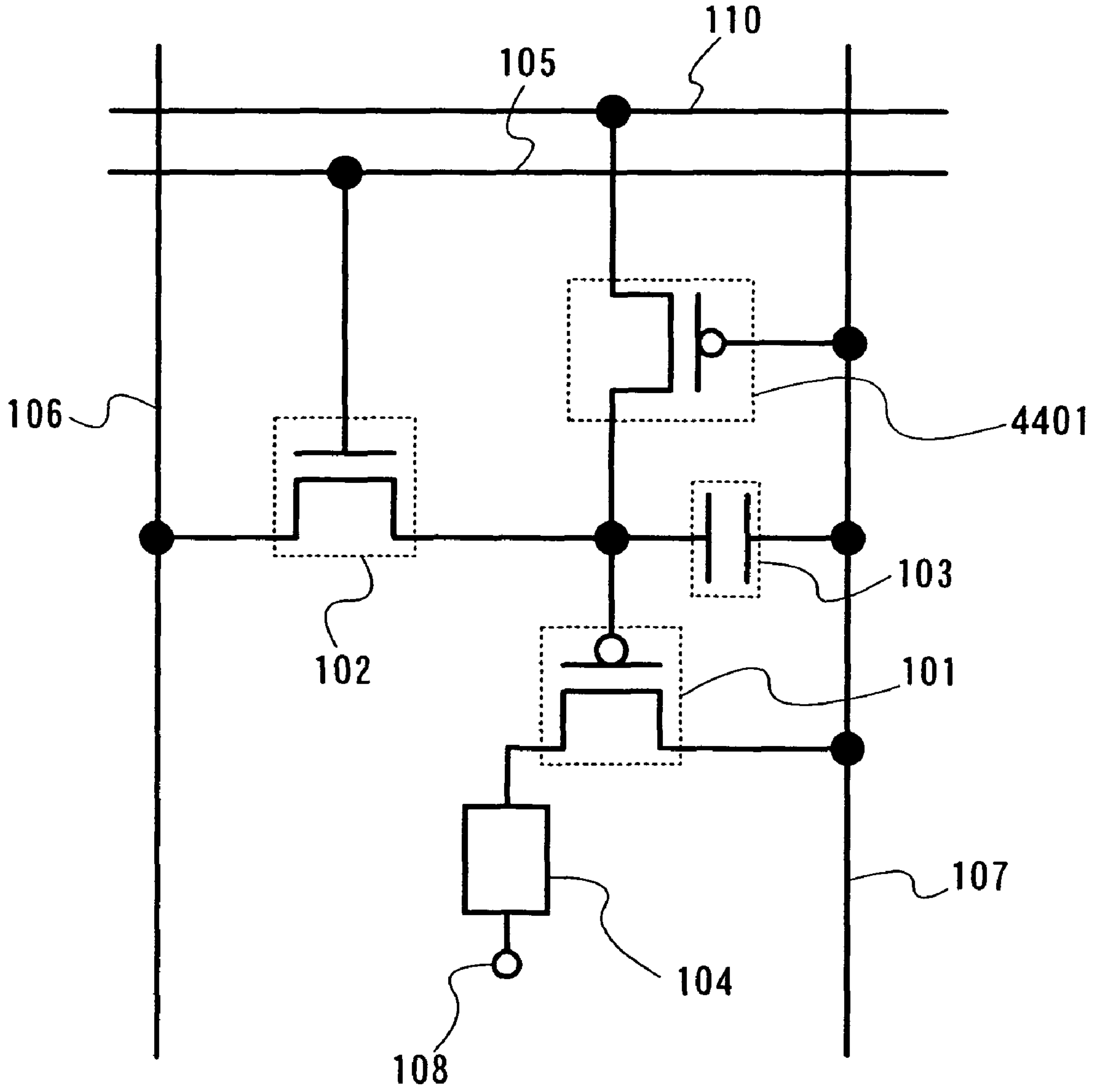
FIG. 44 is a diagram showing a pixel configuration of the invention.

FIG. 44 shows a specific example of the pixel shown in FIG. 54.

A pixel shown in FIG. 44 corresponds to the pixel shown in Embodiment Mode 1 with reference to FIG. 1, where a transistor is used instead of the rectifying element 109. Therefore, common portions to the pixel shown in FIG. 1 are denoted by the common reference numerals. A first terminal (source terminal or drain terminal) of the transistor 4401 is connected to the second scan line 110 and a second terminal (source terminal or drain terminal) thereof is connected to the gate terminal of the driving transistor 101. Further, a gate terminal of the transistor 4401 is connected to the power source line 107. When the second scan line 110 is at an L-level, the first terminal of the transistor 4401 is connected to the second scan line 110 and the second terminal thereof is connected to the gate terminal of the driving transistor 101. Therefore, the first terminal functions as a drain terminal and the second terminal functions as a source terminal. Even when a video signal (a gate potential of the driving transistor 101) written to the pixel is an H-level signal, a current does not flow through the transistor 4401 when the H-level potential and the potential of the power source line 107 are approximately equal to each other. It is needless to say that a current does not flow through the transistor 4401 when the video signal is an L-level signal. On the other hand, when an H-level signal is inputted to the second scan line 110, the first terminal of the transistor 4401 is connected to the second scan line 110 and the second terminal thereof is connected to the gate terminal of the driving transistor 101. Therefore, the first terminal functions as a source terminal and the second terminal functions as a drain terminal. When the H-level potential is higher than that of the power source line 107 (equal to or higher than an absolute value |Vth| of the threshold voltage of the transistor 4401, to be precise), the transistor 4401 is turned on and a current flows therethrough. Accordingly, a predetermined potential can be set at the gate terminal of the driving transistor 101, which can be set at the same potential as the H-level potential of the second scan line 110 in this case. That is, the video signal written to the pixel can be erased.

In the case where an N-channel transistor is applied to the transistor 5301, it is preferable to apply an N-channel transistor to the potential transfer element 5311. Description is made on this structure with reference to FIG. 55.

Figure 55:
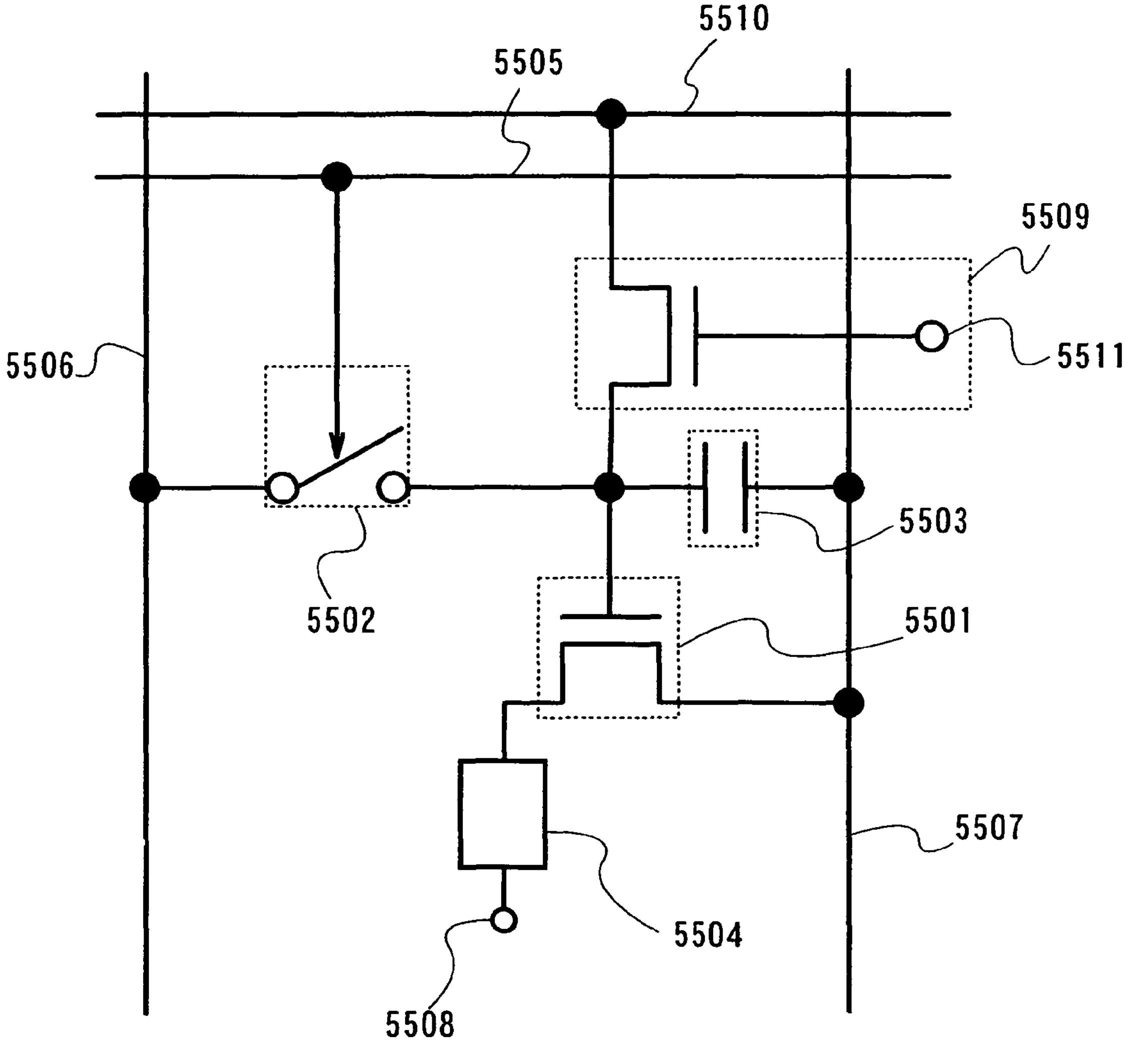
FIG. 55 is a diagram showing a pixel configuration of the invention.

In a pixel shown in FIG. 55, a first transistor 5501, a switch 5502, a capacitor 5503, a light emitting element 5504, a first scan line 5505, a signal line 5506, a power source line 5507, a second scan line 5510, and a second transistor 5509 are provided. It is to be noted that the first transistor 5501 and the second transistor 5509 are N-channel transistors. The switch 5502 is connected so that the signal line 5506 and a gate terminal of the first transistor 5501 become conductive or non-conductive. A control terminal of the switch 5502 is connected to the first scan line 5505. Therefore, the switch 5502 is turned on/off in accordance with a signal inputted to the first scan line 5505, thereby the signal line 5506 and the gate terminal of the first transistor 5501 can be conductive or non-conductive. Further, a first terminal (source terminal or drain terminal) of the first transistor 5501 is connected to the power source line 5507 and a second terminal (source terminal or drain terminal) thereof is connected to a pixel electrode of the light emitting element 5504. A first terminal (source terminal or drain terminal) of the second transistor 5509 is connected to the gate terminal of the first transistor 5501 and a second terminal (source terminal or drain terminal) thereof is connected to the second scan line 5510. A certain potential is inputted to a gate terminal of the second transistor 5509. Further, the capacitor 5503 has one terminal connected to the gate terminal of the first transistor 5501 and the other terminal connected to the power source line 5507, and holds a potential inputted to the gate terminal of the first transistor 5501.

Next, description is made on an operation of the pixel.

When a signal is written to the pixel, a signal is inputted to the first scan line 5505 to turn on the switch 5502. Then, a video signal is inputted from the signal line 5506 to the gate terminal of the first transistor 5501. This video signal is held by the capacitor 5503. In this manner, a signal is written to the pixel. It is to be noted that the second scan line 5510 is set at an H-level at this time.

After a signal is written to the pixel, the first transistor 5501 keeps on or off depending on the gate potential of the first transistor 5501 held by the capacitor 5503. That is, the light emitting element 5504 emits light when the potential of the gate terminal of the first transistor 5501 is at an H-level and emits no light when it is at an L-level.

In the erasing operation, an L-level signal is inputted to the second scan line 5510. Then, a potential is supplied to the gate terminal of the first transistor 5501 through the second transistor 5509. It is to be noted that the L-level potential inputted to the second scan line 5510 is preferably equal to or lower than a potential (Vsig (L)) of a video signal which is supplied to the gate terminal of the first transistor 5501 to make a pixel emit no light. That is, the L-level potential of the second scan line 5510 may be the same potential as Vsig (L). The potential supplied to the gate terminal of the first transistor 5501 can be set as a sufficient potential to turn off the first transistor 5501.

Moreover, an H-level potential inputted to the second scan line 5510 is preferably set at a potential which is higher than the potential inputted to a gate terminal 5511 of the second transistor 5509 by an absolute value of a threshold voltage.

Therefore, when the light emitting element 5504 is required to emit no light, the first transistor 5501 is turned off so that the power source line 5507 and the pixel electrode of the light emitting element 5504 become non-conductive. In this manner, it can be prevented that the light emitting element 5504 slightly emits light.

Figure 51:
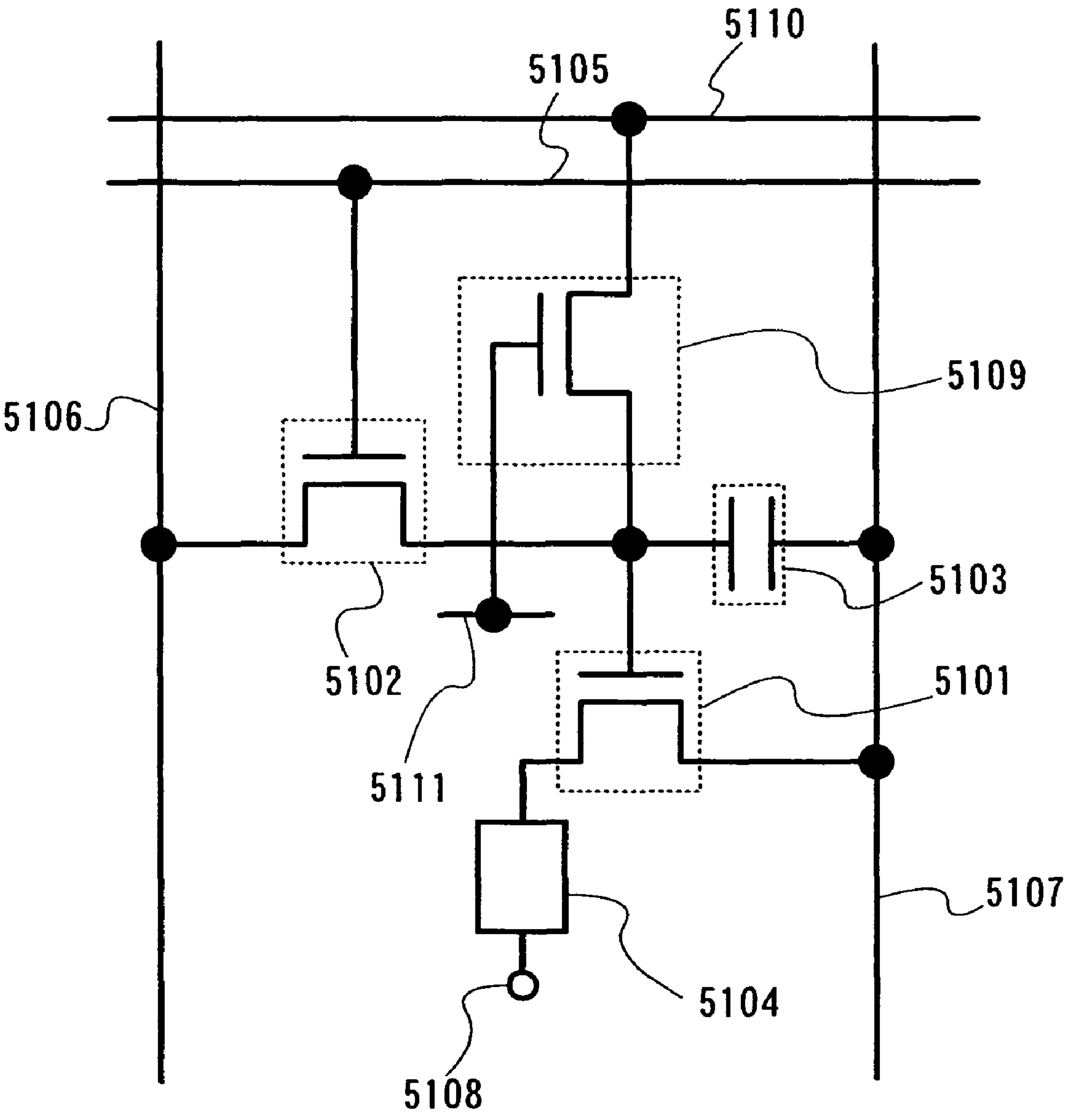
FIG. 51 is a diagram showing a pixel configuration of the invention.

FIG. 51 shows a specific example of the pixel shown in FIG. 55.

In a pixel shown in FIG. 51, a driving transistor 5101, a switching transistor 5102, a capacitor 5103, a light emitting element 5104, a first scan line 5105, a signal line 5106, a power source line 5107, a transistor 5109, and a second scan line 5110 are provided. It is to be noted that the driving transistor 5101, the switching transistor 5102, and the transistor 5109 are N-channel transistors. A gate terminal of the switching transistor 5102 is connected to the first scan line 5105, a first terminal (source terminal or drain terminal) thereof is connected to the signal line 5106, and a second terminal (source terminal or drain terminal) thereof is connected to a gate terminal of the driving transistor 5101. Further, the gate terminal of the driving transistor 5101 is connected to a first terminal (source terminal or drain terminal) of the transistor 5109. A second terminal (source terminal or drain terminal) of the transistor 5109 is connected to the second scan line 5110 and a gate terminal thereof is connected to the wire 5111. The second terminal of the switching transistor 5102 is connected to the power source line 5107 through the capacitor 5103. Further, a first terminal (source terminal or drain terminal) of the driving transistor 5101 is connected to the power source line 5107 and a second terminal (source terminal or drain terminal) thereof is connected to a pixel electrode of the light emitting element 5104. A low power source potential is inputted to an opposite electrode 5108 of the light emitting element 5104. It is to be noted that the low power source potential is a potential which satisfies the relation: low power source potential<high power source potential with a standard of a high power source potential set at the power source line 5107. As the low power source potential, for example, GND, 0 V, or the like may be set. In order to apply a potential difference between the high power source potential and the low power source potential to the light emitting element 5104 so as to supply a current to the light emitting element 5104 to emit light, each of the high power source potential and the low power source potential is set so that a potential difference between the high power source potential and the low power source potential becomes equal to or higher than a forward threshold voltage of the light emitting element 5104.

It is to be noted that the capacitor 5103 may be connected at a place where a gate potential of the driving transistor 5101 can be held. For example, one terminal of the capacitor 5103 may be connected to the gate terminal of the driving transistor 5101 and the other terminal thereof may be connected to a different wire than the power source line 5107. Further, the capacitor 5103 may be removed when the gate capacitance of the driving transistor 5101 is used as a substitute.

Next, description is made on an operation of the pixel.

When a signal is written to the pixel, an H-level signal to turn on the switching transistor 5102 is inputted to the first scan line 5105. Then, the switching transistor 5102 is turned on and a pixel to which a signal is written is selected. Then, a video signal is written from the signal line 5106 to the pixel. That is, a charge of a voltage corresponding to the video signal is accumulated in the capacitor 5103. Then, the first scan line 5105 is set at an L-level to turn off the switching transistor 5102, thereby the capacitor 5103 holds the voltage. It is to be noted that a voltage between the gate terminal and the first terminal of the driving transistor 5101 corresponds to a gate-drain voltage of the driving transistor 5101.

In the case of a voltage input voltage driving method, a video signal Vsig (H) or Vsig (L) to turn on or off the driving transistor 5101 is inputted to the gate terminal of the driving transistor 5101. That is, the driving transistor 5101 operates in a linear region, which is as a switch.

Therefore, when the video signal Vsig (H) which turns on the driving transistor 5101 is inputted, a power source potential Vdd applied to the power source line 5107 is ideally applied to the first terminal of the light emitting element 5104 as it is.

It is to be noted that the H-level signal of the first scan line 5105 is preferably a potential V1 which is higher than a video signal to make the pixel emit light (the gate potential Vsig (H) to turn on the driving transistor 5101) by a threshold voltage Vth of the switching transistor 5102 or more. Because, as the switching transistor 5102 is an N-channel transistor, the first terminal functions as a drain terminal when Vsig (H) is inputted to the signal line 5106. Therefore, the switching transistor 5102 is turned off when the second terminal (source terminal here) thereof is lower than that of the gate terminal by the threshold voltage Vth of the switching transistor 5102. That is, when the gate potential of the switching transistor 5102 is lower than V1, Vsig (H) inputted to the signal line 5106 cannot be inputted to the gate terminal of the driving transistor 5101. Then, the driving transistor 5101 cannot be turned on and a potential of the pixel electrode of the light emitting element 5104 cannot be raised to be equal to the potential inputted to the power source line 5107.

Further, it is preferable to set the L-level signal of the first scan line 5105 at a potential lower than Vsig (L). For example, in the case where the L-level signal of the first scan line 5105 has a potential equal to that of a video signal which makes the pixel emit no light (gate potential Vsig (L) to turn off the driving transistor 5101), when Vsig (L) is inputted to the signal line 5106 for writing a signal to a pixel of another row, a gate-source voltage of the switching transistor 5102 becomes 0 V in the pixel to which Vsig (H) is written. Then, an off current flows when the switching transistor 5102 is normally-on. Accordingly, the charge accumulated in the capacitor 5103 is discharged and the gate potential of the driving transistor 5101 falls, thereby desired luminance cannot be obtained.

Next, description is made on an erasing operation. In the erasing operation, an L-level signal is inputted to the second scan line 5110. Then, a current flows through the transistor 5109, thereby the gate potential of the driving transistor 5101 held by the capacitor 5103 can be a certain predetermined potential. That is, it is possible to set a potential of the gate terminal of the driving transistor 5101 to be a predetermined potential and to forcibly turn off the driving transistor 5101 regardless of a video signal written to the pixel in a signal writing period. It is to be noted that a potential of the gate terminal of the driving transistor 5101 becomes higher than that of the second scan line 5110 by a threshold voltage of the transistor 5109.

At this time, it is preferable that the L-level signal inputted to the second scan line 5110 be a potential lower than the video signal Vsig (L) which makes the pixel emit no light by a threshold voltage of the transistor 5109. By appropriately setting the potential of this L-level signal, the potential of the gate terminal of the driving transistor 5101 can be set lower than that of the source terminal thereof in the case of forcibly turning off the driving transistor 5101 in the erasing period. Accordingly, even when the driving transistor 5101 is normally-on, the driving transistor 5101 can be turned off to prevent that the light emitting element 5104 slightly emits light.

It is to be noted that the H-level of the second scan line 5110 may be the same as the H-level of the first scan line 5105. As a result, the number of power source lines can be reduced.

It is to be noted that an H-level signal is inputted to the second scan line 5110 except for in the erasing operation. It is preferable that the potential of the H-level signal be a potential equal to or higher than that of a video signal (gate potential Vsig (H) to turn on the driving transistor 5101) which makes the pixel emit light. However, if the potential of the H-level signal is set too high, a reverse bias voltage applied to the transistor 5109 becomes high in the case where a video signal for non-light emission (gate potential Vsig (L) to turn off the driving transistor 5101) is written to the pixel. Accordingly, an off current flowing to the rectifying element 109 (also referred to as a reverse current) is increased and the charge held in the capacitor 5103 leaks. Then, the gate potential of the driving transistor 5101 falls, thereby an off current of the driving transistor 5101 increases. Therefore, it is preferable that the potential of the L-level signal be equal to that of a video signal which makes the pixel emit light (gate potential Vsig (H) to turn on the driving transistor 5101).

Figure 18:
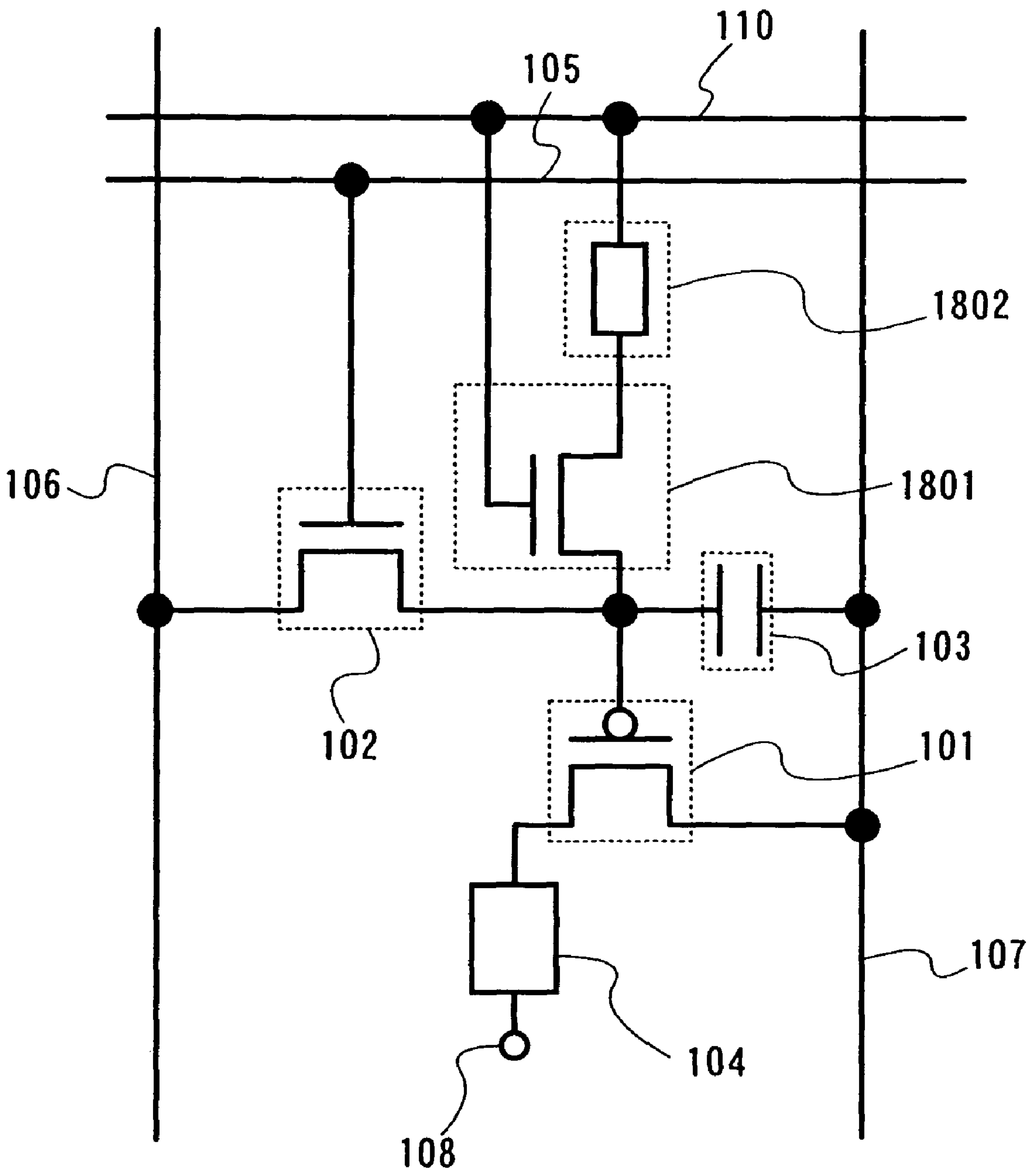
FIG. 18 is a diagram showing a pixel configuration of the invention.

Further, a transistor and a current-voltage converter element may be used in combination instead of the rectifying element 109 of the pixel shown in Embodiment Mode 1 with reference to FIG. 1, thereby an off current can be more effectively reduced. Description is made with reference to FIG. 18 on the case of using an N-channel transistor for a transistor used here.

A first terminal (source terminal or drain terminal) of an N-channel transistor 1801 is connected to the gate terminal of the driving transistor 101 and a gate terminal thereof is connected to the second scan line 110. A second terminal (source terminal or drain terminal) of the N-channel transistor 1801 is connected to the second scan line 110 through a current-voltage converter element 1802.

It is to be noted that the current-voltage converter element 1802 is an element in which a voltage is generated between opposite terminals thereof when a current flows.

Figure 25B:
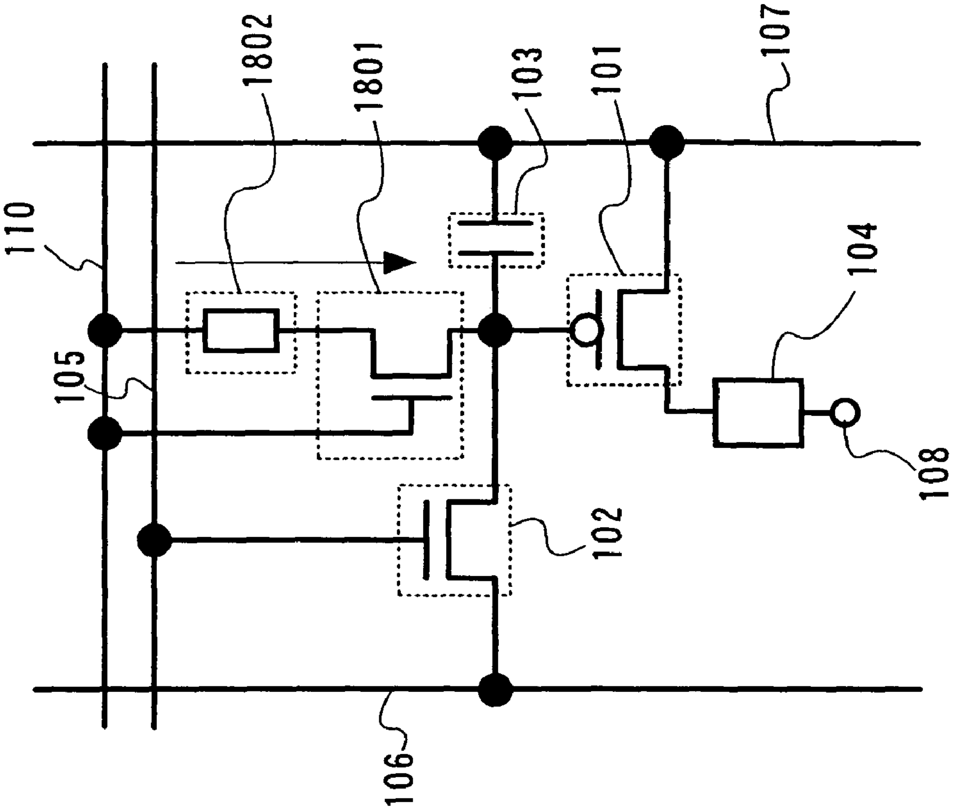
FIGS. 25A and 25B are a diagram showing an operation of a pixel of the invention.
Figure 25A:
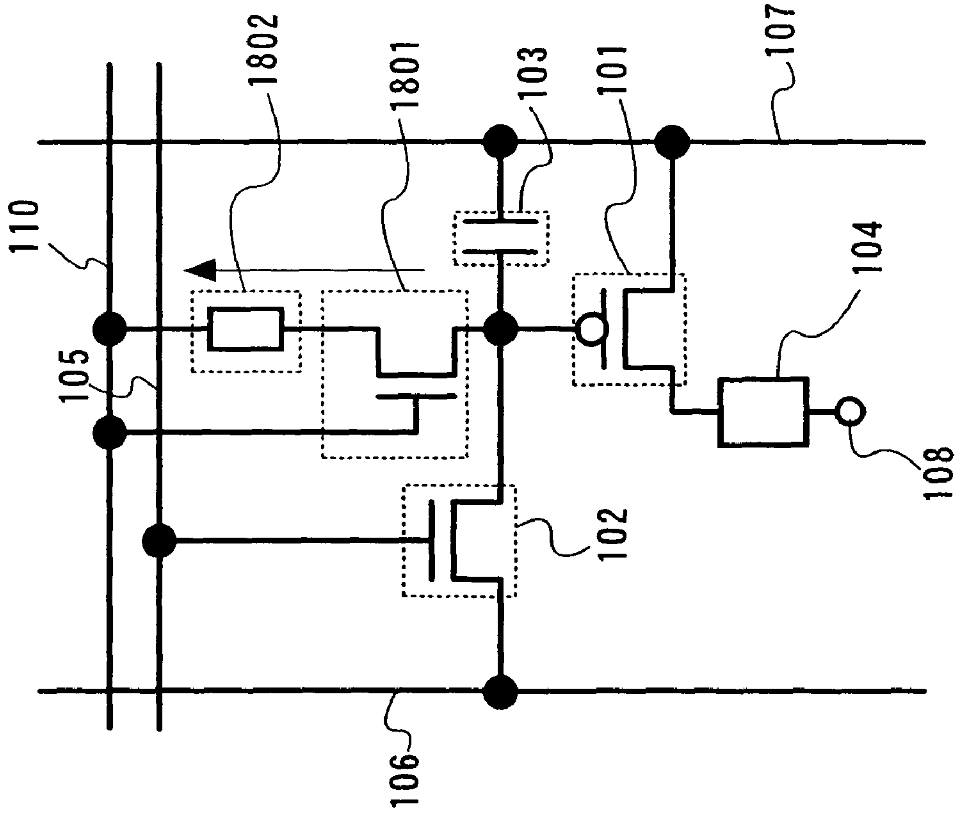

That is, when a current flows from the first terminal to the second terminal of the transistor 1801 as shown by an arrow in FIG. 25A, a potential of the second terminal becomes higher than that of the second scan line 110. On the contrary, when a current flows from the second terminal to the first terminal of the transistor 1801 as shown by an arrow in FIG. 25B, the potential of the second terminal becomes lower than that of the second scan line 110.

It is to be noted at this time that the potential of the H-level signal inputted to the second scan line 110 is preferably higher than that of the power source line 107 as described above. Accordingly, an off current of the driving transistor 101 can be reduced. Moreover, a potential of the L-level signal inputted to the second scan line 110 is set equal to or lower than that of a video signal (gate potential Vsig (L) to turn on the driving transistor 101) which makes a pixel emit light. However, if the potential of the L-level signal is set too low, a drain-source voltage of the transistor 1801 becomes high in the case where a video signal for non-light emission (gate potential Vsig (H) to turn off the driving transistor 101) is written to the pixel, which leads to increase an off current. Therefore, it is preferable that the potential of the L-level signal be equal to that of a video signal which makes a pixel emit no light (gate potential Vsig (L) to turn on the driving transistor 101).

Here, regardless of the video signal inputted to the pixel, when the transistor 1801 is an enhancement transistor, the first terminal functions as a drain terminal and the second terminal functions as a source terminal in the case where the second scan line 110 is at an L-level. Accordingly, a current does not flow through the transistor 1801. However, when the transistor 1801 is a depletion transistor, a current sometimes flows from the first terminal to the second terminal of the transistor 1801 in the case where a video signal (gate potential Vsig (H) to turn off the driving transistor 101) which makes the pixel emit no light is inputted. However, a voltage is generated between the opposite terminals of the current-voltage converter element 1802, therefore, a potential of the second terminal of the transistor 1801 becomes higher than the L-level potential of the second scan line 110. As the second terminal of the transistor 1801 corresponds to a source terminal here, a potential of the source terminal becomes higher than that of the gate terminal of the transistor 1801. Accordingly, a current flowing through the transistor 1801 is suppressed. That is, an off current is reduced.

On the other hand, when an H-level signal is inputted to the second scan line 110, the second terminal of the transistor 1801 functions as a drain terminal and the first terminal thereof functions as a source terminal. Then, a current flows through the transistor 1801. At this time, when a voltage which is generated at the current-voltage converter element 1802 is low, the transistor 1801 operates in a saturation region. However, as the first terminal functions as a source terminal, a gate-source voltage of the transistor 1801 does not depend on a voltage drop at the current-voltage converter element 1802. Thus, it is easy to set a gate potential of the driving transistor 101 to make the pixel emit no light. Further, even when a voltage generated at the current-voltage converter element 1802 is high, it is easy to set a gate potential of the driving transistor 101 to make the pixel emit no light as the transistor 1801 operates in a linear region.

Figure 21:
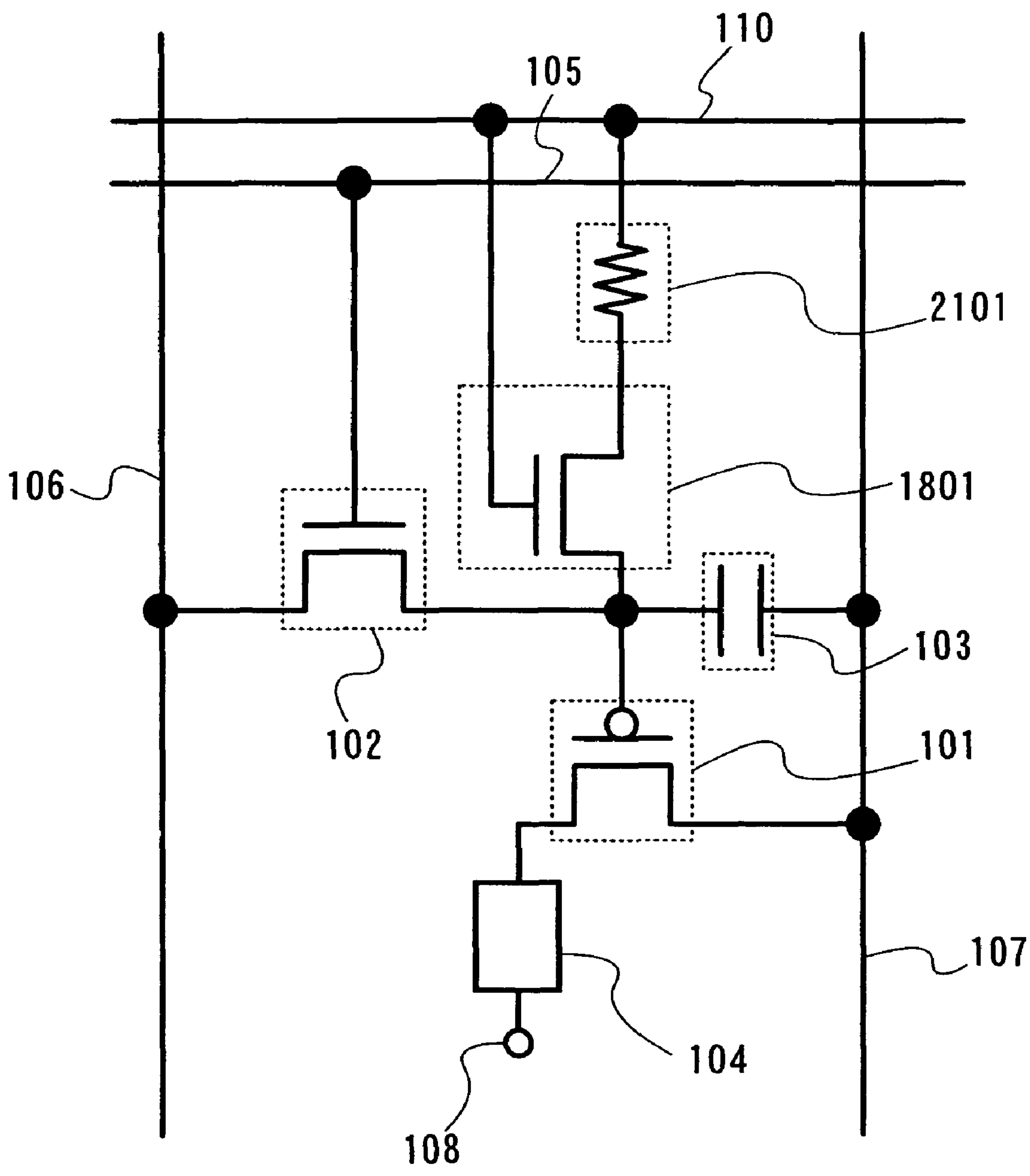
FIG. 21 is a diagram showing a pixel configuration of the invention.

It is to be noted that a resistor, a transistor, or a rectifying element can be used as the current-voltage converter element 1802. FIG. 21 shows a configuration where a resistor is used as an example.

The first terminal (source terminal or drain terminal) of the N-channel transistor 1801 is connected to the gate terminal of the driving transistor 101 and a gate terminal thereof is connected to the second scan line 110. Further, a second terminal (source terminal or drain terminal) of the transistor 1801 is connected to the second scan line 110 through a resistor 2101. It is to be noted that a voltage drop occurs when a current flows to the resistor 2101, thereby the same function as the current-voltage converter element 1802 in FIG. 18 can be performed.

Figure 23:
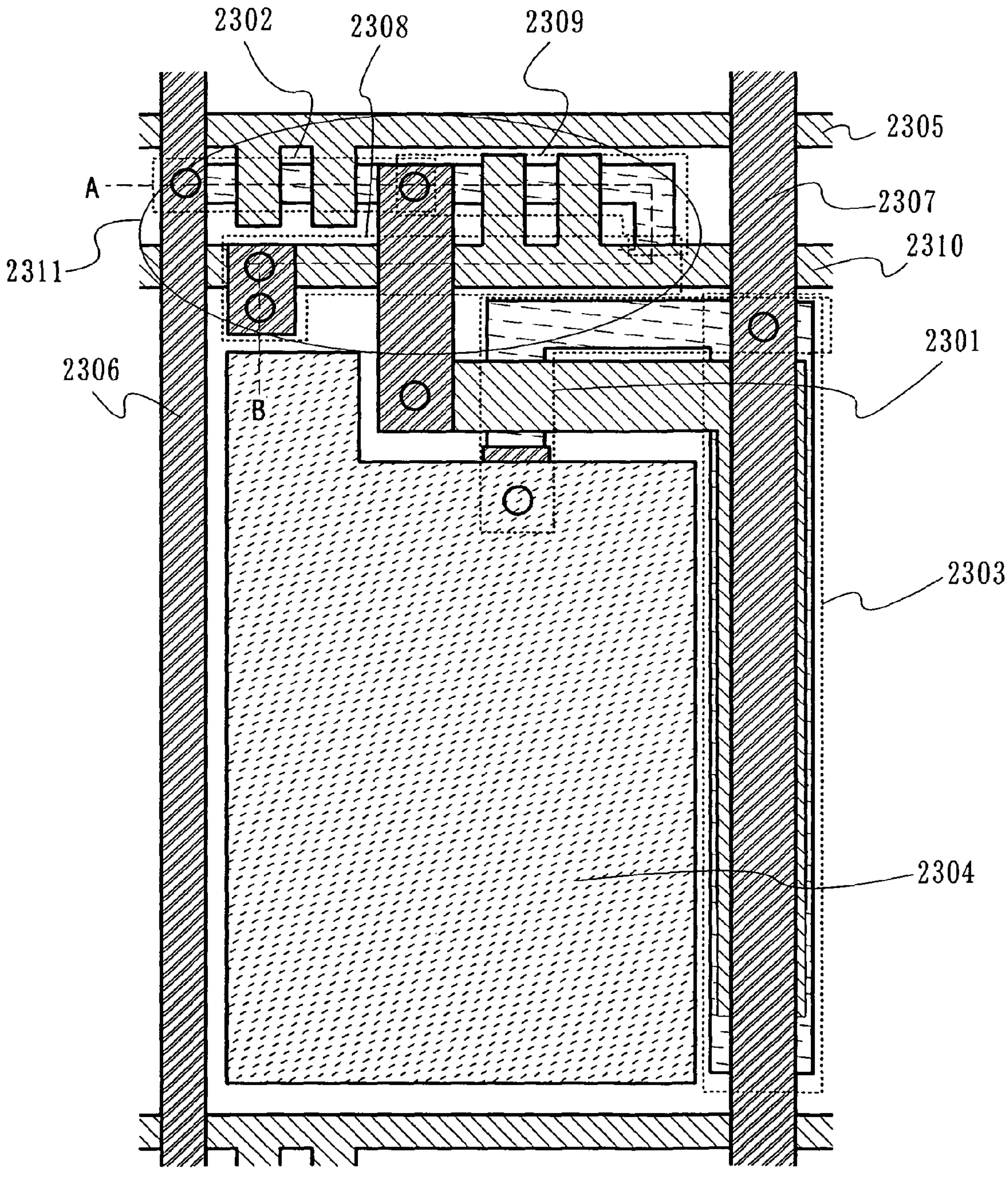
FIG. 23 is a diagram showing a pixel layout.
Figure 24:
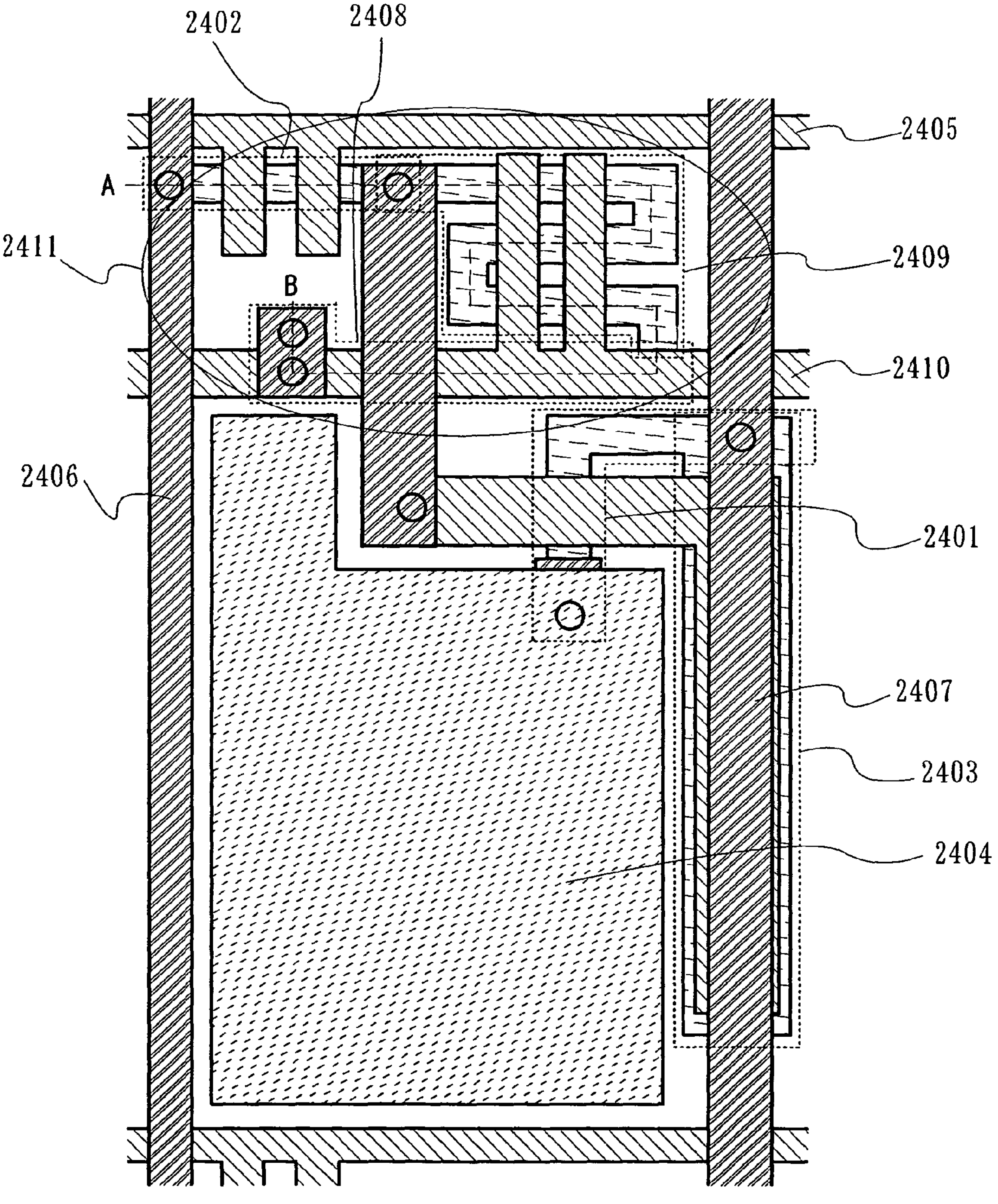
FIG. 24 is a diagram showing a pixel layout.

FIGS. 23 and 24 show examples of a layout of a pixel configuration where a resistor 1802 is provided between the second terminal of the transistor 1801 and the second scan line 110.

First, description is made on a pixel layout of FIG. 23. In the pixel, a driving transistor 2301, a switching transistor 2302, a capacitor 2303, a pixel electrode 2304, a first scan line 2305, a signal line 2306, a power source line 2307, a resistor 2308, a transistor 2309, and a second scan line 2310 are provided. A gate terminal of the switching transistor 2302 is formed of a part of the first scan line 2305, a first terminal (source terminal or drain terminal) thereof is connected to the signal line 2306, and a second terminal (source terminal or drain terminal) is connected to a gate terminal of the driving transistor 2301. Moreover, a gate terminal of the transistor 2309 is formed of a part of the second scan line 2310, a first terminal (source terminal or drain germinal) thereof is connected to a gate terminal of the driving transistor 2301, and a second terminal (source terminal or drain terminal) thereof is connected to the second scan line 2310 through the resistor 2308. It is to be noted that the resistor 2308 is formed of a semiconductor layer in the same layer as an impurity region (source region or drain region) corresponding to a first terminal of the transistor 2309 and is formed under the second scan line 2310. It is to be noted here that the width of the semiconductor layer may be formed wider than that of the second scan line 2310. It is possible to add impurities to the semiconductor layer which is not overlapped with the second scan line 2310, therefore, resistance can be controlled by adjusting the area of the portion to which the impurities are added. Further, a first terminal (source terminal or drain terminal) of the driving transistor 2301 is connected to the power source line 2307 and a second terminal (source terminal or drain terminal) thereof is connected to the pixel electrode 2304. Further, the capacitor 2303 has a first electrode formed of a part of an electrode which forms the gate terminal of the driving transistor 2301, and a second electrode formed of a part of the power source line 2307 and a part of the semiconductor layer in the same layer as the impurity region (source region or drain region) to be the first terminal of the driving transistor 2301. It is to be noted that the pixel layout shown in FIG. 23 is an example of the pixel layout of FIG. 21, and the invention is not limited to this. The driving transistor 2301, the switching transistor 2302, the capacitor 2303, the first scan line 2305, the signal line 2306, the power source line 2307, the resistor 2308, the transistor 2309, and the second scan line 2310 in FIG. 23 correspond to the driving transistor 101, the switching transistor 102, the capacitor 103, the first scan line 105, the signal line 106, the power source line 107, the resistor 2101, the transistor 1801, and the second scan line 110 in FIG. 21 respectively. Moreover, by forming a light emitting layer and an opposite electrode over the pixel electrode 2304, the light emitting element 104 shown in FIG. 21 is completed.

Figure 26A:
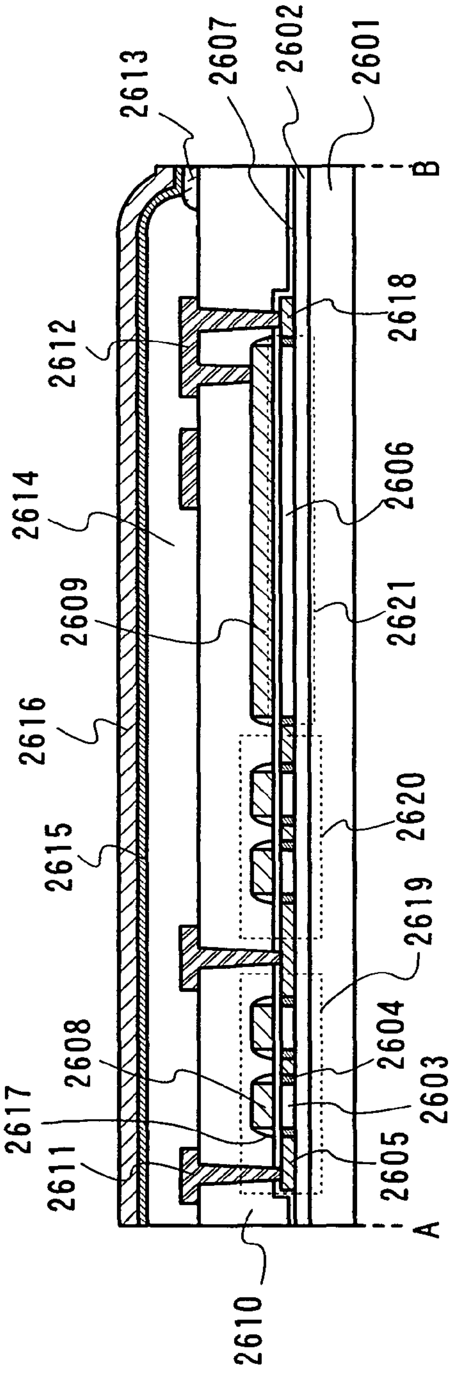
FIG. 26A is a sectional diagram of a portion of a pixel of the invention and FIG. 26B is an enlarged diagram of a portion of a pixel layout.
Figure 26B:
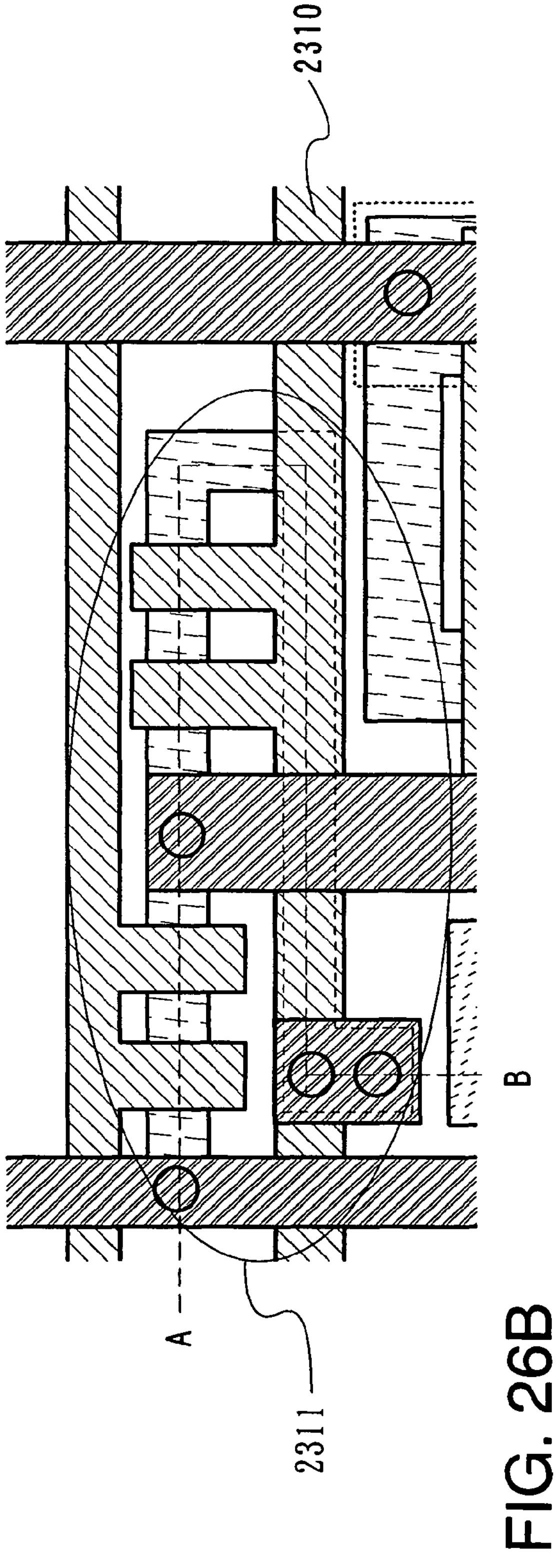

In order to describe the structure of the resistor 2308 in more details, FIG. 26B shows an enlarged view of a region surrounded by an ellipse 2311. Further, FIG. 26A shows a sectional diagram along a broken line A-B to describe the section in more details. It is to be noted in FIG. 26B that the semiconductor layer provided under the second scan line 2310 is shown by a dotted line.

Description is made with reference to the sectional diagram of FIG. 26A. A base film 2602 is formed over a substrate 2601. The substrate 2601 can be formed of an insulating substrate such as a glass substrate, a quartz substrate, a plastic substrate, and a ceramics substrate, or of a metal substrate, a semiconductor substrate, or the like. The base film 2602 can be formed by a CVD method or a sputtering method. For example a silicon oxide film, a silicon nitride film, a silicon oxynitride film, or the like formed by a CVD method using $SiH_4$, $N_2O$, or $NH_3$ as a source material. Moreover, a stacked-layer of these may be used as well. It is to be noted that the base film 2602 is provided to prevent impurities from dispersing from the substrate 2601 into the semiconductor layer. When the substrate 2601 is formed of a glass substrate or a quartz substrate, the base film 2602 is not required to be provided.

Island-shaped semiconductor layers are formed over the base film 2602. In the semiconductor layers, a channel forming region 2603 where an N-channel is formed, an impurity region 2605 which functions as a source region or a drain region of an N-channel transistor, a low concentration impurity region (LDD region) 2604, and a semiconductor layer 2606 which functions as a resistor are formed. Then, a gate electrode 2608 and a first wire 2609 are provided over the channel forming region 2603 and the semiconductor layer 2606 with a gate insulating film 2607 interposed therebetween. As the gate insulating film 2607, a silicon oxide film, a silicon nitride film, a silicon oxynitride film, or the like formed by a CVD method or a sputtering method can be used. Further, an aluminum (Al) film, a copper (Cu) film, a thin film containing aluminum or copper as a main component, a chromium (Cr) film, a tantalum (Ta) film, a tantalum nitride (TaN) film, a titanium (Ti) film, a tungsten (W) film, a molybdenum (Mo) film, or the like can be used as the gate electrode 2608.

Sidewalls 2617 are formed on the sides of the gate electrode 2608. After forming a silicon compound, for example, a silicon oxide film, a silicon nitride film, or a silicon oxynitride film so as to cover the gate electrode 2608, etch-back treatment is applied to form the sidewalls 2617.

The LDD regions 2604 are formed under the sidewalls 2617. That is, the LDD regions 2604 are formed in a self-aligned manner.

A first interlayer insulating film 2610 is formed over the gate electrode 2608, the sidewalls 2617, and the gate insulating film 2607. The first interlayer insulating film 2610 includes an inorganic insulating film as a lower layer and a resin film as an upper layer. As an inorganic insulating film, a silicon nitride film, a silicon oxide film, a silicon oxynitride film, or a film formed by stacking these layers can be used. As a resin film, polyimide, polyamide, acrylic, polyimide amide, epoxy, and the like can be used.

A second wire 2611, a second wire 2612, and a pixel electrode 2613 are formed over the first interlayer insulating film 2610. The second wire 2611 is electrically connected to the impurity region 2606 through a contact hole. Further, the second wire 2612 is connected to the impurity region 2618 and the first wire 2609 through contact holes. A titanium (Ti) film, an aluminum (Al) film, a copper (Cu) film, an aluminum film containing Ti, or the like can be used as the second wire 2611 and the second wire 2612. It is to be noted that in the case of providing a wire such as a signal line in the same layer as the second wire 2611 and the second wire 2612, copper which has low resistance is preferably used. Further, as a material used for the pixel electrode 2613, a material having a high work function is preferably used. For example, a single layer of a titanium nitride (TiN) film, a chromium (Cr), film, a tungsten (W) film, a zinc (Zn) film, a platinum (Pt) film, or the like, a stacked-layer of a titanium nitride film and a film containing aluminum as a main component, a stacked-layer of three layers of a titanium nitride film, a film containing aluminum as a main component, and a titanium nitride film can be used. With a stacked-layer structure, the resistance as a wire is low, a preferable ohmic contact can be obtained, and further a function as an anode can be obtained. By using a metal film which reflects light, an anode which does not transmit light can be formed.

An insulator 2614 is formed over the second wire 2011, the second wire 2612 and the first interlayer insulating film 2610 so as to cover an end portion of the pixel electrode 2613. As the insulator 2614, for example, a positive type photosensitive acrylic resin film can be used.

A layer 2615 containing an organic compound is provided over the insulator 2614 and the pixel electrode 2613, and an opposite electrode 2616 is provided over the layer 2615 containing an organic compound. A region where the layer 2615 containing an organic compound is sandwiched between the pixel electrode 2613 and the opposite electrode 2616 corresponds to a light emitting element. As a material used for the opposite electrode 2616, a material having a low work function is preferably used. For example, a metal thin film of aluminum (Al), silver (Ag), lithium (Li), calcium (Ca), an alloy of these, MgAg, MgIn, AlLi, $CaF_2$, $Ca_3N_2$ or the like can be used. By using a metal thin film in this manner, a cathode which can transmit light can be formed.

In this manner, a transistor 2619, a transistor 2620, and a resistor 2621 are formed. The transistor 2619, the transistor 2620, and the resistor 2621 correspond to the switching transistor 2302, the transistor 2309, and the resistor 2308 in FIG. 23 respectively. It is to be noted that the description has been made on the case of a display device with a top emission structure as an example, however, the invention is not limited to this.

Next, description is made on a pixel layout shown in FIG. 24. In the pixel, a driving transistor 2401, a switching transistor 2402, a capacitor 2403, a pixel electrode 2404, a first scan line 2405, a signal line 2406, a power source line 2407, a resistor 2408, a transistor 2409, and a second scan line 2410 are provided. The switching transistor 2402 has a gate terminal formed of a part of the first scan line 2405, a first terminal (source terminal or drain terminal) connected to the signal line 2406, and a second terminal (source terminal or drain terminal) connected to a gate terminal of the driving transistor 2401. Further, the transistor 2409 has a gate terminal formed of a part of the second scan line 2410, a first terminal (source terminal or drain terminal) connected to the gate terminal of the driving transistor 2401, and a second terminal (source terminal or drain terminal) connected to the second scan line 2410 through the resistor 2408. It is to be noted that the resistor 2408 is formed of a semiconductor layer in the same layer as an impurity region (source region or drain region) to be a first terminal of the transistor 2409 and is formed under the second scan line 2410. It is to be noted here that the width of the semiconductor layer may be formed wider than that of the second scan line 2410. It is possible to add impurities to the semiconductor layer which is not overlapped with the second scan line 2410, therefore, resistance can be controlled by adjusting the area of the portion to which the impurities are added. Further, a first terminal (source terminal or drain germinal) of the driving transistor 2401 is connected to the power source line 2407 and a second terminal (source terminal or drain terminal) thereof is connected to the pixel electrode 2404. Further, the capacitor 2403 has a first electrode formed of a part of an electrode which forms the gate terminal of the driving transistor 2401, and a second electrode formed of a part of the power source line 2407 and a part of the semiconductor layer in the same layer as the impurity region (source region or drain region) to be the first terminal of the driving transistor 2401. It is to be noted that the pixel layout shown in FIG. 24 is an example of the pixel layout of FIG. 21, and the invention is not limited to this. The driving transistor 2401, the switching transistor 2402, the capacitor 2403, the first scan line 2405, the signal line 2406, the power source line 2407, the resistor 2408, the transistor 2409, and the second scan line 2410 in FIG. 24 correspond to the driving transistor 101, the switching transistor 102, the capacitor 103, the first scan line 105, the signal line 106, the power source line 107, the resistor 2101, the transistor 1801, and the second scan line 110 in FIG. 21 respectively. Moreover, by forming a light emitting layer and an opposite electrode over the pixel electrode 2404, the light emitting element 104 shown in FIG. 21 is completed.

Figure 27A:
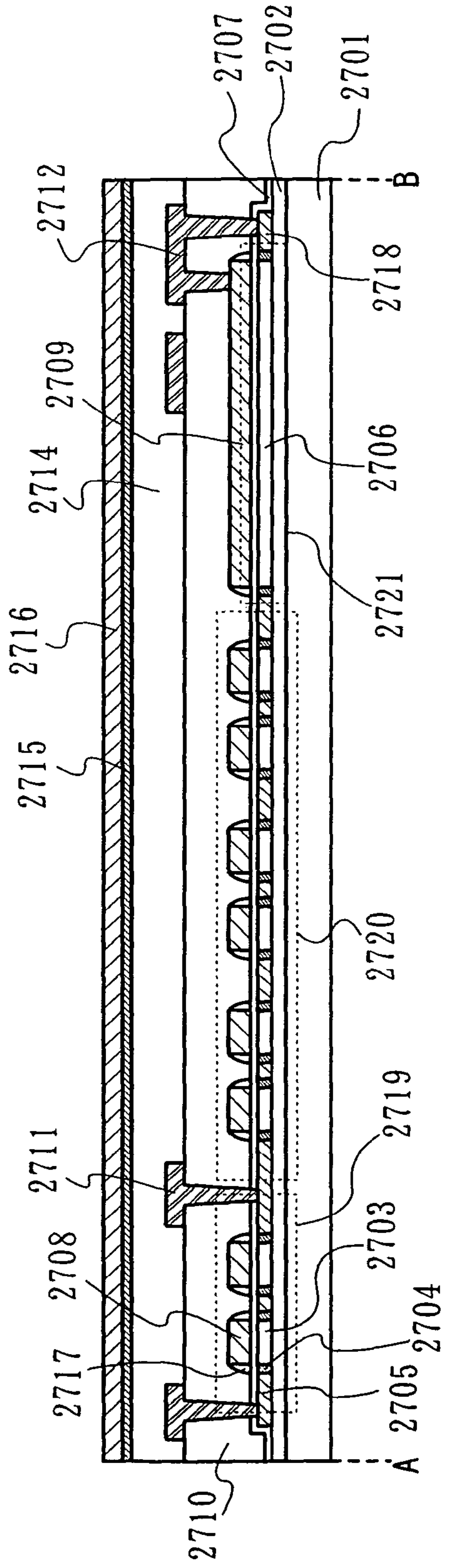
FIG. 27A is a sectional diagram of a portion of a pixel of the invention and FIG. 27B is an enlarged diagram of a portion of a pixel layout.
Figure 27B:
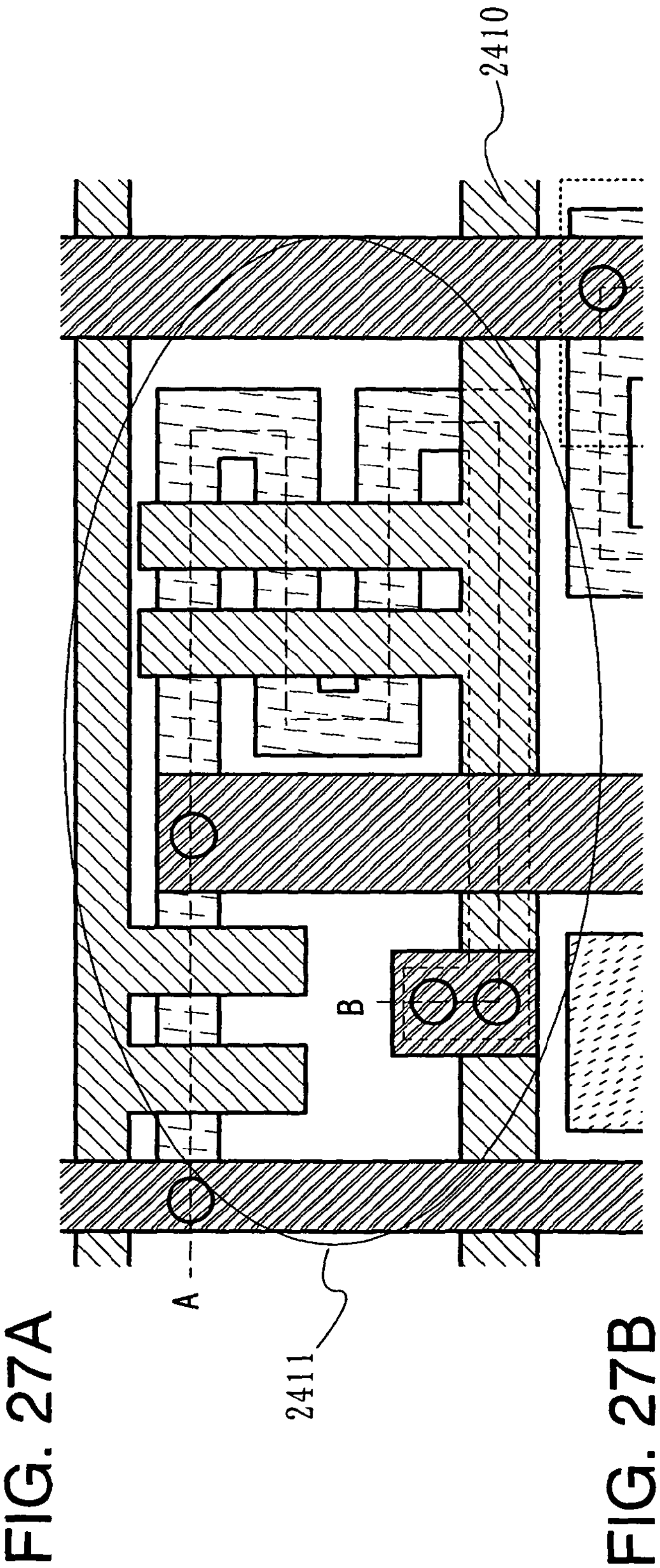

In order to describe the structure of the resistor 2408 in more details, FIG. 27B shows an enlarged view of a region surrounded by an ellipse 2411. Further, FIG. 27A shows a sectional diagram along a broken line A-B to describe the section in more details. It is to be noted in FIG. 27B that the semiconductor layer provided under the second scan line 2410 is shown by a dotted line.

Description is made with reference to the sectional diagram of FIG. 27A. A base film 2702 is formed over a substrate 2701. The substrate 2701 can be formed of an insulating substrate such as a glass substrate, a quartz substrate, a plastic substrate, and a ceramics substrate, or of a metal substrate, a semiconductor substrate, or the like. The base film 2702 can be formed by a CVD method or a sputtering method. For example a silicon oxide film, a silicon nitride film, a silicon oxynitride film, or the like formed by a CVD method using $SiH_4$, $N_2O$, or $NH_3$ as a source material. Moreover, a stacked-layer of these may be used as well. It is to be noted that the base film 2702 is provided to prevent impurities from dispersing from the substrate 2701 into the semiconductor layer. When the substrate 2701 is formed of a glass substrate or a quartz substrate, the base film 2702 is not required to be provided.

Island-shaped semiconductor layers are formed over the base film 2702. In the semiconductor layers, a channel forming region 2703 where an N-channel is formed, an impurity region 2705 which functions as a source region or a drain region of an N-channel transistor, a low concentration impurity region (LDD region) 2704, and a semiconductor layer 2706 which functions as a resistor are formed. Then, a gate electrode 2708 and a first wire 2709 are provided over the channel forming region 2703 and the semiconductor layer 2706 with a gate insulating film 2707 interposed therebetween. As the gate insulating film 2707, a silicon oxide film, a silicon nitride film, a silicon oxynitride film, or the like formed by a CVD method or a sputtering method can be used. Further, an aluminum (Al) film, a copper (Cu) film, a thin film containing aluminum or copper as a main component, a chromium (Cr) film, a tantalum (Ta) film, a tantalum nitride (TaN) film, a titanium (Ti) film, a tungsten (W) film, a molybdenum (Mo) film, or the like can be used as the gate electrode 2708.

Sidewalls 2717 are formed on the sides of the gate electrode 2708. After forming a silicon compound, for example, a silicon oxide film, a silicon nitride film, or a silicon oxynitride film so as to cover the gate electrode 2708, etch-back treatment is applied to form the sidewalls 2717.

The LDD regions 2704 are formed under the sidewalls 2717. That is, the LDD regions 2704 are formed in a self-aligned manner.

A first interlayer insulating film 2710 is formed over the gate electrode 2708, the sidewalls 2717, and the gate insulating film 2707. The first interlayer insulating film 2710 includes an inorganic insulating film as a lower layer and a resin film as an upper layer. As an inorganic insulating film, a silicon nitride film, a silicon oxide film, a silicon oxynitride film, or a film formed by stacking these layers can be used. As a resin film, polyimide, polyamide, acrylic, polyimide amide, epoxy, and the like can be used.

A second wire 2711 and a second wire 2712 are formed over the first interlayer insulating film 2710. The second wire 2711 is electrically connected to the impurity region 2706 through a contact hole. Further, the second wire 2712 is connected to the impurity region 2718 and the first wire 2709 through contact holes. A titanium (Ti) film, an aluminum (Al) film, a copper (Cu) film, an aluminum film containing Ti, or the like can be used as the second wire 2711 and the second wire 2712. It is to be noted that in the case of providing a wire such as a signal line in the same layer as the second wire 2711 and the second wire 2712, copper which has low resistance is preferably used.

An insulator 2714 is formed over the second wire 2711, the second wire 2712 and the first interlayer insulating film 2710. As the insulator 2714, for example, a positive type photosensitive acrylic resin film can be used.

A layer 2715 containing an organic compound is provided over the insulator 2714, and an opposite electrode 2716 is provided over the layer 2715 containing an organic compound. As a material used for the opposite electrode 2716, a material having a low work function is preferably used. For example, a metal thin film of aluminum (Al), silver (Ag), lithium (Li), calcium (Ca), an alloy of these, MgAg, MgIn, AlLi, $CaF_2$, $Ca_3N_2$ or the like can be used. By using a metal thin film in this manner, a cathode which can transmit light can be formed.

In this manner, a transistor 2719, a transistor 2720, and a resistor 2721 are formed. The transistor 2719, the transistor 2720, and the resistor 2721 correspond to the switching transistor 2402, the transistor 2409, and the resistor 2408 in FIG. 24 respectively. It is to be noted that the description has been made on the case of a display device with a top emission structure as an example, however, the invention is not limited to this.

Figure 19:
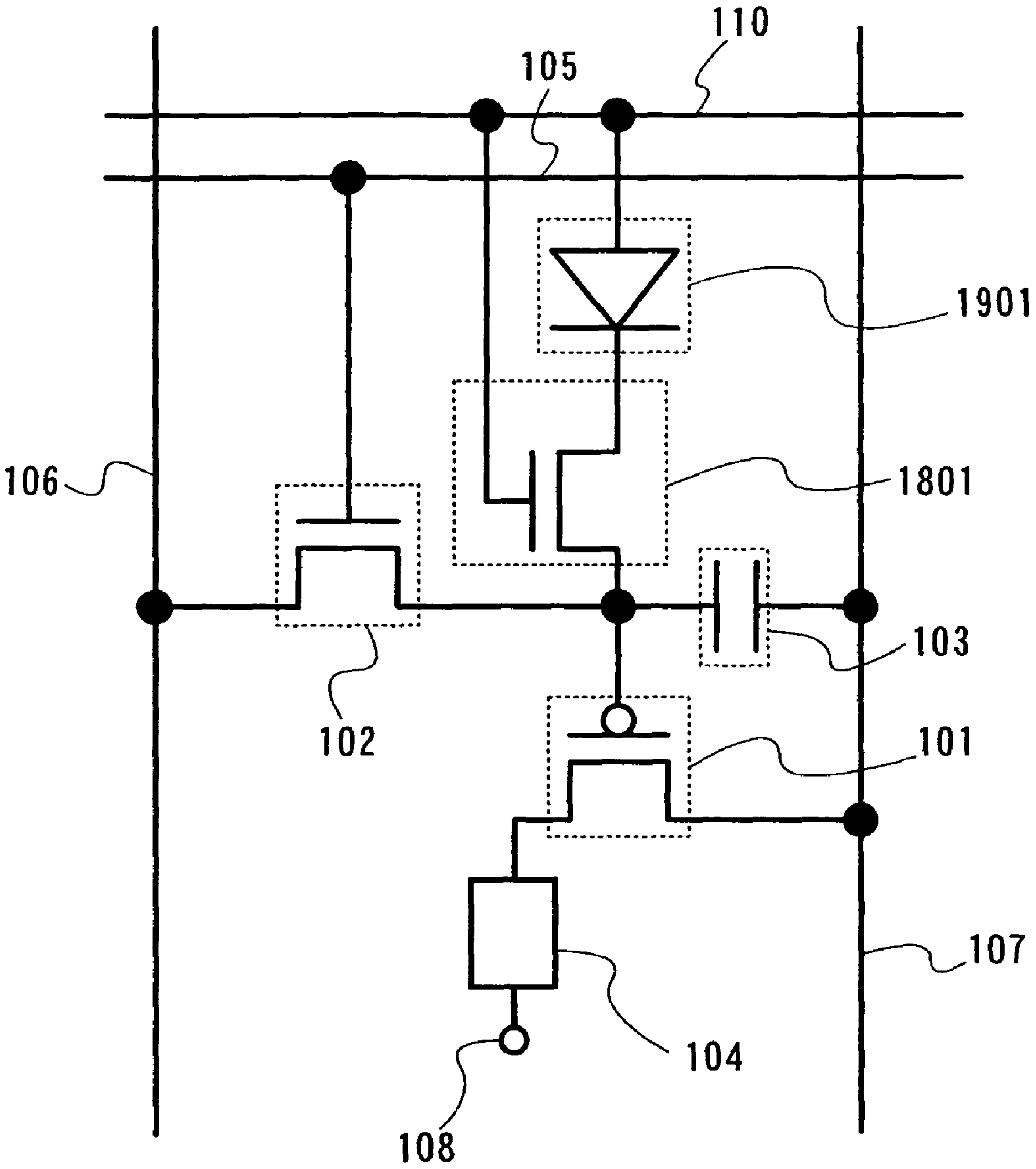
FIG. 19 is a diagram showing a pixel configuration of the invention.

FIG. 19 shows a configuration where a rectifying element 1901 is used as the current-voltage converter element 1802. A first terminal (source terminal or drain terminal) of an N-channel transistor 1801 is connected to the gate terminal of the driving transistor 101 and a gate terminal thereof is connected to the second scan line 110. Further, a second terminal (source terminal or drain terminal) of the transistor 1801 is connected to the second scan line 110 through the rectifying element 1901. It is to be noted that the rectifying element 1901 is connected so that a forward current flows from the second scan line 110 to the second terminal of the transistor 1801.

In this configuration, in the case where a video signal for non-light emission (gate potential Vsig (H) to turn off the driving transistor 101) is inputted to the pixel and the second scan line 110 is at an L-level, a current does not flow even when the transistor 1801 is normally-on, because a reverse voltage is applied to the rectifying element 1901. Further, in the case where a reverse current (off current) flows to the rectifying element 1901, a certain voltage is applied to the rectifying element 1901. Therefore, the potential of the second terminal of the transistor 1801 becomes higher than the L-level potential of the second scan line 110. That is, the potential of the source terminal of the transistor 1801 becomes higher than that of the gate terminal, therefore, a current hardly flows therethrough. That is, an off current is reduced.

It is to be noted that a PIN junction diode, a PN junction diode, a Schottky diode, a diode formed of a carbon nanotube, a transistor, a diode-connected transistor, or the like may be used as the rectifying element 1901. It is more preferable to use a PN junction diode. Description is made with reference to FIG. 20 on the case of using a PN junction diode as the rectifying element 1901.

Figure 15C:
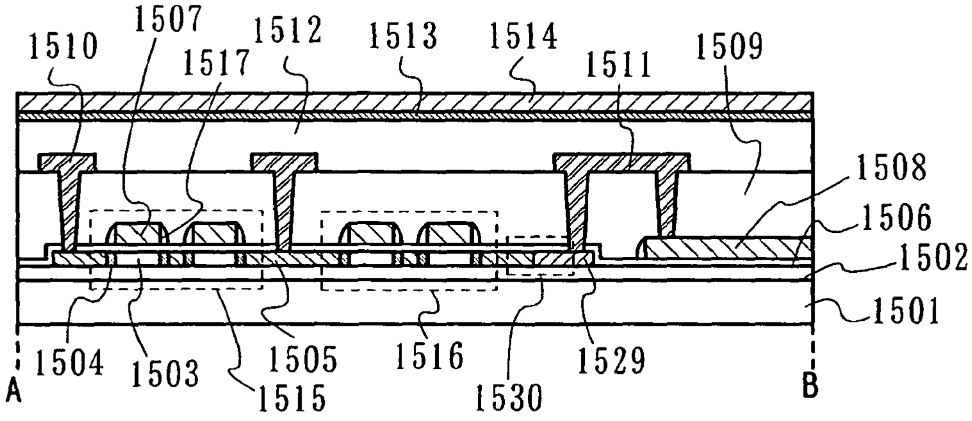

The first terminal (source terminal or drain terminal) of the N-channel transistor 1801 is connected to the gate terminal of the driving transistor 101 and a gate terminal thereof is connected to the second scan line 110. Further, a second terminal (source terminal or drain terminal) of the transistor 1801 is connected to an N-type semiconductor region of a PN junction diode 2001. A P-type semiconductor region of the PN junction diode 2001 is connected to the second scan line 110. The second terminal of the N-channel transistor 1801 includes an N-type impurity region, therefore, an N-type impurity region of the N-channel transistor 1801 can be used as an N-type semiconductor of the PN junction diode 2001. That is, a P-type impurity region may be provided between the gate terminal and the second terminal of the transistor 1801. Description of the layout of this pixel is made according to FIG. 15C which is a sectional diagram of FIG. 14.

In this pixel configuration, a P-type impurity region 1529 is provided on the side of one impurity region of the transistor 1516. That is, in the layout shown in FIG. 14, in the impurity region on the second terminal side of the transistor 1409, the side close to the channel forming region is an N-type impurity region and the other side corresponds to a P-type impurity region. Therefore, a PN junction diode 1530 is formed of a part of one impurity region of the transistor 1516 and a P-type impurity region 1529. For other common portions, the description on FIG. 15A is to be referred. In this manner, the N-type impurity region of the PN junction diode 2001 can be formed of an impurity region to which N-type impurities are added and which is to be the second terminal of the transistor 1801. Therefore, by forming a P-type semiconductor region by adding P-type impurities to a semiconductor layer in which this impurity region is formed, the PN junction diode 2001 and the transistor 1801 are directly connected. Therefore, a terminal for making contact is not required to be provided, which is also advantageous in view of improving the aperture ratio in the pixel layout. It is to be noted that there may be a region where impurities are not added between the P-type impurity region and the N-type impurity region. In that case, a PIN junction diode is formed instead of the PN junction diode 1602. A PIN junction diode can further reduce an off current. Moreover, a higher voltage is generated at the PIN junction diode, therefore, the transistor 1801 is more easily turned off.

Figure 20:
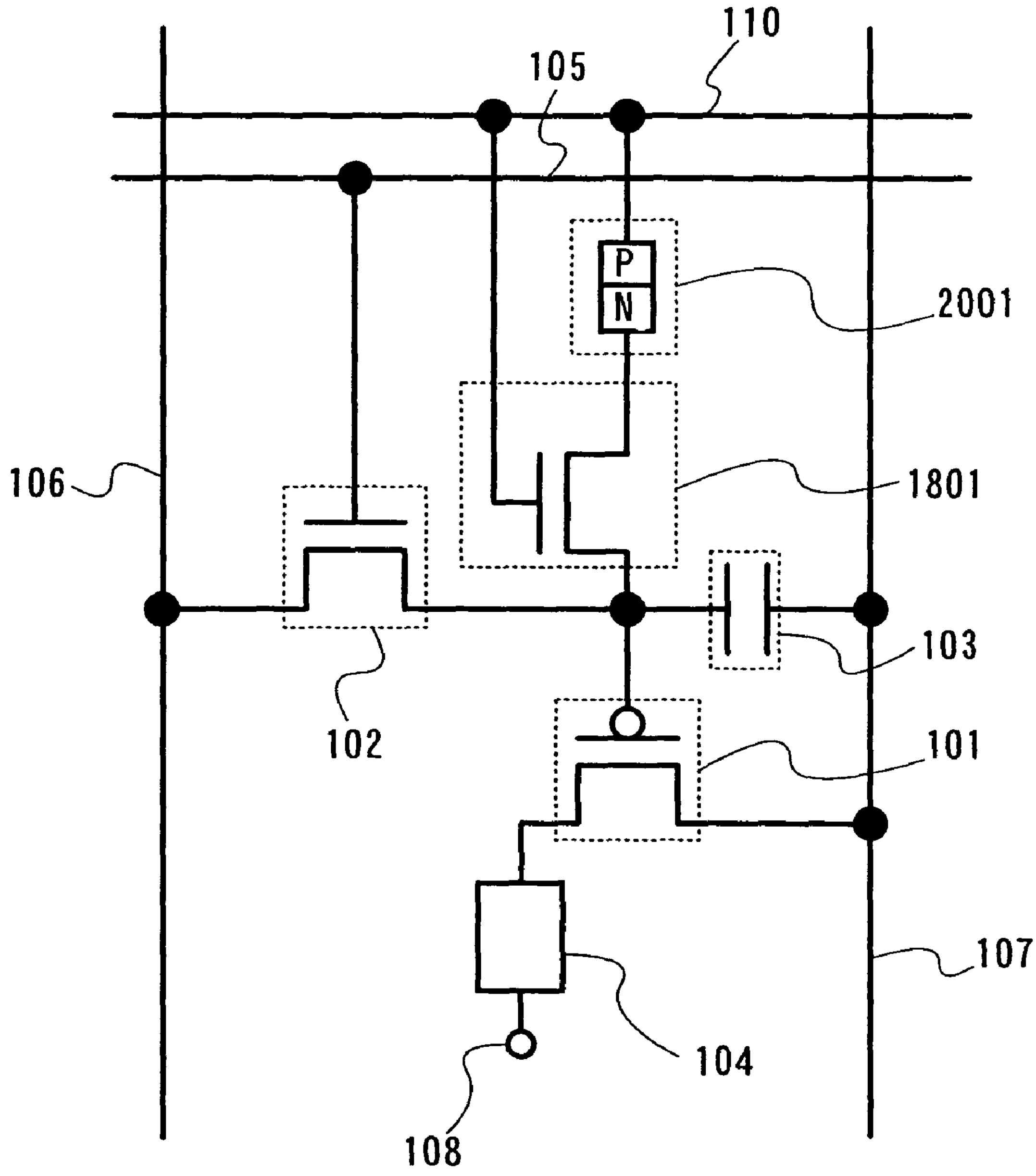
FIG. 20 is a diagram showing a pixel configuration of the invention.

In the pixel configuration shown in FIG. 20, in the case where a video signal for non-light emission (gate potential Vsig (H) to turn off the driving transistor 101) is inputted to the pixel and the second scan line 110 is at an L-level, even when an off current flows through the transistor 1801, the amount thereof is small since a reverse voltage is applied to the PN junction diode 2001. In the case where a reverse current flows to the PN junction diode 2001, a voltage is generated between the opposite terminals of the PN junction diode 2001. That is, the potential of the second terminal of the transistor 1801 becomes higher than the L-level potential of the second scan line 110. That is, the potential of the source terminal of the transistor 1801 becomes higher than that of the gate terminal, therefore, a current hardly flows therethrough. That is, an off current is reduced.

As the current-voltage converter element 1802, a P-channel transistor can be used as well. Description here is made with reference to FIG. 22. The first terminal of the transistor 1801 is connected to the gate terminal of the driving transistor 101 and the second terminal thereof is connected to a second terminal (source terminal or drain terminal) of a P-channel transistor 2201. Moreover, the gate terminal of the transistor 1801 is connected to the second scan line 110. A gate terminal of the P-channel transistor 2201 is connected to the power source line 107 and a first terminal (source terminal or drain terminal) thereof is connected to the second scan line 110.

When a video signal for non-light emission (gate potential Vsig (H) to turn off the driving transistor 101) is inputted to the pixel and the second scan line 110 is at an L-level, the potential of the second terminal of the transistor 2201 is not so high even when the transistor 1801 is normally-on. Therefore, in the transistor 2201, as the potential of the second terminal becomes lower than that of the power source line 107 connected to the gate terminal, the P-channel transistor 2201 is turned off. The lower the potential of the second terminal of the transistor 2201 is, the less the off current flows through the transistor 2201. On the other hand, when the potential of the second terminal of the transistor 2201 becomes high, the potential of the second terminal of the transistor 1801 becomes higher than that of the gate terminal thereof. Therefore, an off current hardly flows through the transistor 1801. That is, with this configuration, an off current can be drastically reduced. It is to be noted that when the second scan line 110 is at an H-level, the potential of the second wire is higher than that of the power source line 107, therefore, the P-channel transistor 2201 is turned on. Further, as the second terminal of the transistor 1801 becomes lower than that of the second wire 110, the transistor 1801 is also turned on. Therefore, a signal to make the pixel emit no light can be inputted to the gate terminal of the driving transistor 101.

Here, it is generally easy to form an LDD region in an N-channel transistor, therefore, an off current can be reduced by using an N-channel transistor. However, by using a polycrystalline silicon film as an active layer (channel forming region), the transistor is likely to be an N-channel transistor which rather tends to be a depletion transistor. As a P-channel transistor tends to an enhancement transistor at this time, an N-channel transistor and a P-channel transistor are used in combination to further effectively reduce an off current.

Figure 22:
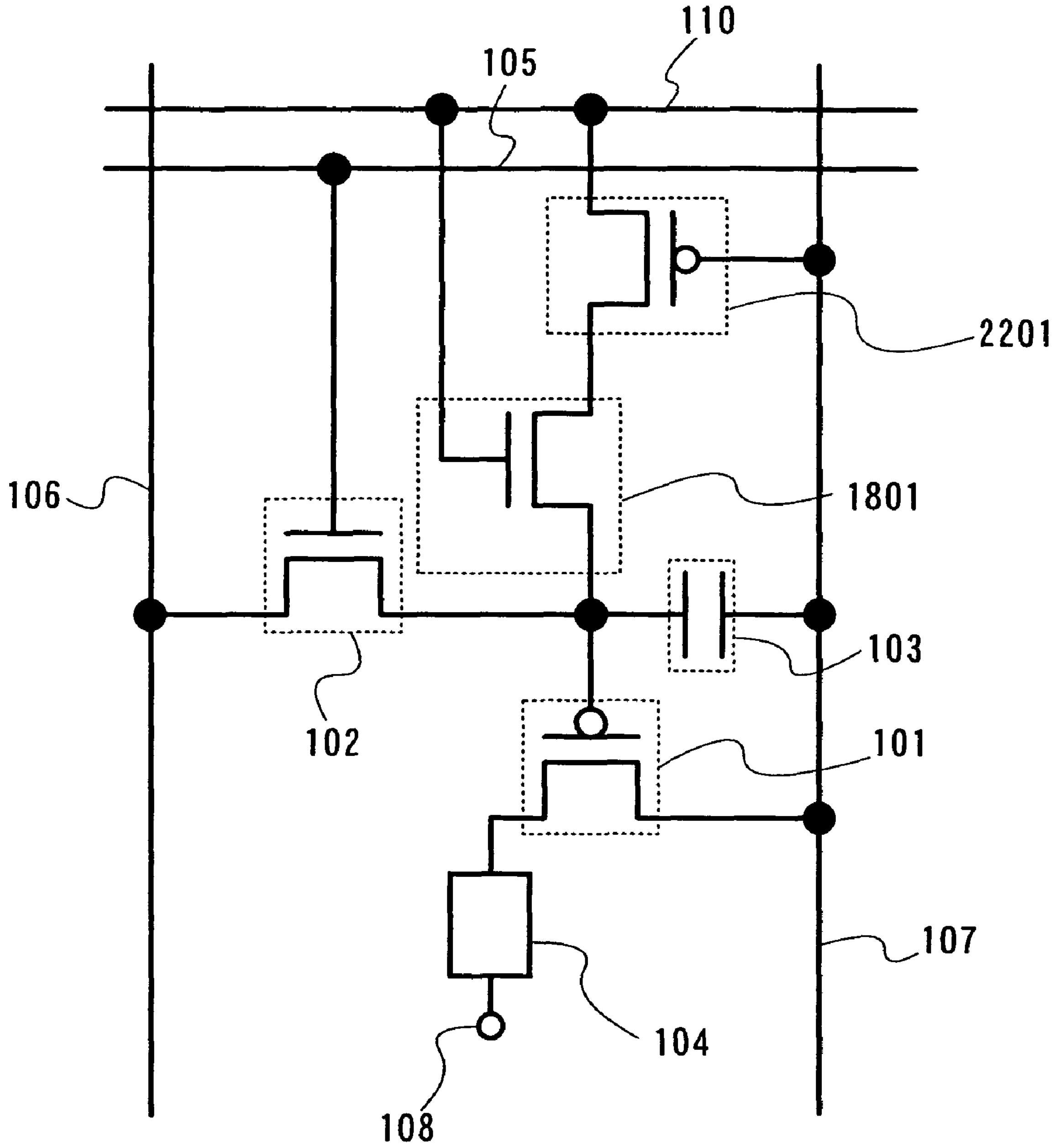
FIG. 22 is a diagram showing a pixel configuration of the invention.
Figure 43:
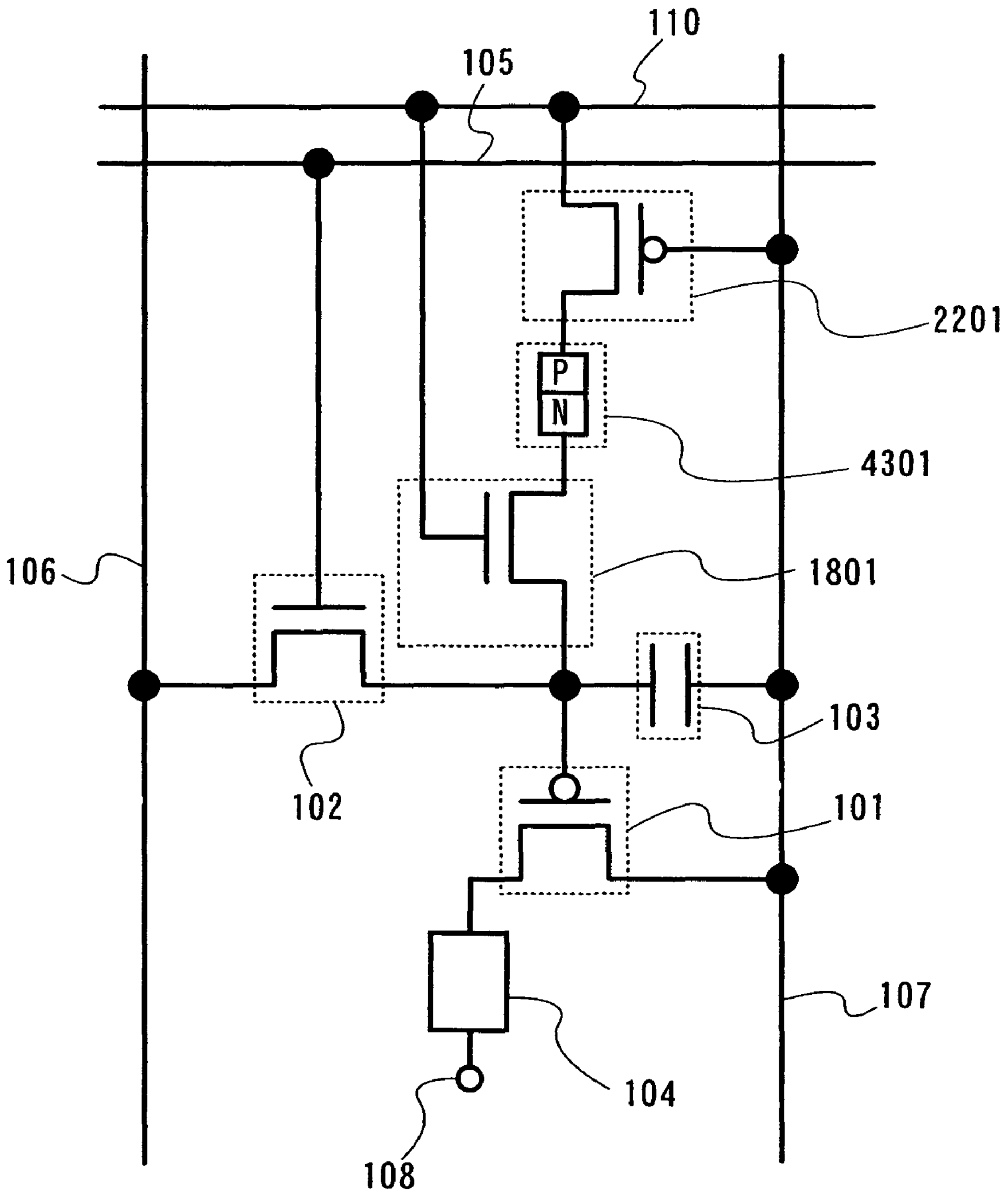
FIG. 43 is a diagram showing a pixel configuration of the invention.

In the configuration as shown in FIG. 22, a PN junction diode may be provided between the transistor 1801 and the transistor 2201. That is, as shown in FIG. 43, an N-type semiconductor region of the PN junction diode 4301 is connected to the second terminal of the transistor 1801 and a P-type semiconductor region of the PN junction diode 4301 is connected to the second terminal of the transistor 2201. It is to be noted here that the impurity region to be the second terminal of the transistor 2201 may be used as the P-type semiconductor region of the PN junction diode 4301 and the impurity region to be the second terminal of the transistor 1801 may be used as the N-type semiconductor region of the PN junction diode 4301, thereby a contact is not required to be provided for connecting the transistor 1801 and the PN junction diode 4301 or connecting the P-channel transistor 2201 and the PN junction diode 4301. This is similarly applied to the cases of FIG. 15C and FIG. 20 and is advantageous in view of improving the aperture ratio in the pixel layout. It is to be noted that there may be a region where impurities are not added between the P-type impurity region and the N-type impurity region. In that case, a PIN junction diode is formed instead of the PN junction diode 4301. A PIN junction diode can further reduce an off current. Moreover, a higher voltage is generated at the PIN junction diode, therefore, the transistor 1801 is more easily turned off.

Figure 50:
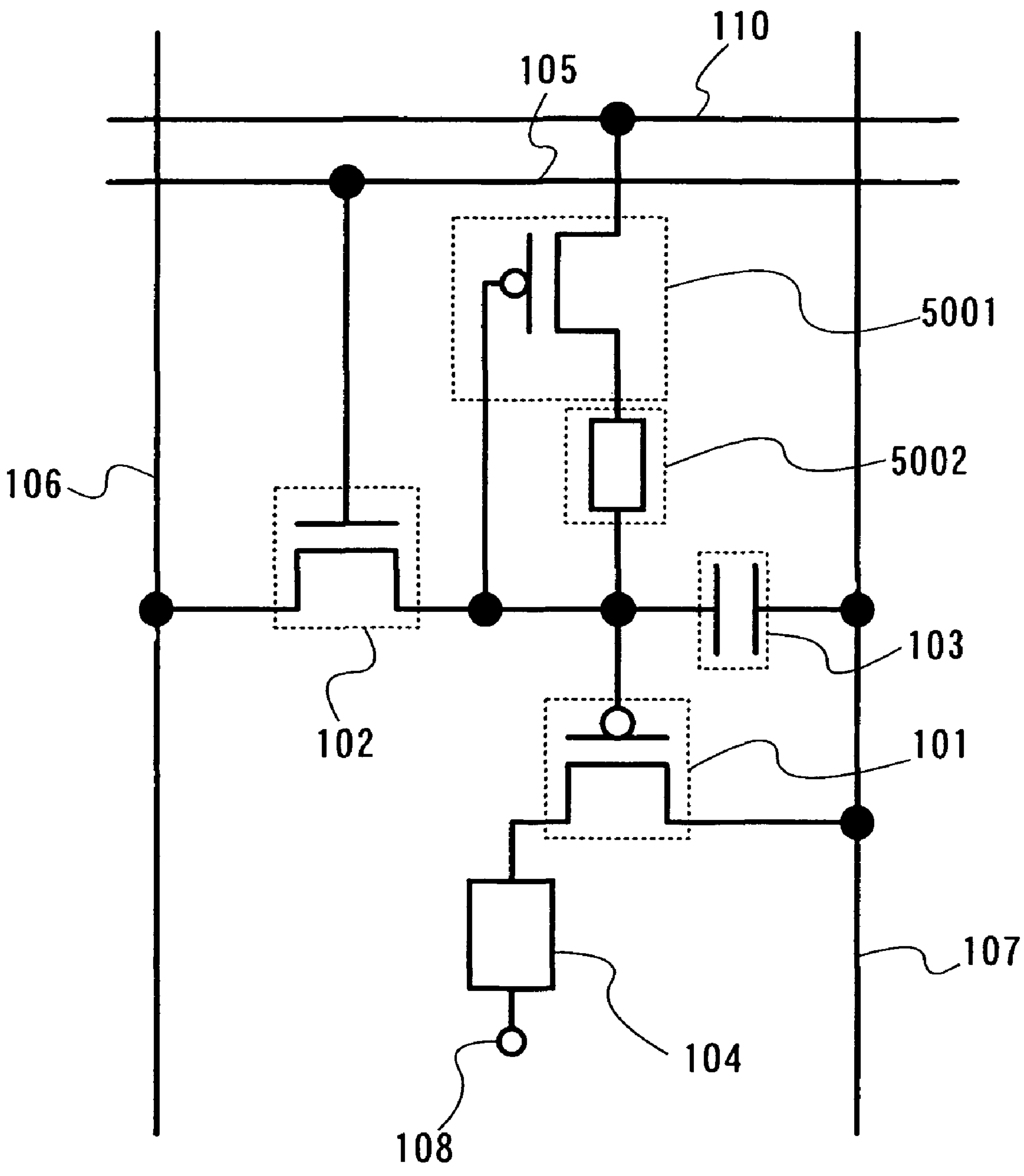
FIG. 50 is a diagram showing a pixel configuration of the invention.

Description is made with reference to FIG. 50 on the case of using a P-channel transistor and a current-voltage converter element in combination instead of the rectifying element 109 of the pixel shown in FIG. 1 of Embodiment Mode 1.

A first terminal (source terminal or drain terminal) of a P-channel transistor 5001 is connected to the gate terminal of the driving transistor 101 through a current-voltage converter element 5002 and a gate terminal thereof is connected to the second scan line 110. Further, a second terminal (source terminal or drain terminal) of the transistor 5001 is connected to the second scan line 110.

It is to be noted that the current-voltage converter element 5002 is an element where a voltage is generated between the opposite terminals thereof when a current flows.

Therefore, by using the pixel configuration described in this embodiment mode, for example, the driving method described with reference to FIG. 8 can be realized.

Embodiment Mode 3

In this embodiment mode, a pixel configuration is shown which can further prevent that a light emitting element slightly emits light when the pixel is required to emit no light (black display). That is, when an off current flows through a driving transistor, the current is prevented from flowing to a light emitting element.

Figure 56:
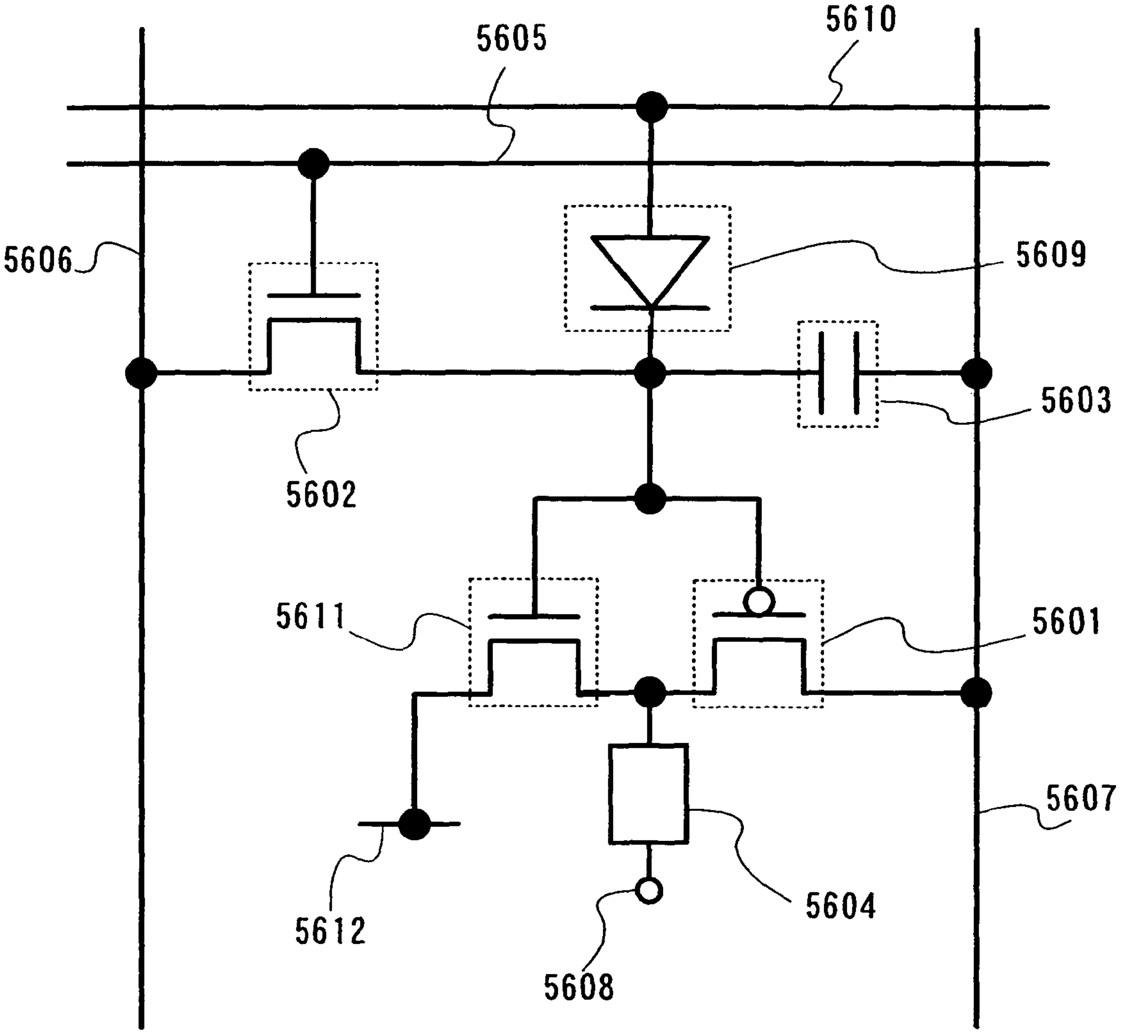
FIG. 56 is a diagram showing a pixel configuration of the invention.

In a pixel shown in FIG. 56, a driving transistor 5601, a complementary transistor 5611, a switching transistor 5602, a light emitting element 5604, a rectifying element 5609, a first scan line 5605, a signal line 5606, a power source line 5607, and a second scan line 5610 are provided. It is to be noted that the driving transistor 5601 is a P-channel transistor, and the complementary transistor 5611 and the switching transistor 5602 are N-channel transistors. A first terminal (source terminal or drain terminal) of the switching transistor 5602 is connected to the signal line 5606 and a second terminal (source terminal or drain terminal) thereof is connected to gate terminals of the driving transistor 5601 and the complementary transistor 5611. The driving transistor 5601 and the complementary transistor 5611 have second terminals (source terminals or drain terminals) connected to a pixel electrode of the light emitting element 5604. A first terminal of the driving transistor 5601 is connected to the power source line 5607. Further, the second terminal of the complementary transistor 5611 is connected to a wire 5612. The gate terminals of the driving transistor 5601 and the complementary transistor 5611 are connected to one electrode of the capacitor 5603. The other electrode of the capacitor 5603 is connected to the power source line 5607. The gate terminals of the driving transistor 5601 and the complementary transistor 5611 are connected to the second scan line 5610 through the rectifying element 5609.

It is to be noted that a high power source potential is inputted to the power source line 5607 and a low power source potential is inputted to an opposite electrode 5608 of the light emitting element 5604. The high power source potential and low power source potential satisfy the relation: high power source potential>low power source potential and are set so that a potential difference between them becomes equal to a forward threshold voltage of the light emitting element 5604.

Moreover, the potential of the wire 5612 is preferably equal to or lower than the potential of the opposite electrode 5608 of the light emitting element 5604.

First, description is made on a signal writing operation to the pixel. When a signal is written to the pixel, an H-level signal is inputted to the first scan line 5605 to turn on the switching transistor 5602. Then, a video signal is written to the pixel through the signal line 5606. That is, a video signal is inputted to the gate terminals of the driving transistor 5601 and the complementary transistor 5611. It is to be noted at this time that the second scan line 5610 is set at an L-level.

At this time, a charge is accumulated in the capacitor 5603. Therefore, even when an L-level signal is inputted to the first scan line 5605 and the switching transistor 5602 is turned off, the potential of the video signal is held by the capacitor 5603.

Therefore, in the case where Vsig (L) which makes the pixel emit light is inputted as the video signal, the driving transistor 5601 is turned on and the complementary transistor 5611 is turned off. Then, the potential inputted to the power source line 5607 can be supplied to a pixel electrode of the light emitting element 5604 through the driving transistor 5601.

In the case where a video signal as Vsig (H) to make the pixel emit no light is inputted, the driving transistor 5601 is turned off and the complementary transistor 5611 is turned on. Therefore, the potential inputted to the power source line 5607 is not supplied to the pixel electrode of the light emitting element 5604. However, when the driving transistor 5601 is normally-on, a current slightly flows through the driving transistor 5601 in some cases. Normally, this off current flows to the light emitting element, therefore, the light emitting element slightly emits light and the pixel cannot be made to emit no light (black display), which leads to a display defect. However, in this pixel configuration, the off current flowing through the driving transistor 5601 flows to the wire 5612 through the complementary transistor 5611, therefore, a current does not flow to the light emitting element 5604. That is, it is possible to make the pixel emit no light (black display) since a current flows to the wire 5612 as the complementary transistor 5611 is on at this time.

By setting the potential of the wire 5612 lower than the potential of the opposite electrode 5608 of the light emitting element 5604, a reverse bias voltage can be applied to the light emitting element 5604. A current does not flow to the normal light emitting element 5604 even when a reverse bias voltage is applied to the light emitting element 5604 in this manner. On the other hand, when the light emitting element 5604 has a short-circuited portion, a current flows to the short-circuited portion. Then, the current concentrates to the short-circuited portion and the short-circuited portion of the light emitting element 5604 is insulated. By insulating the short-circuited portion of the light emitting element 5604, a display defect of the pixel can be improved. Further, the life of the light emitting element 5604 can be extended.

It is to be noted that the H-level signal of the first scan line 5605 is preferably a potential V1 which is higher than a video signal to make the pixel emit no light (the gate potential Vsig (H) to turn off the driving transistor 5601) by a threshold voltage Vth of the switching transistor 5602 or more. Because, as the switching transistor 5602 is an N-channel transistor, the first terminal functions as a drain terminal when Vsig (H) is inputted to the signal line 5606. Therefore, the switching transistor 5602 is turned off when a potential of the second terminal (source terminal here) thereof is lower than that of the gate terminal by the threshold voltage Vth of the switching transistor 5602. That is, when the gate potential of the switching transistor 5602 is lower than V1, Vsig (H) inputted to the signal line 5606 cannot be inputted to the gate terminal of the driving transistor 5601. Then, the driving transistor 5601 cannot be completely turned off and the light emitting element 5604 slightly emits light in some cases.

Further, it is preferable to set the L-level signal of the first scan line 5605 at a potential lower than Vsig (L). For example, in the case where the L-level signal of the first scan line 5605 has a potential equal to that of a video signal which makes the pixel emit light (gate potential Vsig (L) to turn on the driving transistor 5601), when Vsig (L) is inputted to the signal line 5606 for writing a signal to a pixel of another row, a gate-source voltage of the switching transistor 5602 becomes 0 V in the pixel to which Vsig (H) is written. Then, an off current flows when the switching transistor 5602 is normally-on. Accordingly, the charge accumulated in the capacitor 5603 is discharged and the gate potential of the driving transistor 5601 becomes low and a current flows through the driving transistor 5601, thereby the light emitting element 5604 slightly emits light in some cases.

Next, description is made on an erasing operation. In the erasing operation, an H-level signal is inputted to the second scan line 5610. Then, a current flows through the rectifying element 5609, thereby the gate potentials of the driving transistor 5601 and the complementary transistor 5611 can be certain predetermined potentials. It is to be noted that this potential is lower than the H-level potential of the second scan line 5610 by a threshold voltage of the rectifying element 5609. Therefore, it is preferable to set the H-level potential inputted to the second scan line 5610 to be higher than the video signal Vsig (H) by the threshold voltage of the rectifying element 5609.

At this time, the H-level signal inputted to the second scan line 5610 is preferably equal to higher than the high power source potential inputted to the power source line 5607. By appropriately setting the potential of the H-level signal, the potential of the gate terminal of the driving transistor 5601 can be set higher than that of the source terminal when forcibly turning off the driving transistor 5601 in the erasing period. Therefore, even when the driving transistor 5601 is normally-on, the driving transistor 5601 can be turned off and it can be prevented that the light emitting element 5604 slightly emits light.

It is to be noted that the H-level of the second scan line 5610 may be the same as the H-level of the first scan line 5605. As a result, the number of power source lines can be reduced.

It is to be noted that an L-level signal is inputted to the second scan line 5610 except for in the erasing operation. It is preferable that the potential of the L-level signal be a potential equal to or lower than that of a video signal (gate potential Vsig (L) to turn on the driving transistor 5601) which makes the pixel emit light. However, if the potential of the L-level signal is set too low, a reverse bias voltage applied to the rectifying element 5609 becomes high in the case where a video signal for non-light emission (gate potential Vsig (H) to turn off the driving transistor 5601) is written to the pixel. Accordingly, an off current flowing to the rectifying element 5609 (also referred to as a reverse current) is increased and the charge held in the capacitor 5603 leaks. Then, the gate potential of the driving transistor 5601 falls, thereby an off current of the driving transistor 5601 increases. Therefore, it is preferable that the potential of the L-level signal be equal to that of a video signal which makes the pixel emit light (gate potential Vsig (L) to turn on the driving transistor 5601).

It is to be noted that one or a combination of a resistor, a PN junction diode, a PIN junction diode, a Schottky diode, a diode-connected transistor, and a diode formed of a carbon nanotube can be used as the rectifying element 5609 of FIG. 56. The configuration shown in Embodiment Mode 1 can be used as required.

A potential transfer element can be used instead of the rectifying element. As a potential transfer element, various configurations shown in Embodiment Mode 2 can be employed.

In this pixel configuration, an off current of the driving transistor can be reduced by appropriately setting the potential of the video signal and the potential to be inputted to the second scan line. Further, by providing a complementary transistor which is turned on/off in a complementary style as the driving transistor, it is possible to make the pixel emit no light (black display) even when an off current flows through the driving transistor, thereby a display defect can be prevented.

In the case were the potentials inputted to the wire 5612 and the opposite electrode 5608 of the light emitting element 5604 are equal to each other, the wire 5612 and the opposite electrode 5608 are connected to each other, thereby the resistance of the opposite electrode can be reduced and the power consumption can be reduced.

Figure 57:
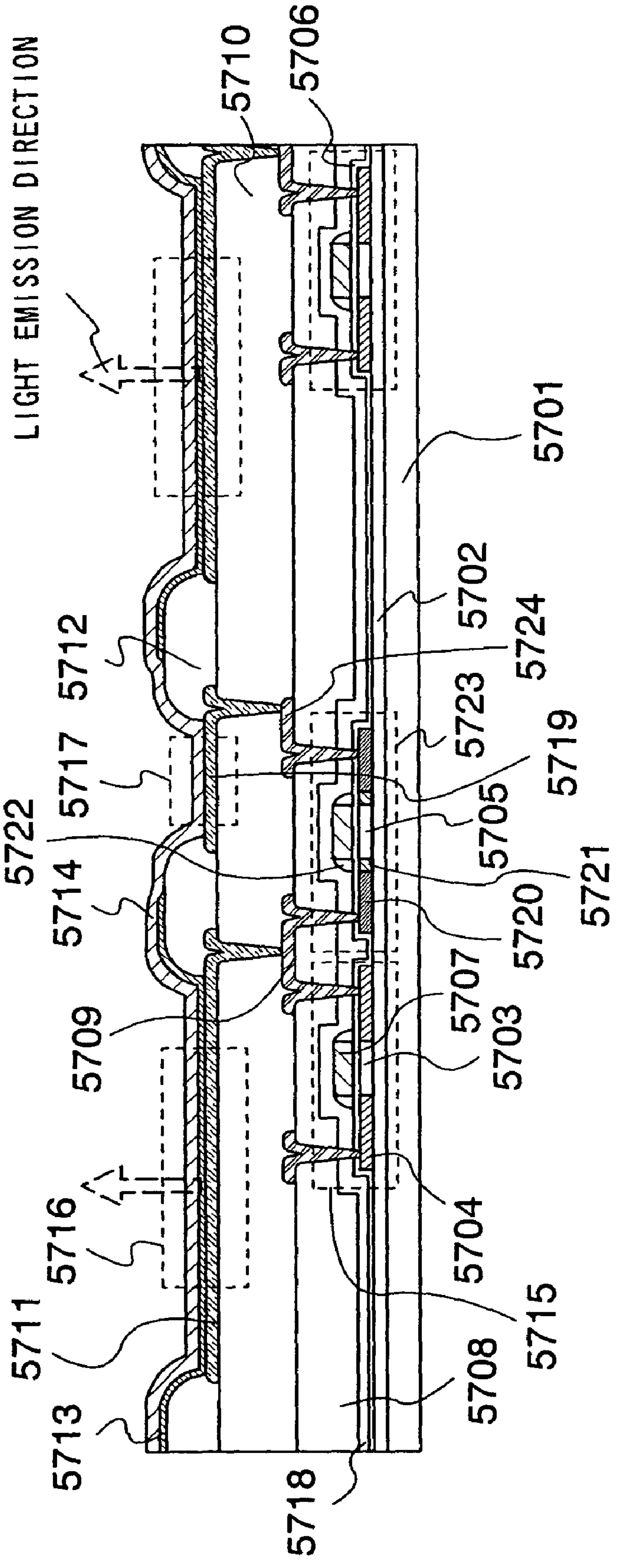
FIG. 57 is a sectional diagram of a portion of a pixel configuration of the invention.

Description is made with reference to FIG. 57 on the section of a part of the pixel in that case.

A base film 5702 is formed over a substrate 5701. The substrate 5701 can be formed of an insulating substrate such as a glass substrate, a quartz substrate, a plastic substrate, and a ceramics substrate, or of a metal substrate, a semiconductor substrate, or the like. The base film 5702 can be formed by a CVD method or a sputtering method. For example a silicon oxide film, a silicon nitride film, a silicon oxynitride film, or the like formed by a CVD method using $SiH_4$, $N_2O$, and $NH_3$ as source materials. Moreover, a stacked-layer of these may be used as well. It is to be noted that the base film 5702 is provided to prevent impurities from dispersing from the substrate 5701 into the semiconductor layer. When the substrate 5701 is formed of a glass substrate or a quartz substrate, the base film 5702 is not required to be provided.

Island-shaped semiconductor layers are formed over the base film 5702. In the semiconductor layers, a channel forming region 5703 where a P-channel is formed, an impurity region 5704 which functions as a source region or a drain region, a channel forming region 5705 where an N-channel is formed, an impurity region 5720 which functions as a source region or a drain region, and a low concentration impurity region (LDD region) 5721 are formed. Then, a gate electrode 5707 is provided over the channel forming region 5703 and the channel forming region 5705 with a gate insulating film 5706 interposed therebetween. As the gate insulating film 5706, a silicon oxide film, a silicon nitride film, a silicon oxynitride film, or the like formed by a CVD method or a sputtering method can be used. Further, an aluminum (Al) film, a copper (Cu) film, a thin film containing aluminum or copper as a main component, a chromium (Cr) film, a tantalum (Ta) film, a tantalum nitride (TaN) film, a titanium (Ti) film, a tungsten (W) film, a molybdenum (Mo) film, or the like can be used as the gate electrode 5707.

Sidewalls 5722 are formed on the sides of the gate electrode 5707. After forming a silicon compound, for example, a silicon oxide film, a silicon nitride film, or a silicon oxynitride film so as to cover the gate electrode 5707, etch-back treatment is applied to form the sidewalls 5722.

The LDD regions 5721 are formed under the sidewalls 5722. That is, the LDD regions 5721 are formed in a self-aligned manner. It is to be noted that the sidewalls 5722 are provided to form the LDD regions 5721 in a self-aligned manner, therefore, the sidewalls 5722 are not necessarily provided.

A first interlayer insulating film is formed over the gate electrode 5707, the sidewalls 5722 and the gate insulating film 5706. The first interlayer insulating film includes an inorganic insulating film 5718 as a lower layer and a resin film 5708 as an upper layer. As the inorganic insulating film 5718, a silicon nitride film, a silicon oxide film, a silicon oxynitride film, or a film formed by stacking these layers can be used. As the resin film 5708, polyimide, polyamide, acrylic, polyimide amide, epoxy, and the like can be used.

A first electrode 5709 and a second electrode 5724 are formed over the first interlayer insulating film. The first electrode 5709 is electrically connected to the impurity region 5704 and the impurity region 5720 through a contact hole. Further, the second electrode 5724 is electrically connected to the impurity region 5720 through contact holes. A titanium (Ti) film, an aluminum (Al) film, a copper (Cu) film, an aluminum film containing Ti, or the like can be used as the first electrode 5709 and the second electrode 5724. It is to be noted that in the case of providing a wire such as a signal line in the same layer as the first electrode 5709 and the second electrode 5724, copper which has low resistance is preferably used.

A second interlayer insulating film 5710 is formed over the first electrode 5709, the second electrode 5724, and the first interlayer insulating film. The second interlayer insulating film can be formed of an inorganic insulating film, a resin film, or a stacked-layer of these. As an inorganic insulating film, a silicon nitride film, a silicon oxide film, a silicon oxynitride film, or a film formed by stacking these layers can be used. As a resin film, polyimide, polyamide, acrylic, polyimide amide, epoxy, and the like can be used.

A pixel electrode 5711 and a wire 5719 are formed over the second interlayer insulating film 5710. The pixel electrode 5711 and the wire 5719 are formed of the same material, that is, in the same layer at the same time. As a material for forming the pixel electrode 5711 and the wire 5719, a material having a high work function is preferably used. For example, a single layer of a titanium nitride (TiN) film, a chromium (Cr) film, a tungsten (W) film, a zinc (Zn) film, a platinum (Pt) film, or the like, a stacked-layer of a titanium nitride film and a film containing aluminum as a main component, a stacked-layer of three layers of a titanium nitride film, a film containing aluminum as a main component, and a titanium nitride film, or the like can be used. With a stacked-layer structure, the resistance as a wire is low, a preferable ohmic contact can be obtained, and further a function as an anode can be obtained. By using a metal film which reflects light, an anode which does not transmit light can be formed.

An insulator 5712 is formed so as to cover end portions of the pixel electrode 5711 and the wire 5719. As the insulator 5712, a positive type photosensitive acrylic resin film can be used.

A layer 5713 containing an organic compound is provided over the pixel electrode 5711, and a part of the layer 5713 containing an organic compound overlaps the insulator 5712. It is to be noted that the layer 5713 containing an organic compound is not formed over the wire 5719.

An opposite electrode 5714 is formed over the layer 5713 containing an organic compound, the insulator 5712, and the wire 5719. As a material used for the opposite electrode 5714, a material having a low work function is preferably used. For example, a metal thin film of aluminum (Al), silver (Ag), lithium (Li), calcium (Ca), an alloy of these, MgAg, MgIn, AlLi, $CaF_2$, $Ca_3N_2$ or the like can be used. By using a metal thin film in this manner, a cathode which can transmit light can be formed.

A region where the layer 5713 containing an organic compound is sandwiched between the opposite electrode 5714 and the pixel electrode 5711 corresponds to the light emitting element 5716.

In a region where the layer 5713 is isolated by the insulator 5712, a joint portion 5717 is formed so that the opposite electrode 5714 and the wire 5719 contact each other. Therefore, the wire 5719 functions as an auxiliary electrode of the opposite electrode 5714, thereby the low resistance of the opposite electrode 5714 can be realized. Accordingly, a film thickness of the opposite electrode 5714 can be thin, which leads to increase the light transmittance. Therefore, higher luminance can be obtained in a top emission structure where the light from the light emitting element 5716 is extracted from a top surface.

A stacked-layer of a metal thin film and a light-transmissive conductive film (ITO (indium tin oxide), indium zinc oxide (IZO), zinc oxide (ZnO), or the like) may be used in order to realize the lower resistance of the opposite electrode 5714. In this manner, a cathode which can transmit light can be formed also by using a metal thin film and a light-transmissive conductive film which transmits light.

It is to be noted that the impurity region 5704 is doped with P-type impurities. Further, the impurity region 5720 is doped with N-type impurities. Therefore, a transistor 5715 is a P-channel transistor and a transistor 5723 is an N-channel transistor.

That is, the transistor 5715 corresponds to the driving transistor 5601 in the pixel of FIG. 56 and the transistor 5723 corresponds to the complementary transistor 5611 in the pixel of FIG. 56. Further, the wire 5719 corresponds to the wire 5612 in the pixel of FIG. 56 and the opposite electrode 5714 corresponds to the opposite electrode 5608 of the light emitting element 5604 in the pixel of FIG. 56. That is, the wire 5612 and the opposite electrode 5608 of the light emitting element 5604 are connected in the pixel of FIG. 56.

In the display panel shown in FIG. 57, the film of the opposite electrode 5714 can be formed thin, thereby the light can be emitted from a top surface with favorable transmittance. Therefore, the luminance from the top surface can be enhanced. Further, by connecting the opposite electrode 5714 and the wire 5719, low resistance of the opposite electrode 5714 and the wire 5719 can be realized. Therefore, power consumption can be reduced.

Figure 58A:
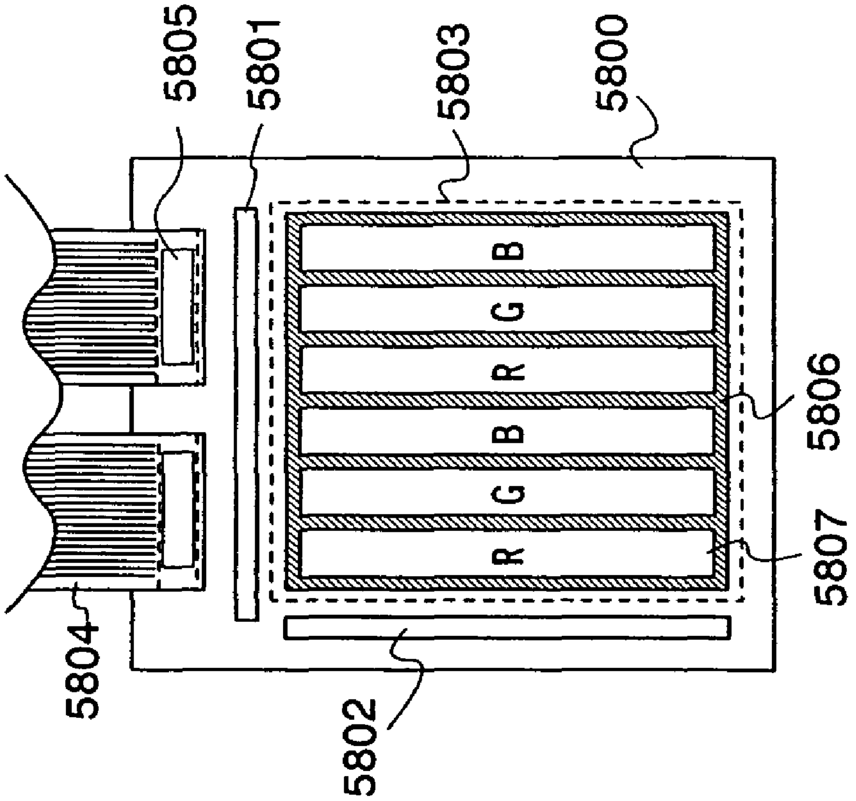
FIG. 58A is a schematic diagram showing a configuration of a display panel of the invention and FIG. 58B is a schematic diagram showing a configuration of a display panel of the invention.
Figure 58B:
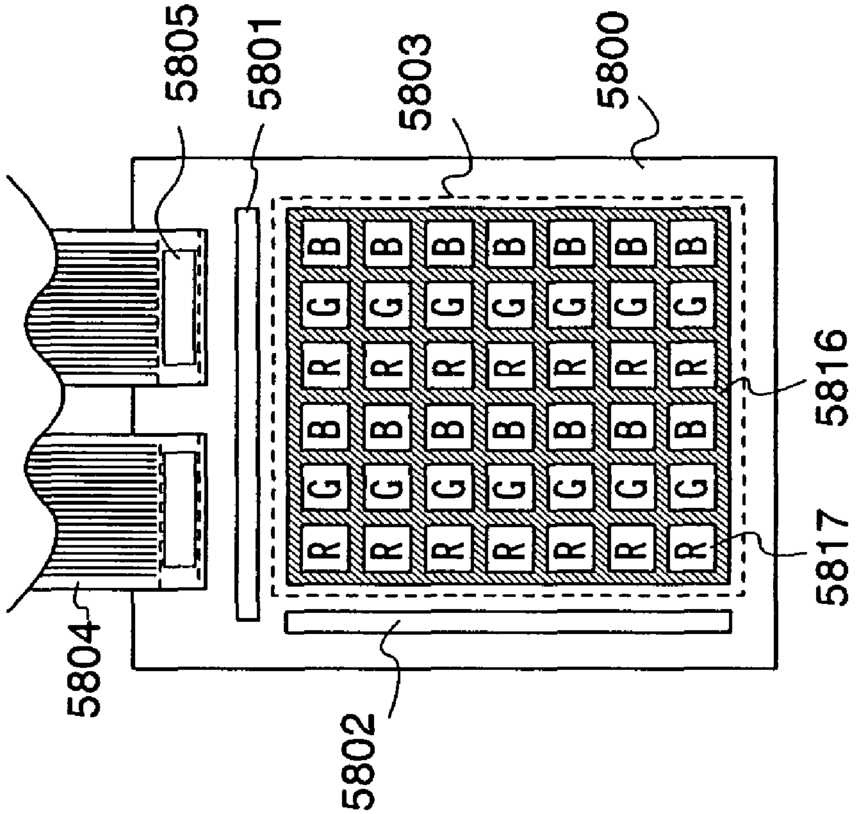

Next, description is made with reference to FIGS. 58A and 58B on the structures of the display panel. A signal line driver circuit 5801, a scan line driver circuit 5802, and a pixel portion 5803 are formed over a substrate 5800. It is to be noted that the substrate 5800 is connected to FPCs 5804 and receives signals such as a video signal, a clock signal, and a start signal inputted to the signal line driver circuit 5801 and the scan line driver circuit 5802 from the FPC (Flexible Printed Circuit) 5804 which is an external input terminal. An IC chip (semiconductor chip including memory circuit, buffer circuit, or the like) 5805 is mounted over a joint portion of the FPC 5804 and the substrate 5800 by COG (Chip On Glass) or the like. It is to be noted that only the FPC 5804 is shown here, however, a printed wiring board (PWB) may be attached to the FPC 5804. A display device in this specification includes not only a main body of the display panel, but also the one with an FPC or a PWB attached thereto and the one mounted with an IC chip or the like.

Figure 59:
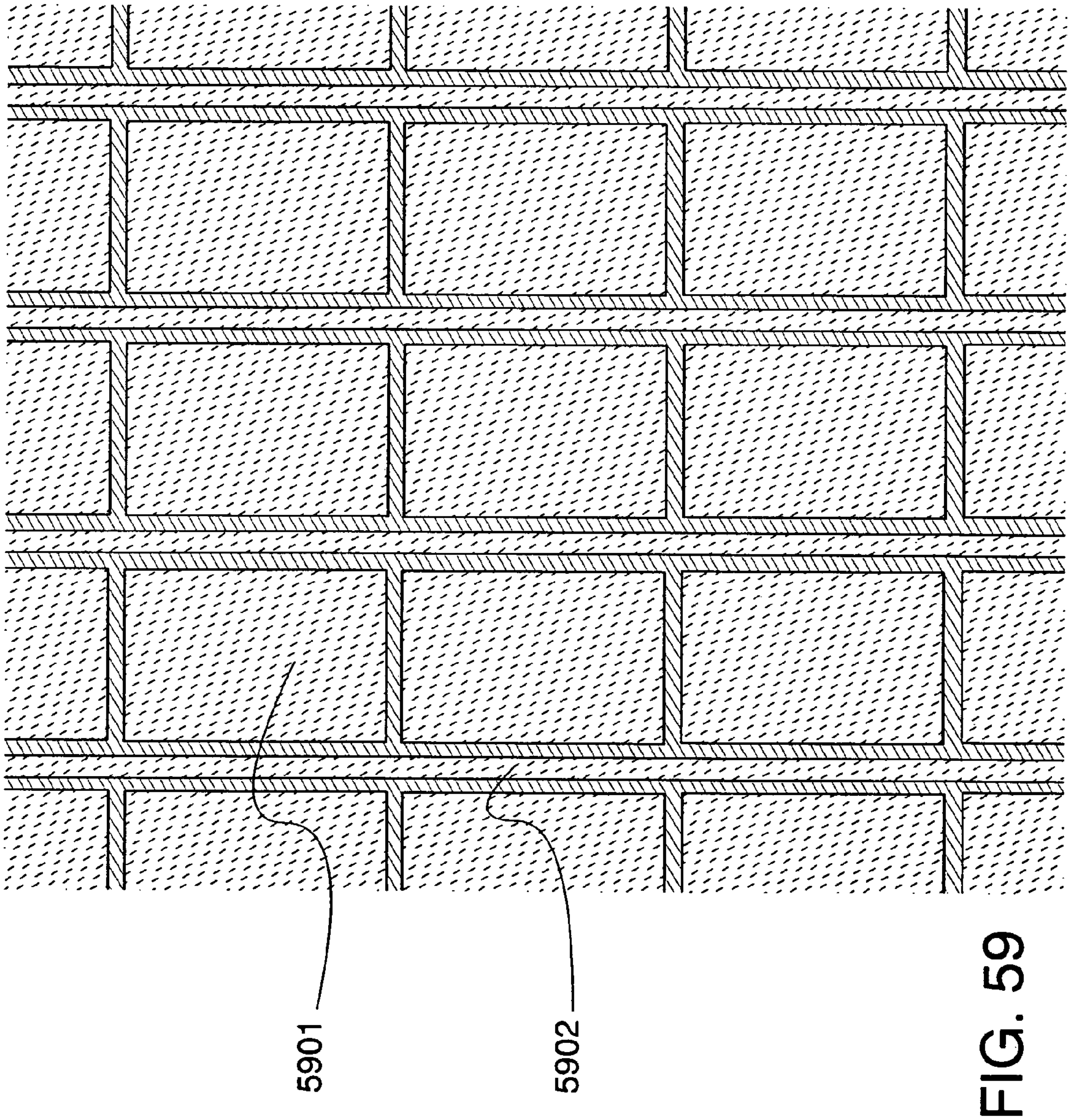
FIG. 59 is a schematic diagram of a pixel portion of a display panel of the invention.

In a pixel portion 5803 shown in FIG. 58A, pixels are arranged in matrix. The pixels are arranged in pixel columns for each color element. A layer 5807 containing an organic compound is provided for one column of pixels per each color. In a region 5806 where the layer 5807 containing an organic compound is not provided in the pixel portion, a joint portion of an opposite electrode and a wire formed of the same material as a pixel electrode is formed. That is, the joint portion 5717 in the sectional diagram of FIG. 57 is formed in the region 5806 in FIG. 58A. Further, FIG. 59 shows a schematic diagram of a top view of the pixel portion. In FIG. 59, a wire 5902 is formed of the same material as a pixel electrode 5901. The pixel electrode 5901 corresponds to the pixel electrode 5711 in FIG. 57 and the wire 5902 corresponds to the wire 5719 in FIG. 57. A layer containing an organic compound is formed over one column of the pixel electrodes 5901 and a light emitting element is formed in a region sandwiched between the pixel electrode 5901 and an opposite electrode. As the opposite electrode and the wire 5902 contact each other in the joint portion, low resistance of the opposite electrode can be realized. That is, the wire 5902 functions as an auxiliary electrode of the opposite electrode. With the structure of the pixel portion as shown in FIG. 59, a display panel which has a high aperture ratio and an opposite electrode with low resistance can be provided.

Figure 60:
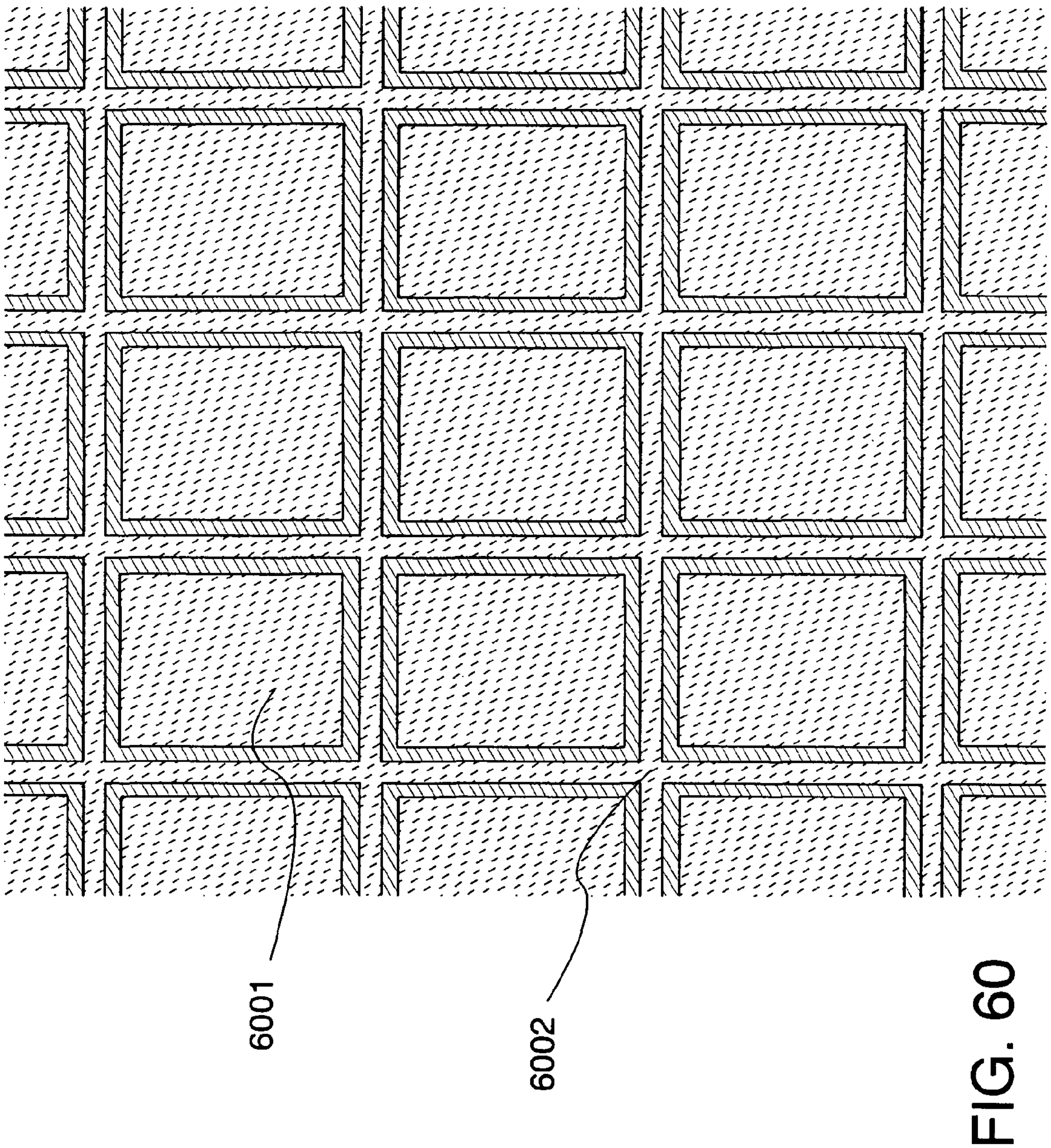
FIG. 60 is a schematic diagram of a pixel portion of a display panel of the invention.

In the pixel portion 5803 of a display panel shown in FIG. 58B, pixels are arranged in matrix. The pixels are arranged in pixel columns for each color element. A layer 5817 containing an organic compound is provided for one column of pixels per each color. In a region 5816 where the layer 5817 containing an organic compound is not provided in the pixel portion, a joint portion of an opposite electrode and a wire formed of the same material as a pixel electrode is formed. That is, the joint portion 5717 in the sectional diagram of FIG. 57 is formed in the region 5816 in FIG. 58B. Further, FIG. 60 shows a schematic diagram of a top view of the pixel portion. In FIG. 60, a wire 6002 is formed of the same material as a pixel electrode 6001. The pixel electrode 6001 corresponds to the pixel electrode 5711 in FIG. 57 and the wire 6002 corresponds to the wire 5719 in FIG. 57. A layer containing an organic compound is formed over each of the pixel electrodes 6001 and a light emitting element is formed in a region sandwiched between the pixel electrode 6001 and an opposite electrode. As the opposite electrode and the wire 6002 contact each other in the joint portion, low resistance of the opposite electrode can be realized. That is, the wire 6002 functions as an auxiliary electrode of the opposite electrode. With the structure of the pixel portion as shown in FIG. 60, a display panel which has an opposite electrode with lower resistance can be provided.

The display panel shown in this embodiment mode has an opposite electrode with favorable light transmittance and pixels with high aperture ratio, therefore, required brightness can be obtained even with low luminance. Therefore, reliability of a light emitting element can be improved. As low resistance of the opposite electrode can be realized, power consumption can be reduced as well.

Therefore, by using the pixel configuration described in this embodiment mode, for example, the driving method described with reference to FIG. 8 can be realized.

Embodiment Mode 4

Figure 5:
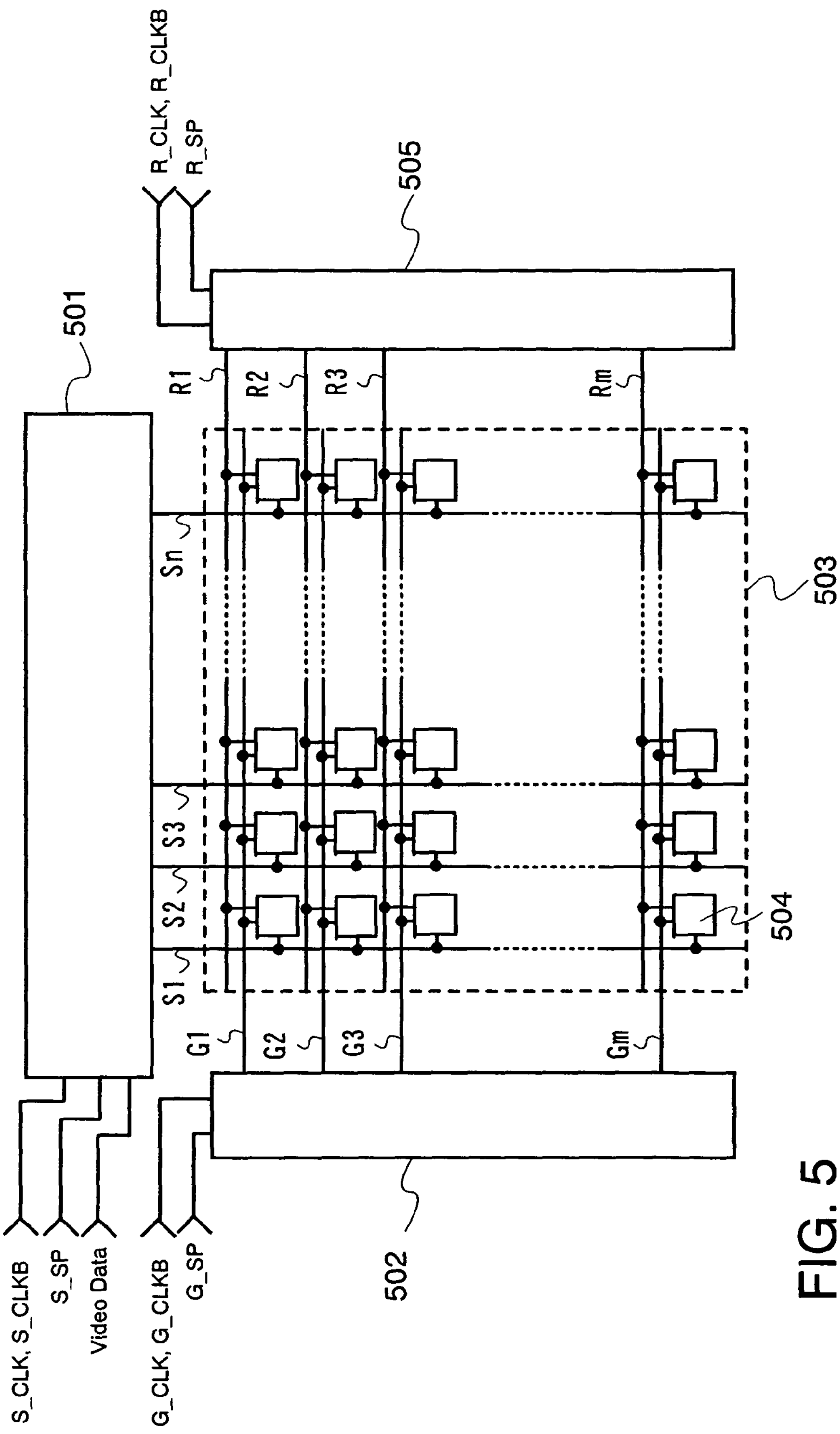
FIG. 5 is a diagram showing a display device having a pixel configuration of the invention.

Next, description is made on a display device having the aforementioned pixel. In a display device shown in FIG. 5, a signal line driver circuit 501, a first scan line driver circuit 502, a second scan line driver circuit 505, and a pixel portion 503 are provided. Signal lines S1 to Sn are provided extending from the signal line driver circuit 501 in a column direction, first scan lines G1 to Gm are provided extending from the first scan line driver circuit 502 in a row direction, and second scan lines R1 to Rm are provided extending from the second scan line driver circuit 505 in the column direction. A plurality of pixels 504 are arranged in matrix in the pixel portion 503 corresponding to the signal lines S1 to Sn, the first scan lines G1 to Gm, and the second scan lines R1 to Rm. That is, one of the signal lines S1 to Sn, one of the first scan lines G1 to Gm, and one of the second scan lines R1 to Rm are connected to one pixel. It is to be noted that the pixel configurations shown in FIGS. 1, 3, 4, 9, 10, 11, 12, 13, 16, 17, 18,

19, 20, 21, 22, 34, 40, 41, 42, 43, 44, 45, 46, 47, 50, 51, 53, 54, 55, and 56 can be applied to the pixels 504.

Signals such as a clock signal (G_LCLK), a clock inverting signal (G_CLKB), and a start pulse signal (G_SP) are inputted to the first scan line driver circuit 502. In accordance with these signals, a signal is outputted to a first scan line G1 (one of the first scan lines G1 to Gm) of a pixel column to be selected. It is to be noted that this first scan line Gi corresponds to the first scan lines 105, 1305, 4505, 5305, 5605, and the like in the pixel configurations shown in FIGS. 1, 3, 4, 9, 10, 11, 12, 13, 16, 17, 18, 19, 20, 21, 22, 34, 40, 41, 42, 43, 44, 45, 46, 47, 50, 51, 53, 54, 55, and 56.

Signals such as a clock signal (R_CLK), a clock inverting signal (R_CLKB), and a start pulse signal (R_SP) are inputted to the second scan line driver circuit 505. In accordance with these signals, a signal is outputted to a second scan line R1 (one of the second scan lines R1 to Rm) of a pixel column to be selected. It is to be noted that this second scan line R1 corresponds to the second scan lines 110, 1310, 4510, 5310, 5610, and the like in the pixel configurations shown in FIGS. 1, 3, 4, 9, 10, 11, 12, 13, 16, 17, 18, 19, 20, 21, 22, 34, 40, 41, 42, 43, 44, 45, 46, 47, 50, 51, 53, 54, 55, and 56.

Signals such as a clock signal (S_CLK), a clock inverting signal (S_CLKB), a start pulse signal (S_SP), and a video signal (Video Data) are inputted to the signal line driver circuit 501. In accordance with these signals, a video signal corresponding to the pixels in each column is outputted to each of the signal lines S1 to Sn. It is to be noted that one signal line Sj of the signal lines S1 to Sn corresponds to the signal lines 106, 1306, 4506, 5306, 5606, and the like in the pixel configurations shown in FIGS. 1, 3, 4, 9, 10, 11, 12, 13, 16, 17, 18, 19, 20, 21, 22, 34, 40, 41, 42, 43, 44, 45, 46, 47, 50, 51, 53, 54, 55, and 56.

Therefore, the video signal inputted to the signal lines S1 to Sn is written to the pixel 504 of the row selected by a signal inputted through the scan line G1 (one of the scan lines G1 to Gm). Then, each pixel row is selected through each of the scan lines G1 to Gm, thereby video signals corresponding to each of the pixels 504 are inputted to all the pixels 504. Each of the pixels 504 holds the data of the written video signal for a certain period. Then, each of the pixels 504 can keep a light emission or non-light emission state by holding the data of the written signal for a certain period.

Here, the display device of this embodiment mode is a display device employing a time gray scale method, which controls light emission or non-light emission of each of the pixels 504 in accordance with the data of the video signal written to each of the pixels 504, thereby expressing a gray scale depending on the length of light emission period. It is to be noted that a period for displaying a whole image for one display region (one frame) is referred to as one frame period and the display device of this embodiment mode has a plurality of subframe periods in one frame period. The lengths of the subframe periods in one frame period may be approximately the same or different. That is, the light emission or non-light emission of each of the pixels 504 is controlled in each subframe period in one frame period, thereby a gray scale is expressed depending on a difference in the total light emission time of each pixel 504.

It is to be noted that the display device of the invention may employ a dot sequential method in which a video signal is inputted from the signal line driver circuit to each column of signal lines when the pixel row is selected, or a line sequential method in which signals are simultaneously written to all the pixels of the selected pixel row.

Figure 6:
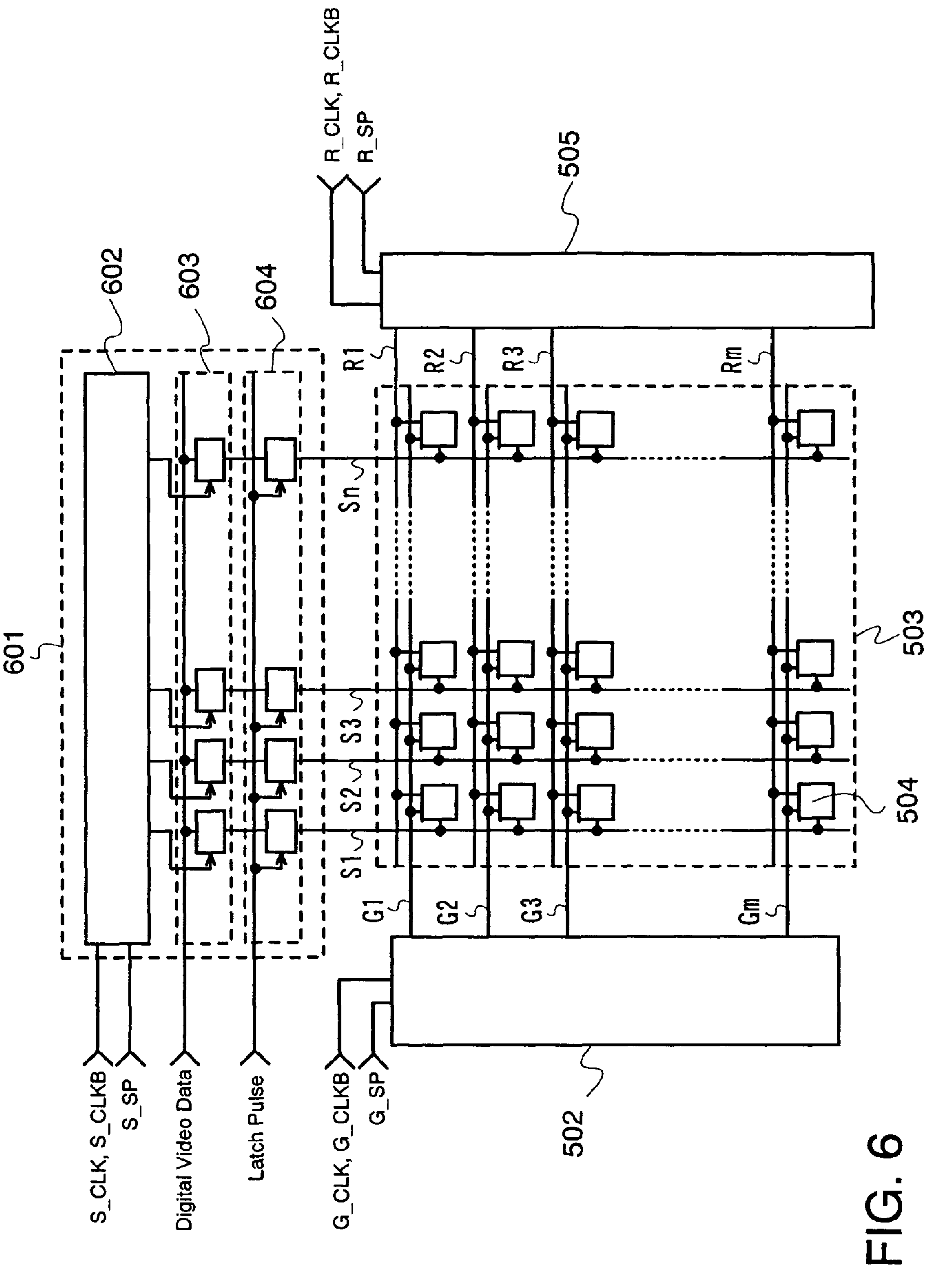
FIG. 6 is a diagram showing a display device having a pixel configuration of the invention.

FIG. 6 shows a schematic diagram of a display device employing a line sequential method. Other common portions are denoted by the same reference numerals as those in FIG. 5 and description thereon is omitted.

A signal line driver circuit 601 includes a pulse output circuit 602, a first latch circuit 603, and a second latch circuit 604.

A clock signal (S_CLK), a clock inverting signal (S_CLKB), a start pulse signal (S_SP) and the like are inputted to the pulse output circuit 602. In accordance with the timing of these signals, sampling pulses are outputted from a pulse output circuit 602.

The sampling pulses outputted from the pulse output circuit 602 are inputted to the first latch circuit 603. A video signal (Digital Video Data) is inputted to the first latch circuit 603. The data of the video signal is held in each stage of the first latch circuit 603 in accordance with the timing at which the sampling pulses are inputted.

After the data of the video signals are held up to the last stage in the first latch circuit 603, latch pulse signals (Latch Pulse) are inputted to the second latch circuit 604 and the data of the video signals held in the first latch circuit 603 are transferred to the second latch circuit 604 all at once. Then, the data of the video signals held in the second latch circuit 604 is outputted to the signal lines S1 to Sn one pixel row at a time.

Figure 7:
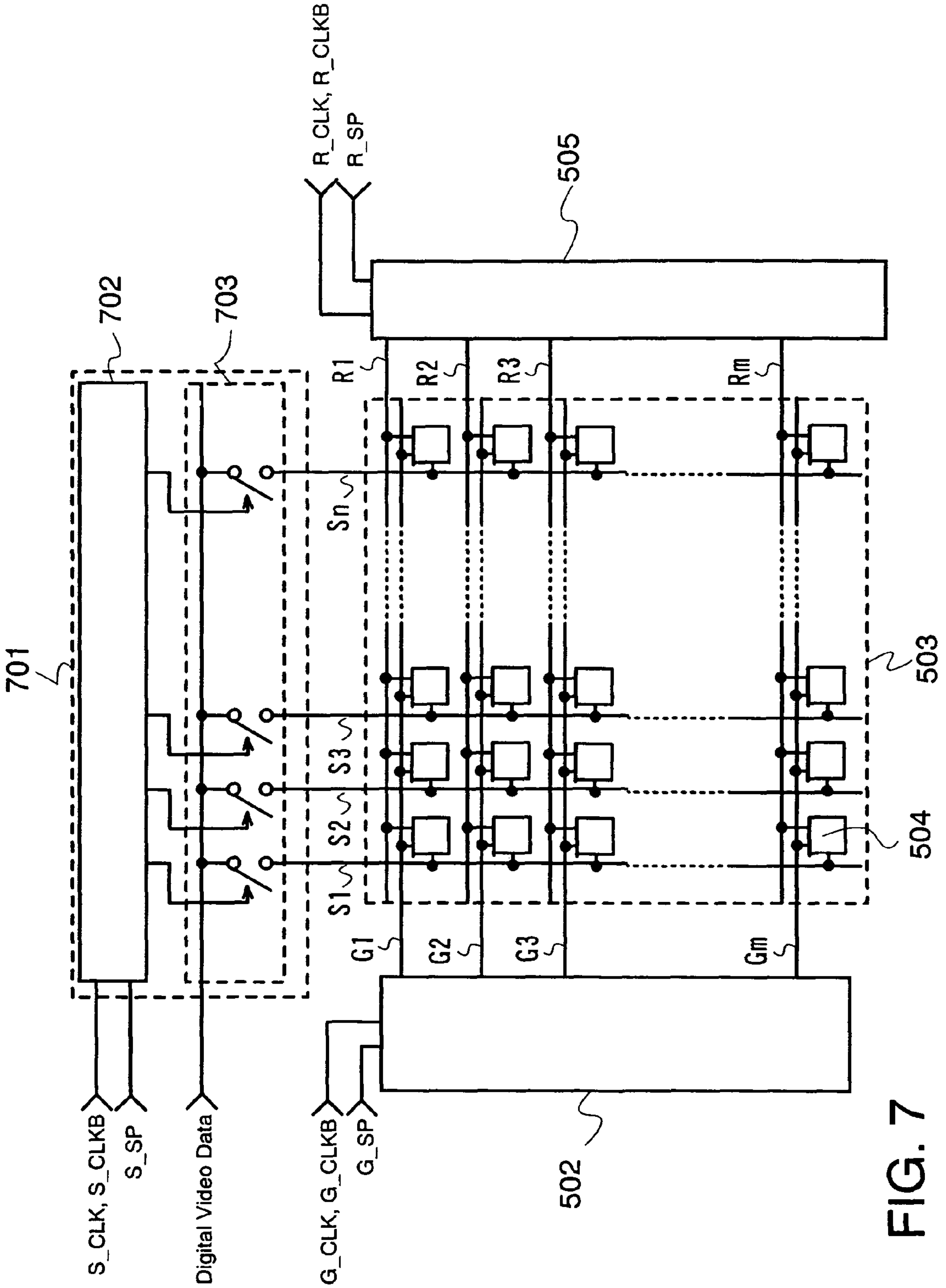
FIG. 7 is a diagram showing a display device having a pixel configuration of the invention.

Next, FIG. 7 shows a schematic diagram of a display device employing a dot sequential method. A signal line driver circuit 701 corresponds to the signal line driver circuit 501 of the display device shown in FIG. 5. Other common portions are denoted by the same reference numerals to those in FIG. 5 and the description is omitted.

A signal line driver circuit 701 includes a pulse output circuit 702, and a switch group 703.

A clock signal (S_CLK), a clock inverting signal (S_CLKB), a start pulse signal (S_SB), and the like are inputted to the pulse output circuit 702. In accordance with the timing of these signals, sampling pulses are outputted from the pulse output circuit 702.

The sampling pulses outputted from the pulse output circuit 702 are inputted to the switch group 703. A video signal (Digital Video Data) is inputted to one terminal of each switch of the switch group 703 and the other terminal thereof is connected to the signal lines S1 to Sn through the output control circuit 704. In accordance with the timing at which the sampling pulses are inputted, the switches of each stage in the switch group 703 are sequentially turned on. Then, the video signals are outputted to the signal lines S1 to Sn corresponding to the stage of the switch which is turned on.

The display device of the invention is not limited to this.

Embodiment Mode 5

Further, the invention can be applied to a current input current driving type pixel in which a signal is written by a current and which is driven by a current. Description is made with reference to FIG. 34 on such a pixel.

Figure 34:
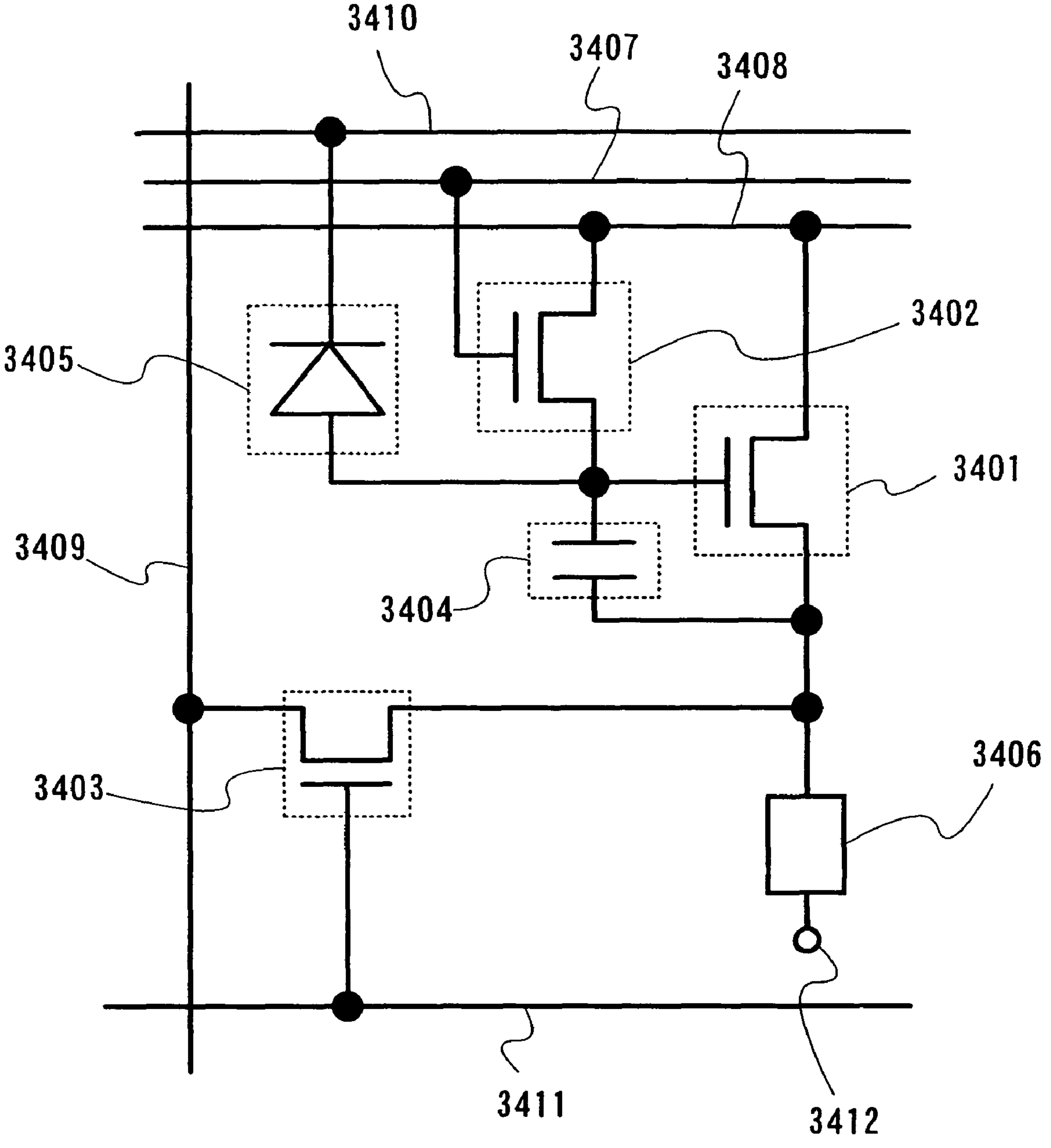
FIG. 34 is a diagram showing a pixel configuration of the invention.

In a pixel shown in FIG. 34, a driving transistor 3401, a holding transistor 3402, a switching transistor 3403, a capacitor 3404, a rectifying element 3405, a light emitting element 3406, a first scan line 3407, a second scan line 3411, a signal line 3409, a power supply line 3408, and a third scan line 3410 are provided. It is to be noted that a low power source potential Vss is inputted to an opposite electrode 3412 of the light emitting element 3406. It is to be noted that the driving transistor 3401, the holding transistor 3402, and the switching transistor 3403 are N-channel transistors.

A first terminal (source terminal or drain terminal) of the driving transistor 3401 is connected to a pixel electrode of the light emitting element 3406 and to a second terminal (source terminal or drain terminal) of the switching transistor 3403. A first terminal (source terminal or drain terminal) of the switching transistor 3403 is connected to the signal line 3409 and a gate terminal thereof is connected to the second scan line 3411. A second terminal (source terminal or drain terminal) of the driving transistor 3401 is connected to the power supply line 3408. A gate terminal of the driving transistor 3401 is connected to one electrode of the capacitor 3404 and the first terminal thereof is connected to the other electrode of the capacitor 3404. That is, the gate terminal and the first terminal of the driving transistor 3401 are connected to each other through the capacitor 3404. A first terminal (source terminal or drain terminal) of the holding transistor 3402 is connected to the gate terminal of the driving transistor 3401 and a second terminal (source terminal or drain terminal) thereof is connected to the power supply line 3408. A gate terminal of the holding transistor 3402 is connected to the first scan line 3407. The gate terminal of the driving transistor 3401 and the third scan line 3410 are connected to each other through the rectifying element 3405. It is to be noted that a direction of a forward current of the rectifying element 3405 is a direction flowing from the gate terminal of the driving transistor 3401 to the third scan line 3410.

Next, description is made on an operation of the pixel.

In the case of a signal writing operation to the pixel, signals are inputted to the first scan line 3407 and the second scan line 3411. Then, the holding transistor 3402 and the switching transistor 3403 are turned on.

Further, the potential of the power supply line 3408 is set at an L-level. This L-level potential is set so that an absolute value of a potential difference between the L-level potential and the potential of the opposite electrode 3412 of the light emitting element 3406 does not exceed an absolute value of a threshold voltage of the light emitting element 3406.

In this manner, a signal current (corresponding to a video signal) inputted from the signal line 3409 is divided and flows to the transistor 3401 and the capacitor 3404. When the current stops flowing to the capacitor 3404 eventually, a gate-source voltage of the driving transistor 3401, which makes a signal current flow through the driving transistor 3401, is accumulated in the capacitor 3404. Then, the signal inputs to the first scan line 3407 and the second scan line 3411 are terminated and the holding transistor 3402 and the switching transistor 3403 are turned off. The capacitor 3404 holds the gate-source voltage which makes a signal current flow through the driving transistor 3401.

Subsequently, a potential of the power supply line 3408 is set at an H-level in the light emission operation. Then, a current equivalent to the signal current flows to the light emitting element 3406.

In the erasing operation, the third scan line 3410 is set at an L-level, thereby a current flows through the rectifying element 3405. The potential of the gate terminal of the driving transistor 3401 can be set lower than that of the source terminal thereof. That is, the driving transistor 3401 can be forcibly turned off.

It is to be noted that a diode-connected transistor can be used as the rectifying element 3405. Further, besides the diode-connected transistor, a PN junction diode, a PIN junction diode, a Schottky diode, a diode or a transistor formed of a carbon nanotube, or a combination thereof may be used as well. The rectifying element shown in Embodiment Mode 1 can be used as required.

Embodiment Mode 6

Figure 48:
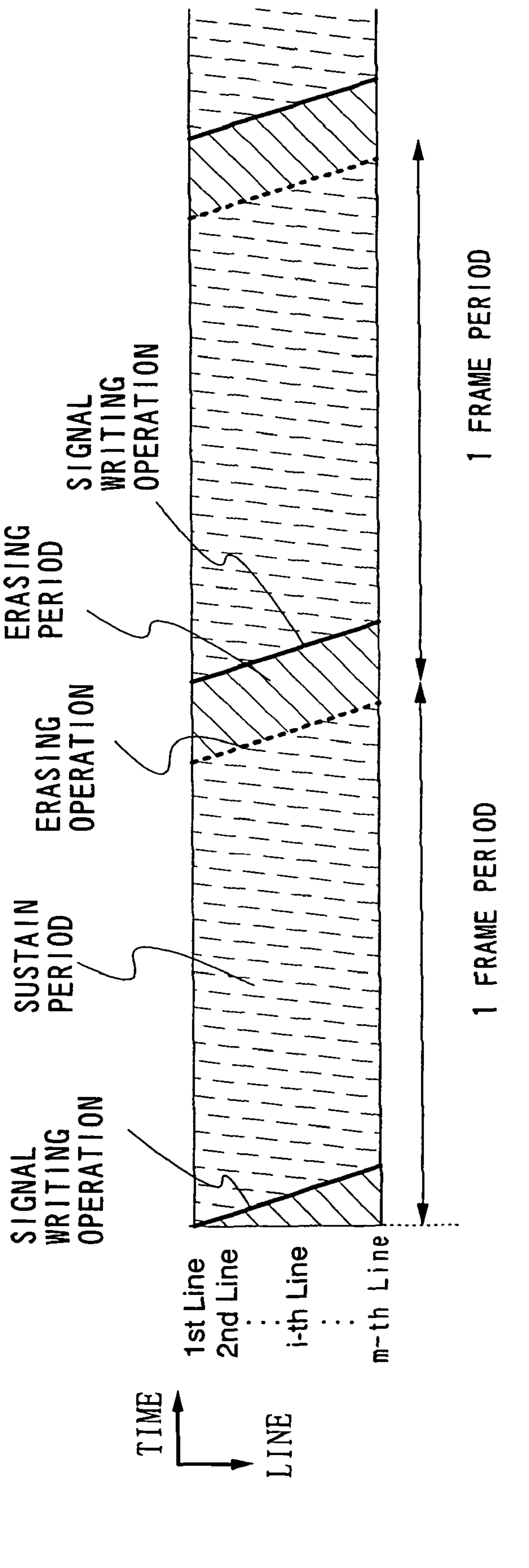
FIG. 48 shows a timing chart.

In this embodiment mode, description is made with reference to a timing chart shown in FIG. 48 on another driving method of a display device to which a pixel of the invention can be applied.

The abscissa expresses a time passage while the ordinate expresses the number of scan rows of the scan lines.

When an image is displayed, a writing operation and a light emission operation are repeated. A period to perform a writing operation and a light emission operation for one image (one frame) is referred to as one frame period. A process for the signals for one frame period is not particularly limited, however, at least about 60 times per second is preferable so that a person who sees the image does not sense a flicker.

By the writing operation, a video signal in accordance with a gray scale of a pixel is written to the pixel in the display device of this embodiment mode. That is, an analog signal is written to the pixel. This video signal may be a current signal or a voltage signal.

By holding the video signal in the sustain period, a gray scale is expressed. Here, a display device having the pixel of the invention erases the signal written to the pixel by the erasing operation. Then, an erasing period is provided until the next frame period. That is, when a black display is inserted, an afterimage is hardly seen. In this manner, characteristics of moving images can be improved.

For example, the pixel shown in FIG. 1 can be applied to the pixel of the display device of this embodiment mode. In the pixel shown in FIG. 1, an analog signal is used as a video signal inputted to the signal line 106.

When a signal is written to the pixel, an H-level signal is inputted to the first scan line 105 to turn on the switching transistor 102. Then, an analog signal is inputted to the gate terminal of the driving transistor 101. In this manner, a signal is written to the pixel.

In the light emission operation, the first scan line 105 is set at an L-level to turn off the switching transistor 102. Then, the capacitor 103 holds the potential of the analog signal. In accordance with the potential of the analog signal inputted to the gate terminal of the driving transistor 101, the amount of current flowing through the driving transistor 101 is controlled. That is, the driving transistor 101 mainly operates in a saturation region.

In the erasing operation, an H-level signal is inputted to the second scan line 110 and a current is flows the rectifying element 109. Then, the potential of the gate terminal of the driving transistor 101 can be set at a predetermined potential. In this manner, the signal can be erased. The predetermined potential can be set higher than that of the power source line 107, which leads to reduce an off current of the driving transistor 101.

With a display device of the invention, an off current is reduced. Therefore, a display defect can be prevented and the yield can be improved.

It is to be noted that the driving method of this embodiment mode can be applied to another display device having the pixel besides those shown in Embodiment Modes 1 to 3, 5, and 6.

Embodiment Mode 7

Figure 36A:
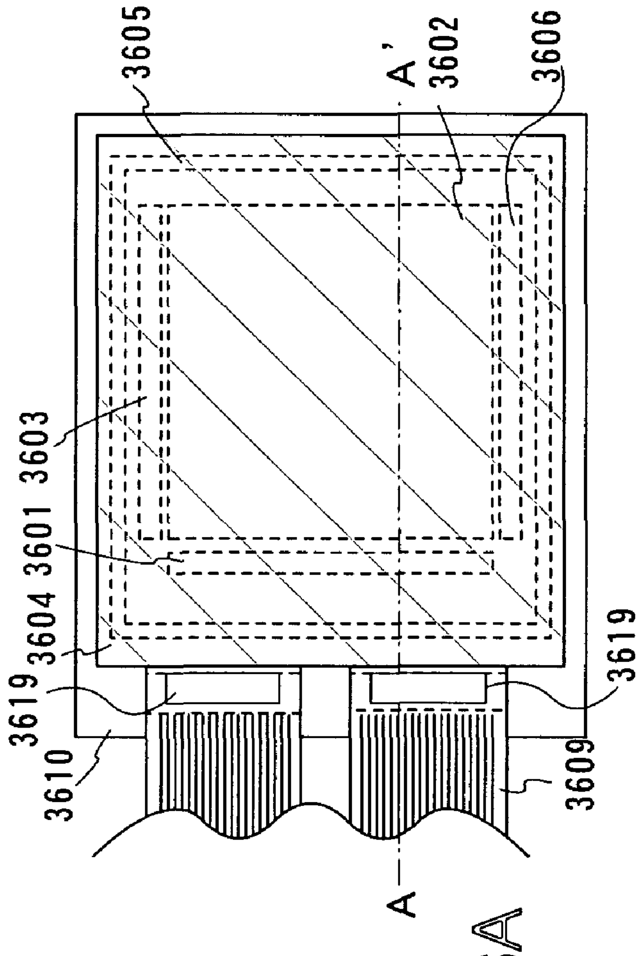
FIGS. 36A and 36B are examples of a display panel of the invention.
Figure 36B:
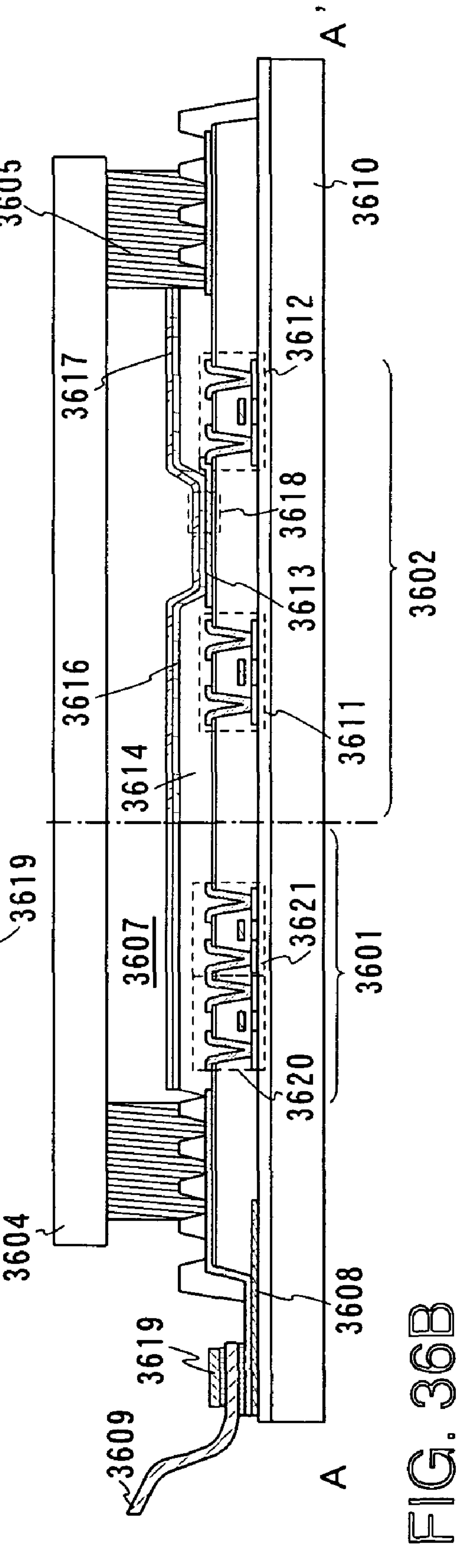

In this embodiment mode, description is made with reference to FIGS. 36A and 36B on the structures of a display panel used for a display device.

In this embodiment mode, description is made with reference to FIGS. 36A and 36B on a display panel which can be applied to the display device of the invention. It is to be noted that FIG. 36A is a top plan view of the display panel and FIG. 36B is a sectional diagram along A-A' of FIG. 36A. A signal line driver circuit 3601, a pixel portion 3602, a second scan line driver circuit 3603, and a first scan line driver circuit 3606 which are shown by dotted lines are provided. Further, a sealing substrate 3604 and a sealing material 3605 are provided. A space 3607 is surrounded by the sealing material 3605. It is to be noted that an insulator may be injected in the space 3607.

It is to be noted that a wire 3608 is a wire for transmitting a signal inputted to the second scan line driver circuit 3603, the first scan line driver circuit 3606, and the signal line driver circuit 3601 and receives a video signal, a clock signal, a start signal, and the like from an FPC (Flexible Printed Circuit) 3609 to be an external input terminal. An IC chip (semiconductor chip including memory circuit, buffer circuit, and the like) 3619 is mounted over a joint portion of the FPC 3609 and the display panel by COG (Chip On Glass) or the like. It is to be noted that only the FPC 3609 is shown here, however, a printed wiring board (PWB) may be attached to the FPC 3609. A display device in this specification includes not only a main body of the display panel, but also the one with an FPC or a PWB attached thereto and the one mounted with an IC chip or the like.

Next, description is made with reference to FIG. 36B on a sectional structure. The pixel portion 3602 and a peripheral driver circuit (the second scan line driver circuit 3603, the first scan line driver circuit 3606, and the signal line driver circuit 3602) are formed over a substrate 3610. Here, the signal line driver circuit 3601 and the pixel portion 3602 are shown.

It is to be noted that the signal line driver circuit 3601 forms a CMOS circuit using an N-channel TFT 3620 and a P-channel TFT 3621. Further, in this embodiment mode, a display panel in which a peripheral driver circuit is integrated over the substrate is shown, however, the invention is not limited to this. All or a part of the peripheral driver circuit may be formed into an IC chip or the like and mounted by COG or the like.

Further, the pixel portion 3602 includes a plurality of circuits which form pixels each having a switching TFT 3611 and a driving TFT 3612. It is to be noted that a first electrode of the driving TFT 3612 is connected to a pixel electrode 3613. An insulator 3614 is formed so as to cover end portions of the pixel electrode 3613. Here, a positive type photosensitive acrylic resin film is used for the insulator 3614.

In order to obtain favorable coverage, the insulator 3614 is formed so that a curved surface having a curvature is formed at a top end portion or a bottom end portion of the insulator 3614. For example, in the case of using a positive type photosensitive acrylic as a material for the insulator 3614, it is preferable that only the top end portion of the insulator 3614 have a curved surface having a curvature radius (0.2 to 3 μm). Moreover, a negative type photosensitive acrylic which becomes insoluble in etchant by photosensitive light or a positive type photosensitive acrylic which becomes soluble in etchant by light can be used as the insulator 3614.

A layer 3616 containing an organic compound and an opposite electrode 3617 are formed over the pixel electrode 3613. Here, it is preferable to use a material having a high work function as a material used for the pixel electrode 3613 which functions as an anode. For example, a single layer of an ITO (indium tin oxide) film, an indium zinc oxide (IZO) film, a titanium nitride film, a chromium film, a tungsten film, a Zn film, a Pt film, and the like, a stacked-layer of a titanium nitride film and a film containing aluminum as a main component, a three-layer structure of a titanium nitride film, a layer containing aluminum as a main component, and a titanium nitride film can be used. It is to be noted that with a stacked-layer structure, resistance as a wire is low, favorable ohmic contact can be obtained, and a function as an anode can be obtained.

The layer 3616 containing an organic compound is formed by an evaporation method using an evaporation mask or an ink-jet method. A metal complex belonging to group 4 of the periodic table of elements is used for a part of the layer 3616 containing an organic compound. Besides, a low molecular material or a high molecular material may be used as a combination as well. Further, as a material used for the layer 3616 containing an organic compound, a single layer or a stacked-layer of an organic compound is normally used, however, in this embodiment mode, an inorganic compound may be used in a part of the film formed of an organic compound. Moreover, a known triplet material may be used.

Further, as a material used for the opposite electrode 3617 formed over the layer 3616 containing an organic compound, a material having a low work function (Al, Ag, Li, Ca, or an alloy thereof such as MgAg, MgIn, AlLi, $CaF_2$, or $Ca_3N_2$) may be used. In the case where light generated from the layer 3616 containing an organic compound transmits through the opposite electrode 3617, a stacked-layer of a metal thin film with a thinner thickness and a light-transmissive conductive film (ITO (indium oxide tin oxide alloy), indium oxide zinc oxide alloy ($In_2O_3$—ZnO), zinc oxide (ZnO), or the like) is preferably used. In this manner, the opposite electrode 3617 which functions as a cathode can be formed.

Further, by attaching the sealing substrate 3604 to the substrate 3610 by the sealing material 3605, the light emitting element 3618 is provided in the space 3607 surrounded by the substrate 3610, the sealing substrate 3604, and the sealing material 3605. The space 3607 may be filled with the sealing material 3605 as well as an inert gas (nitrogen, argon, or the like).

It is to be noted that an epoxy-based resin is preferably used for the sealing material 3605. Further, it is preferable that these materials should not transmit moisture or oxygen as much as possible. As a material for the sealing substrate 3604, a glass substrate, a quartz substrate, a plastic substrate formed of an FRP (Fiberglass-Reinforced Plastics), PVF (polyvinylfluoride), myler, polyester, acrylic, or the like can be used.

As described above, a display panel can be obtained.

As shown in FIG. 36, the cost of the display device can be reduced by integrating the signal ling driver circuit 3601, the pixel portion 3602, the second scan line driver circuit 3603, and the first scan line driver circuit 3606.

Figure 37B:
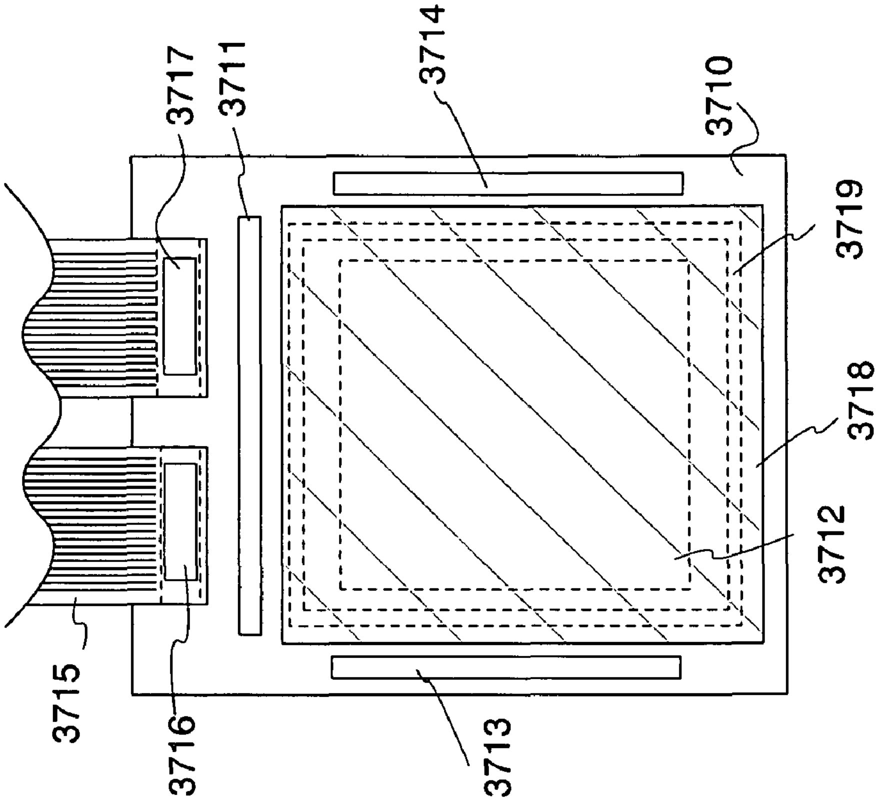
FIGS. 37A and 37B are examples of a display panel of the invention.
Figure 37A:
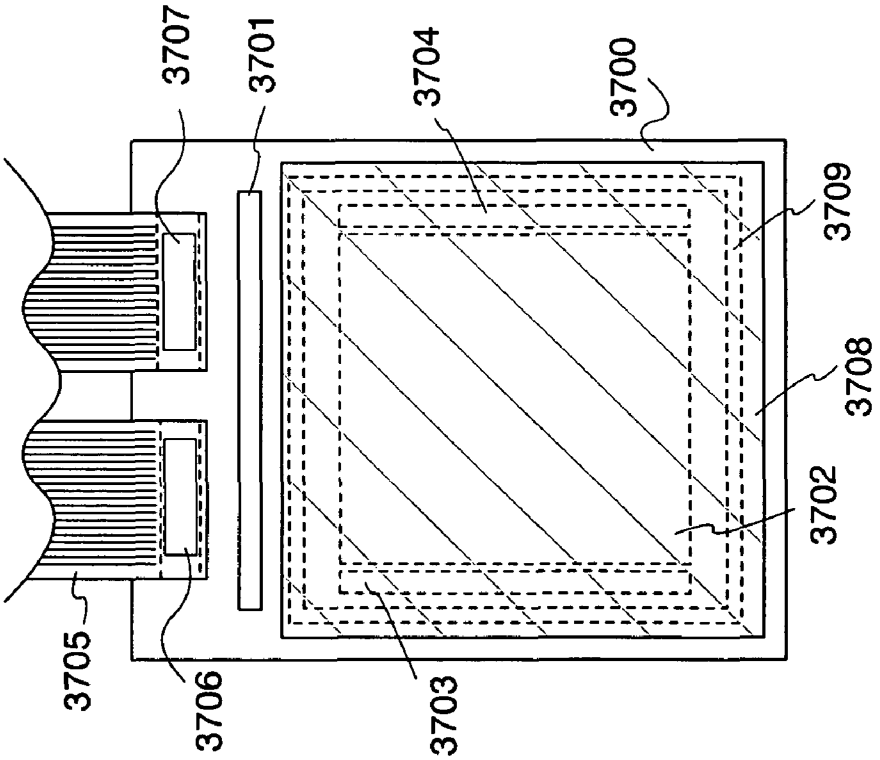

It is to be noted that the configuration of the display panel is not limited to the structure shown in FIG. 36A where the signal line driver circuit 3601, the pixel portion 3602, the second scan line driver circuit 3603, and the first scan line driver circuit 3606 are integrated, but a signal line driver circuit 3701 shown in FIG. 37A corresponding to the signal line driver circuit 3601 may be formed into an IC chip and mounted over the display panel by COG, or the like. It is to be noted that a substrate 3700, a pixel portion 3702, a second scan line driver circuit 3703, a first scan line driver circuit 3704, an FPC 3705, an IC chip 3706, an IC chip 3707, a sealing substrate 3708, and a sealing material 3709 in FIG. 37A correspond to the substrate 3610, the pixel portion 3602, the second scan line driver circuit 3603, the first scan line driver circuit 3606, the FPC 3609, the IC chips 3619, the sealing substrate 3604, and the sealing material 3605 in FIG. 36A respectively.

That is, only the signal line driver circuit which is required to have a driver circuit which operates at a high rate is formed into an IC chip using a CMOS or the like, thereby low power consumption is achieved. Further, by forming the IC chip into a semiconductor chip formed of a silicon wafer or the like, a higher operation and lower power consumption can be realized.

By integrating the first scan line driver circuit 3703 and the second scan line driver circuit 3704 with the pixel portion 3702, cost reduction can be achieved.

In this manner, cost reduction of a high resolution display device can be realized. Further, by mounting an IC chip including a functional circuit (memory or buffer) at a joint portion of the FPC 3705 and the substrate 3700, a substrate area can be effectively utilized.

Moreover, a signal line driver circuit 3711, a second scan line driver circuit 3714, and a first scan line driver circuit 3713 shown in FIG. 37B corresponding to the signal line driver circuit 3601, the second scan line driver circuit 3603, and the first scan line driver circuit 3606 shown in FIG. 36A may be formed into an IC chip and mounted over a display panel by COG or the like. In this case, lower power consumption of a high resolution display device can be realized. Therefore, in order to obtain a display device with less power consumption, it is preferable to use polysilicon (p-Si:H) for a semiconductor layer of a transistor used in the pixel portion. It is to be noted that a substrate 3710, a pixel portion 3712, an FPC 3715, an IC chip 3716, an IC chip 3717, a sealing substrate 3718, and a sealing material 3719 in FIG. 37B correspond to the substrate 3610, the pixel portion 3602, the FPC 3609, the IC chip 3619, the sealing substrate 3604, and the sealing material 3605 in FIG. 36A respectively.

Further, by using amorphous silicon (a-Si:H) for a semiconductor layer of the pixel portion 3712, cost reduction can be achieved. Moreover, a large display panel can be manufactured.

Figure 38A:
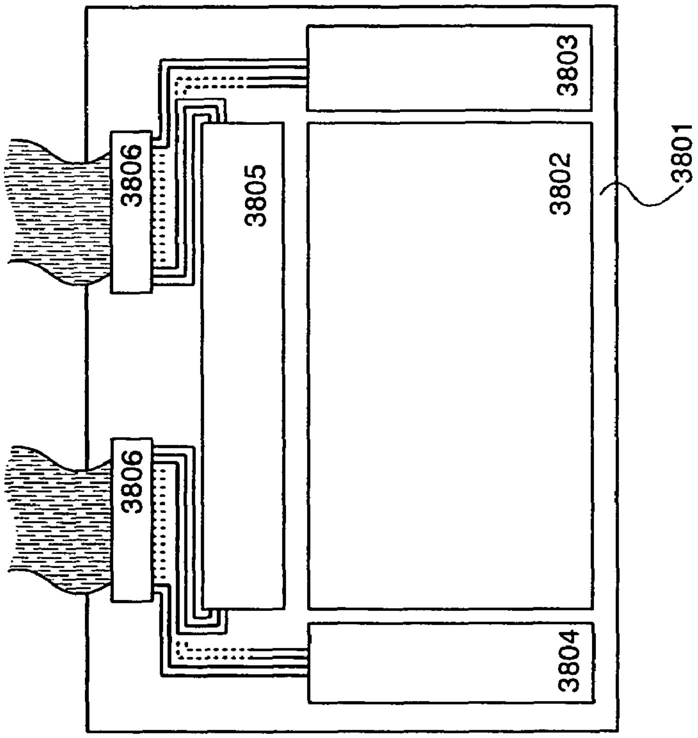
FIGS. 38A and 38B are examples of a display device of the invention.

FIG. 38A shows a schematic diagram of a configuration of the aforementioned display panel. A pixel portion 3802 in which a plurality of pixels are arranged is provided over a substrate 3801. A second scan line driver circuit 3803, a first scan line driver circuit 3804, and a signal line driver circuit 3805 are provided in the periphery of the pixel portion 3802.

Signals inputted to the second scan line driver circuit 3803, the first scan line driver circuit 3804, and the signal line driver circuit 3805 are externally supplied through a flexible printed circuit (FPC) 3806.

Although not shown, an IC chip may be mounted over the FPC 3806 by COG (Chip On Glass), TAB (Tape Auto Bonding), or the like. That is, a part of a memory and a buffer of the second scan line driver circuit 3803, the first scan line driver circuit 3804, and the signal line driver circuit 3805 which are not easily integrated with the pixel portion 3802 may be formed into an IC chip and mounted over the display device.

Figure 38B:
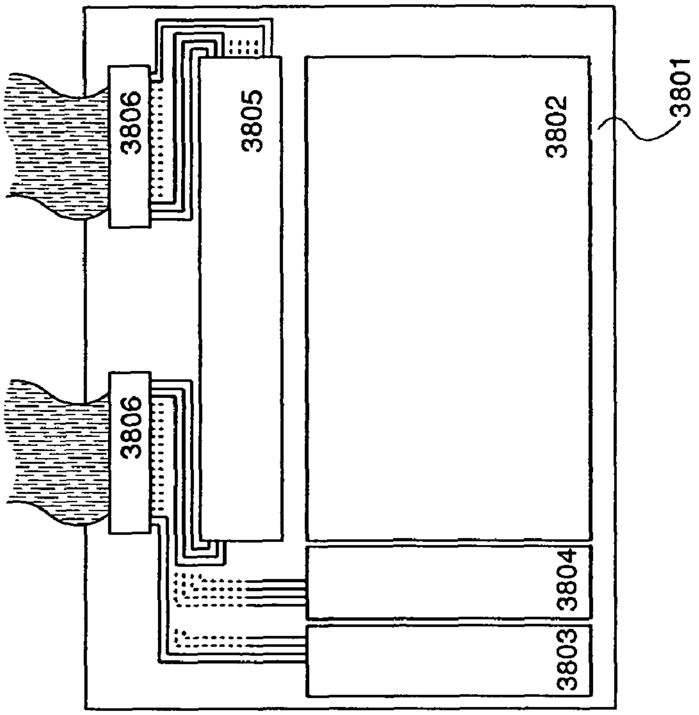

Here, in the display device of the invention, as shown in FIG. 38B, the second scan line driver circuit 3803 and the first scan line driver circuit 3804 may be provided on one side of the pixel portion 3802. It is to be noted that the display device shown in FIG. 38B is different from the display device shown in FIG. 38A in the arrangement of the second scan line driver circuit 3803, therefore, the same reference numerals are used. Moreover, the second scan line driver circuit 3803 and the first scan line driver circuit 3804 may be formed as one driver circuit to provide a similar function. That is, the configuration may be changed as required depending on the pixel configuration and the driving method.

Further, the first scan line driver circuit, the second scan line driver circuit, and the signal line driver circuit are not required to be provided in a row direction and a column direction of the pixels. For example, as shown in FIG. 39A, a peripheral driver circuit 3901 formed in an IC chip may have functions of the second scan line driver circuit 3714, the first scan line driver circuit 3713, and the signal line driver circuit 3711 shown in FIG. 37B. It is to be noted that a substrate 3900, a pixel portion 3902, an FPC 3904, an IC chip 3905, an IC chip 3906, a sealing substrate 3907, and a sealing material 3908 in FIG. 39A correspond to the substrate 3610, the pixel portion 3602, the FPC 3609, the IC chip 3619, the sealing substrate 3604, and the sealing material 3605 in FIG. 36A respectively.

Figure 39B:
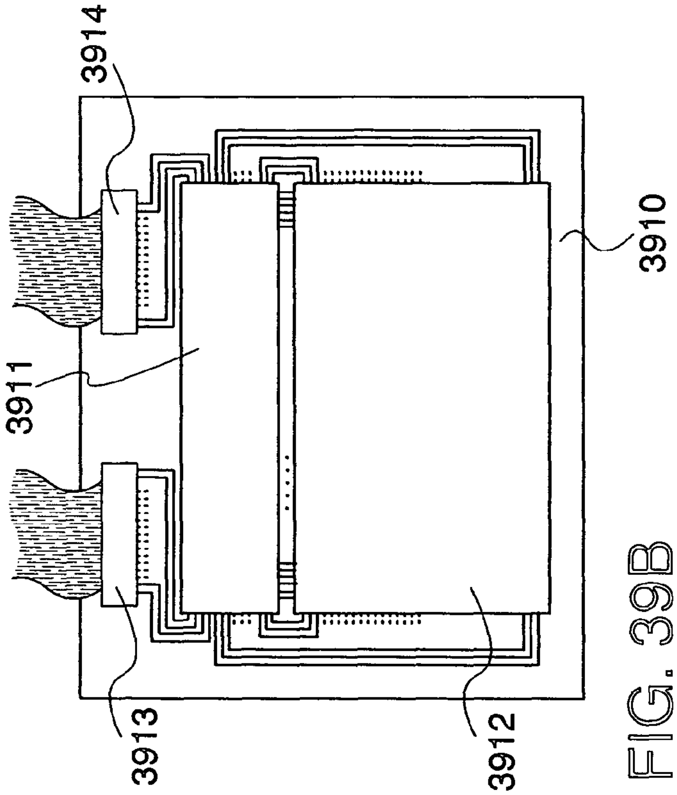
FIG. 39A is an example of a display panel of the invention and FIG. 39B is an example of a display device of the invention.
Figure 39A:
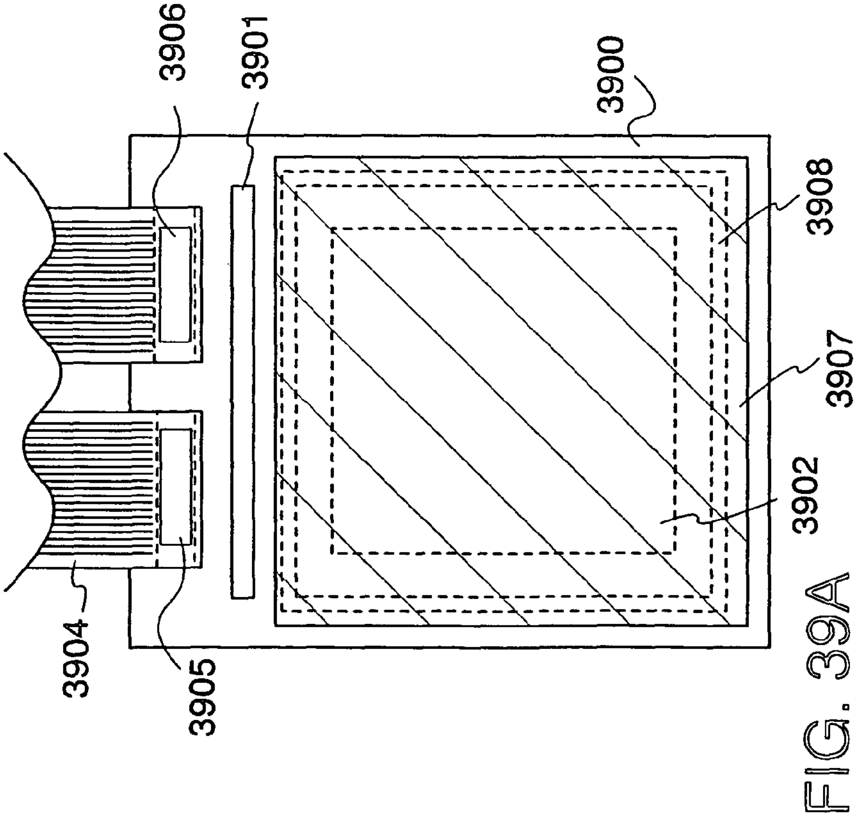

FIG. 39B shows a schematic diagram showing connections of signal lines of the display device shown in FIG. 39A. A substrate 3910, a peripheral driver circuit 3911, a pixel portion 3912, an FPC 3913, and an FPC 3914 are provided. Signals and a power source potential are externally inputted from the FPC 3913 to the peripheral driver circuit 3911. An output from the peripheral driver circuit 3911 is inputted to scan lines in the row direction and signal lines in the column direction, which are connected to the pixels in the pixel portion 3912.

Figure 28A:
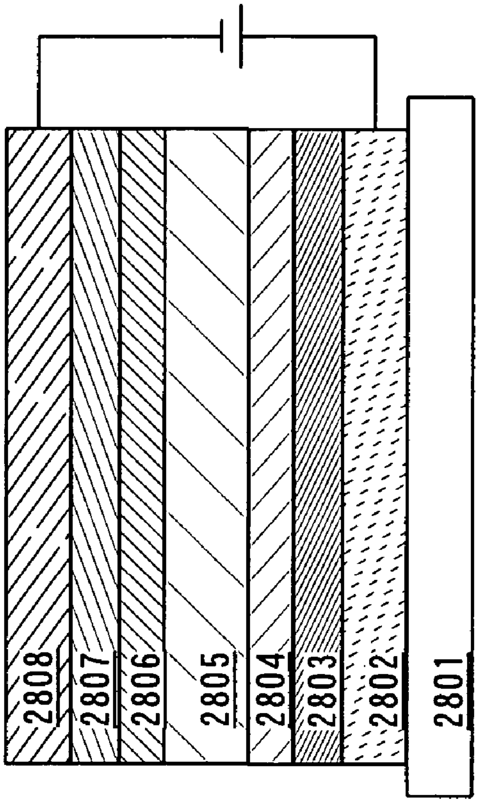
FIGS. 28A and 28B are diagrams showing light emitting elements.
Figure 28B:
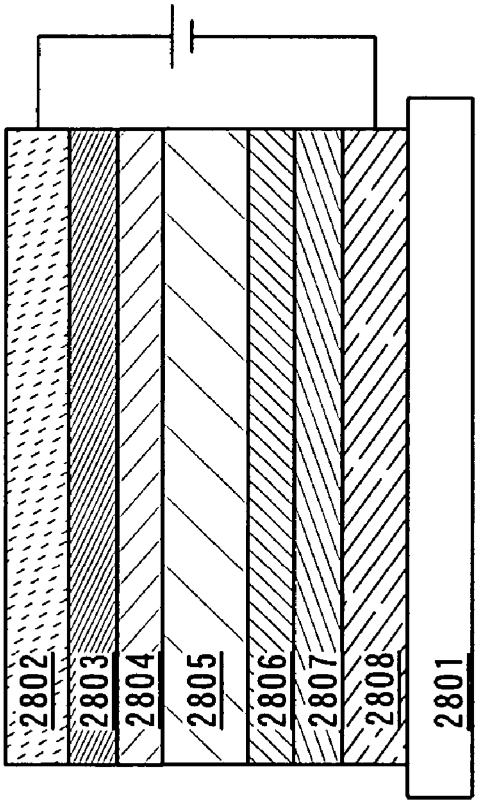

Further, FIGS. 28A and 28B show examples of a light emitting element which can be applied to the light emitting element 3618. That is, description is made with reference to FIGS. 28A and 28B on structures of a light emitting element which can be applied to the pixel shown in Embodiment Mode 1.

In a light emitting element shown in FIG. 28A, an anode 2802, a hole injecting layer 2803 formed of a hole injecting material, and a hole transporting layer 2804 formed of a hole transporting material, a light emitting layer 2805, an electron transporting layer 2806 formed of an electron transporting material, an electron injecting layer 2807 formed of an electron injecting material, and a cathode 2808 are stacked over a substrate 2801. Here, the light emitting layer 2805 is sometimes formed of only one kind of light emitting material, however, it may be formed of two or more kinds of materials. The structure of the element of the invention is not limited to this.

In addition to the stacked-layer structure shown in FIG. 28 in which each functional layer is stacked, there are wide variations such as an element formed of a polymer compound, a high efficiency element which utilizes a triplet light emission material which emits light by a triplet excitation state in a light emitting layer. It is also possible to apply a white light emitting element which can be obtained by dividing a light emitting region into two regions by controlling a recombination region of carriers using a hole blocking layer, and the like.

The element of the invention shown in FIG. 28 can be formed by sequentially depositing a hole injecting material, a hole transporting material, and a light emitting material over the substrate 2801 having the anode 2802 (ITO). Next, an electron transporting material and an electron injecting material are deposited, and at last the cathode 2808 is deposited.

Materials suitable for the hole injecting material, the hole transporting material, the electron transporting material, the electron injecting material, and the light emitting material are as follows.

As the hole injecting material, a porphyrin-based compound, a phthalocyanine (hereinafter referred to as "$H_2$Pc"), copper phthalocyanine (hereinafter referred to as "CuPc"), and the like are effective as an organic compound. Further, a material that has a smaller value of an ionization potential than the hole transporting material to be used and has a hole transporting function can also be used as the hole injecting material. There is also a material obtained by chemically doping a conductive high molecular compound, which includes polyaniline and polyethylene dioxythiophene (hereinafter, referred to as "PEDOT") doped with polystyrene sulfonate (hereinafter, referred to as "PSS"). Also, an insulator of a high molecular compound is efficient in terms of planarization of an anode, and polyimide (hereinafter, referred to as "PI") is often used. Further, an inorganic compound is also used, which includes an extra-thin film of aluminum oxide (hereinafter, referred to as "alumina") in addition to a thin film of a metal such as gold or platinum.

It is an aromatic amine-based (that is, one having a bond of benzene ring-nitrogen) compound that is most widely used as the hole transporting material. A material that is widely used includes 28'-bis(diphenylamino)biphenyl (hereinafter, referred to as "TAD"), derivatives thereof such as 28'-bis[N-(3-methylphenyl)-N-phenyl-amino]-biphenyl (hereinafter, referred to as "TPD"), 28'-bis[N-(1-naphthyl)-N-phenyl-amino]-biphenyl (hereinafter, referred to as "α-NPD"), and star burst aromatic amine compounds such as 28',4"-tris(N,N-diphenyl-amino)-triphenylamine (hereinafter, referred to as "TDATA") and 28',4"-tris[N-(3-methylphenyl)-N-phenyl-amino]-triphenylamine (hereinafter, referred to as "MTDATA").

As the hole transporting material, a metal complex is often used, which includes a metal complex having a quinoline moiety or a benzoquinoline moiety such as $Alq_3$, and BAlq mentioned above, tris(4-methyl-8-quinolinolato)aluminum (hereinafter, referred to as "Almq"), or bis(10-hydroxybenzo[h]-quinolinato)beryllium (hereinafter, referred to as "BeBq"), and in addition, a metal complex having an oxazole-based or a thiazole-based ligand such as bis[2-(2-hydroxyphenyl)-benzoxazolato]zinc (hereinafter, referred to as "$Zn(BOX)_2$") or bis[2-(2-hydroxyphenyl)-benzothiazolato]zinc (hereinafter, referred to as "$Zn(BTZ)_2$"). Further, in addition to the metal complexes, oxadiazole derivatives such as 2-(4-biphenylyl)-5-(4-tert-butylphenyl)-1,3,4-oxadiazole (hereinafter, referred to as "PBD") and OXD-7, triazole derivatives such as TAZ and 3-(4-tert-butylphenyl)-4-(4-ethylphenyl)-5-(4-biphenylyl)-2,0,4-triazole (hereinafter, referred to as "p-EtTAZ"), and phenanthroline derivatives such as bathophenanthroline (hereinafter, referred to as "BPhen") and BCP have an electron transporting property.

As the electron injecting material, the above-mentioned electron transporting materials can be used. In addition, an extra-thin film of an insulator such as metal halide such as calcium fluoride, lithium fluoride, or cesium fluoride, or alkali metal-oxide such as lithium oxide is often used. Further, an alkali-metal complex such as lithium acetyl acetonate (hereinafter, referred to as "Li(acac)") or 8-quinolinolato-lithium (hereinafter, referred to as "Liq") is also efficient.

As the light emitting material, in addition to the above-mentioned metal complexes such as $Alq_3$, Almq, BeBq, BAlq, $Zn(BOX)_2$, and $Zn(BTZ)_2$, various fluorescent pigments are efficient. The fluorescent pigments include 28'-bis(2,2-diphenyl-vinyl)-biphenyl, which is blue, and 4-(dicyanomethylene)-2-methyl-6-(p-dimethylaminostyryl)-4H-pyran, which is red-orange. Also, a triplet light emitting material is available, which principally includes a complex with platinum or iridium as a central metal. As the triplet light emitting material, tris(2-phenylpyridine)iridium, bis(2-(4'-tryl)pyridinato-N,$C^{2'}$)acetylacetonato iridium (hereinafter, referred to as "$acacIr(tpy)_2$"), 2,3,7,8,20,13,17,18-octaethyl-21H,23H porphyrin-platinum, and the like are known.

By using the materials as described above in combination, a highly reliable light emitting element can be formed.

By changing the polarity of the driving transistor to be an N-channel transistor in the pixel configuration shown in Embodiment Mode 1 and reversing the high and low of the potential of the opposite electrode of the light emitting element and the potential of the power source line, a light emitting element in which layers are formed in a reverse order to that of FIG. 28A can be obtained. That is, as shown in FIG. 28B, the cathode 2808, the electron injecting layer 2807 formed of an electron injecting material, the electron transporting layer 2806 formed of an electron transporting material, the light emitting layer 2805, the hole transporting layer 2804 formed of a hole transporting material, the hole injecting layer 2803 formed of a hole injecting material, and the anode 2802 are stacked in this order over the substrate 2801.

In addition, in order to take out light emission of a display element, at least one of an anode and a cathode is required to transmit light. A TFT and a light emitting element are formed over a substrate; and there are light emitting elements having a top emission structure in which light emission is taken out through a surface opposite to the substrate, having a bottom emission structure in which light emission is taken out through a surface on the substrate side, and having a dual emission structure in which light emission is taken out through a surface opposite to the substrate and a surface on the substrate side, respectively. The pixel configuration of the invention can be applied for the light emitting element having any emission structure.

Figure 29A:
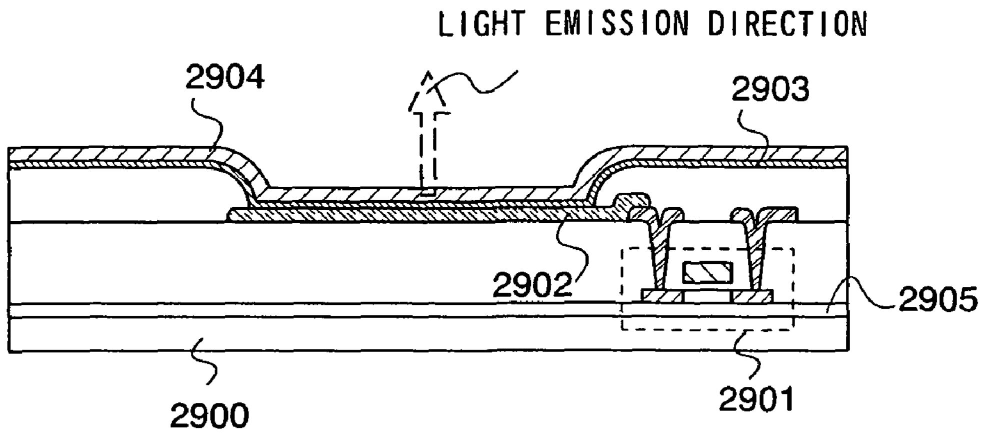
FIGS. 29A to 29C are sectional diagrams of portions of a display panel.

Description is made with reference to FIG. 29A on a light emitting element with a top emission structure.

A driving TFT 2901 is formed over a substrate 2900 with a base film 2905 interposed therebetween and a first electrode 2902 is formed in contact with a source electrode of the driving TFT 2901, over which a layer 2903 containing an organic compound and a second electrode 2904 are formed.

Further, the first electrode 2902 is an anode of a light emitting element. The second electrode 2904 is a cathode of the light emitting element. That is, a region of the layer 2903 containing an organic compound, which is sandwiched between the first electrode 2902 and the second electrode 2904 corresponds to the light emitting element.

Further, as a material used for the first electrode 2902 which functions as an anode, a material having a high work function is preferably used. For example, a single layer of a titanium nitride (TiN) film, a chromium (Cr) film, a tungsten (W) film, a zinc (Zn) film, a platinum (Pt) film, or the like, a stacked-layer of a titanium nitride film and a film containing aluminum as a main component, a stacked-layer of three layers of a titanium nitride film, a film containing aluminum as a main component, and a titanium nitride film can be used. With a stacked-layer structure, the resistance as a wire is low, a preferable ohmic contact can be obtained, and further a function as an anode can be obtained. By using a metal film which reflects light, an anode which does not transmit light can be formed.

As a material used for the second electrode 2904 which functions as a cathode, a stacked-layer of a metal thin film formed of a material having a low work function (Al, Ag, Li, Ca, or an alloy thereof such as MgAg, MgIn, AlLi, $CaF_2$, or $Ca_3N_2$), a light-transmissive conductive film (ITO (indium tin oxide), indium zinc oxide (IZO), zinc oxide (ZnO), or the like) is preferably used. By using a metal thin film and a light-transmissive conductive film in this manner, a cathode which can transmit light can be formed.

In this manner, light from the light emitting element can be extracted to the top surface as shown by an arrow in FIG. 29A. That is, in the case of applying the pixel shown in FIG. 29A to the display panel shown in FIG. 36, light is emitted to the substrate 3610 side. Therefore, in the case of using a light emitting element with a top emission structure to the display device, a substrate which transmits light is used as the sealing substrate 3604.

In the case of providing an optical film, an optical film may be provided over the sealing substrate 3604.

In the case of the pixel configuration shown in FIG. 36 of Embodiment Mode 1, a metal film formed of a material which functions as a cathode and has a low work function, such as MgAg, MgIn, AlLi can be used for the first electrode 2902. For the second electrode 2904, a light-transmissive film such as an ITO (indium tin oxide) film or an indium zinc oxide (IZO) film can be used. Accordingly, with this structure, the transmittance of the top light emission can be improved.

Figure 29B:
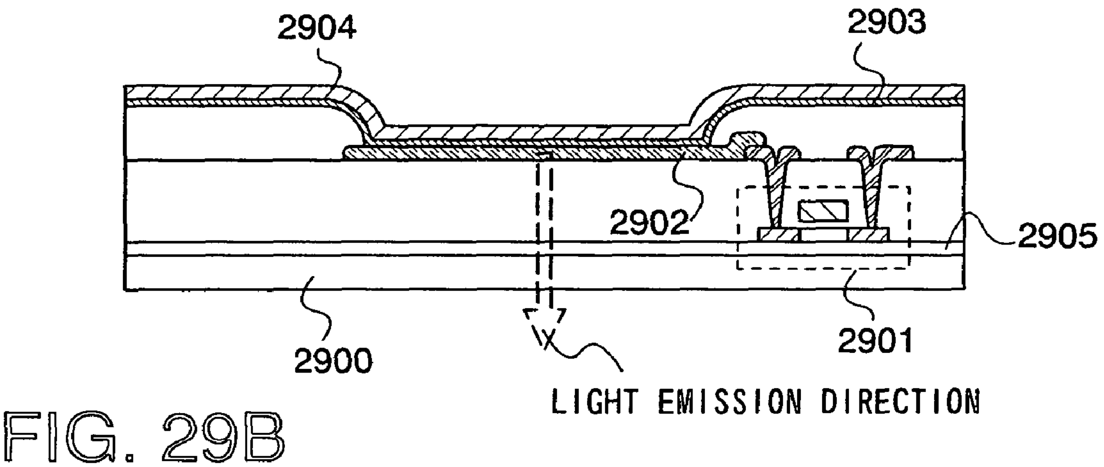

Further, description is made with reference to FIG. 29B on a light emitting element with a bottom emission structure. The same reference numerals to those in FIG. 29A are used as the structures are the same except for the light emission structure.

Here, as a material used for the first electrode 2902 which functions as an anode, a material having a high work function is preferably used. For example, a light-transmissive film such as an ITO (indium tin oxide) film and an indium zinc oxide (IZO) film can be used. By using a light-transmissive conductive film, an anode which can transmit light can be formed.

As a material used for the second electrode 2904 which functions as a cathode, a metal film formed of a material having a low work function (Al, Ag, Li, Ca, or an alloy thereof such as MgAg, MgIn, AlLi, $CaF_2$, or $Ca_3N_2$) can be used. By using a metal film which reflects light, a cathode which does not transmit light can be formed.

In this manner, light from the light emitting element can be extracted to a bottom surface as shown by an arrow in FIG. 29B. That is, in the case of applying the pixel shown in FIG. 29B to the display panel shown in FIG. 36, light is emitted to the substrate 3610 side. Therefore, in the case of using a light emitting element with a bottom emission structure to a display device, a substrate which transmits light is used as the substrate 3610.

In the case of providing an optical film, an optical film may be provided over the substrate 3610.

Figure 29C:
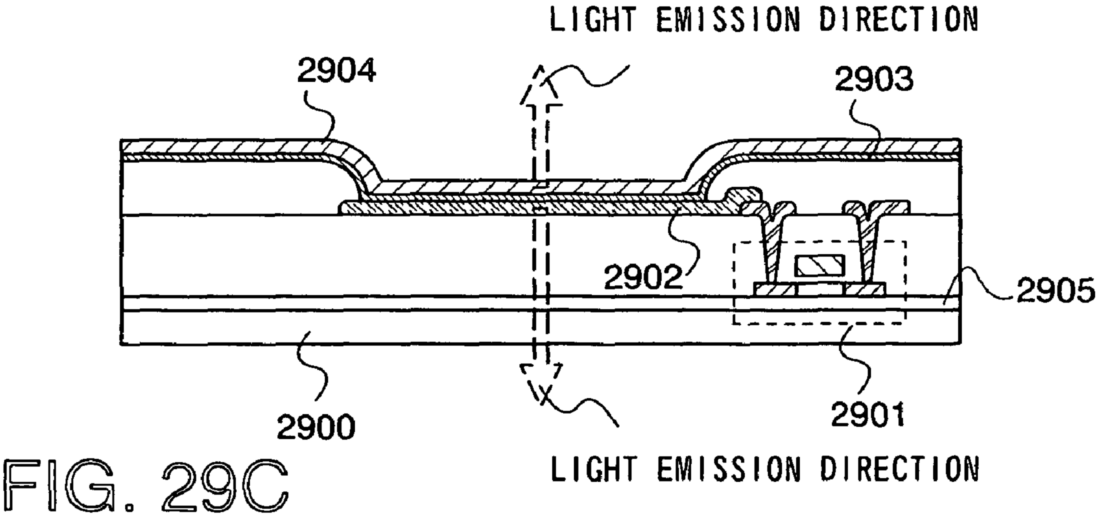

Description is made with reference to FIG. 29C on a light emitting element with a dual emission structure. The same reference numerals to those in FIG. 29A are used as the structures are the same except for the light emission structure.

Here, as a material used for the first electrode 2902 which functions as an anode, a material having a high work function is preferably used. For example, a light-transmissive film such as an ITO (indium tin oxide) film or an indium zinc oxide (IZO) film can be used. By using a light-transmissive conductive film, an anode which can transmit light can be formed.

As a material used for the second electrode 2904 which functions as a cathode, a stacked-layer of a metal thin film formed of a material having a low work function (Al, Ag, Li, Ca, or an alloy thereof such as MgAg, MgIn, AlLi, $CaF_2$, or $Ca_3N_2$), a light-transmissive conductive film (ITO (indium tin oxide), indium oxide zinc oxide ($In_2O_3$—ZnO) alloy, zinc oxide (ZnO), or the like) is preferably used. By using a metal thin film and a light-transmissive conductive film in this manner, a cathode which can transmit light can be formed.

In this manner, light from the light emitting element can be extracted to the both surfaces as shown by arrows in FIG. 29C. That is, in the case of applying the pixel shown in FIG. 29C to the display panel shown in FIG. 36, light is emitted to the substrate 3610 side and the substrate 3604 side. Therefore, in the case of using a light emitting element with a dual emission structure to a display device, a substrate which transmits light is used as the substrate 3610 and the sealing substrate 3604.

In the case of providing an optical film, optical films may be provided over both the substrate 3610 and the sealing substrate 3604.

The invention can also be applied to a display device which realizes a full color display by using a white light emitting element and a color filter.

Figure 30:
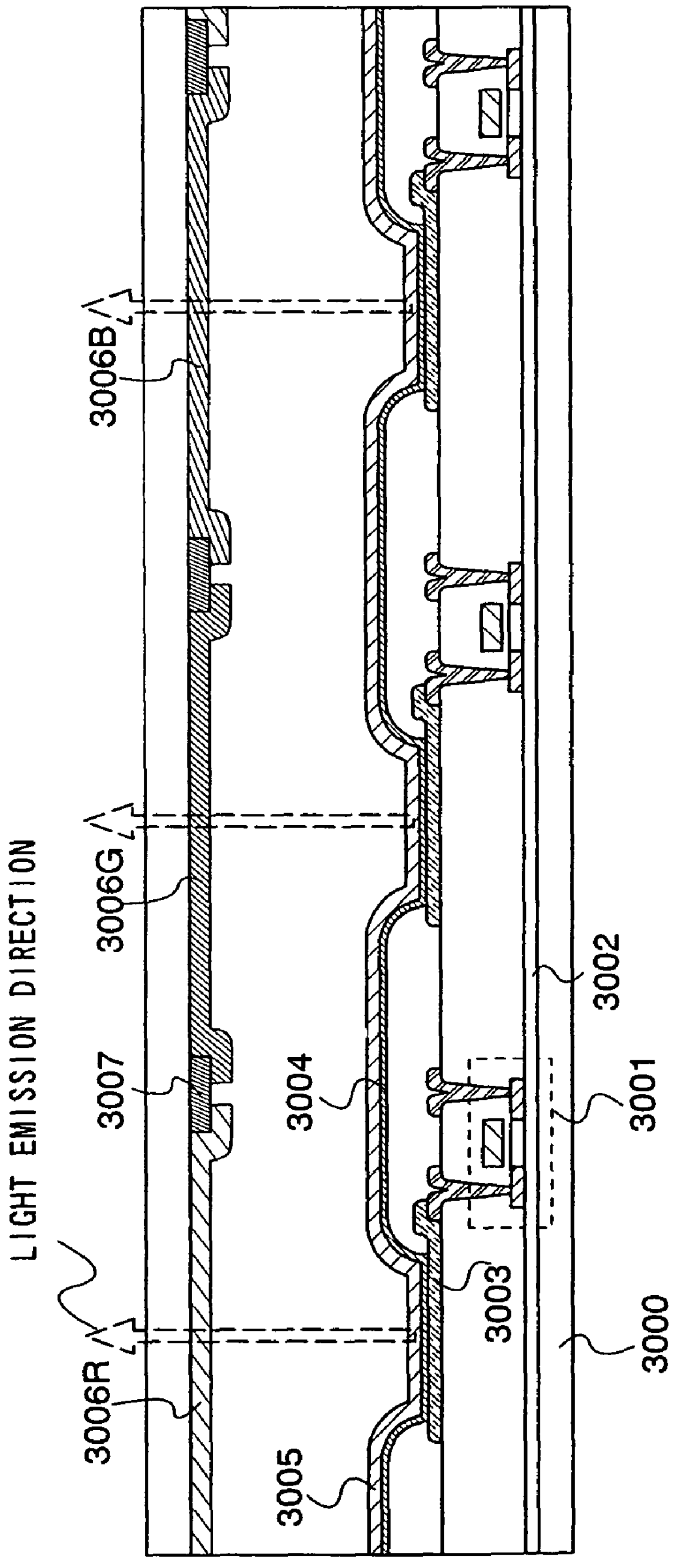
FIG. 30 is a sectional diagram of a portion of a display panel.

As shown in FIG. 30, a base film 3002 is formed over a substrate 3000 and a driving TFT 3001 is formed thereover. A first electrode 3003 is formed in contact with a source electrode of the driving TFT 3001 and a layer 3004 containing an organic compound and a second electrode 3005 are formed thereover.

The first electrode 3003 is an anode of a light emitting element. The second electrode 3005 is a cathode of the light emitting element. That is, a region where the layer 3004 containing an organic compound is sandwiched between the first electrode 3003 and the second electrode 3005 corresponds to the light emitting element. In the structure shown in FIG. 30, white light is emitted. A red color filter 3006R, a green color filter 3006G, and a blue color filter 3006B are provided over the light emitting element, thereby a full color display can be performed. Further, a black matrix (also referred to as BM) 3007 for separating these color filters is provided.

The aforementioned structures of the light emitting element can be used in combination and can be appropriately used for the display device of the invention. The structures of the display panel and the light emitting elements which are described above are examples and it is needless to say that other structures can be applied to the display device of the invention.

Embodiment Mode 8

The invention can be applied to various electronic devices. In specific, the invention can be applied to display portions of electronic devices. Such electronic devices include a camera such as a video camera and a digital camera, a goggle type display, a navigation system, an audio reproducing device (car audio set, audio component set, and the like), a computer, a game machine, a portable information terminal (mobile computer, portable phone, portable game machine, electronic book, and the like), an image reproducing device provided with a recording medium (specifically a device which reproduces a recording medium such as a DVD (Digital Versatile Disc) and has a light emitting device capable of displaying the reproduced image), and the like.

Figure 35A:
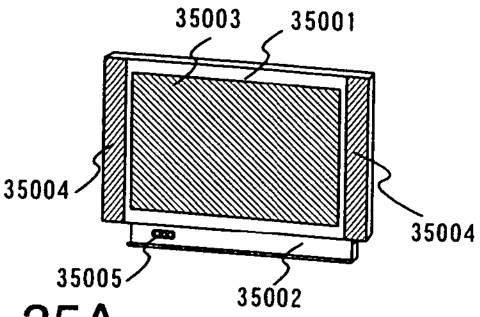
FIGS. 35A to 35H are examples of electronic devices to which the invention can be applied.

FIG. 35A illustrates a light emitting device including a housing 35001, a support base 35002, a display portion 35003, speaker portions 35004, a video input terminal 35005, and the like. The display device of the invention can be applied to the display portion 35003. It is to be noted that the light emitting device includes all light emitting devices for displaying information, such as the ones for a personal computer, a television broadcast reception, and advertisement. The light emitting device having the display device of the invention in the display portion 35003 can reduce slight light emission generated by an off current and provide a clear display.

Figure 35B:
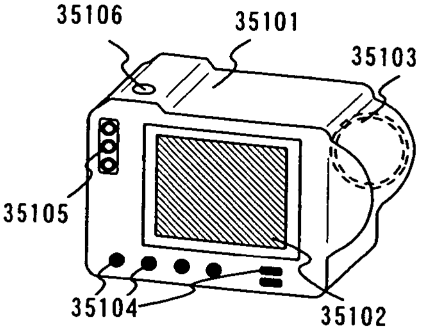

FIG. 35B illustrates a camera including a main body 35101, a display portion 35102, an image receiving portion 35103, operating keys 35104, an external connecting port 35105, a shutter 35106, and the like.

A digital camera having the invention in the display portion 35102 can reduce slight light emission generated by an off current and provide a clear display.

Figure 35C:
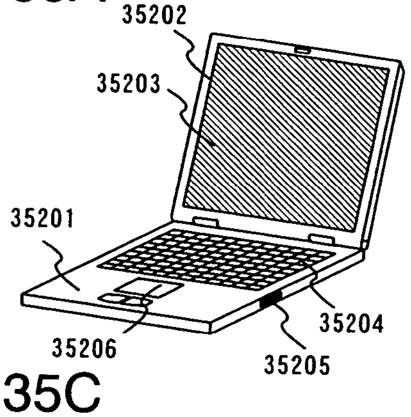

FIG. 35C illustrates a computer including a main body 35201, a housing 35202, a display portion 35203, a keyboard 35204, an external connecting port 35205, a pointing mouse 35206, and the like. A computer having the invention in the display portion 35203 can reduce slight light emission generated by an off current and provide a clear display.

Figure 35D:
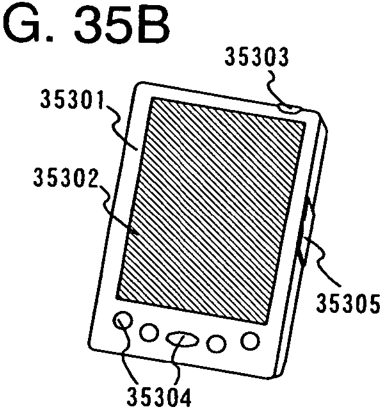

FIG. 35D illustrates a mobile computer including a main body 35301, a display portion 35302, a switch 35303, operating keys 35304, an infrared port 35305, and the like. A mobile computer having the invention in the display portion 35302 can reduce slight light emission generated by an off current and provide a clear display.

Figure 35E:
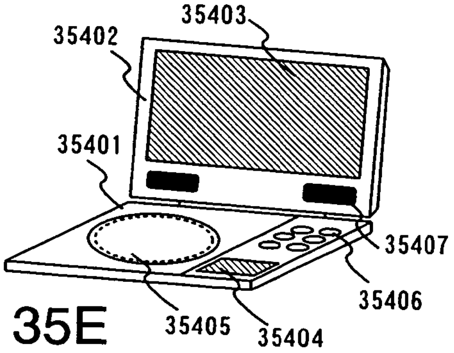

FIG. 35E illustrates a portable image reproducing device provided with a recording medium (specifically a DVD reproducing device), including a main body 35401, a housing 35402, a display portion A 35403, a display portion B 35404, a memory medium (DVD or the like) reading portion 35405, an operating key 35406, a speaker portion 35407, and the like. The display portion A 35403 mainly displays image data while the display portion B 35404 mainly displays text data. An image reproducing device using the invention in the display portion A 35403 or the display portion B 35404 can reduce slight light emission generated by an off current and provide a clear display.

Figure 35F:
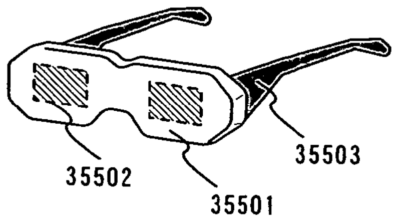

FIG. 35F illustrates a goggle type display including a main body 35501, a display portion 35502, and an arm portion 35503. A goggle type display using the invention in the display portion 35502 can reduce slight light emission generated by an off current and provide a clear display.

Figure 35G:
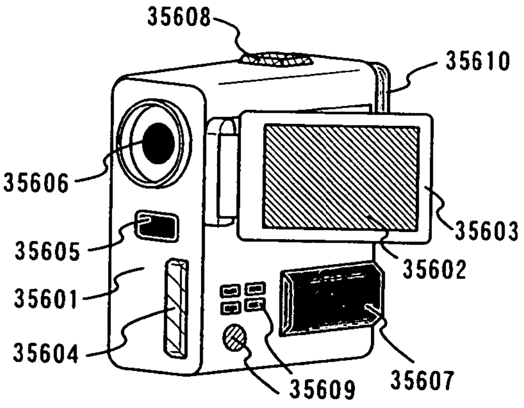

FIG. 35G illustrates a video camera including a main body 35601, a display portion 35602, a housing 35603, an external connecting port 35604, a remote control receiving portion 35605, an image receiving portion 35606, a battery 35607, an audio input portion 35608, operating keys 35609, an eyepiece portion 35610, and the like. A video camera having the invention in the display portion 35602 can reduce slight light emission generated by an off current and provide a clear display.

Figure 35H:
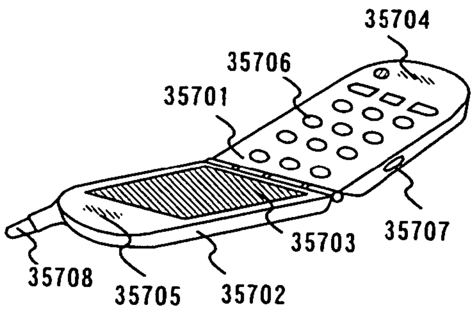

FIG. 35H illustrates a portable phone including a main body 35701, a housing 35702, a display portion 35703, an audio input portion 35704, an audio output portion 35705, an operating key 35706, an external connecting port 35707, an antenna 35708, and the like. A portable phone having the invention in the display portion 35703 can reduce slight light emission generated by an off current and provide a clear display.

In this manner, the invention can be applied to various electronic devices.

Embodiment Mode 9

Figure 33:
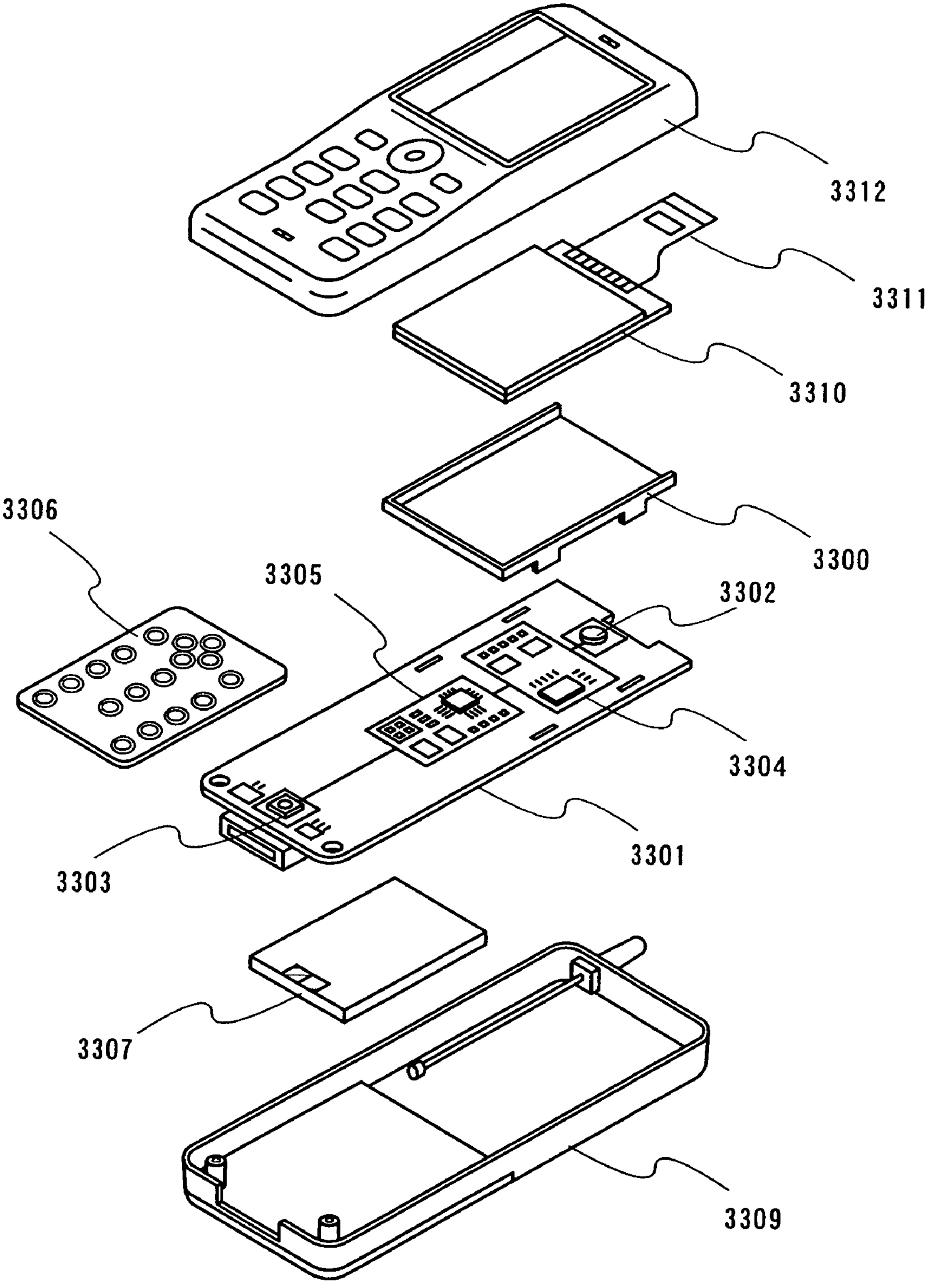
FIG. 33 is a view showing a structure example of a portable phone.

In this embodiment mode, description is made with reference to FIG. 33 on a structure example of a portable phone having a display device using the pixel configuration of the invention in a display portion.

A display panel 3310 is detachably incorporated in a housing 3300. The shape and size of the housing 3300 can be changed as required in accordance with the size of the display panel 3310. The housing 3300 in which the display panel 3310 is fixed is fit into the printed substrate 3301 and formed as a module.

The display panel 3310 is connected to the printed substrate 3301 through and FPC 3311. In the printed substrate 3301, a speaker 3302, a microphone 3303, a transmission/reception circuit 3304, and a signal processing circuit 3305 including a CPU, a controller, and the like are formed. Such a module, an input unit 3306, and a battery 3307 are combined and stored in a housing 3309. A pixel portion of the display panel 3310 is arranged so that it can be seen through an opening window formed in the housing 3309.

In the display panel 3310, the pixel portion and a part of a peripheral driver circuit (a driver circuit with a low operating frequency among a plurality of driver circuits) may be integrated over the substrate by using TFTs and another part of the peripheral driver circuit (a driver circuit with high operating frequency among a plurality of driver circuits) may be formed into an IC chip, thereby the IC chip may be mounted over the display panel 3310 by COG (Chip On Glass). Alternatively, the IC chip may be connected to a glass substrate by TAB (Tape Auto Bonding) or by using a printed substrate. It is to be noted that FIG. 37A shows an example of a structure of a display panel in which a part of a peripheral driver circuit is integrated with a pixel portion over a substrate and an IC chip formed of another part of peripheral driver circuit is mounted by COG or the like. With such a structure, low power consumption of a display device can be achieved and the usable time on a full charge of a portable phone can be extended. Further, cost reduction of a portable phone can be achieved.

Further, in order to further reduce the power consumption, a pixel portion is formed over the substrate using TFTs, all the peripheral driver circuits are formed into an IC chip, and the IC chip may be mounted over the display panel by COG (Chip On Glass) or the like as shown in FIG. 37B.

The structure shown in this embodiment mode is an example of a portable phone and the pixel configuration of the invention is not limited to a portable phone with such a structure, and can be applied to portable phones with various structures.

Embodiment Mode 10

Figure 31:
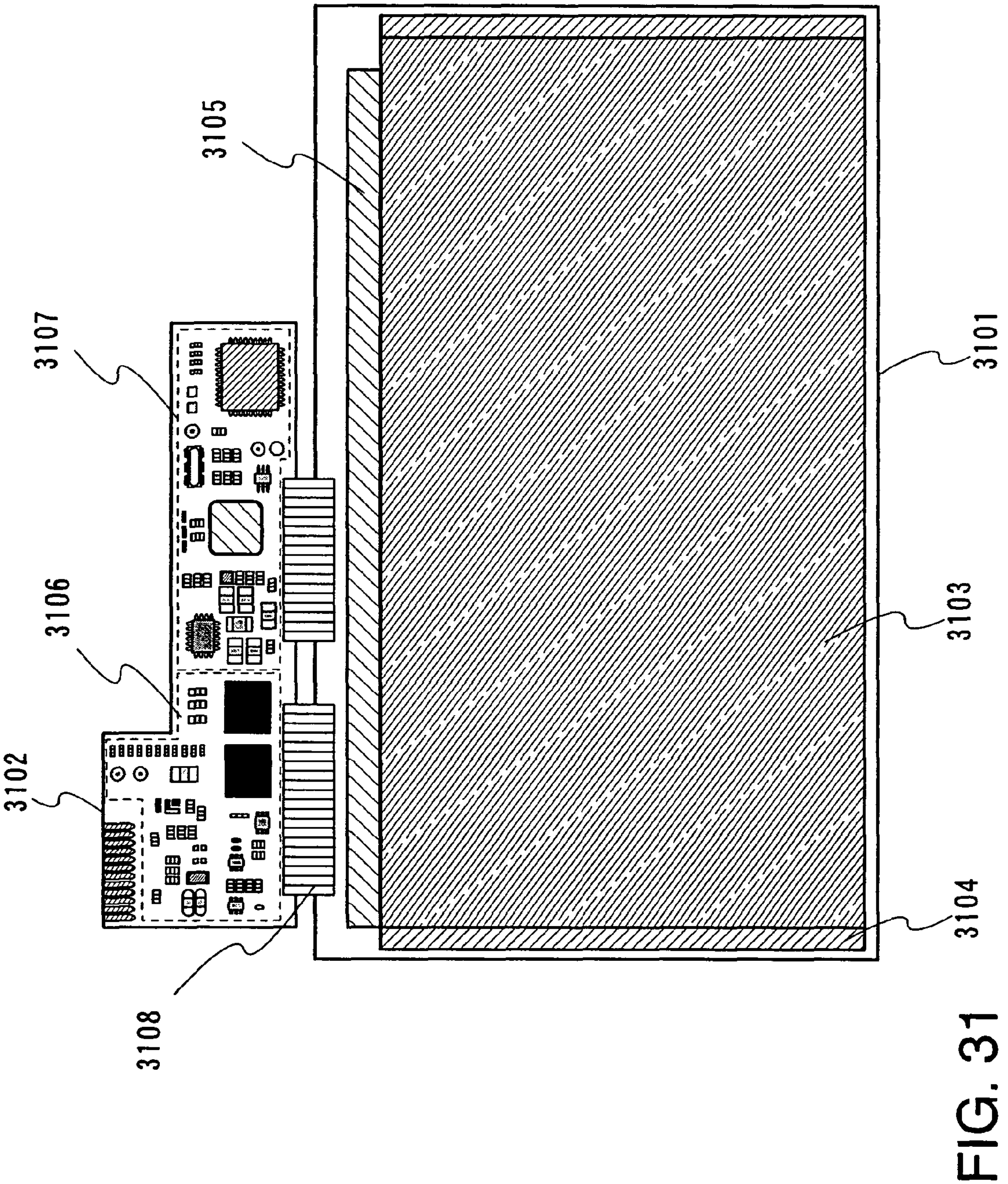
FIG. 31 is a diagram showing an EL module.

FIG. 31 shows an EL module in which a display panel 3101 and a circuit substrate 3102 are combined. The display panel 3101 includes a pixel portion 3103, a scan line driver circuit 3104, and a signal line driver circuit 3105. In the circuit substrate 3102, for example, a control circuit 3106, a signal dividing circuit 3107, and the like are formed. The display panel 3101 and the circuit substrate 3102 are connected through connecting wires 3108. The connecting wires may be an FPC or the like.

In the display panel 3101, the pixel portion and a part of a peripheral driver circuit (a driver circuit with a low operating frequency among a plurality of driver circuits) may be integrated over the substrate by using TFTs and another part of the peripheral driver circuit (a driver circuit with a high operating frequency among a plurality of driver circuits) may be formed into an IC chip, thereby the IC chip may be mounted over the display panel 3101 by COG (Chip On Glass) or the like. Alternatively, the IC chip may be mounted over the display panel 3101 by TAB (Tape Auto Bonding) or by using a printed substrate. It is to be noted that FIG. 37A shows an example of a structure of a display panel in which a part of a peripheral driver circuit is integrated with a pixel portion over a substrate and an IC chip formed of another part of the peripheral driver circuit is mounted by COG or the like.

In order to further reduce the power consumption, a pixel portion is formed over a glass substrate using TFTs, all the peripheral driver circuits are formed into an IC chip, and the IC chip may be mounted over the display panel by COG (Chip On Glass) or the like. FIG. 37B shows an example of a structure in which a pixel portion is formed over a substrate and an IC chip including a peripheral driver circuit is mounted over the substrate by COG or the like.

Figure 32:
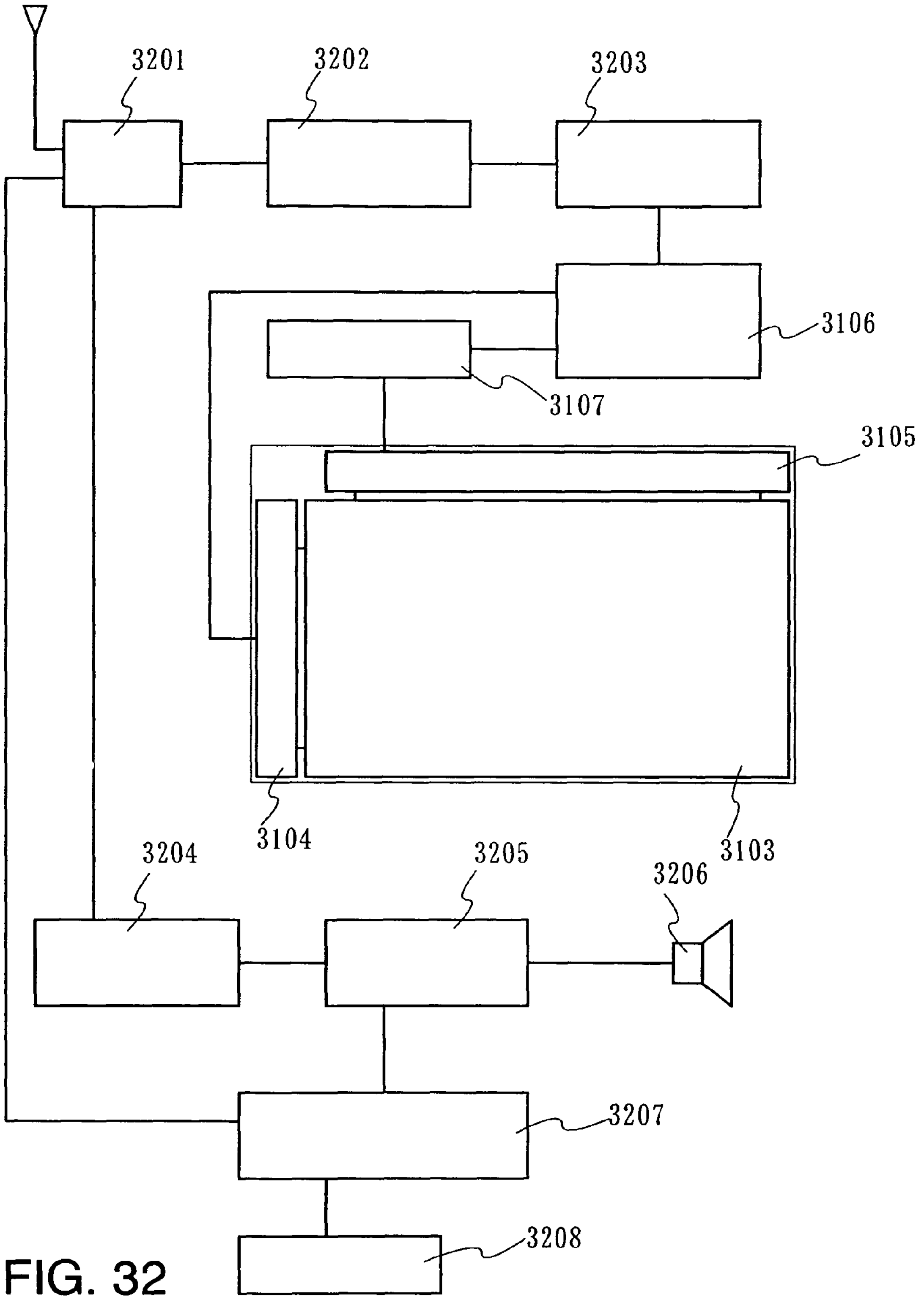
FIG. 32 is a diagram showing a major structure of an EL television receiver.

With this EL module, an EL television receiver can be completed. FIG. 32 is a block diagram showing a major structure of an EL television receiver. A tuner 3201 receives video signals and audio signals. The video signals are processed by a video signal amplifying circuit 3202, a video signal processing circuit 3203 which converts the signals outputted from the video signal amplifying circuit into color signals corresponding to each of red, green, and blue, and a control circuit 3106 which converts the video signals into the input specifications for a driver circuit. The control circuit 3106 outputs signals to a scan line side and a signal line side. In the case of a digital drive, a signal dividing circuit 3107 is provided on the signal line side and input digital signal may be divided into m signals and supplied.

The audio signals among the signals received by the tuner 3201 are transmitted to an audio signal amplifying circuit 3204 and an output thereof is supplied to a speaker 3206 through an audio signal processing circuit 3205. A control circuit 3207 receives control data such as a reception station (reception frequency) and a volume from an input portion 3208 and transmits the signals to the tuner 3201 and the audio signal processing circuit 3205.

As shown in FIG. 35A, the EL module shown in FIG. 31 may be incorporated in the housing 35001 to complete a television receiver. The display portion 35003 is formed using the EL module. Further, the speaker portion 35004, the video input terminal 35005, and the like are provided as required.

It is needless to say that the invention is not limited to the television receiver and can be used for various applications, in particular for a large display medium such as an information display board in train stations, airports, and the like, an advertisement display board on streets, and the like as well as a monitor of a personal computer.

Embodiment 1

In this embodiment, description is made in details on the relation of the potentials of the H-level and the L-level of the first scan line 105 and the second scan line 110 shown in the pixel of FIG. 1, the potential of the video signal inputted to the signal line 106 (Vsig (L) to make the pixel emit light and Vsig (H) to make the pixel emit no light), and the potentials of the power source line 107 and the opposite electrode 108.

Figure 52A:
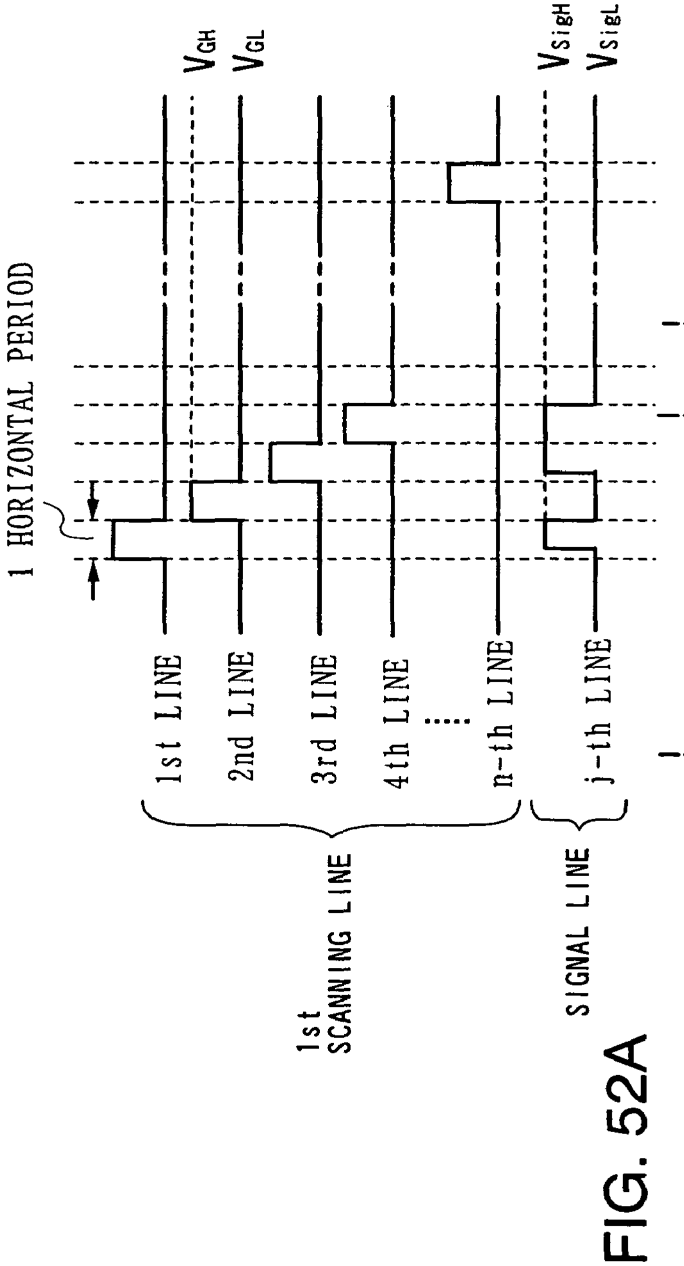
FIG. 52A is a diagram showing a potential of a first scan line signal and FIG. 52B is a diagram showing a potential of a video signal.

In the pixel portion of the display device, in which pixels are arranged in n rows, n of the first scan lines 105 are provided. A pulse is outputted to each of the first scan lines 105 as shown in FIG. 52A. Then, video signals are inputted to the pixels of a row to which the pulses are inputted. It is to be noted that FIG. 52A shows video signals inputted to pixels of a j-th column. A video signal (Vsig (H)) to make the pixel emit no light is written to a pixel of first row and j-th column. Further, a video signal (Vsig (L) to make the pixel emit light is written to a pixel of second row and j-th column.

Vsig (H) is preferably a potential which satisfies the relation: Vsig (H)>Vdd+Vthp when the high power source potential inputted to the power source line 107 is Vdd and the threshold voltage of the driving transistor 101 is Vthp. That is, in the case where the driving transistor 101 is an enhancement transistor, Vthp is a negative voltage, therefore, the relation Vsig (H)=Vdd is accepted. However, in the case where the driving transistor 101 is a depletion transistor, Vthp is a positive voltage, therefore, it is preferable that Vsig (H) satisfy the relation: Vsig (H)>Vdd. On the other hand, when the potential of Vsig (H) is too high, the amplitude of the video signal becomes too large, which leads to increase power consumption. Therefore, for example, Vsig (H) is preferably higher than the high power source potential Vdd by 1 to 3 V.

Vsig (L) may be a potential which can make the driving transistor 101 operate in a linear region. Therefore, it may be equal to or higher than that of the opposite electrode 108. By setting Vsig (L) equal to the potential of the opposite electrode 108, the number of power source lines can be reduced. By setting Vsig (L) higher than the potential of the opposite electrode 108, the amplitude of the video signal can be reduced, which leads to reduce the power consumption.

The H-level potential and the L-level potential inputted to the first scan line 105 are referred to as $V_{GH}$ and $V_{GL}$ respectively.

$V_{GH}$ is preferably a potential which can input the video signal Vsig (H) inputted to the signal line 106 to the gate terminal of the driving transistor 101. That is, $V_{GH}$ is preferably higher than Vsig (H) which makes the pixel emit no light by the threshold voltage Vthn of the switching transistor 102. Therefore, $V_{GH}$ is preferably a potential which satisfies the relation: $V_{GH}$>Vsig (H)+Vthn. For example, it is preferable that $V_{GH}$ be higher than Vsig (H) by 1 to 3 V.

It is preferable that the L-level potential $V_{GL}$ of the first scan line 105 be lower than Vsig (L). For example, in the case where the L-level potential of the first scan line 105 is equal to the potential of the video signal which makes the pixel emit light (Vsig (L) to turn of the driving transistor 101), when Vsig (L) is inputted to the signal line 106 for writing a signal to a pixel of another row, the gate-source voltage of the switching transistor 102 becomes 0 V in the pixel to which Vsig (H) is written. Then, when the switching transistor 102 is normally-on, an off current flows therethrough. Therefore, the charge accumulated in the capacitor 103 is discharged and the gate potential of the driving transistor 101 falls, thereby a current flows through the driving transistor 101 and the light emitting element 104 slightly emits light. In order to prevent that a signal written to the pixel leaks from the switching transistor 102, $V_{GL}$ is preferably a potential which satisfies the relation: $V_{GL}$<Vsig (L)+Vthn. For example, $V_{GL}$ is preferably lower than Vsig (L) by 1 to 3 V. It is to be noted that when the switching transistor 102 is an enhancement transistor, $V_{GL}$=Vsig (L) may be satisfied. Accordingly, the number of power source lines can be reduced and the power consumption can be reduced.

Figure 52B:
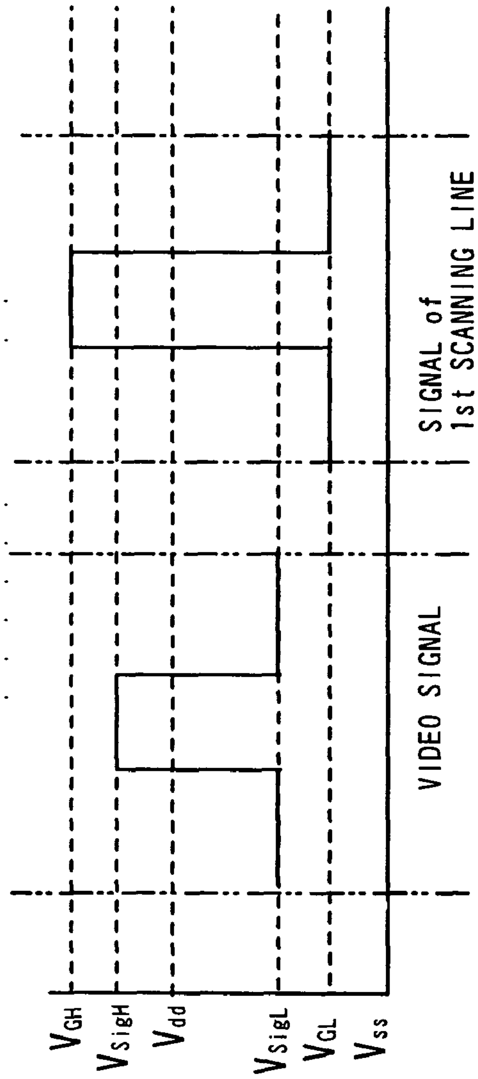

Therefore, as shown in FIG. 52B, the H-level potential $V_{GH}$ and the L-level potential $V_{GL}$ of a signal inputted to the first scan line 105 and the potentials of the video signals Vsig (H) and Vsig (L) inputted to the pixel may be set so as to satisfy the relation: $V_{GH}$>Vsig (H)>Vsig (L)>$V_{GL}$. Alternatively, when an enhancement transistor can be used as the switching transistor 102, it is preferable that the relation: $V_{GH}$>Vsig (H)>Vsig (L)=$V_{GL}$ be satisfied.

Figure 61A:
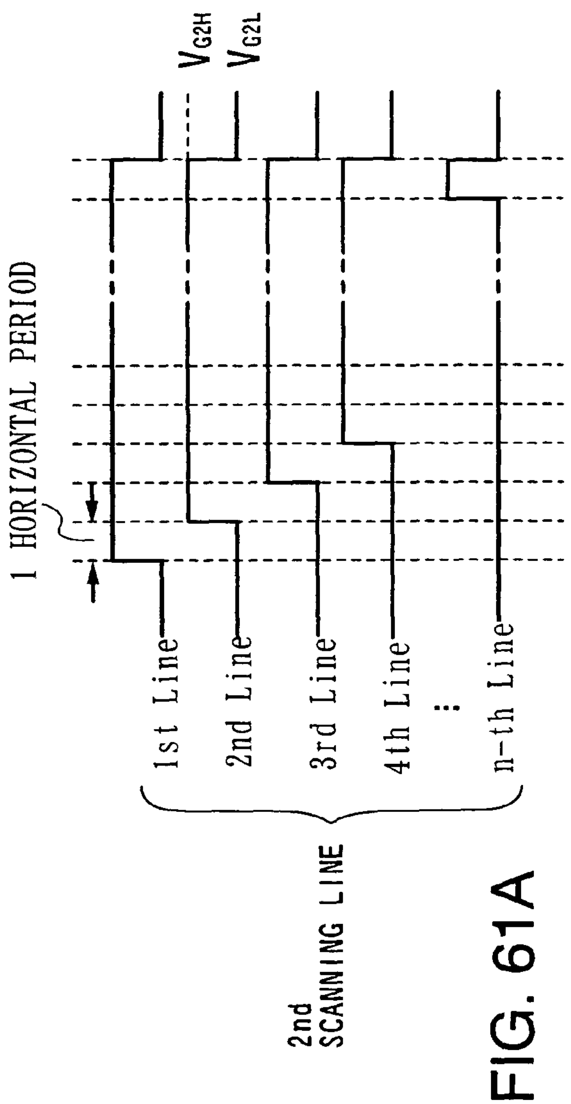
FIG. 61A is a diagram showing a potential of a second scan line signal and FIG. 61B is a diagram showing a potential of a video signal.
Figure 61B:
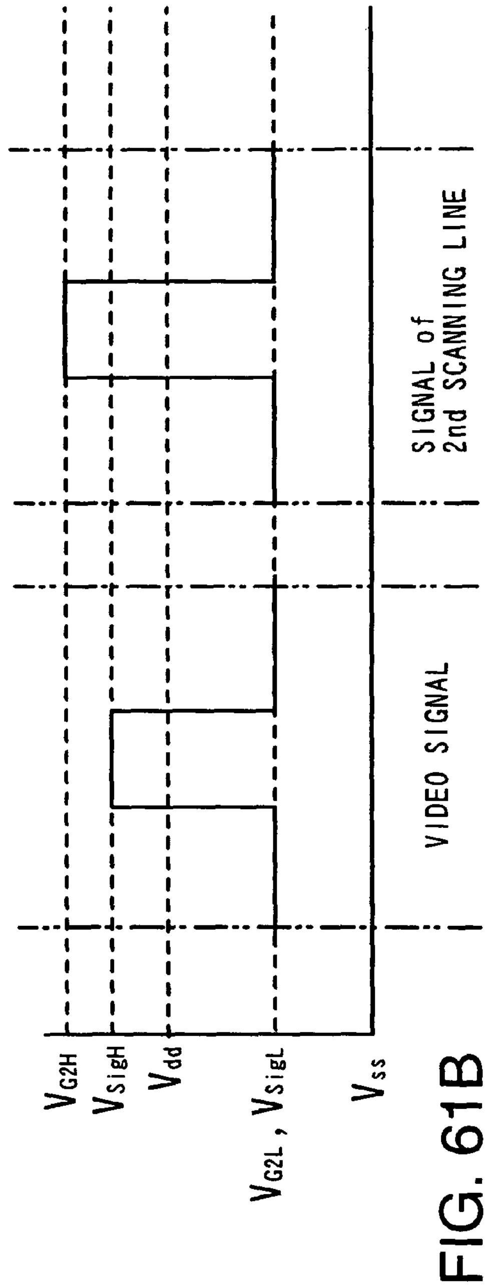

As shown in FIG. 61A, an H-level potential is sequentially inputted to the second scan line 110, changing from an L-level. In this manner, pixels in a row to which an H-level potential is inputted emit no light. By setting the second scan line at an H-level in the erasing operation, it can be prevented that a charge leaks from the gate terminal of the driving transistor 101 to which a potential to make the pixel emit no light is inputted and the potential falls.

It is to be noted that the H-level potential and the L-level potential inputted to the second scan line 110 are referred to as $V_{G2H}$ and $V_{G2L}$ respectively.

It is preferable that $V_{G2H}$ be a potential which enables the potential inputted to the signal line 106 to turn off the driving transistor 101 completely. Therefore, with a threshold voltage Vthd of the rectifying element 109, $V_{G2H}$ is preferably a potential which satisfies the relation: $V_{G2H}$−Vthd>Vdd+Vthp. That is, in the case where the driving transistor 101 is an enhancement transistor, Vthp is a negative voltage, therefore, the relation $V_{G2H}$−Vthd=Vdd is accepted. However, in the case where the driving transistor 101 is a depletion transistor, Vthp is a positive voltage, therefore, it is preferable that $V_{G2H}$ satisfies the relation: $V_{G2H}$>Vdd+Vthd. On the other hand, when the potential of $V_{G2H}$ is too high, the amplitude of the video signal becomes too large, which leads to increase power consumption. Therefore, for example, $V_{G2H}$ is preferably higher than the high power source potential Vdd by 1 to 3 V. Further, by setting $V_{G2H}$ and $V_{GH}$ at equal potentials, the number of power source lines can be reduced.

Further, it is preferable that the L-level potential $V_{G2L}$ of the first scan line 105 be a potential equal to or lower than that of a video signal which makes the pixel emit light (gate potential Vsig (L) to turn on the driving transistor 101). However, when this L-level potential $V_{GL}$ is set too low, a reverse bias voltage applied to the rectifying element 109 becomes high in the case where a video signal for non-light emission (gate potential Vsig (H) to turn off the driving transistor 101) is written to the pixel. Therefore, an off current (also referred to as a reverse current) flowing through the rectifying element 109 increases, thereby a charge held by the capacitor 103 leaks. Accordingly, the gate potential of the driving transistor 101 becomes low and more off current flows through the driving transistor 101. Therefore, it is preferable to set the L-level potential $V_{GL}$ equal to that of a video signal to make the pixel emit light (gate potential Vsig (L) to turn on the driving transistor 101).

Therefore, as shown in FIG. 62B, the H-level potential $V_{G2H}$ and the L-level potential $V_{G2L}$ of a signal inputted to the second scan line 110 and the potentials of the video signals Vsig (H) and Vsig (L) inputted to the pixel are set so as to satisfy the relation: $V_{G2H}$>Vsig (H)>Vsig (L)=$V_{G2L}$.

Figure 62:
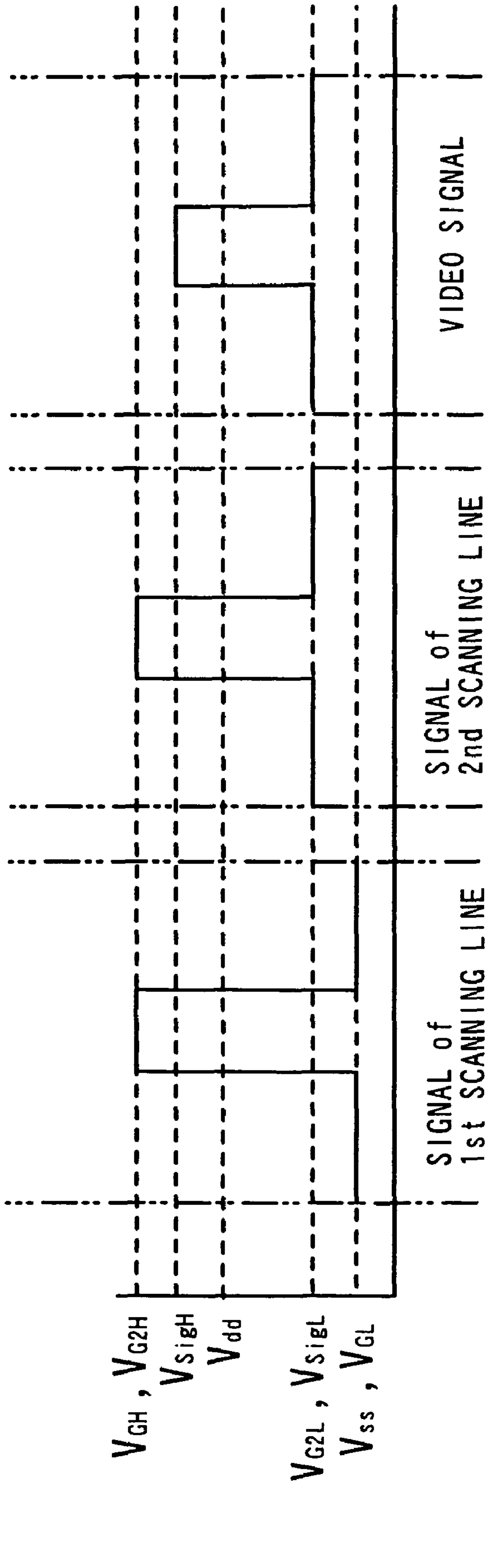
FIG. 62 is a diagram showing potentials of a first scan line signal, a second scan line signal, and a video signal.

Therefore, by setting $V_{GH}$ and $V_{G2H}$ at equal potentials and Vss and $V_{GL}$ at equal potentials as shown in FIG. 62, the number of power source lines can be reduced.

What is claimed is:

1. A semiconductor device comprising:
an electrode;
a diode comprising:
a first impurity region; and
a second impurity region;
a first transistor comprising:
a first terminal connected to a first wire;
a second terminal; and
a gate terminal connected to a second wire;
a second transistor comprising:
a first terminal connected to a third wire;
a second terminal directly connected to the electrode; and
a gate terminal directly connected to the second terminal of the first transistor; and
a third transistor comprising:
a first terminal directly connected to the gate terminal of the second transistor;
a second terminal connected to a fourth wire through the diode; and
a gate terminal directly connected to the fourth wire,
wherein the first impurity region is directly connected to the second terminal of the third transistor,
wherein the second impurity region is directly connected to the fourth wire,
wherein the first terminal of the third transistor, the second terminal of the third transistor, the first impurity region and the second impurity region are included in one island-shaped semiconductor layer,
wherein the first terminal of the third transistor, the second terminal of the third transistor and the first impurity region comprise a first dopant, and
wherein the second impurity region comprises a second dopant.

2. The semiconductor device according to claim 1,
wherein the first transistor and the third transistor are N-channel transistors and the second transistor is a P-channel transistor.

3. The semiconductor device according to claim 1,
wherein the electrode is incorporated in an electroluminescence element.

4. A display device comprising the semiconductor device according to claim 1.

5. An electronic device comprising the display device according to claim 4,
wherein the electronic device is one selected from the group consisting of a camera, a computer, a mobile computer, a portable image reproducing device provided with a recording medium, a goggle type display, a video camera, and a portable phone.

6. A semiconductor device comprising:
an electrode;
a PN junction diode comprising:
a first doped region; and
a second doped region;
a first transistor comprising:
a first terminal connected to a first wire;
a second terminal; and
a gate terminal connected to a second wire;
a second transistor comprising:
a first terminal connected to a third wire;
a second terminal directly connected to the electrode; and
a gate terminal directly connected to the second terminal of the first transistor; and
a third transistor comprising:
a first terminal directly connected to the gate terminal of the second transistor;
a second terminal connected to a fourth wire through the PN junction diode current voltage converter element; and
a gate terminal directly connected to the fourth wire,
wherein the first doped region is directly connected to the second terminal of the third transistor,
wherein the second doped region is directly connected to the fourth wire,
wherein the first terminal of the third transistor, the second terminal of the third transistor, the first doped region and the second doped region are included in one island-shaped semiconductor layer,
wherein the first terminal of the third transistor, the second terminal of the third transistor and the first doped region comprise a first dopant, and
wherein the second doped region comprises a second dopant.

7. The semiconductor device according to claim 6,
wherein the first transistor and the third transistor are N-channel transistors and the second transistor is a P-channel transistor.

8. The semiconductor device according to claim 6,
wherein the electrode is incorporated in an electroluminescence element.

9. A display device comprising the semiconductor device according to claim 6.

10. An electronic device comprising the display device according to claim 9,
wherein the electronic device is one selected from the group consisting of a camera, a computer, a mobile computer, a portable image reproducing device provided with a recording medium, a goggle type display, a video camera, and a portable phone.

* * * * *

UNITED STATES PATENT AND TRADEMARK OFFICE

CERTIFICATE OF CORRECTION

PATENT NO. : 8,300,031 B2
APPLICATION NO. : 11/391373
DATED : October 30, 2012
INVENTOR(S) : Kimura It is certified that error appears in the above-identified patent and that said Letters Patent is hereby corrected as shown below:

In the Specification

Column 49, line 3, "G_LCLK" should be -- G_CLK --;

In the Claims

Column 66, claim 6, line 34, please delete "current voltage converter element".

Signed and Sealed this
Eighteenth Day of February, 2014

Michelle K. Lee
*Deputy Director of the United States Patent and Trademark Office*